United States Patent [19]

Morley

[11] Patent Number: 4,648,064
[45] Date of Patent: Mar. 3, 1987

[54] PARALLEL PROCESS CONTROLLER

[76] Inventor: Richard E. Morley, RD #1 - Box 294 Greenville, N.H. 03048

[21] Appl. No.: 879,200

[22] Filed: Feb. 21, 1978

Related U.S. Application Data

[63] Continuation of Ser. No. 646,412, Jan. 2, 1976, abandoned.

[51] Int. Cl.⁴ .......................... G06F 15/16; G06F 9/00
[52] U.S. Cl. .................................................... 364/900
[58] Field of Search ... 364/200 MS File, 900 MS File; 370/80, 86, 88

[56] References Cited

U.S. PATENT DOCUMENTS

| | | | |
|---|---|---|---|
| 3,181,124 | 4/1965 | Hammel | 364/200 |
| 3,349,375 | 10/1967 | Seeber et al. | 364/200 |
| 3,389,404 | 6/1968 | Koster | 364/200 |
| 3,470,540 | 9/1969 | Levy | 364/200 |
| 3,483,329 | 12/1969 | Hunkins et al. | 370/86 |
| 3,537,074 | 10/1970 | Stokes et al. | 364/200 |
| 3,573,852 | 4/1971 | Watson et al. | 364/200 |
| 3,647,976 | 3/1972 | Moses | 370/88 |
| 3,659,271 | 4/1972 | Collins et al. | 364/200 |
| 3,697,959 | 10/1972 | Abramson et al. | 364/200 |
| 3,755,789 | 8/1973 | Collins | 364/200 |
| 3,781,478 | 12/1973 | Blahut et al. | 370/86 |
| 3,787,818 | 1/1974 | Arnold et al. | 364/200 |
| 3,796,835 | 3/1974 | Closs et al. | 370/88 |
| 3,875,564 | 4/1975 | Thurvoka et al. | 364/900 |
| 3,876,838 | 4/1975 | Boxall | 370/80 |
| 3,919,484 | 11/1975 | Maxemchuk | 370/86 |
| 3,943,494 | 3/1976 | Holmes, Jr. et al. | 364/200 |
| 3,997,879 | 12/1976 | Markley et al. | 364/900 |
| 4,015,243 | 3/1977 | Kurpanek et al. | 364/200 |

Primary Examiner—Eddie P. Chan
Attorney, Agent, or Firm—Alfred A. Fressola; Melvin I. Stoltz; Robert H. Ware

[57] ABSTRACT

A parallel process controller capable of expandable, parallel operating multi-function control of processes without degradation of performance. The process controller comprises up to N (where N is a positive integer) programmable command memory modules, and also comprises data memory modules, an input/output system, a high speed data bus (N-bus) and a general timing and control unit. Each command memory module performs the functional equivalent of a central processing unit with storage of instruction lines designatable by a user via a programming panel. Each command memory module operates autonomously, without regard to the other command memory modules and cyclically solves each of the user instruction lines in a short, fixed length of time. Each data memory module supplements data storage in the command memory modules. The N-bus is a high speed data bus that cyclically interconnects for a fixed length of time each command memory module during one of N control signals generated by the general timing and control unit, to any of the data memory modules and to the input/output system. During this length of time, the selected command memory module may address, read, or write in any location in any data memory module. An interconnectable programming panel may monitor, program, or control line status indicators for any instruction line within any command module or any line within any data memory module. The programming panel communicates with the controller via a dedicated channel of the input/output system.

136 Claims, 121 Drawing Figures

COMMAND MEMORY BLOCK DIAGRAM

FIG. 11
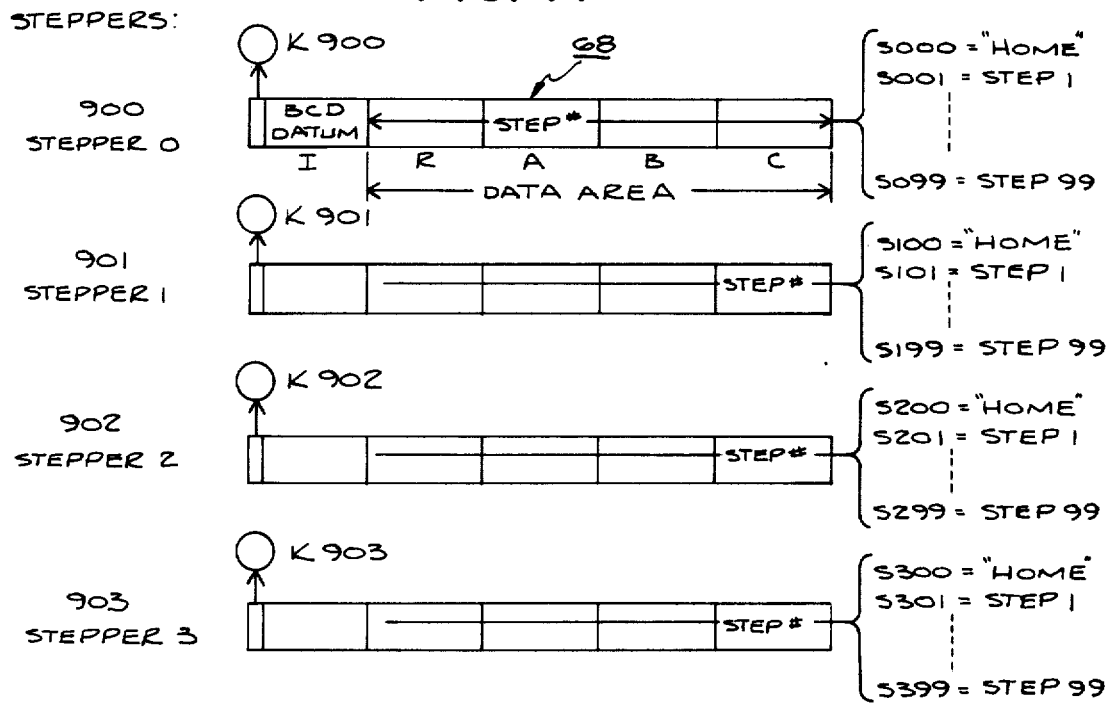
FIG. 10
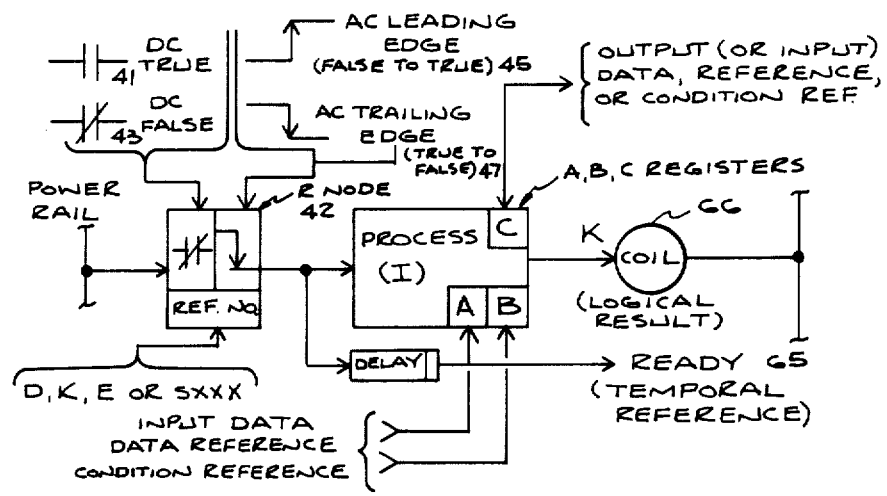
EXAMPLES OF R REFERENCES:
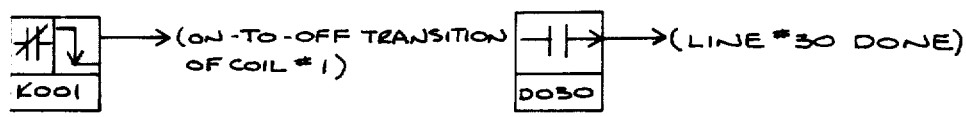

GENERAL LINE FORMATS FOR DIFFERENT INSTRUCTIONS

FIG. 15

STATEMENT:

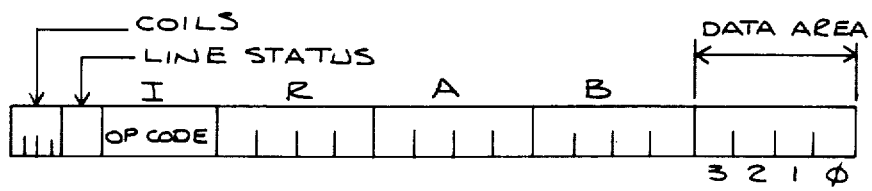

DATA AREA: C REGISTER (HEX) CODING: 4-DIGIT BCD (A-F ILLEGAL)

MODULUS: $10^4$

BINARY OR BCD DATUM:

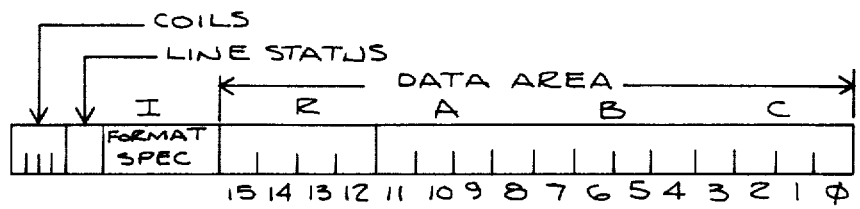

DATA AREA: R, A, B, C REGISTER (HEX) CODING: BCD: (A-F ARE VALID FOR TEST, GET PUT ONLY)

MODULUS: $10^{16}$

ASCII DATUM:

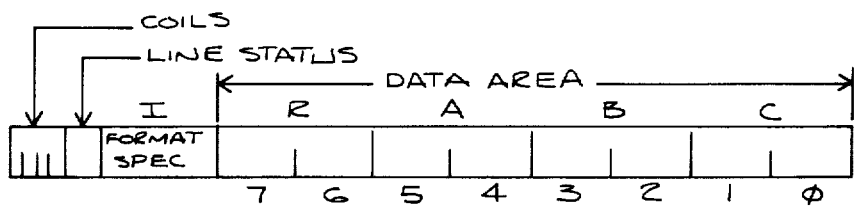

DATA AREA: R, A, B, C REGISTERS

CODING (HEX): X0 = $\phi$; X = $\phi$, 1, --- 9, A, B, C, D, E, F
X1 = 1
⋮
X9 = 9

XA ⎫
  ⎬ PRODUCE MEANINGLESS RESULTS FOR
  ⎬ ARITHMETIC, COUNT CALCULATIONS, VALID
XF ⎭ FOR TEST, MOVE IN, MOVE OUT

MODULUS $10^{16}$

FIG. 15A
CODING FORMATS
FOR THE I & R REGISTERS
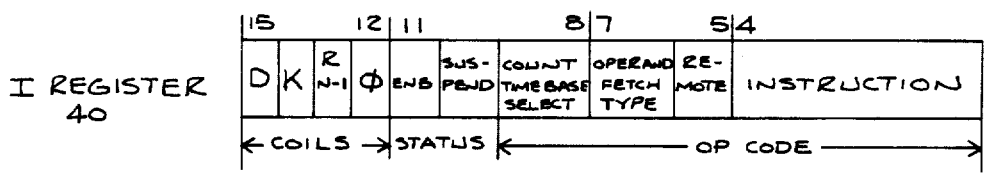
I REGISTER 40
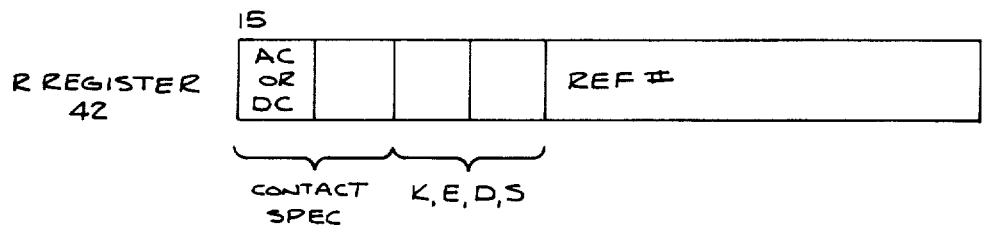
R REGISTER 42
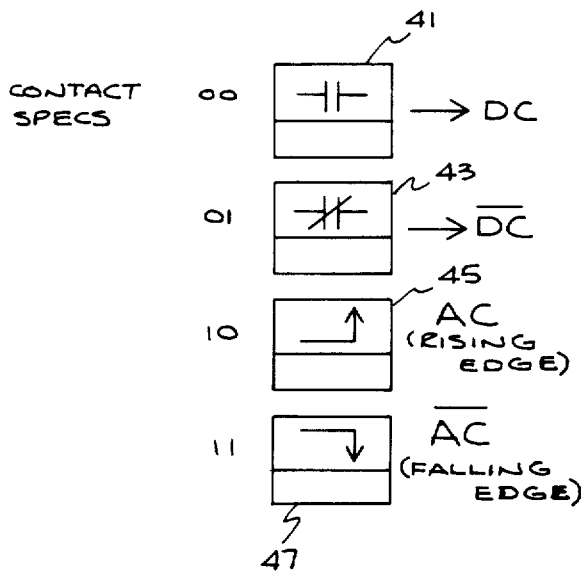
CONTACT SPECS

STATEMENT: ADD LOCAL

STATEMENT: ADD REMOTE

STATEMENT: SUBTRACT LOCAL

STATEMENT: SUBTRACT REMOTE

STATEMENT: COMPARE LOCAL  FIG. 16 I
SYMBOL:
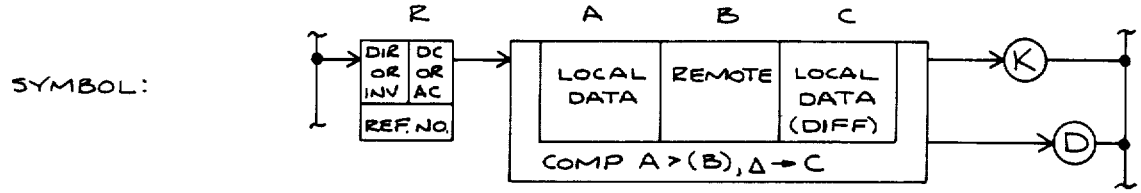
STATEMENT: COMPARE REMOTE  FIG. 16J
SYMBOL:
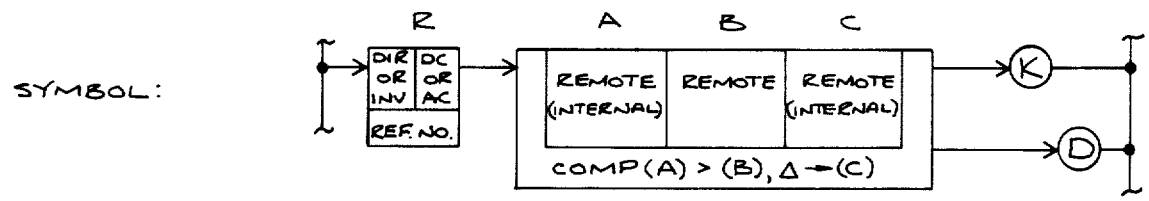
STATEMENT: MATCH LOCAL  FIG. 16K
SYMBOL:
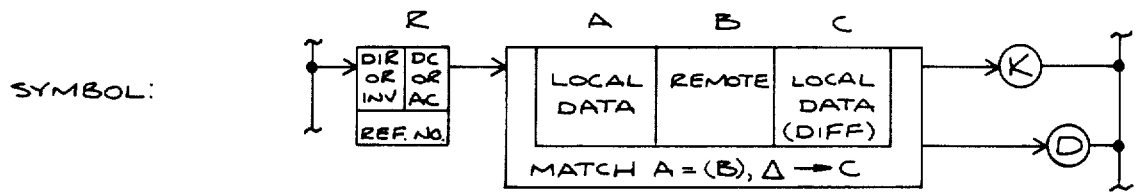
STATEMENT: MATCH REMOTE  FIG. 16L
SYMBOL:
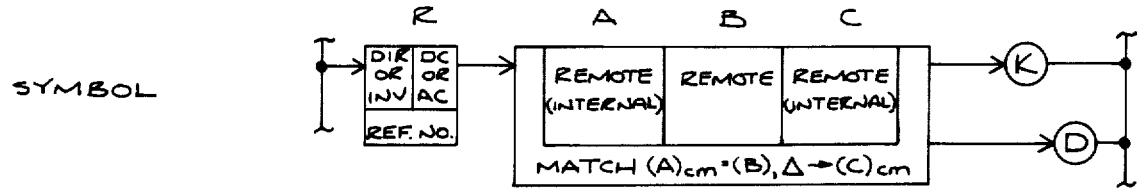

STATEMENT: TEST LOCAL

SYMBOL

STATEMENT: TEST REMOTE

SYMBOL:

STATEMENT: MOVE IN DATA LOCAL

SYMBOL:

STATEMENT: MOVE IN DATA REMOTE

SYMBOL:

STATEMENT: MOVE OUT DATA LOCAL  FIG. 16Q
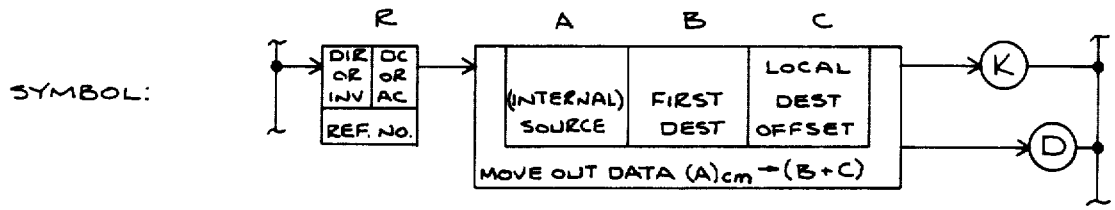
STATEMENT: MOVE OUT DATA REMOTE  FIG. 16R
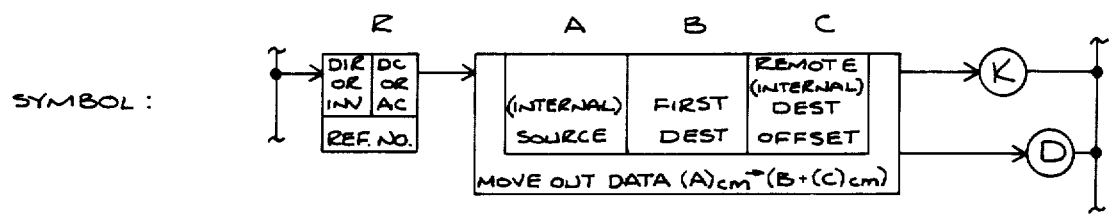
STATEMENT: PACK DATA LOCAL  FIG. 16S
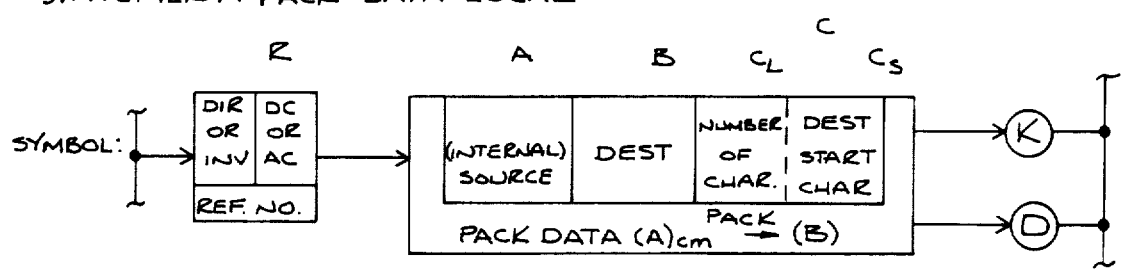
EXAMPLE:
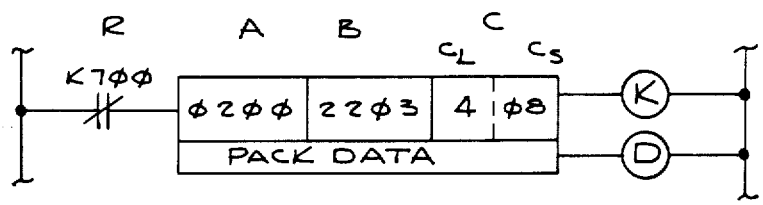
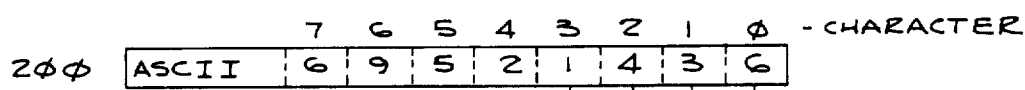
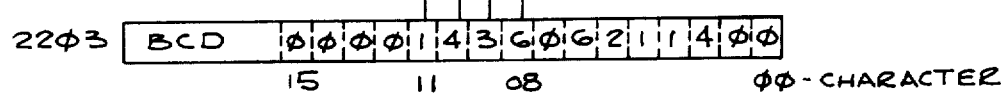

FIG. 16T
STATEMENT: PACK DATA REMOTE
SYMBOL:
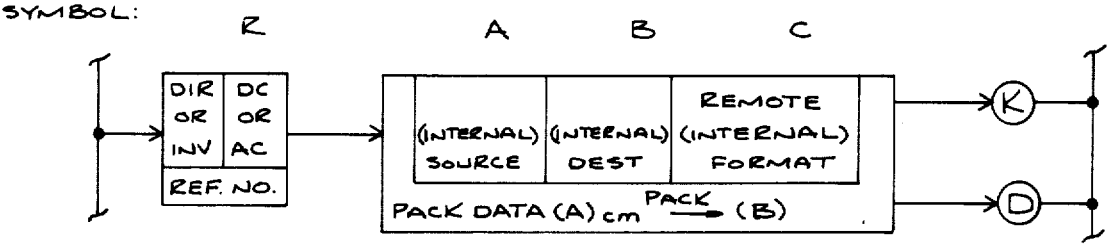
FIG. 16U
STATEMENT: UNPACK DATA LOCAL
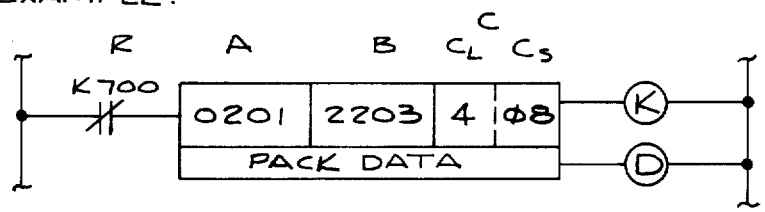
EXAMPLE:
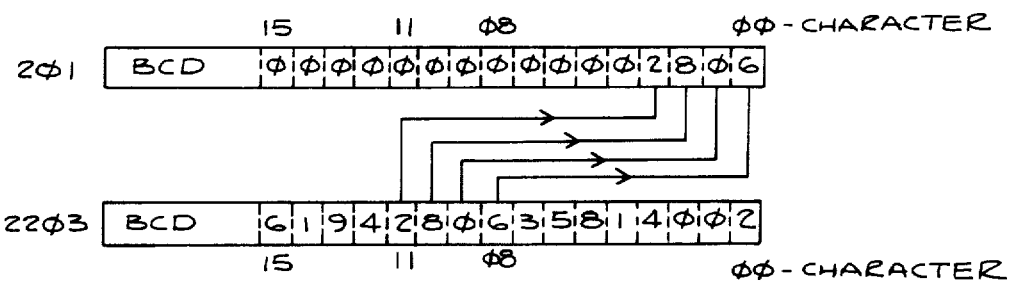

STATEMENT: UNPACK DATA REMOTE

SYMBOL:

STATEMENT: FIFO PAIR

SYMBOL:

STATEMENT: MOVE IN LINE LOCAL

SYMBOL:

*ENTIRE LINE (80 BITS)

STATEMENT: MOVE IN LINE REMOTE

SYMBOL:

*ENTIRE LINE (80 BITS)

STATEMENT: MOVE OUT LINE LOCAL

\* ENTIRE LINE (80 BITS)

STATEMENT: MOVE OUT LINE REMOTE

\* ENTIRE LINE (80 BITS)

STATEMENT: MOVE IN BLOCK LOCAL

STATEMENT: MOVE IN BLOCK REMOTE

STATEMENT: MOVE OUT BLOCK LOCAL

STATEMENT: MOVE OUT BLOCK REMOTE

STATEMENT: SUSPEND LOCAL

STATEMENT: SUSPEND REMOTE

STATEMENT: UP/DOWN COUNT REMOTE

STATEMENT: BIT MANIPULATE LOCAL

STATEMENT: BIT MANIPULATE REMOTE

FIG. 16NN
STATEMENT: BIT MATCH LOCAL
SYMBOL:
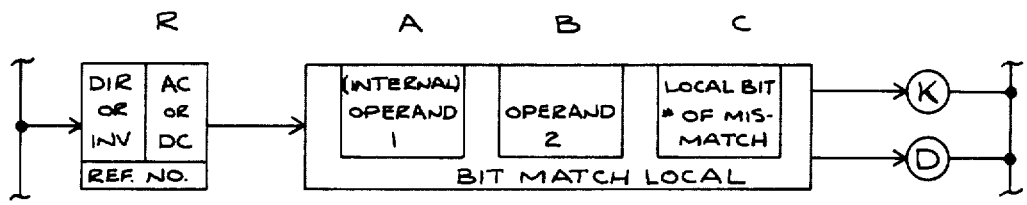
FIG. 16OO
STATEMENT: BIT MATCH REMOTE
SYMBOL:
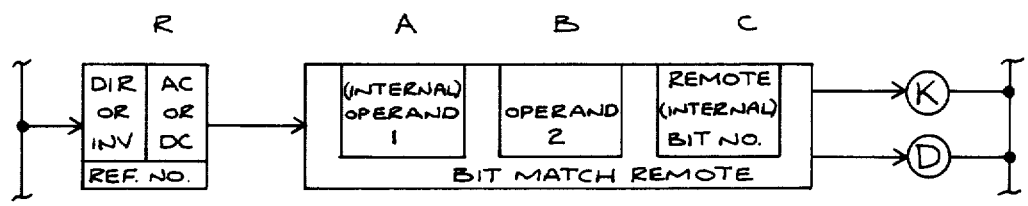
FIG. 16PP
STATEMENT: SHIFT LOCAL
SYMBOL:
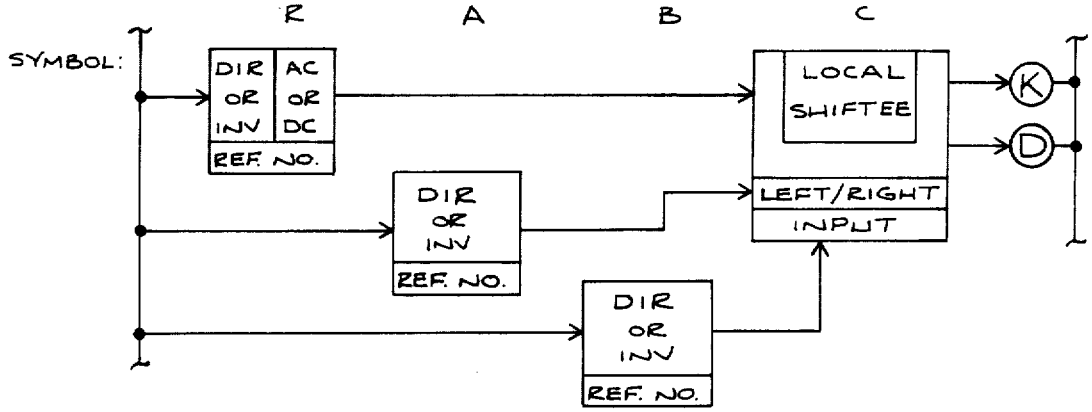
EXAMPLE: (SHIFT RIGHT USED AS A "ROTATE")
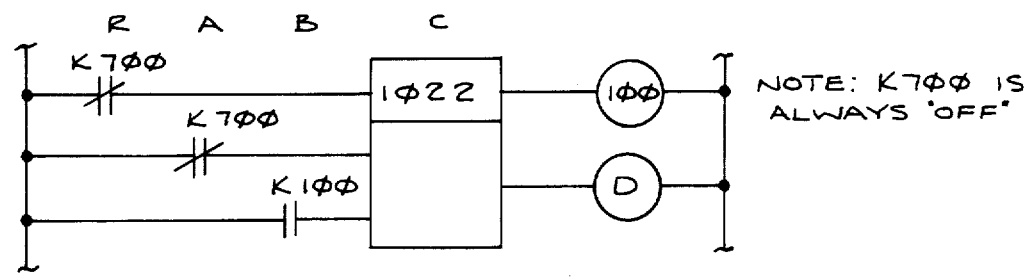
NOTE: K700 IS ALWAYS "OFF"
EXAMPLE: (SHIFT LEFT USED AS A "ROTATE")
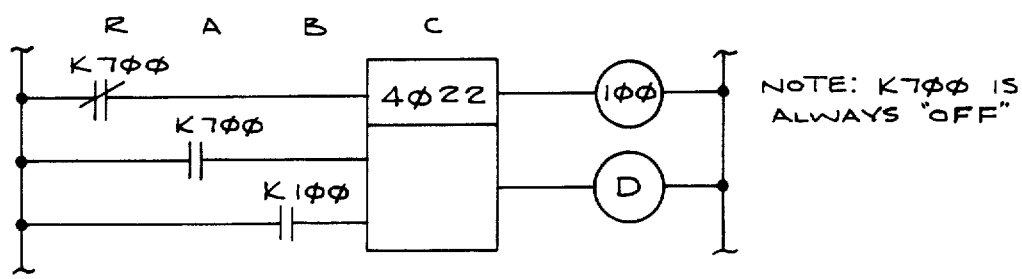
NOTE: K700 IS ALWAYS "OFF"

FIG. 16QQ
STATEMENT: SHIFT REMOTE
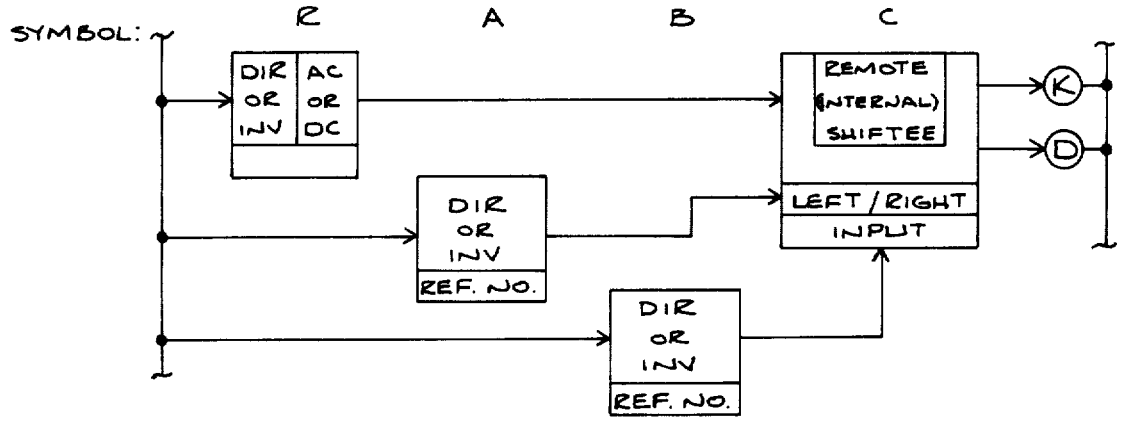
FIG. 16RR
STATEMENT: LOGIC
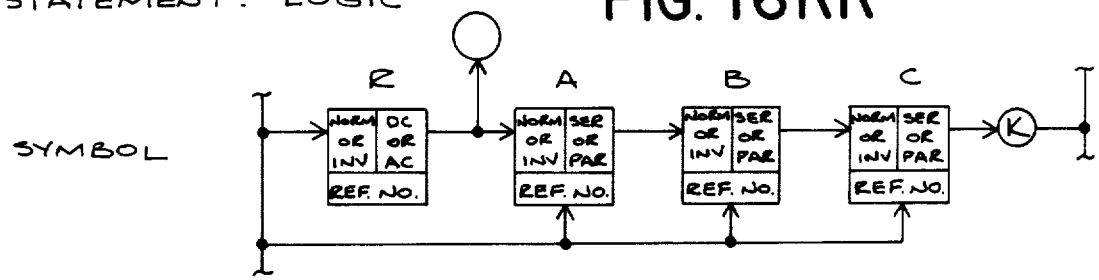
FIG. 16SSA
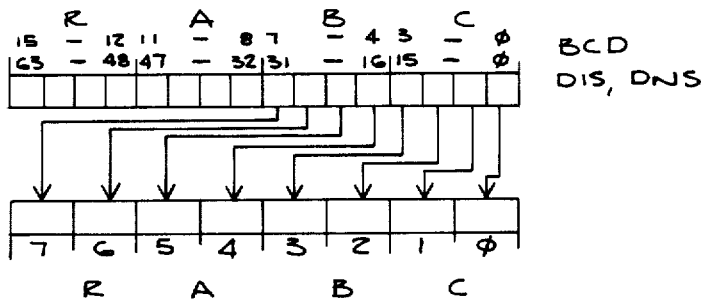
FIG. 16SSB
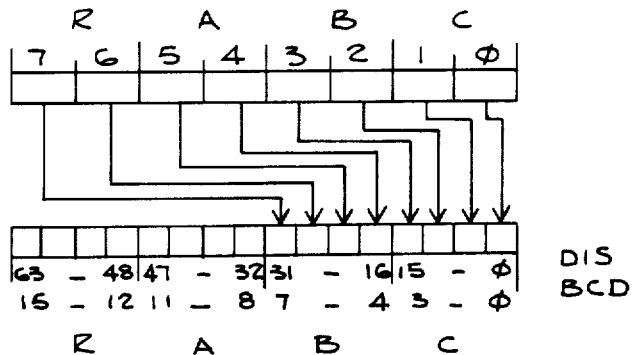

DATUM: DIS, BCD, ASCII, DNS

SYMBOL:

FIG. 16 SSC
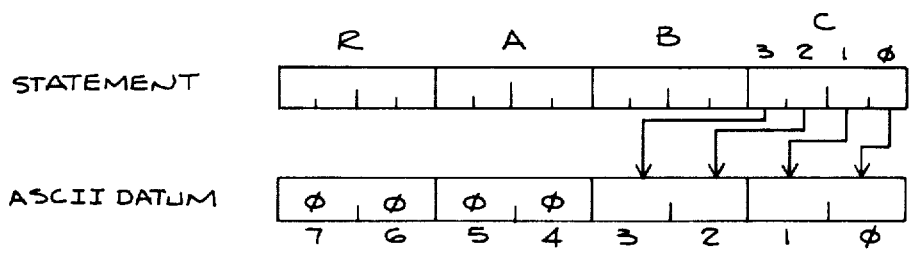
FIG. 16 SSD
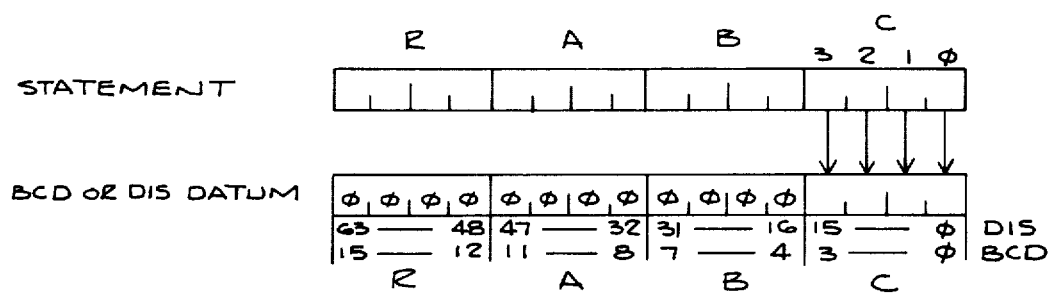
FIG. 16 SSE
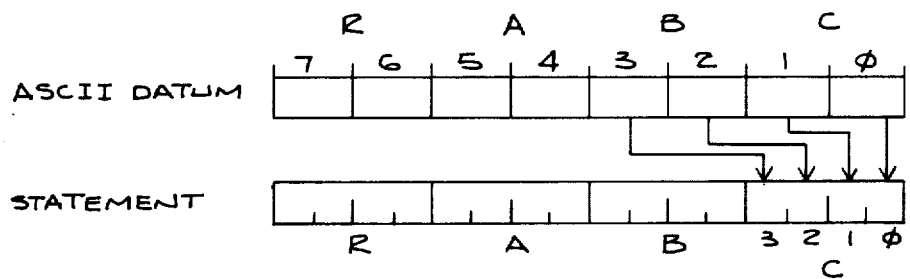
FIG. 16 SSF
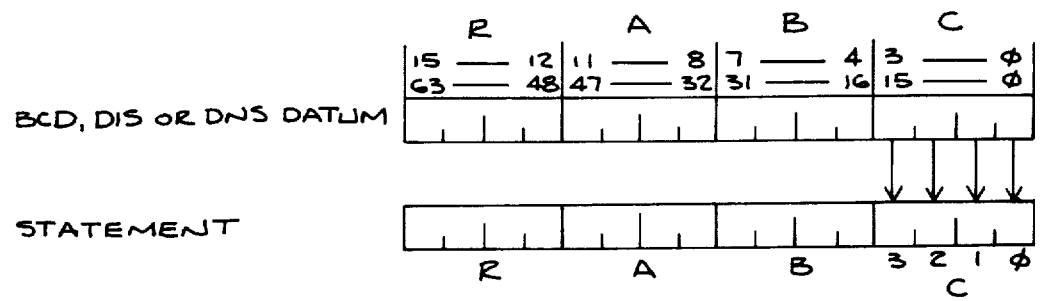

I/0 STATUS WORD CODING

X = CHAN #
Y = LINE #

SYSTEM STATUS WORD CODING

GTCU BLOCK DIAGRAM

GTCU DETAILED BLOCK DIAGRAM

N-BUS BLOCK DIAGRAM AND TIMING

N-BUS TIMING ANALYSIS

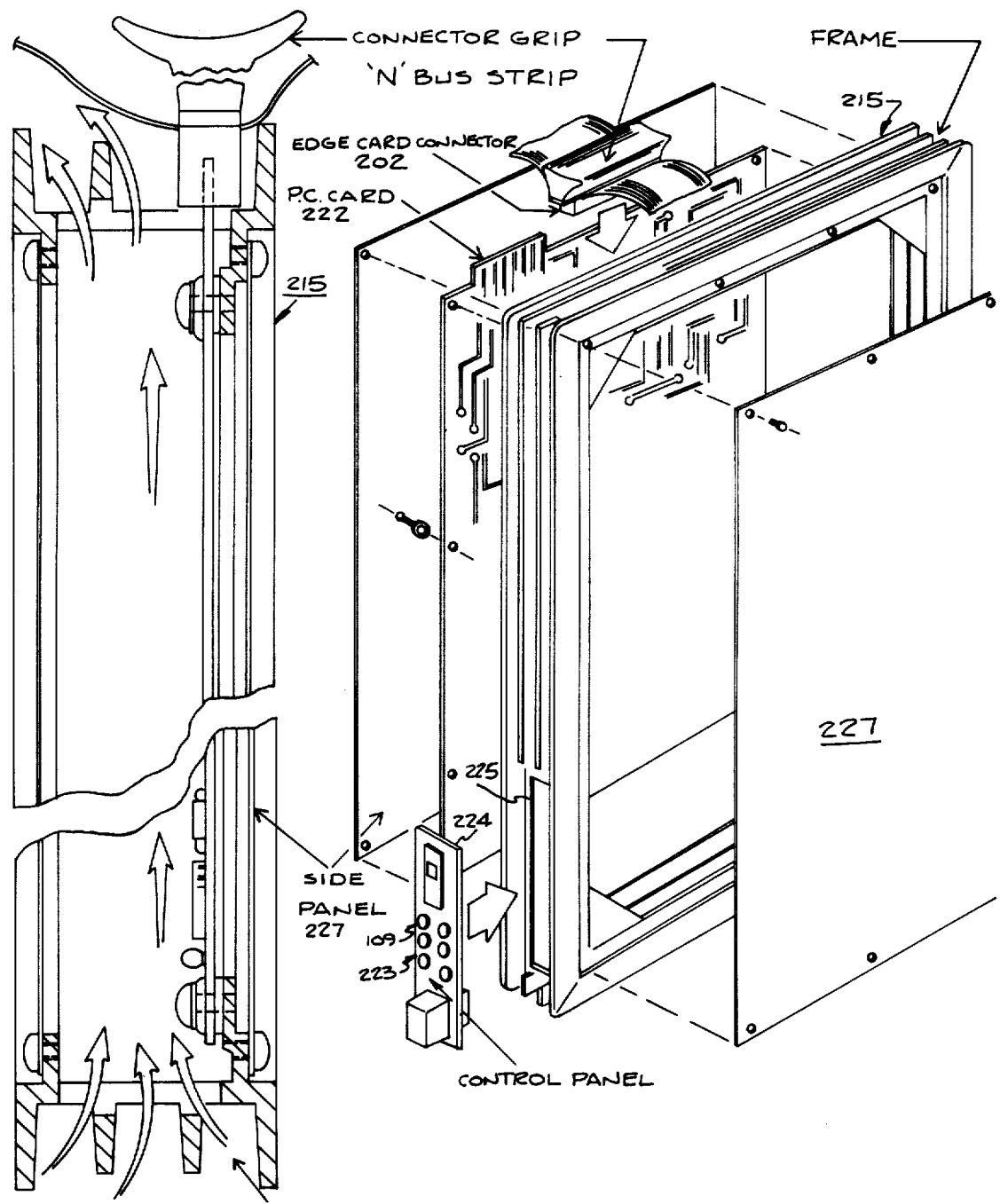

FIG. 55

NOTATIONS USED IN THE LADDER BLOCK DIAGRAM

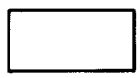 : A FUNCTION BLOCK, WHICH CORRESPONDS TO ONE INSTRUCTION OF THE PPC

R, A, B, C : A NODE, WHICH, IN AN INSTRUCTION, REFERS TO A SIGNAL, AN ADDRESS OF A DATUM OR A DATUM ITSELF

K : A RESULT OF AN INSTRUCTION EXECUTION

D : A COMPLETION OF AN INSTRUCTION EXECUTION

→ : A DESIGNATION OF A CONTINUOUS CONTACT ACCORDING TO A SIGNAL (ONLY FOR R)

↑ : A DESIGNATION OF AN INSTANTANEOUS CONTACT AT THE LEADING EDGE OF A SIGNAL (ONLY FOR R)

① : AN INPUT SIGNAL FROM OUTSIDE THE PPC

● : AN OUTPUT SIGNAL TO OUTSIDE THE PPC

PARALLEL PROCESS CONTROLLER

This is a continuation, of application Ser. No. 646,412 filed Jan. 2, 1976 now abandoned.

BACKGROUND OF THE INVENTION

1. Field of the Invention

This invention relates to process controllers, and in particular to parallel process controllers.

2. Description of the Prior Art

The use of control systems in industry and commerce is pervasive. Such control systems are typically used in chemical processing, textile processing, steel manufacture, weighing systems, and virtually any industrial manufacturing process. Originally, such control systems depended upon timely human decisions and intervention for proper operation. However, control systems that operate independently of human response have recently appeared. These control systems have typically relied on predetermined limits, sequences, and actions in order to properly control the system. Thus, the tools of the control engineer have progressed from simple human intervention to relays, to simple sequences, and finally, in the recent past, to programmable controllers; such as the Models 084, 184 and 284 of the Modicon Division of Gould Inc. The advent of programmable controllers was a powerful new tool for the control engineer, for it allowed him or her to produce a control program that effectively simulated the logic functions of hard wired relays.

The use of relay logic was a natural first step for the control engineer to take. Also, the use of sequencers, or stepping switches, to make relay logic cyclicable and repetitive was a logical extension of hard wired relay logic. Thus, the introduction of programmable controllers that operated in relay logic fashion and were programmable in a relay ladder diagram format was a natural; albeit highly innovative, progression of the control engineering art.

However, at this point the logical development of tools for the control engineer broke down. The industry's acceptance of programmable controllers as a working tool led to the desire to assign greater and more complex control tasks to these controllers. Some of these tasks have been met in part by adding to programmable controllers the ability to perform non-relay logic functions such as data transfer operations as enumerated in application United States Application, U.S. Pat. No. 3,940,233, issued Dec. 30, 1975, assigned to the Modicon Division of Gould Inc., and incorporated herein by reference.

However, although the programmable controllers may be improved to allow some data transfer capability, the programmable controllers do not have the speed nor the capability to rapidly perform many such data transfer operations without lengthening the execution time of the relay logic lines of the programmable controller.

An alternative to the programmable controller having such added functions was found to be the mini-computer, which is capable of performing far more complex tasks than a programmable controller. However, mini-computers have the significant drawback of requiring a programmer to define its operations. Thus, the control engineer could no longer speak to his equipment directly, because the mini-computer did not comprehend relay logic. The mini-computer spoke computer language, or assembly language, or some interpretive language like Fortran, and the control engineer typically did not speak these languages.

Thus, this more powerful tool for the control engineer required an interpreter between it and the control engineer. Furthermore, the larger the computer, the greater the interpreter's skill required to program the computer.

In using a mini-computer to perform control functions for industrial control systems, the control engineer would design his system and tell the programmer what he wanted the mini-computer to do. Consequently, a new language was necessary which was considered a compromise between the control engineer and the programmer. The control engineer put his control system's request into a new language, and the programmer converted it into computer language. Consequently, there were mistakes and mistaken interpretations due to the extra man between the control engineer and the system to be controlled. The resultant misunderstandings and re-education by both the control engineer and the programmer resulted in an inefficient control system with major economic drawbacks. Thus even though with the use of a mini-computer it was possible to perform more complicated tasks than previously performable by simple programmable controllers, the development and debugging of software for the mini-computer, as well as the interfacing hardware necessary between the mini-computer and the system to be controlled, made such a mini-computer system an order of magnitude more expensive and time consuming to implement than programmable controllers.

Also, today's control system problems have become more difficult due to the large control problems encountered in many large industrial complexes. Some control engineers have used multiple service programmable controllers to tackle such large control system's problems. Others have used the general purpose computer directly through a variety of general and special interface boxes. Finally, there is an increasing trend toward the development of special languages for a dedicated mini-computer. Various suppliers have developed dedicated programming languages for specific market segments. However, there seems to be little commonality between these programming languages.

The control engineers that have attempted to use computers have suffered through the development time and expense of generating original software for the computers. Furthermore, they have the continuing problem of implementing changes in the process, or changes in the control technique that require alteration of the software. Thus, even though the computer is programmed to perform a control task, it still requires a programmer to make every change in the program performing that task. Even minor changes in the process require a programmer's assistance in reinstructing the computer.

Furthermore, the dedicated computers being applied through interpretive programming language are not free of problems. Computers are not generally variable in size to match a given job, which results in excess capacity and expense in those situations where the job is small, or complicated interconnections between two or more computers if the control task is large. In addition, the reliability of the computer creates a maintenance problem, since computers generally are intended to be used in the computer room environment and not in the hard-hat environment of industrial process control.

Clearly then, the ideal solution to the problem of control system implementation is a special purpose machine that communicates in a language understandable by the control engineer, that is expandable to fit the desired control system, and that can withstand the industrial environment. Furthermore such a machine must be reliable and be equipped with input/output capability that will operate the relay valves and motors found in industrial process control systems. Such a machine must give the control engineer the enlarged and expandable data base that the current programmable controllers lack, and eliminate the need of the programmer intermediary used with mini-computers and computers.

The present parallel process controller is this solution. It comprises command memory modules, data memory modules, an input/output system, a programming panel, and a high speed N-bus (data bus) for accomplishing any desired control task. The control engineer simply instructs the command memory modules through the interconnectable programming panel what he desires to be performed. The control engineer does not have to tell the process controller how to perform what he desires because the command memory modules incorporate the necessary hardware for solving the instructions selected by the control engineer.

Since each command memory module is a physically separable item, they may be added to the process controller to adequately fit the size of a particular control task. Furthermore, since each command memory module acts autonomously from the other command memory modules, and since each command module solves its selected instructions in a short, fixed, length of time, the entire process controller, regardless of the overall complexity of the entire control task, performs this control task in a parallel fashion. That is, the system response time is not a function of the complexity of the control task.

The programming panel not only allows the control engineer to instruct the command modules, but also allows the control engineer to monitor and troubleshoot the entire process controller. A discrete, simpler, user oriented language is used, therefore not requiring the control engineer to understand computer language. Furthermore, all information displays are decimal, not requiring the control engineer to know and understand other numeric systems.

The present invention also incorporates data memory modules which allow expansion of the data base to fit a particular control task. In addition, the input/output system of the present invention provides high speed, error-free transfer of information from the process under control to the process controller, as well as the transferral of industrial compatible signals to operate relays, valves, and motors ordinarily found on equipment in the control process.

The parallel process controller can also serve as a master control over a number of programmable controllers that interface with the process under control. Here, the process controller of the present invention forms the hierarchical control needed for controlling complex processes.

SUMMARY OF THE INVENTION

The parallel process controller (PPC or machine) of the present invention is an expandable, parallel operating mult-function controller designed specifically for industrial process control. It consists of three basic sections, the command memory modules (CM), the data memory modules (DM), and the input/output system (I/O). Each CM and DM is packaged in a self-contained module, and a high speed N-bus allows interconnection of from 1 to 10 CM's with from 0 to 2 DM's. Internally, the I/O is regarded as additional memory. The PPC is programmed and monitored through a programming panel, which functions through a dedicated channel in the I/O. The programming panel can display the contents of each command memory and data memory, one line at a time. A line is the basic information entity in the PPC. The programming panel also allows an operator to instruct the PPC to perform functions which are part of its repertoire. Power for the parallel process controller is available in incremental blocks, to match the number of CM's and DM's employed.

The PPC will interface with peripherals which operate in ASCII format. Printers, certain CRT's, teletypewriters and other peripheral devices are usable with the PPC. The three basic building blocks of the parallel process controller, the CM, DM, and I/O, are organized around the high speed N-bus and communicate to each other via this bus.

The command memory module is the active element of the parallel process controller. It contains the functional equivalent of a central processing unit as well as memory for lines of instruction for the PPC. Additionally, the CM has as part of its hardware the circuitry to carry out certain special functions. These include calculations, data or instruction transfers, timing and counting, and arithmetic testing and logic. A command memory operates autonomously, without regard for other CM's. It is the equivalent of a micro-processor with memory but without I/O. While major differences in implementation exist between a general purpose processor and the command memory, their results, for those functions which the PPC is built to perform, are the same with one significant exception. The present process controller operates as a parallel processor, while a computer is a series processor. In the process control field, the present command memory represents a departure from conventional process controller design, combining as it does the processor with its own dedicated memory and allowing the resultant device to step through 200 pre-programmed lines of instructions. The advantages of the present invention's use of command memory modules over conventional process controllers for process control applications are:

1. a large reference data base;
2. designed-in hardware commands;
3. faster operation;
4. the ability to operate up to ten CM's in parallel;
5. the range of peripherals available; and
6. possibility of interaction with supervisory general purpose computers.

The advantages of the command memory over general purpose computers are:

1. the hardwired commands (no software generation required).
2. the parallel operation of up to 10 CM's;
3. the optimized handling of the eighty bit line;
4. the ruggedized construction; and
5. the RFI shielding;

The data memory module is the data storage element of the parallel process controller. The data memory is optional and the PPC can function without the data memory by using a scratchpad memory and live storage area in the command memory. For applications in which the storage available in the CM is not large enough, from one to two DM's may be included in the system. CM's share the N-bus sequentially and during its bus access time, any CM may address, read, or write in any DM location. Information stored by one CM at a certain DM location can be referenced, destroyed, or changed by any other CM. This multiple DM access is the only means of CM to CM communication.

The input/output system (I/O) of the parallel process controller consists of from one to three 80 line I/O memories (200 lines maximum are used), from two to ten pairs of local and remote modems, and an indeterminate number of terminal boxes. Each of the ten remote modems performs multiplexing on the equivalent of 640 input and 640 output terminals, for a total capacity of up to 6400 input points and 6400 output points. Sixty-four (64) bit datum words or 80 bit statement words are assembled in the remote modem. These words are created by any device desiring to communicate with the PPC, including the programming panel, peripheral devices such as printers, CRT's, teletypewriters, and mass storage units, and input and output signal conditioning cards.

The line is the basic unit of information and instruction within the parallel process controller. It is 80 bits long and is the functional equivalent of the word in a mini-computer. However, because the minicomputer word length is typically 12 or 16 bits, the 80 bit line in the PPC is more powerful than a word or instruction in the mini-computer. The line is broken into five 16-bit segments, called registers, and each register is given a name and has a specific function in the operation of the PPC. The number assigned to the line describes its geographical location within the parallel process controller. Each command memory has locations for 1000 lines and is assigned numbers from 000 to 999. Line numbers 1000 through 1999 are reserved for memory locations within the I/O system of the PPC. Line numbers 2000 through 9999, in blocks of 4000 numbers, are reserved for the data memory modules.

An instruction register tells whether the line is an instruction (to be carried out) or a datum (to be processed as information); and if it is an instruction, what the instruction is.

A reference register tells the controller whether the condition reference is AC (transitional) or DC (direct), where the condition reference is stored, the relationship to the reference (true, false, true-to-false transition, or false-to-true transition), and the type of reference (coil, ready, stepper, or transformer, explained infra). This register is similar in operation to the first register of an electrical circuit line disclosed in U.S. Pat. No. 3,686,639, entitled "Digital Computer-Industrial Controller System and Apparatus"; assigned to Modicon Division of Gould Inc.; and hereby incorporated by reference.

A third register, called the A register can refer only to the command memory in which it is located. It can contain a relay type element, and a four digit number. The number can be local data, or it can be the address of another line within the same CM where data may be obtained. The latter type of number is designated remote data. A fourth register, called the B register can refer to any line of memory in the entire machine. It can contain a relay type element and a four digit number, and the four digit number is always an address.

For all arithmetic operations, the A and B registers are operated on, and the result is stored in the fifth register, known as the C register.

The C register, as the A register can only refer to lines of memory within the CM in which it is located. It also can contain a relay type element and a four digit number. The number can be data (local) or it can be in address of data within the CM (remote).

All communication to the PPC is performed through the line. The programming panel can address any line within the PPC and operate on that line alone. Data from I/O modules is grouped into lines before it is transmitted to the I/O memory, where it is stored as discrete lines. Information is stored in the data memory in complete 80-bit lines.

The operation of the programming panel including the "trace" and "scroll" features (discussed infra) and the electronic implementation of the programming panel is set forth in significant part in U.S. Pat. No. 3,944,984, issued Mar. 16, 1976 and assigned to Gould Inc. In addition U.S. Pat. No. 3,686,639, entitled "Digital Computer-Industrial Controller System and Apparatus", issued Aug. 22, 1972, and U.S. Pat. No. 3,930,233, entitled "Data Transfer and Manipulation Apparatus for Industrial Controllers", issued Dec. 30, 1975, both assigned to Gould Inc., also discuss the electronic implementation of programming panels similar to the programming panel utilized in the present invention. These patents are hereby incorporated by reference.

There are two status bits associated with each line within the PPC. They are included as part of the 80 bits of the line itself within the instruction register and are addressable using the same number as the line number. The first bit is designated Ready (D) which generally refers to the truth of the reference condition, or if the instruction is a multiscan instruction, to the truth of the reference condition after a suitable delay to allow the instruction to be completed. Ready can be either a steady state or a pulse reference. The second bit is designated Coil or Koil (K) and can be defined for many lines as the logical truth of the line.

Each PPC command memory contains a large number of hardwired instructions that can be used repeatedly by the control engineer to set up and solve process problems. These instructions require only a single line of CM space to implement, and during programming, only the selection of a single pushbutton switch to request. First is the relay logic line, which is analogous to the logic line disclosed in U.S. Pat. No. 3,686,639, supra, as well as the logic line used by the Model 084 and 184 programmable controllers of the Modicon Corporation, Andover, Mass. The selection of the relay switch sets up the R, A, B, and C registers to accept logic element type inputs and reference locations similar to the Modicon model 084 and 184 programmable controllers.

Beyond simple relay logic lines, the PPC will perform arithmetic calculations, tests, counts, timing, transfers, and conversion of data from one format to another. Each of these functions can be performed locally (where the A & C registers contain data) or remotely (where the A & C registers contain the addresses of data stored elsewhere).

The parallel process controller of the present invention can also control a number of external programmable controllers which in turn control a desired process. Here the present invention forms the apex of a heirarchical control system. Alternatively, the programmable controllers can act as remote data concentrators for efficient data transfer to the I/O system of the present invention. In either mode as well as in the earlier mentioned direct control of the desired process, the present parallel process controller provides a means for controlling extremely complicated processes capable of being implemented by control engineers without the need of computer specialists.

OBJECTS OF THE INVENTION

Therefore, it is a principal object of the present invention to provide a process controller that is capable of parallel operation of a plurality of central processing units so as to implement industrial process control of varying complexity;

Another object of the present invention is to provide a parallel process controller of the above description having an invariant response time regardless of the complexity or size of the industrial process being controlled;

A further object of the present invention is to provide a parallel process controller comprising command memory modules corresponding to individual central processing units which are expandable in number, that communicate with an expandable number of data memory modules for the storage of data, and an input/output system for communication between the parallel process controller and a plurality of interconnected external devices;

A still further object of the present invention is to provide a parallel process controller of the above description capable of parallel, supervisory control of a plurality of programmable controllers;

Another object of the present invention is to provide a parallel process controller of the above description having an interconnectable programming panel for monitoring, programming, and displaying instruction executed by the parallel process controller;

An additional object of the present invention is to provide a parallel process controller of the above description wherein the instructions programmed by the programming panel are of a simple format thereby allowing an operator unskilled in computer programming language to effectively implement a desired industrial process control;

A further object of the present invention is to provide a parallel process controller of the above description wherein the instructions entered on the programming panel correspond to lines having a fixed size which are capable of representing the complete repertoire of instructions solvable by the parallel process controller, including calculation, data and instruction transfers, timing and counting, arithmetic testing and logic, and wherein said lines may alternatively represent data in one of a variety of formats;

An additional object of the present invention is to provide a parallel process controller of the above description wherein data manipulations involving data of varying format is solved by the process controller without special instructions or alterations of the instuctions by the user;

A further object of the present invention is to provide a parallel process controller of the above description wherein the programming panel is able to monitor the lines stored in the command memory modules and data memory modules, to scroll through consecutively higher or lower numbered lines, and to trace into instruction lines to which a previously displayed instruction line refers;

A still further object of the present invention is to provide a parallel process controller of the above description wherein the input/output system performs error free communication with a plurality of external devices and operates asynchronously with respect to the remainder of the parallel process controller;

An additional object of the present invention is to provide a parallel process controller of the above description wherein each command memory module is repetitively sequentially interconnected with the data memory modules and input/output system for a set predetermined length of time so that the command memory modules are capable of communication between each other via the data memory modules;

A further object of the present invention is to provide a parallel process controller of the above description wherein the programming panel incorporates a cathode ray tube (CRT) display for illustrating the particular instruction line presently being monitored or programmed by the user wherein a plurality of keys on the programming panel are capable of selecting the complete repertoire of instructions solvable by the parallel process controller;

A still further object of the present invention is to provide a parallel process controller of the above description having an input/output system that is capable of communication with a plurality of external devices including programmable controllers, over long distances while maintaining error free transmittal of information to and from the parallel process controller;

Other objects of the present invention will in part be obvious and will in part appear hereinafter.

THE DRAWINGS

For a further understanding of the nature and objects of the invention, reference should be had to the following detailed description taken in connection with the accompanying drawings in which:

FIG. 10 is a schematic illustration of the information entered into the registers of a program line of the parallel process controller of FIG. 1, illustrating the condition references and output conditions of a typical programmed line;

FIG. 11 is a schematic representation of "stepper" lines utilized in the command memory modules of the parallel process controller of FIG. 1;

FIG. 15 is a schematic representation of the general statement formats used by the command memory modules of the parallel process controller of FIG. 1;

FIG. 15A is a schematic representation of the instruction and reference registers of an instruction line utilized by the command memory modules of the parallel process controller of FIG. 1, illustrating the coding format for these instruction registers as well as the contact specifications used by the reference register;

Figure 1:
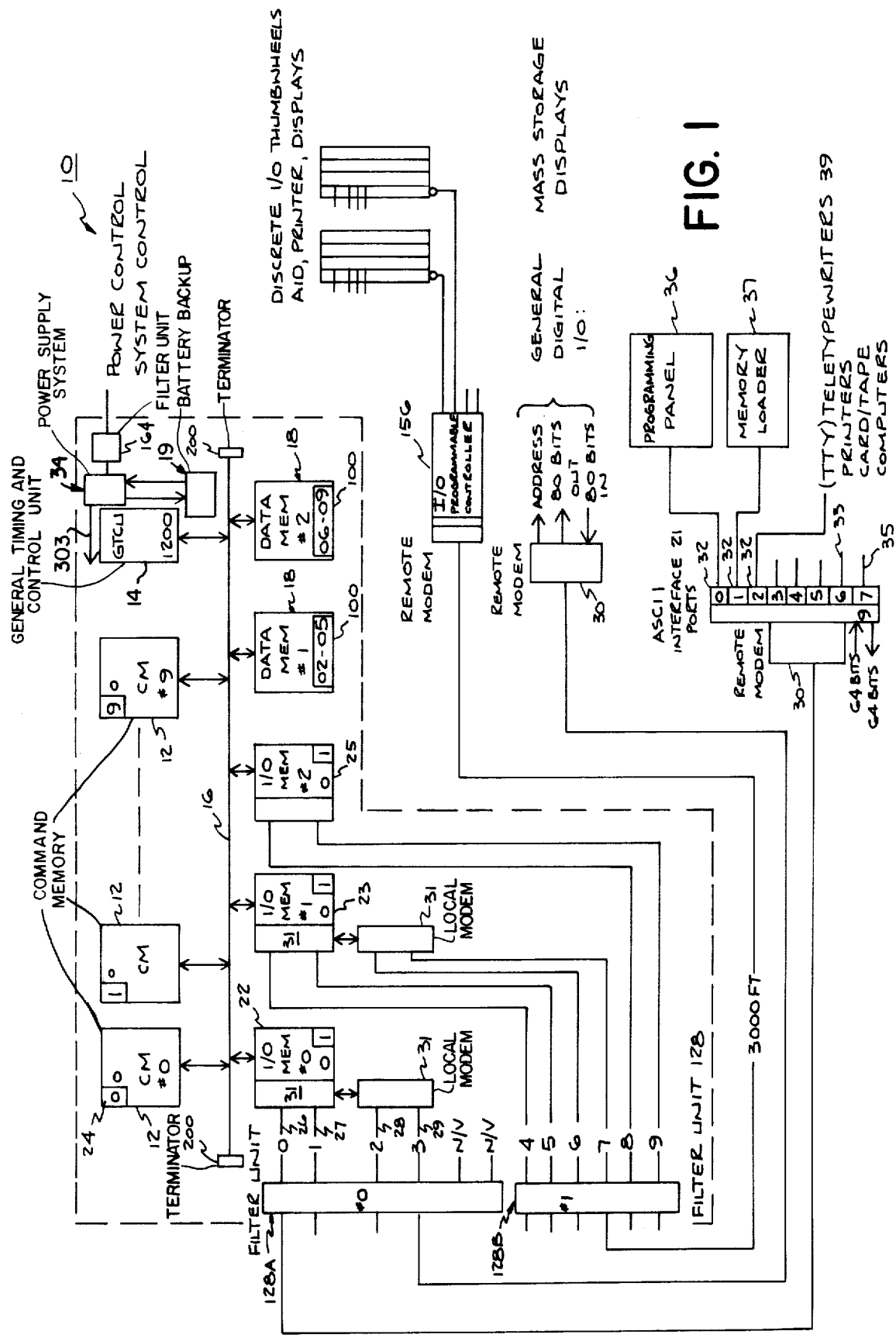
FIG. 1 is an overall block diagram of the parallel process controller of the present invention.
Figure 2:
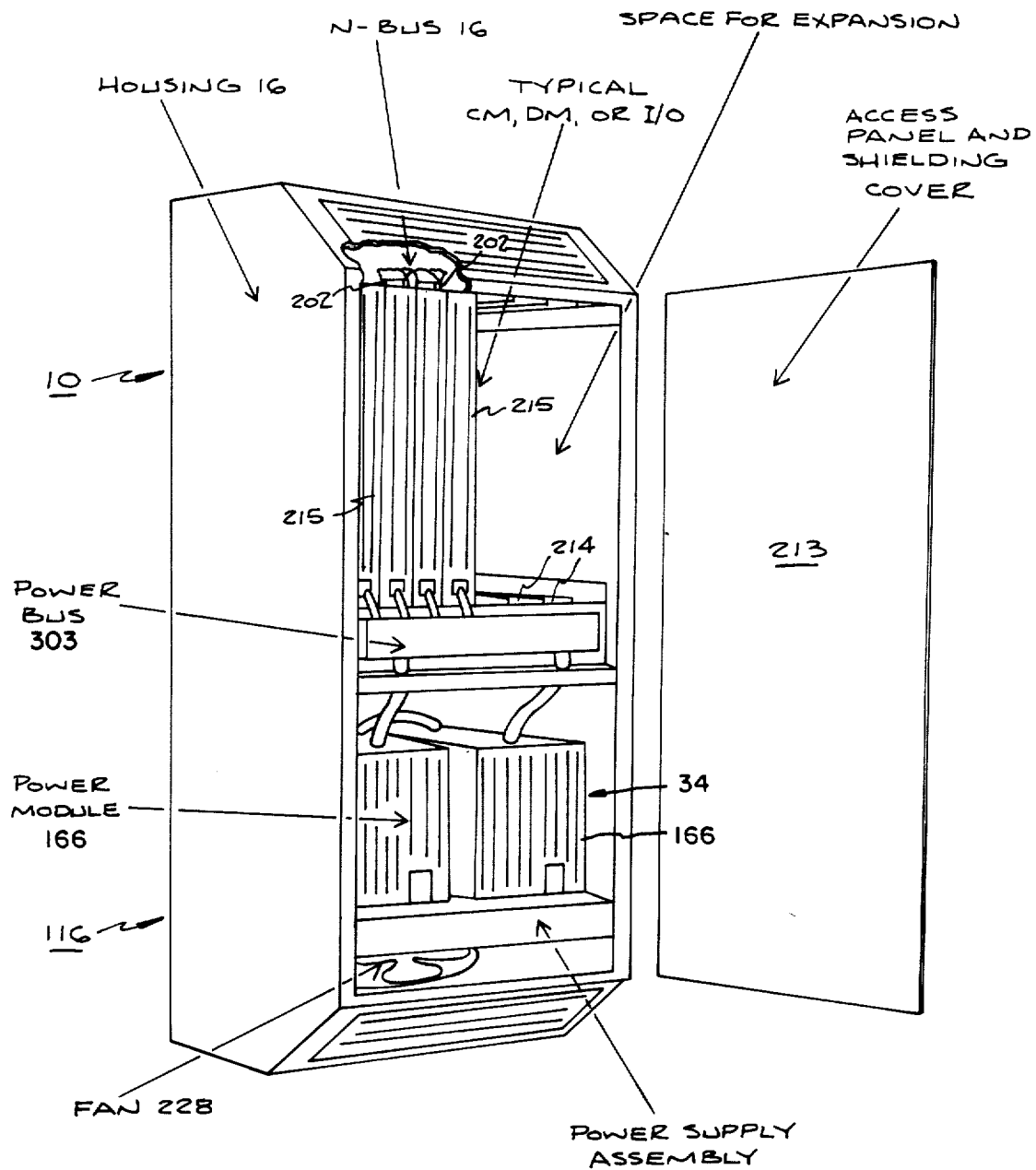
FIG. 2 is a perspective view of the parallel process controller of FIG. 1.
Figure 16A:
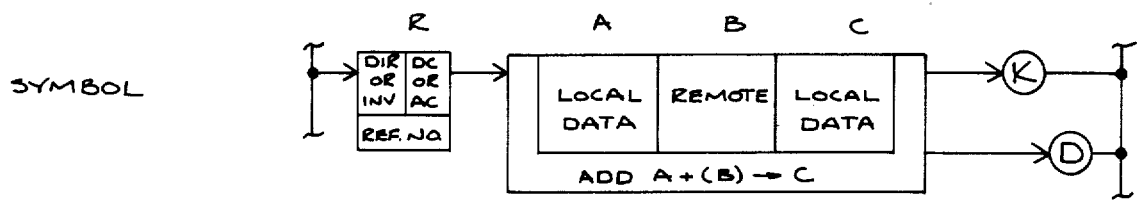
Figure 16B:
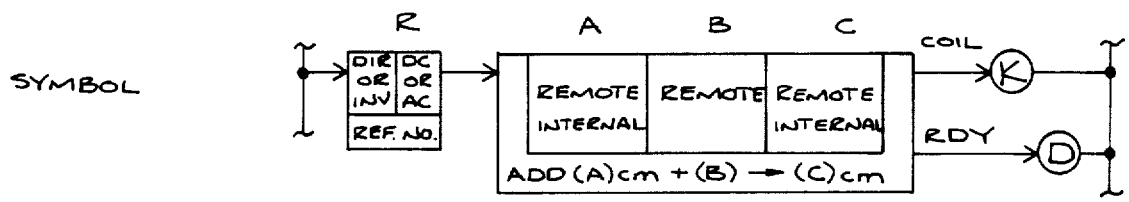
Figure 16C:
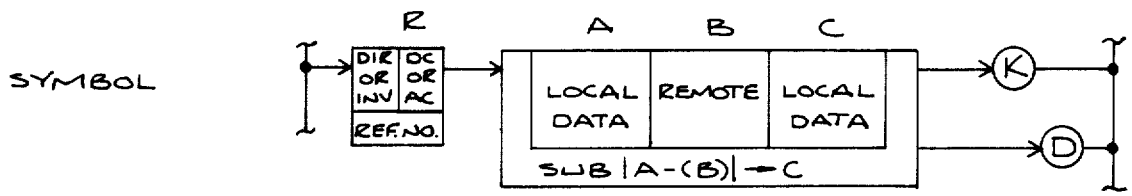
Figure 16D:
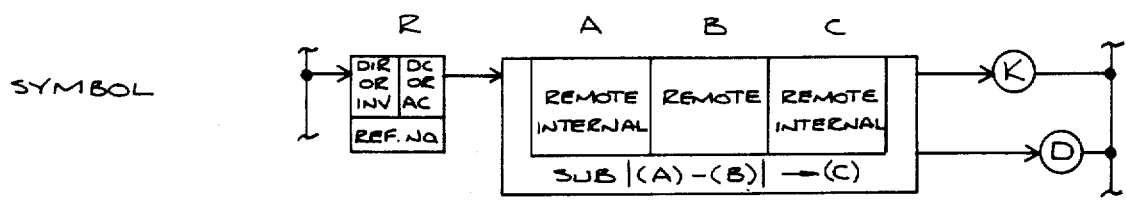
Figure 16E:
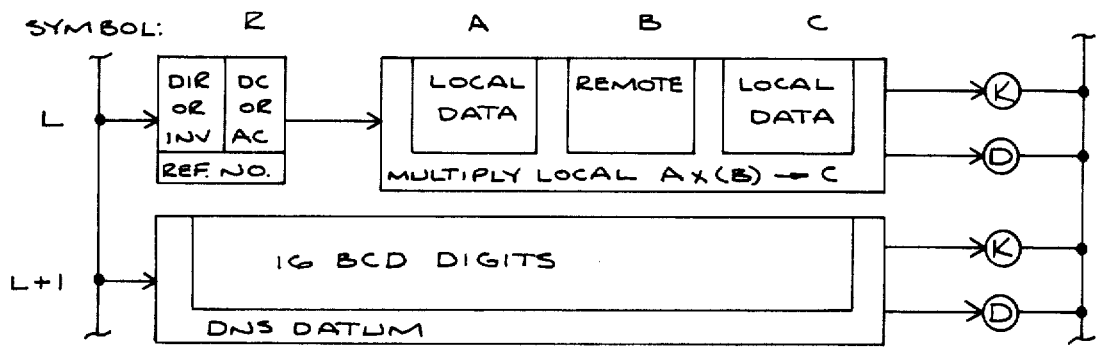
Figure 16F:
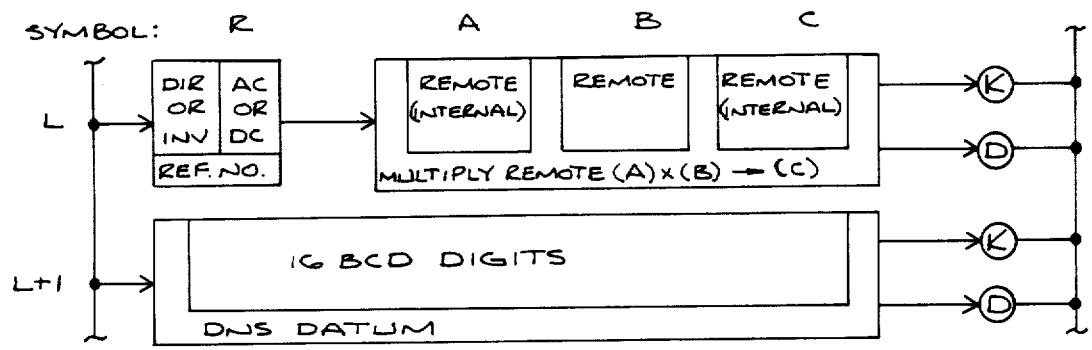
Figure 16G:
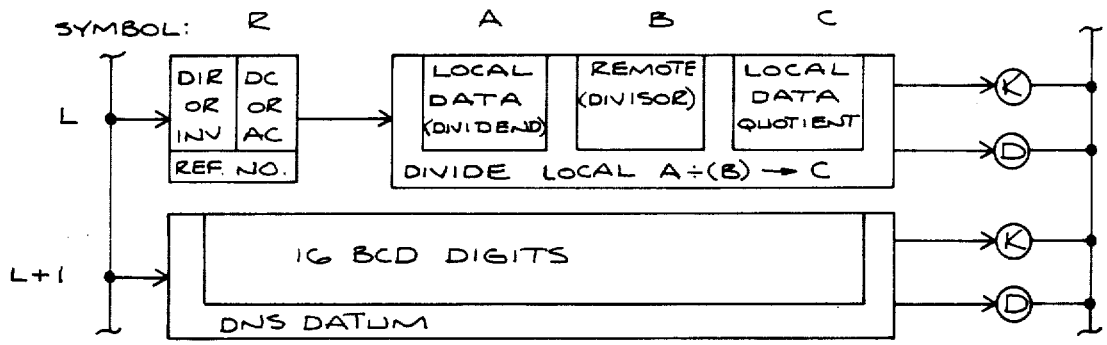
Figure 16H:
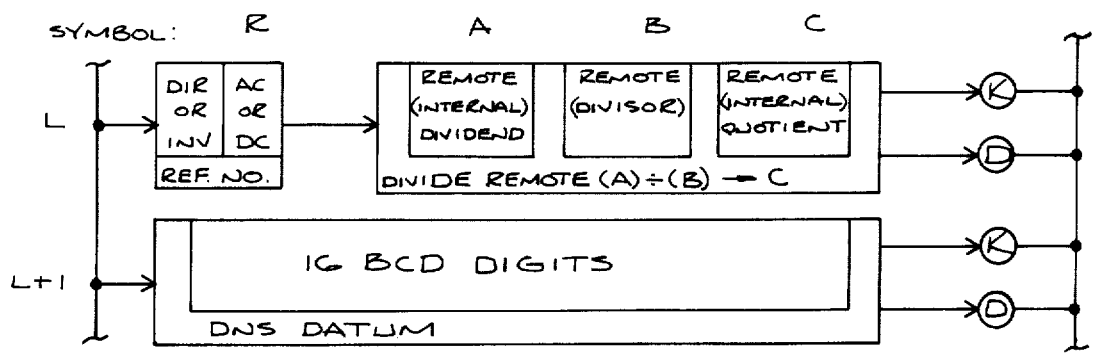
Figure 16M:
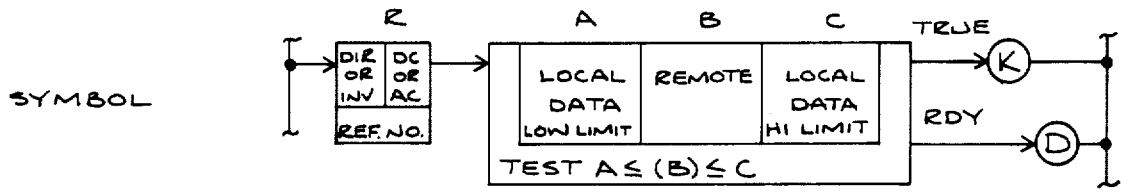
Figure 16N:
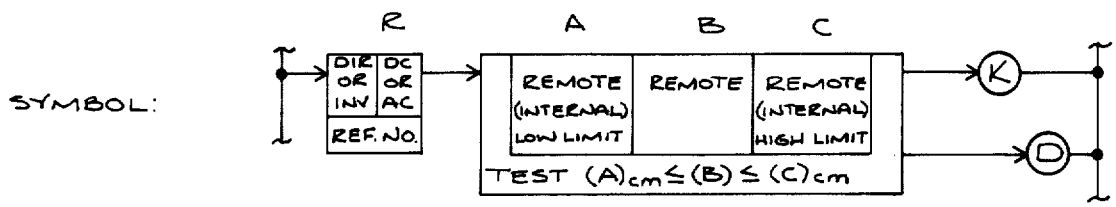
Figure 16O:
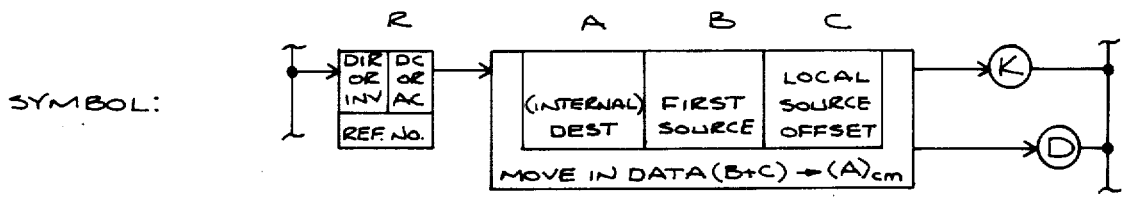
Figure 16P:
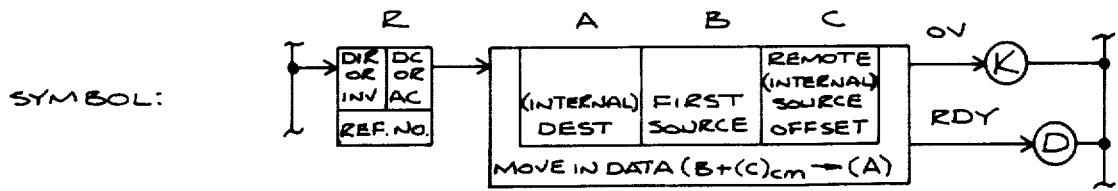
Figure 16V:
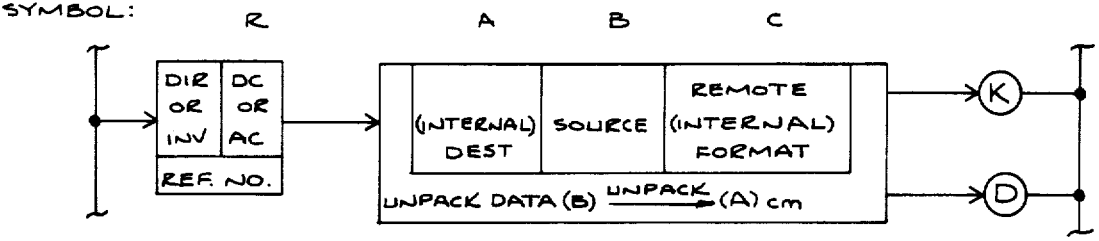
Figure 16W:
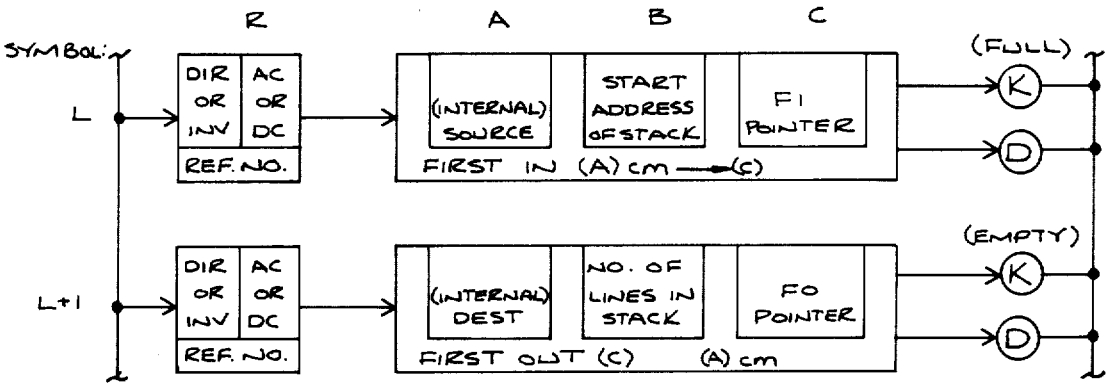
Figure 16X:
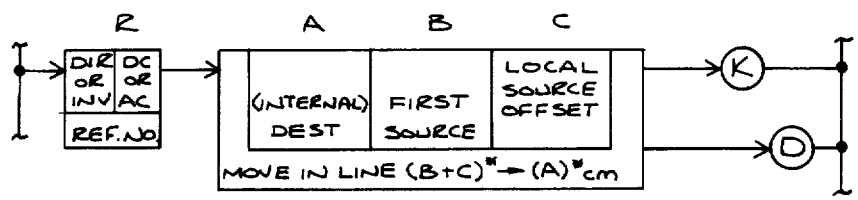
Figure 16Y:
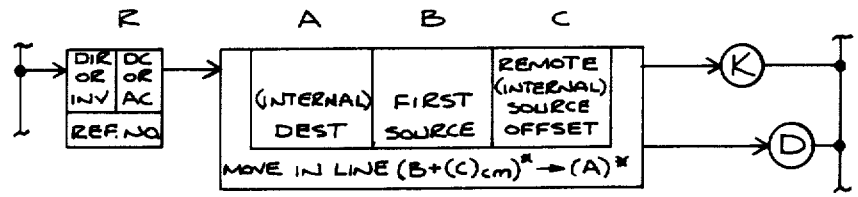
Figure 16Z:
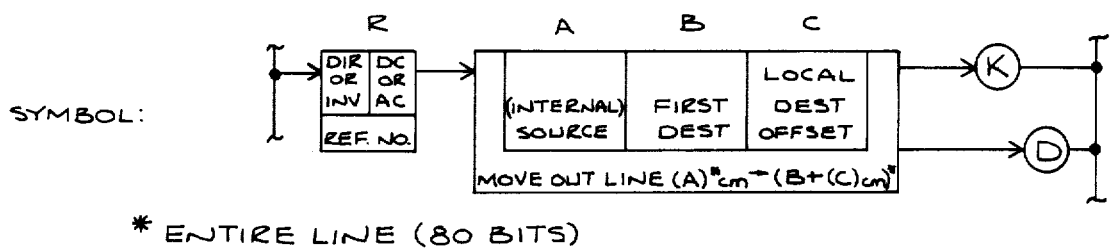
Figure 16A:
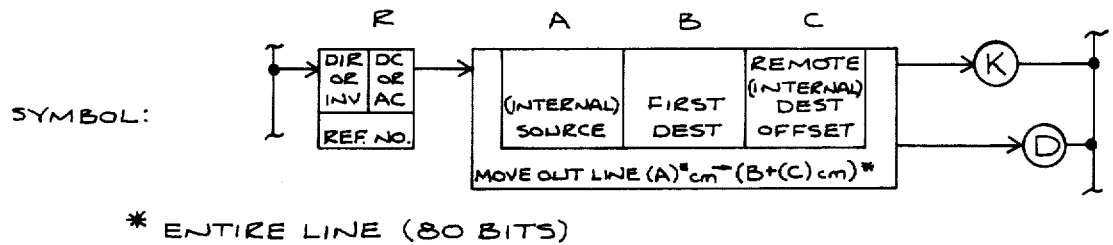
Figure 16B:
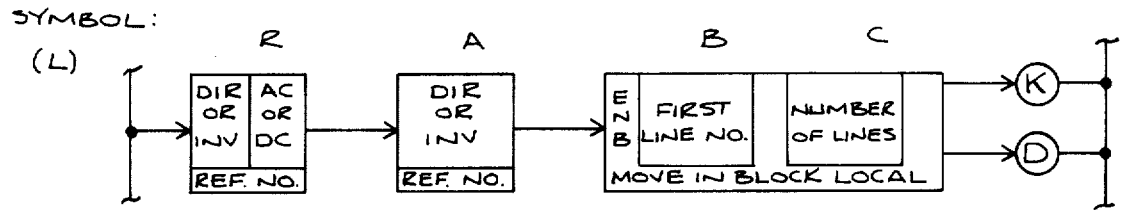
Figure 16C:
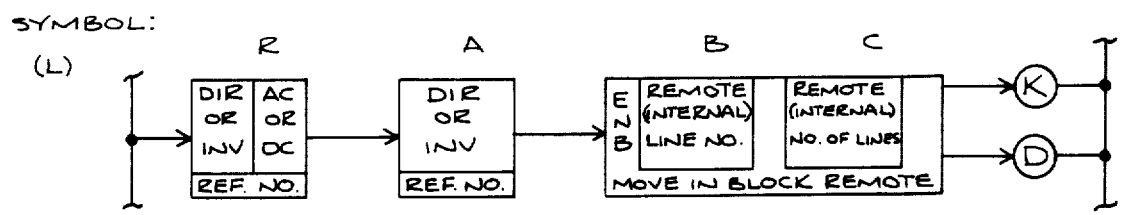
Figure 16D:
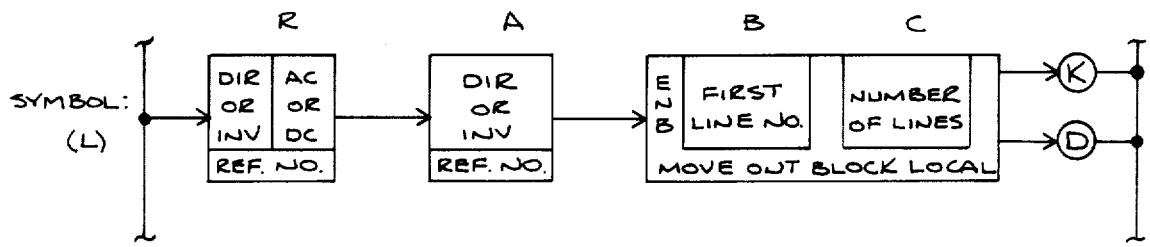
Figure 16E:
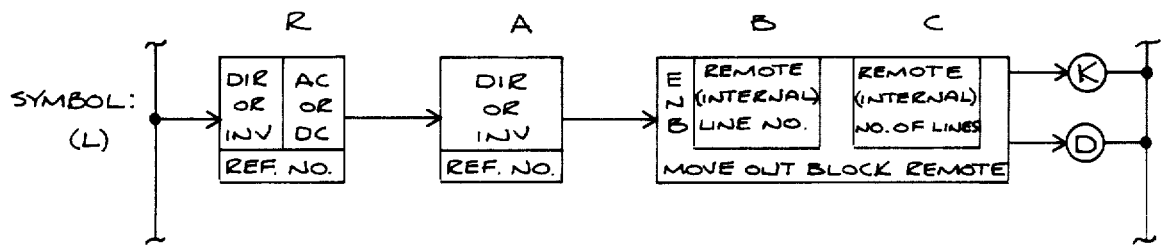
Figure 16F:
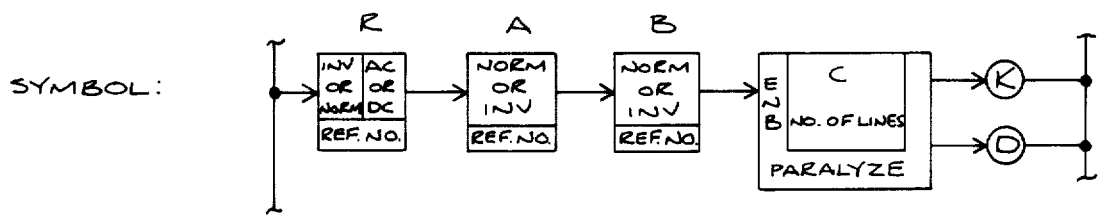
Figure 16G:
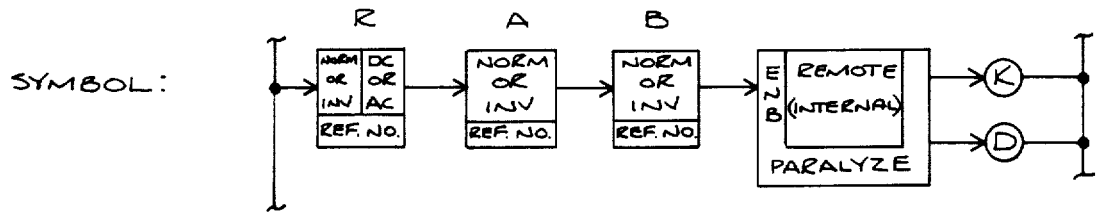
Figure 16H:
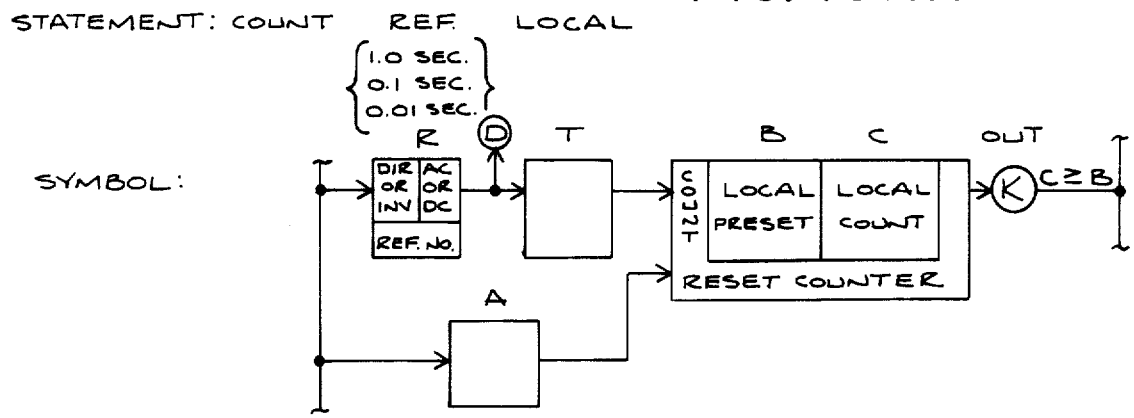
Figure 16I:
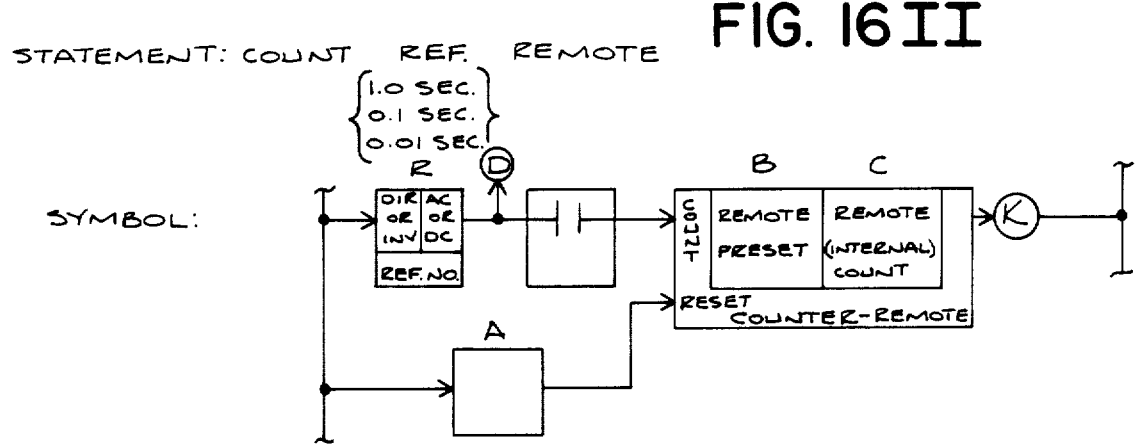
Figure 16J:
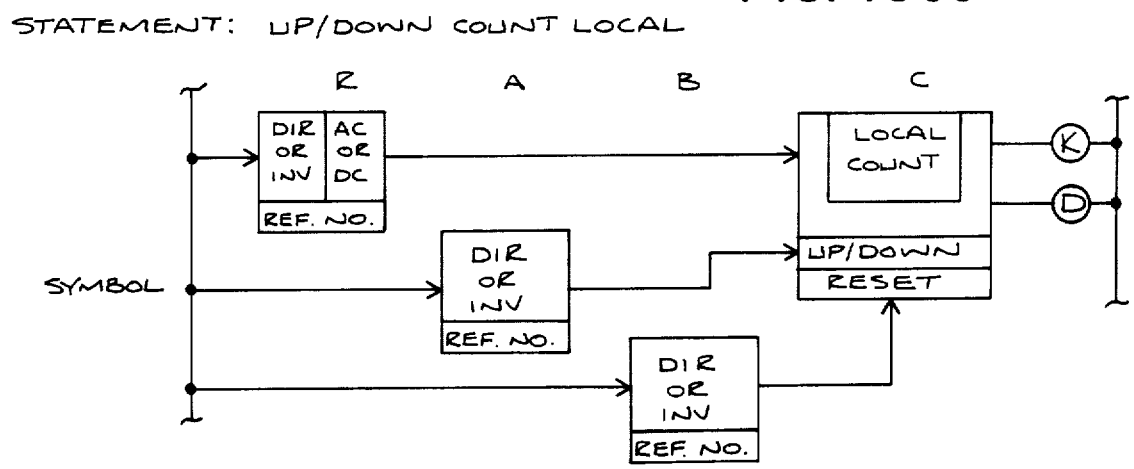
Figure 16K:
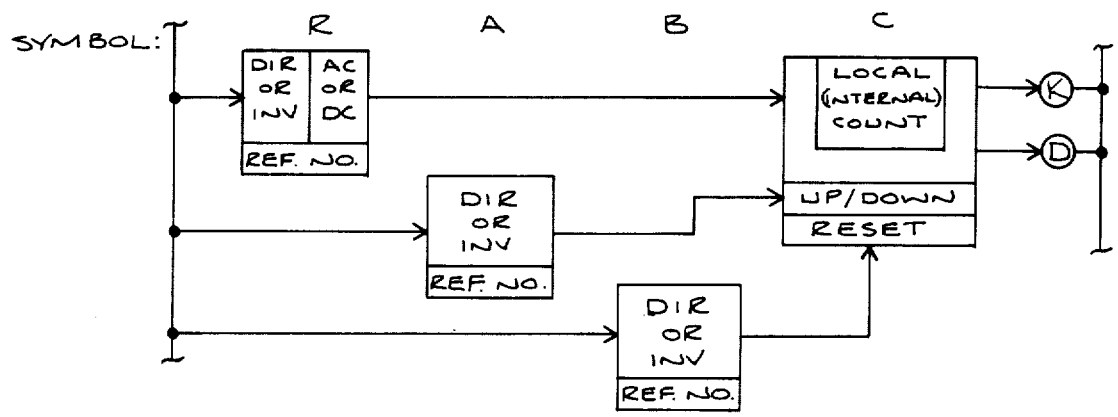
Figure 16L:
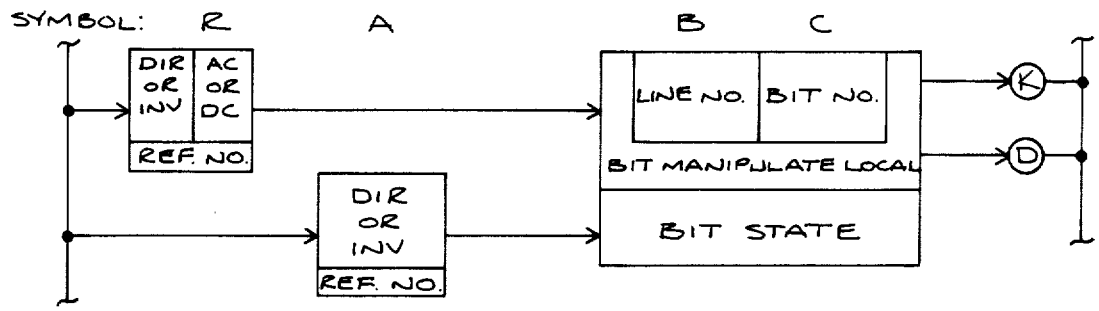
Figure 16M:
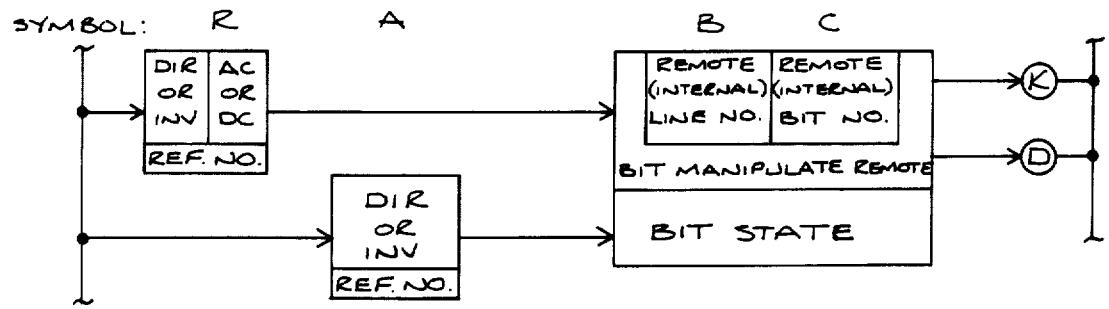
Figure 16S:
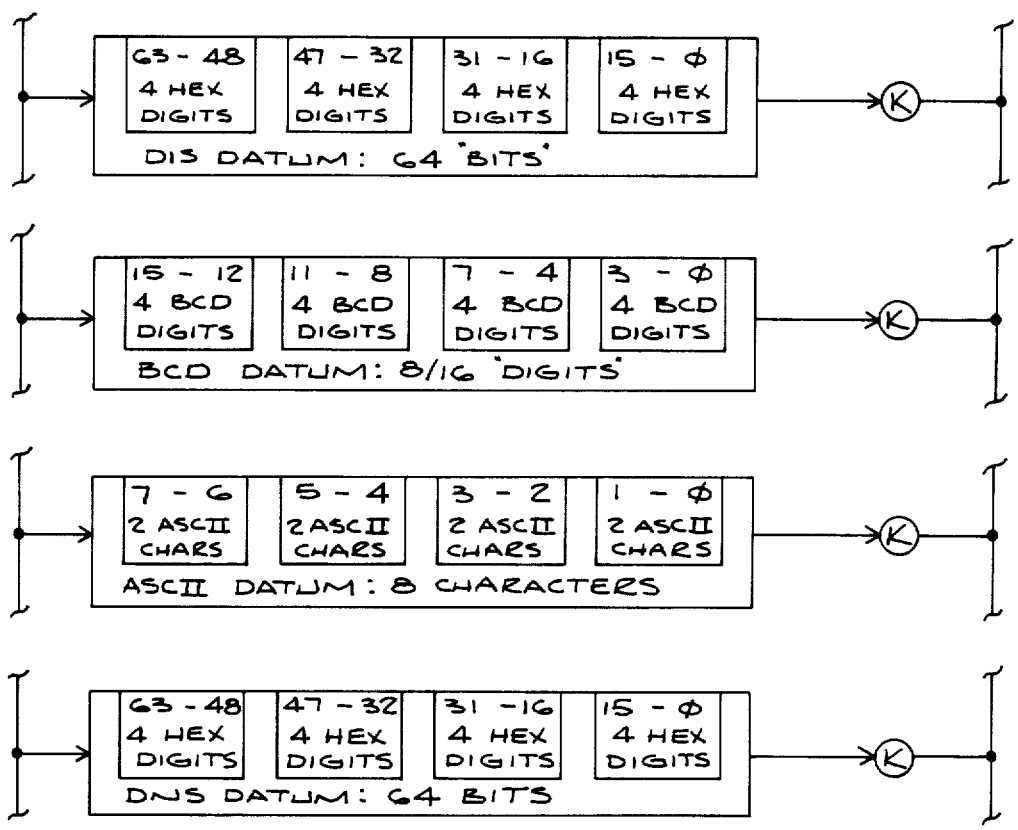
Figure 17:
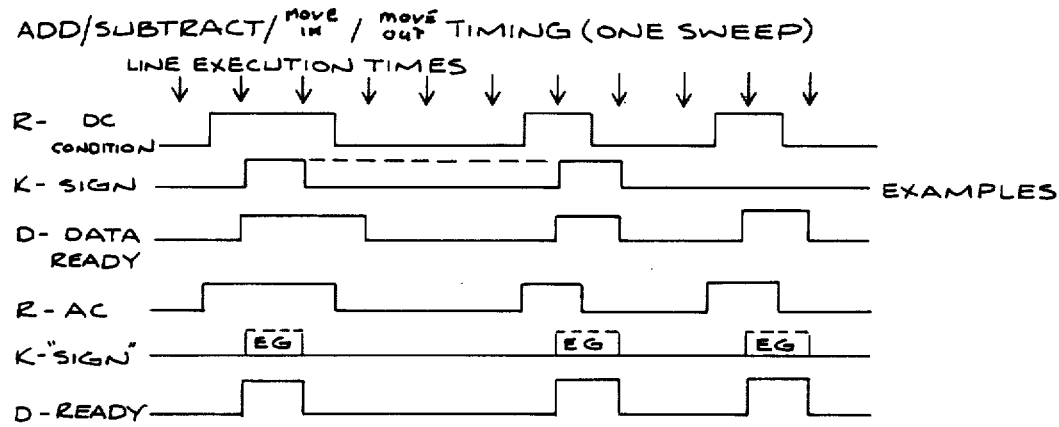
Figure 18:
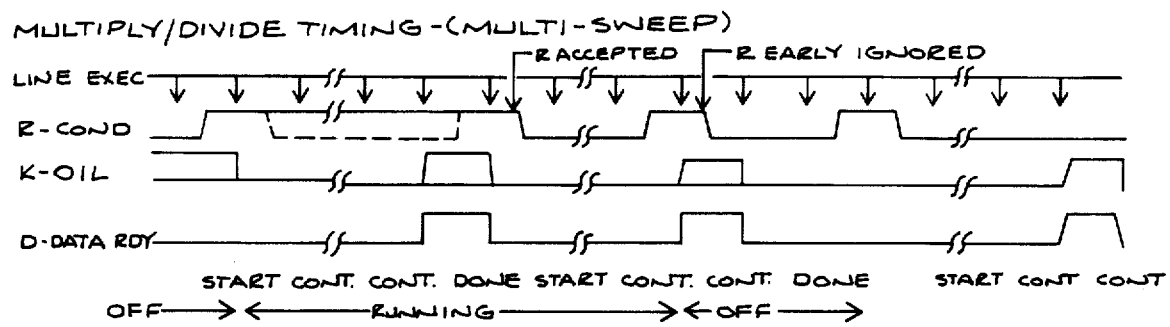
Figure 19:
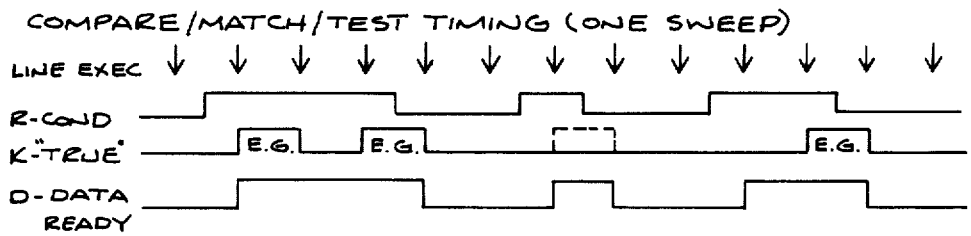
Figure 20:
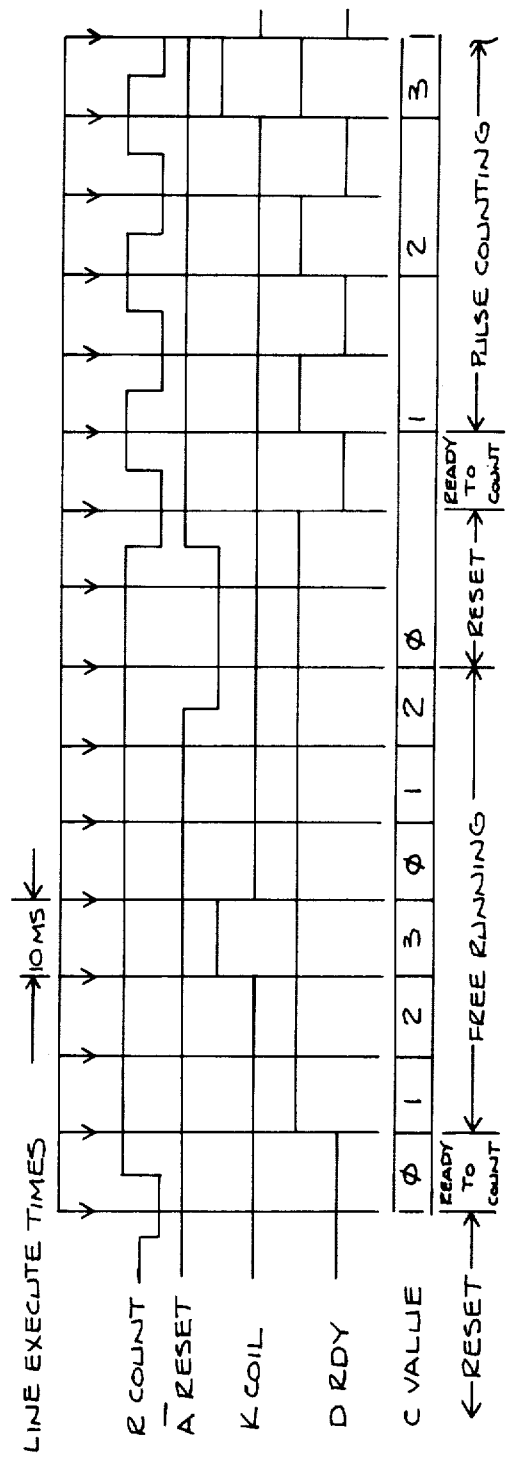
Figure 21:
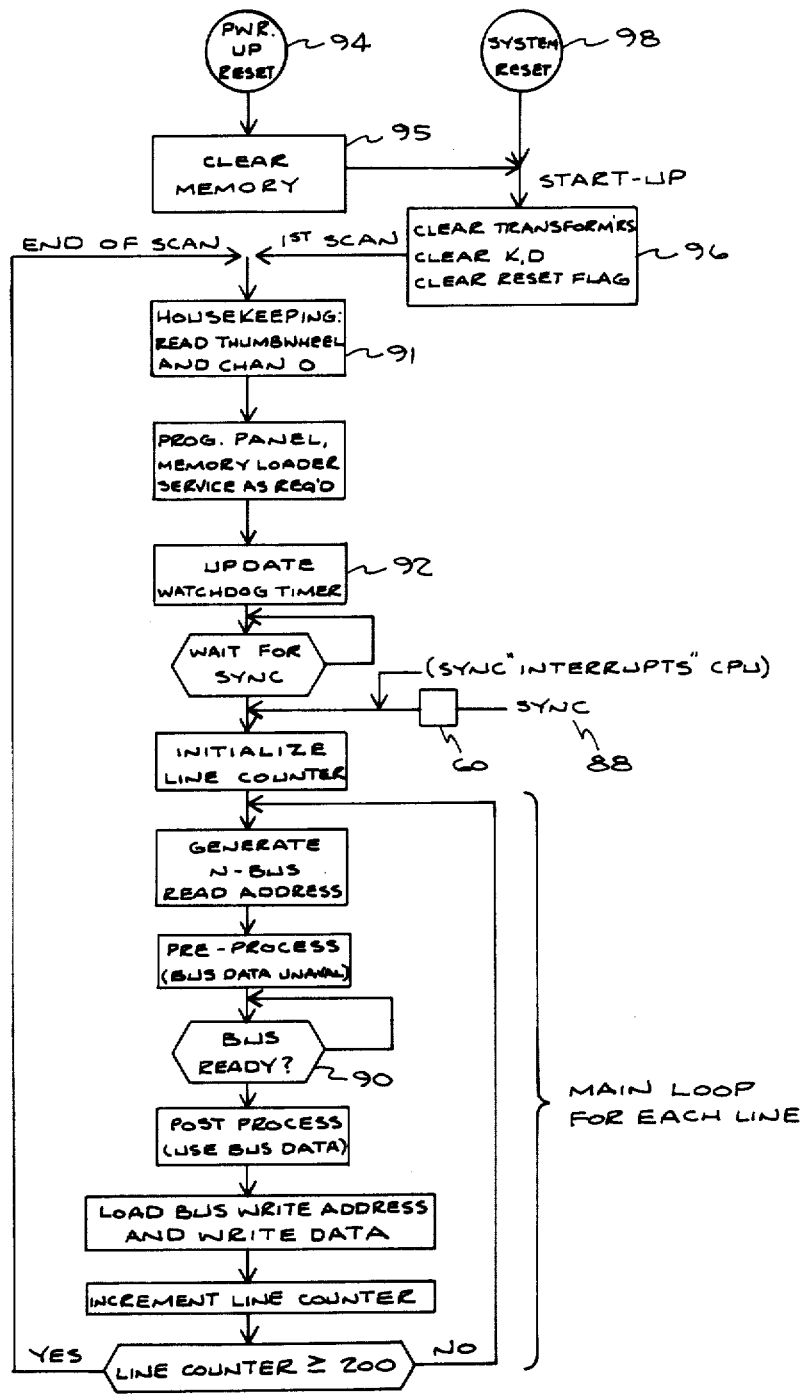
Figure 22:
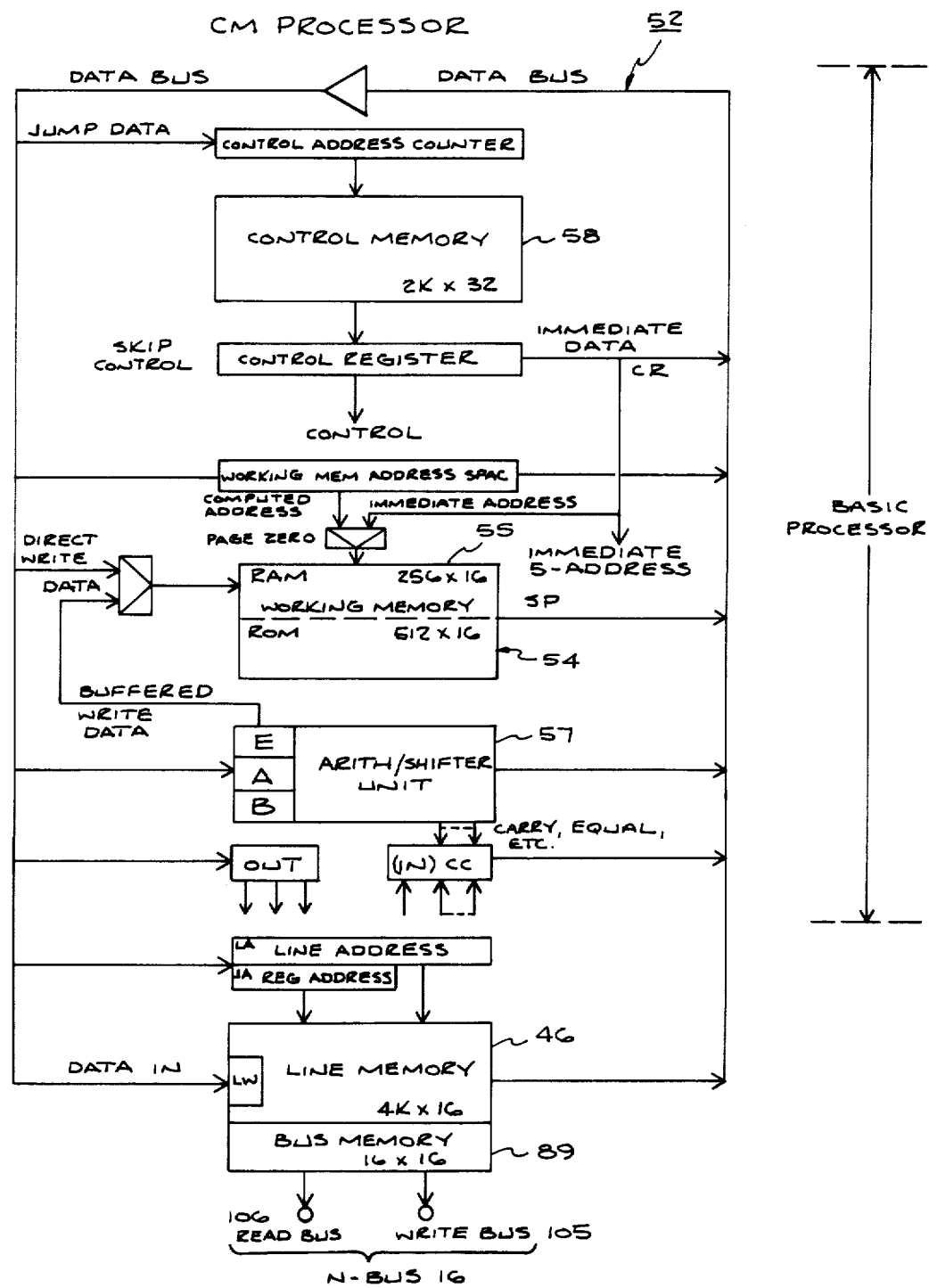
Figure 23:
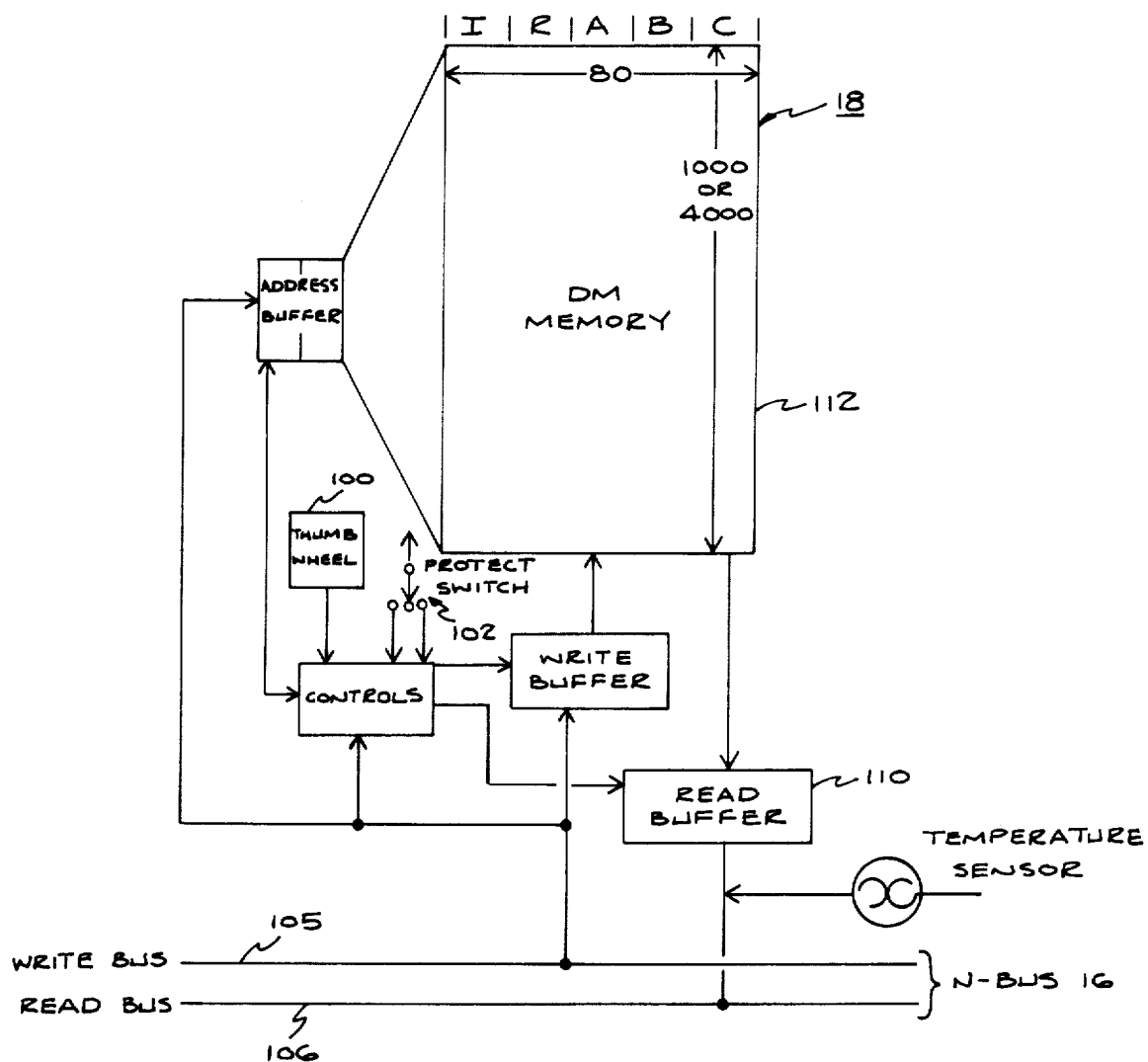
Figure 24:
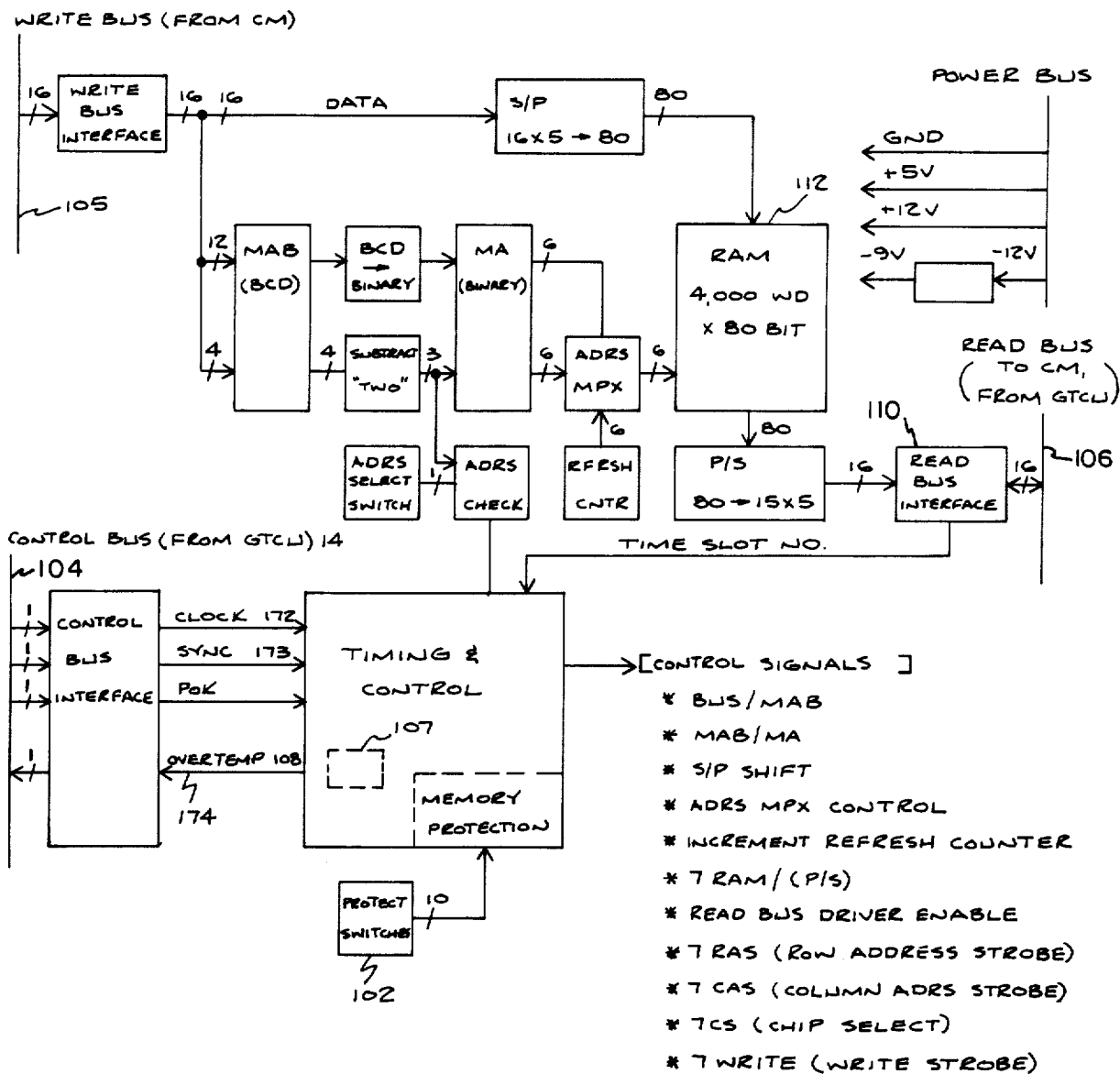
Figure 25:
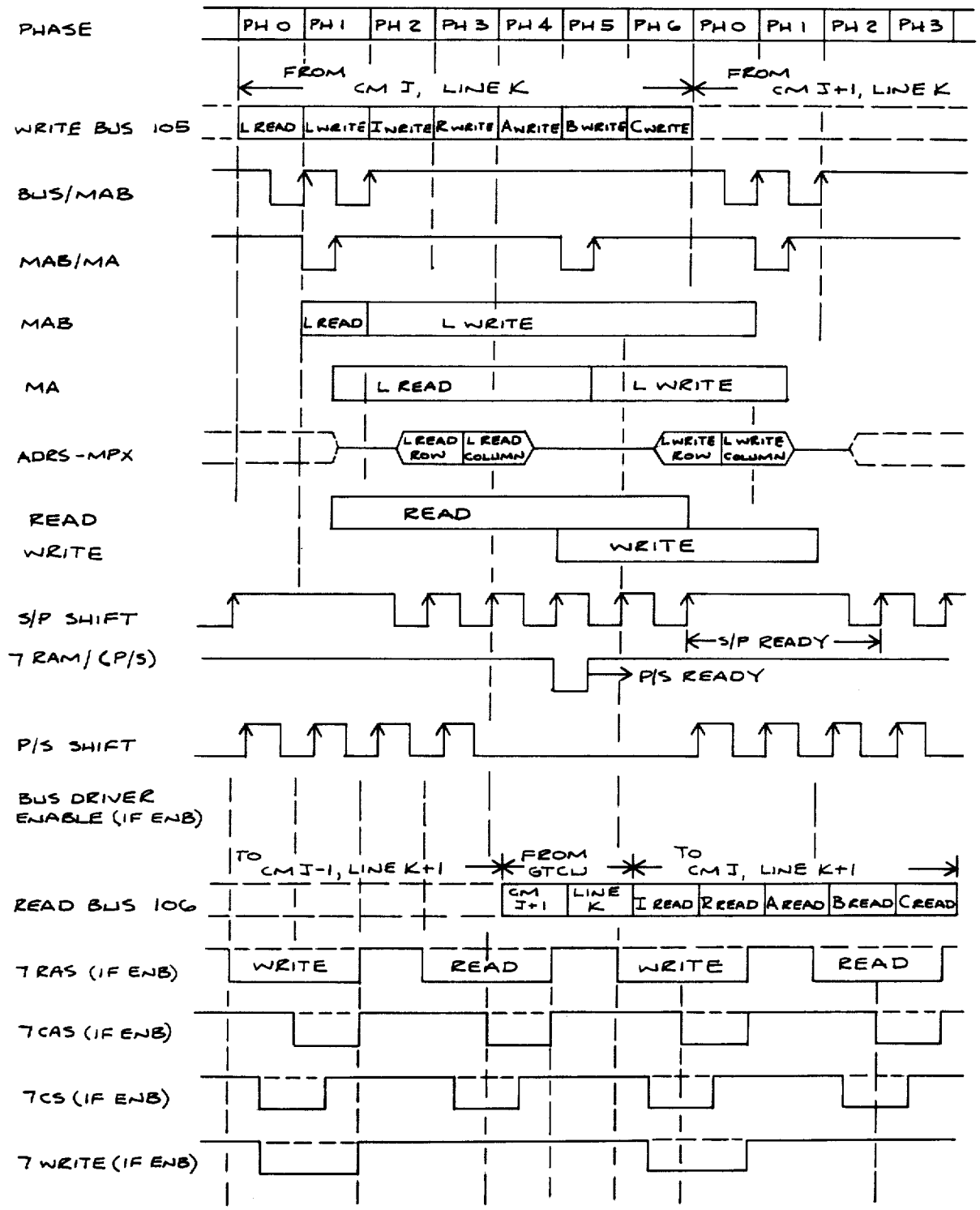
Figure 26:
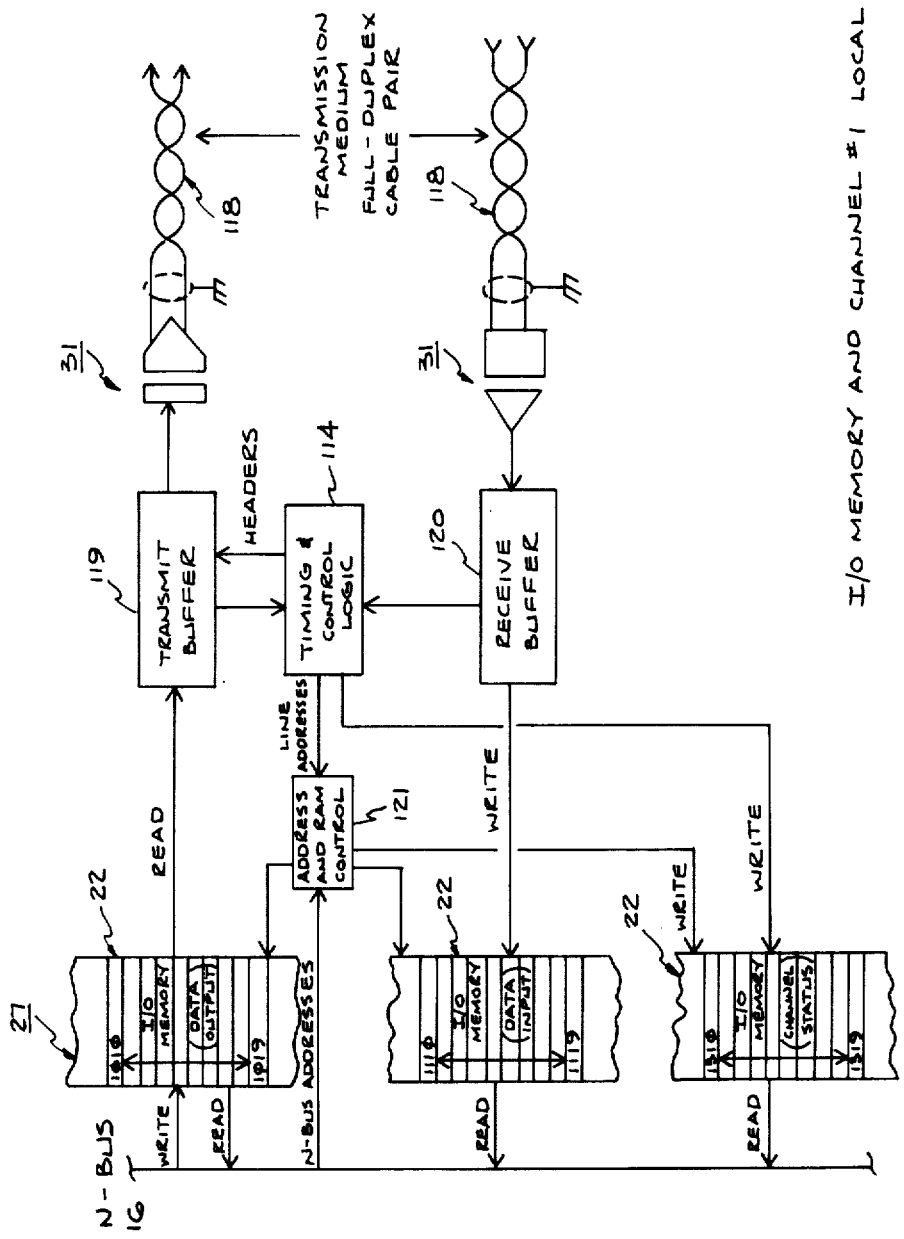
Figure 27:
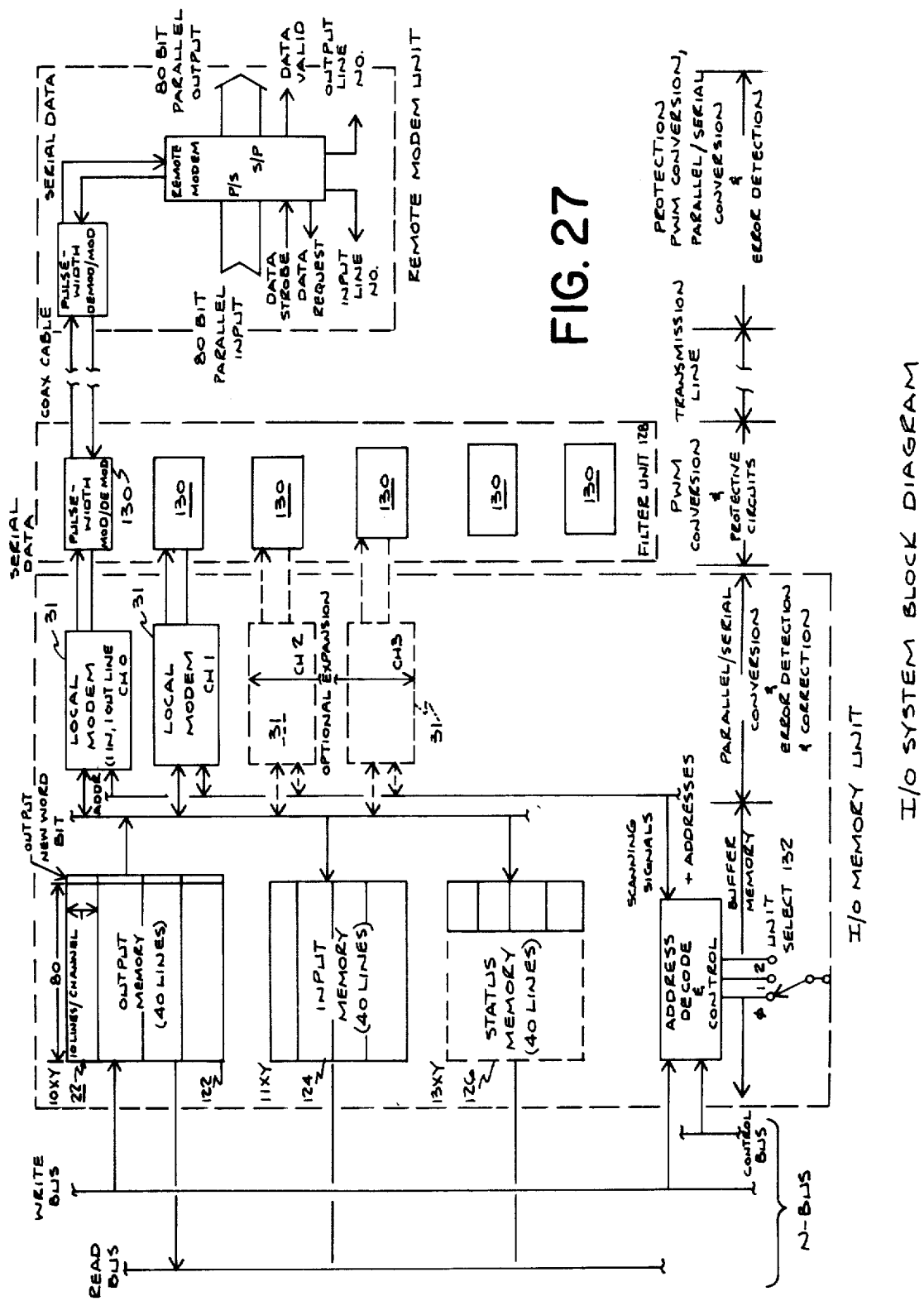
Figure 28:
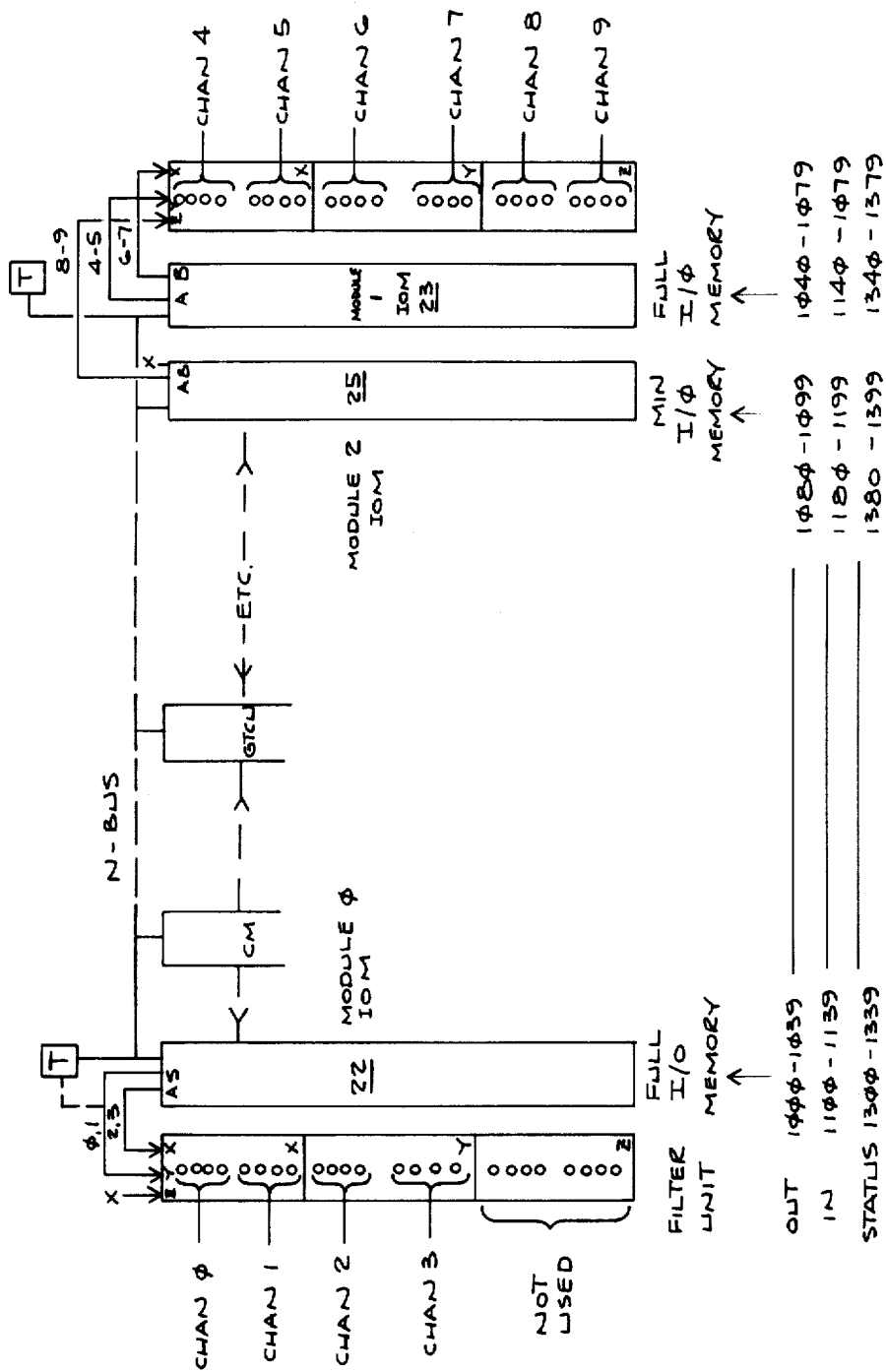
Figure 29:
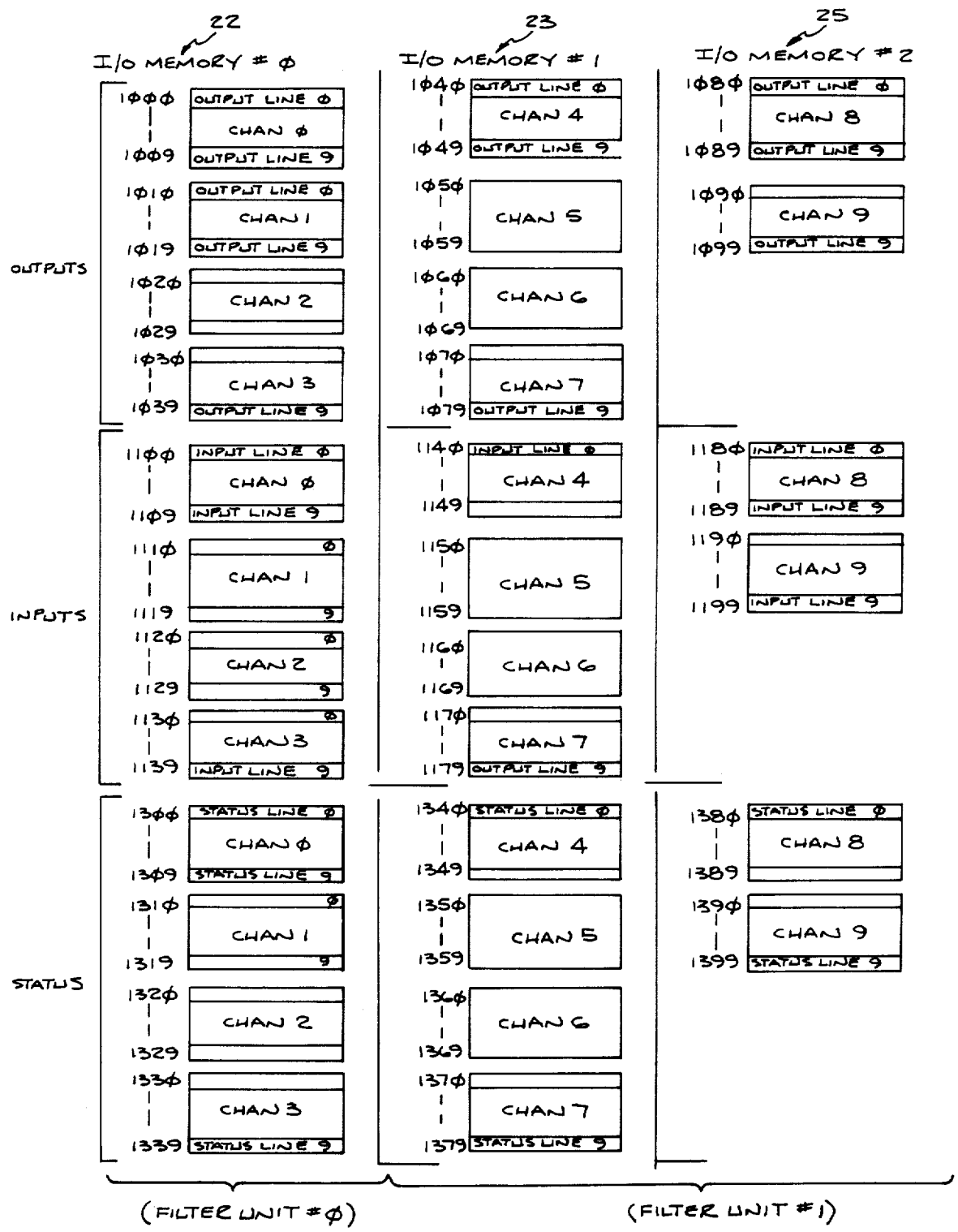
Figure 30:
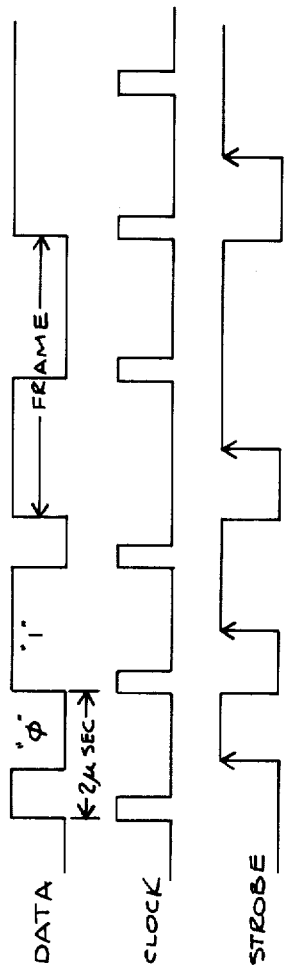
Figure 31:
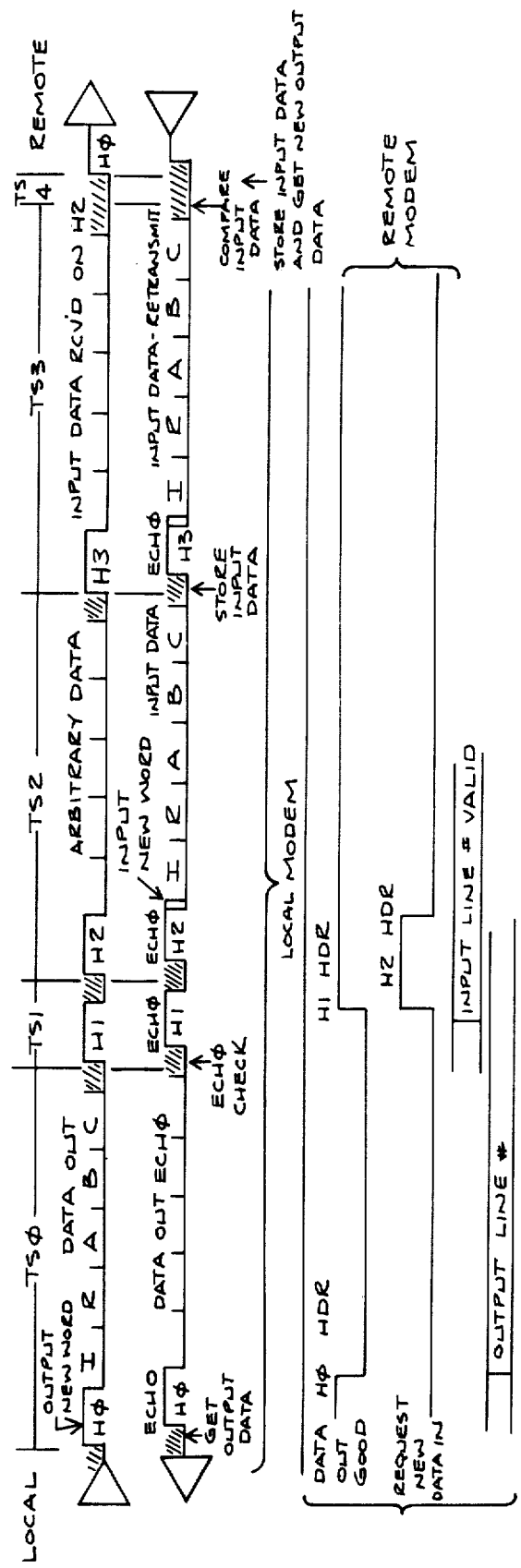
Figure 32:
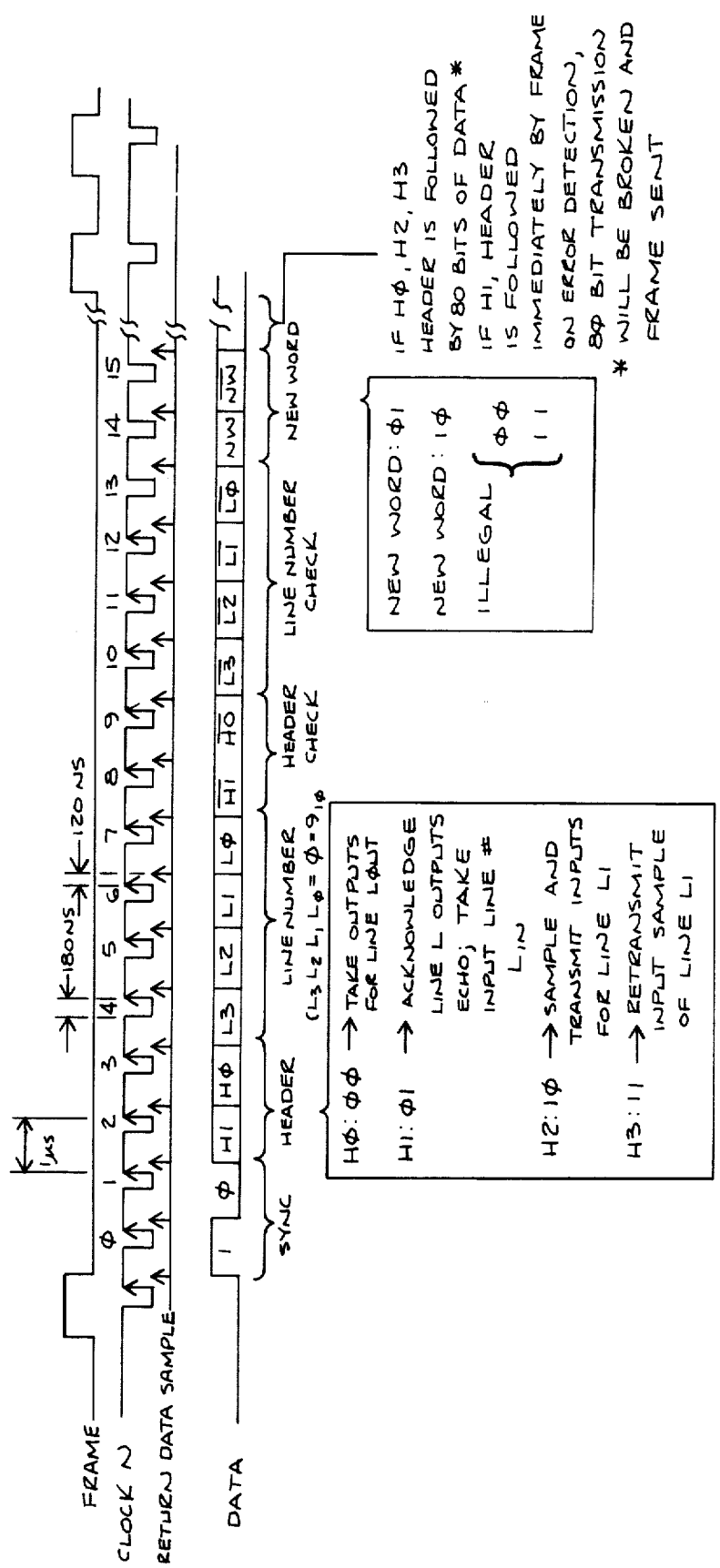
Figure 33:
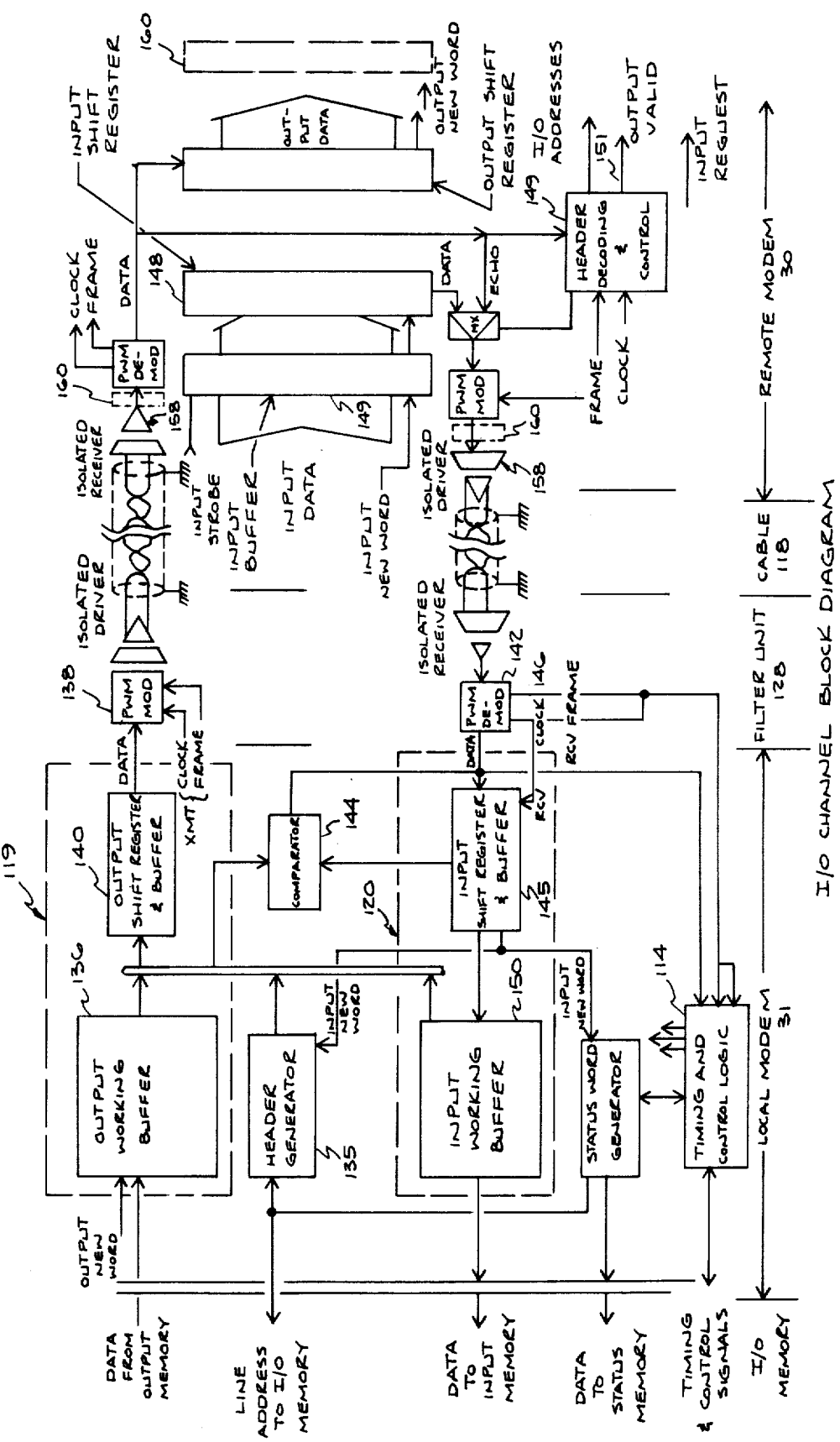
Figure 34:
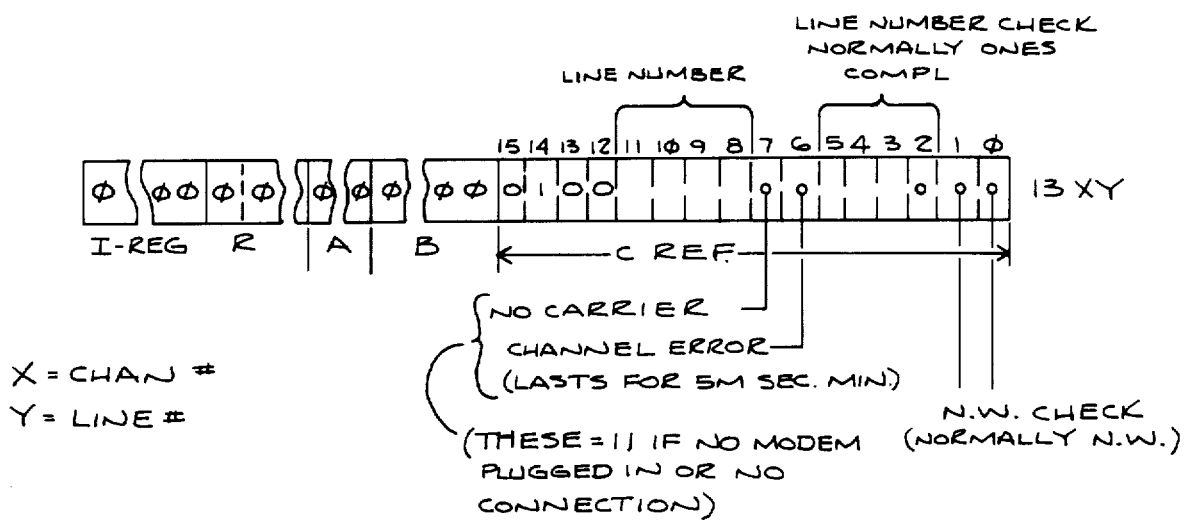
Figure 39:
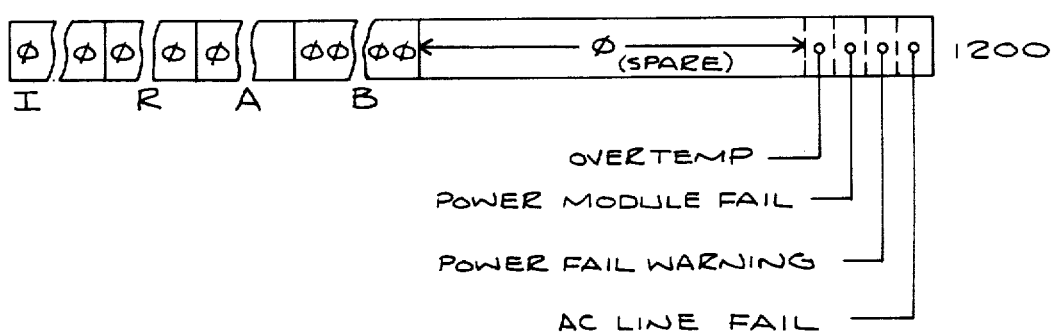
Figure 35:
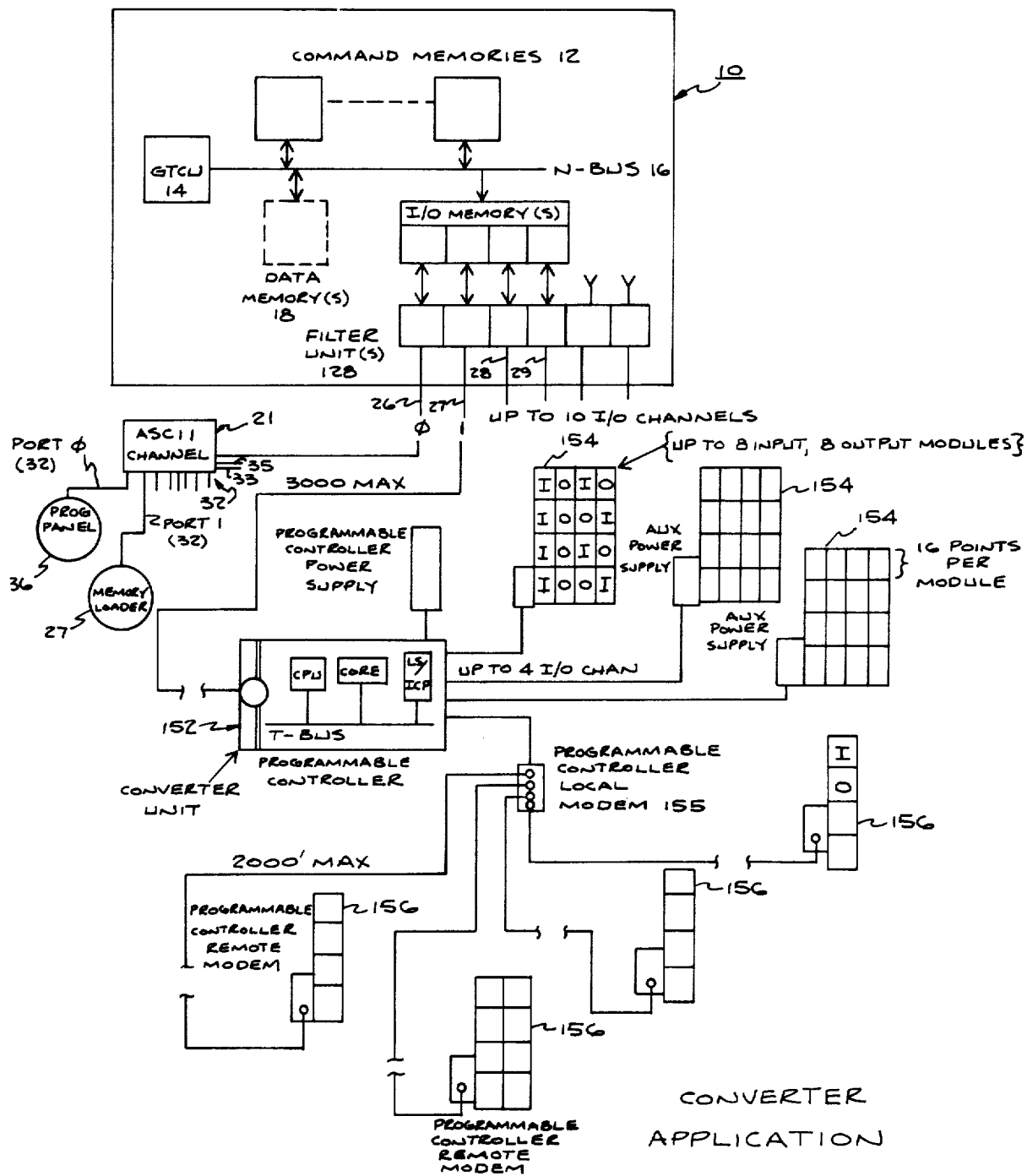
Figure 36:
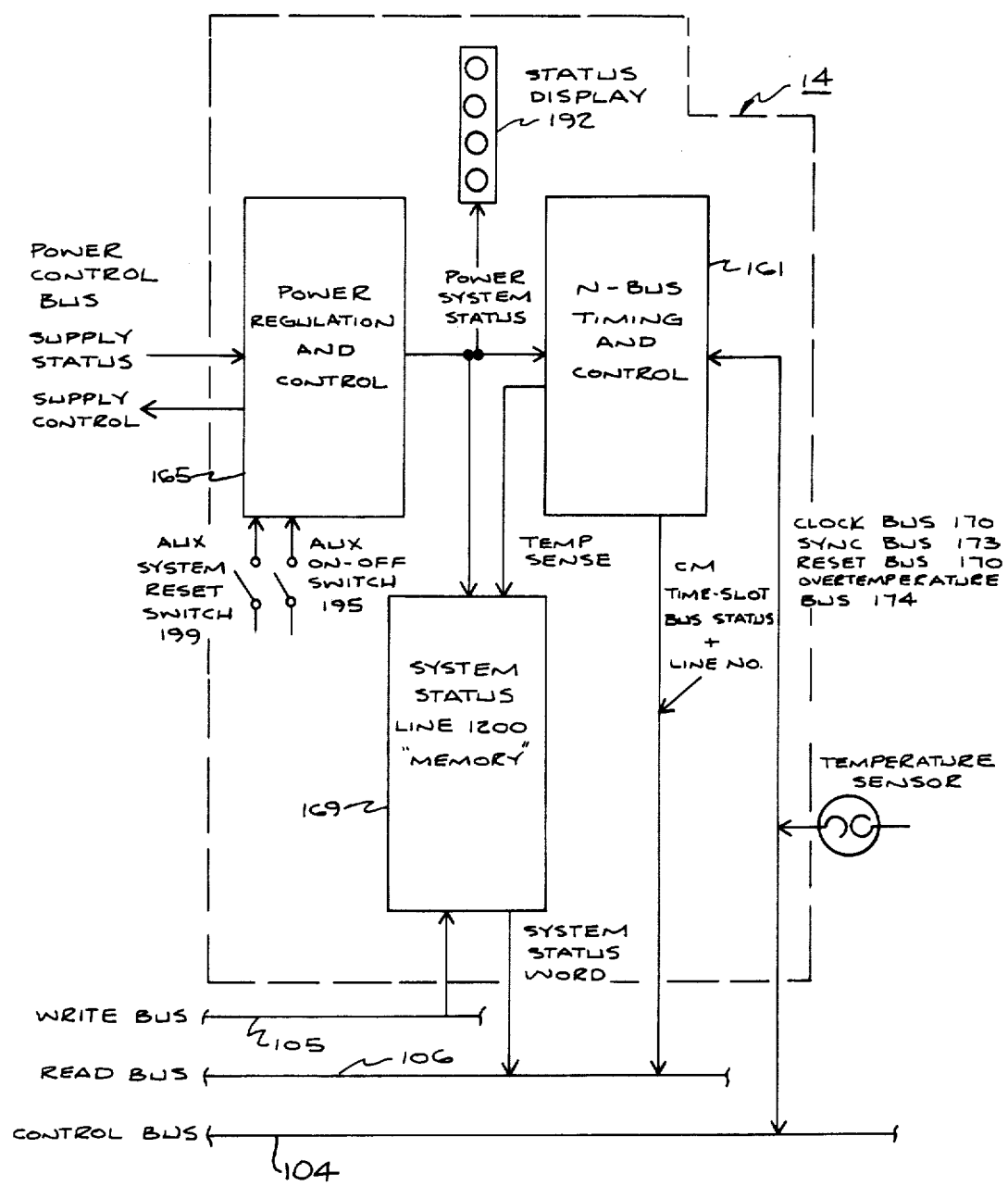
Figure 37:
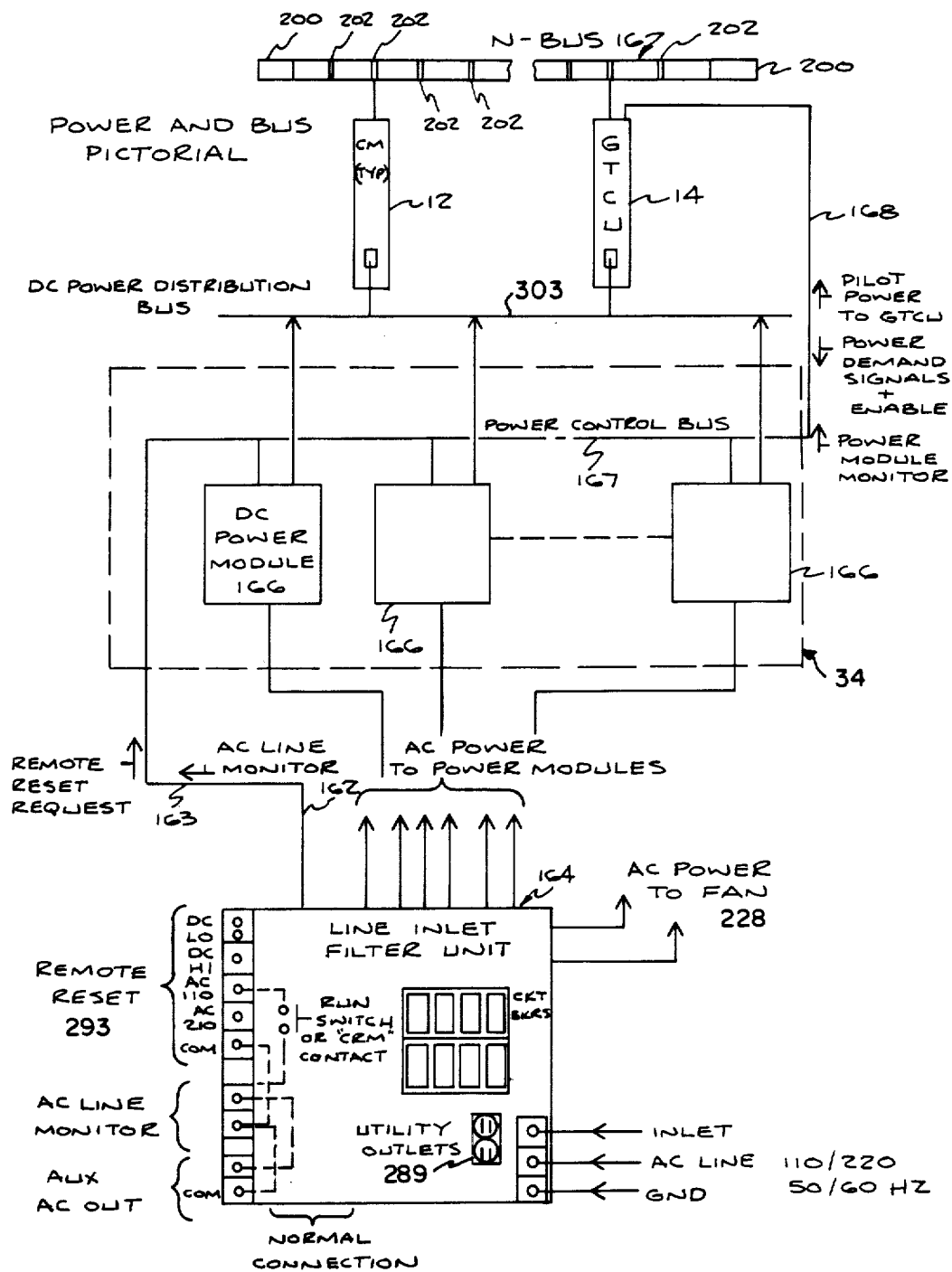
Figure 38:
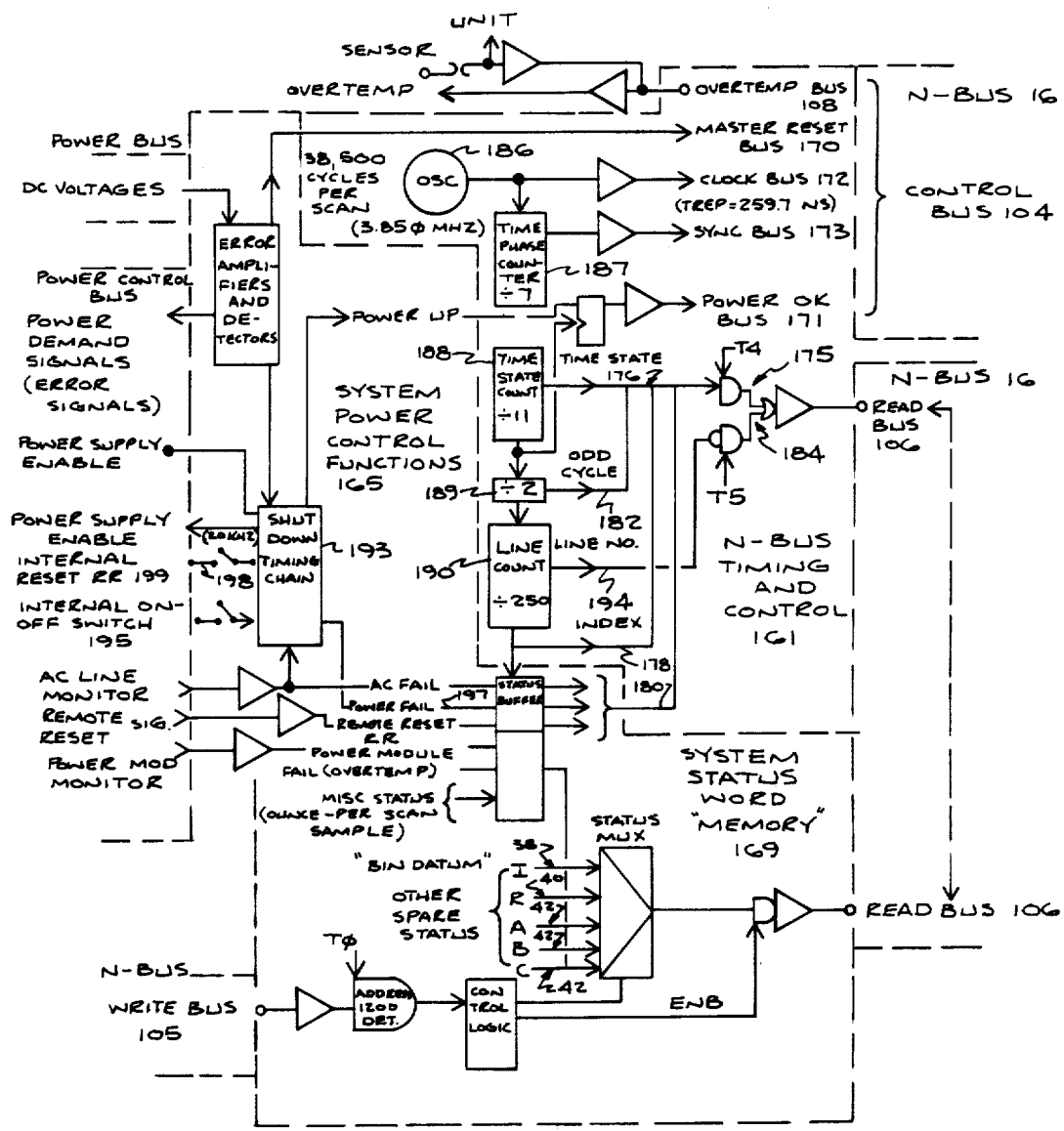
Figure 40:
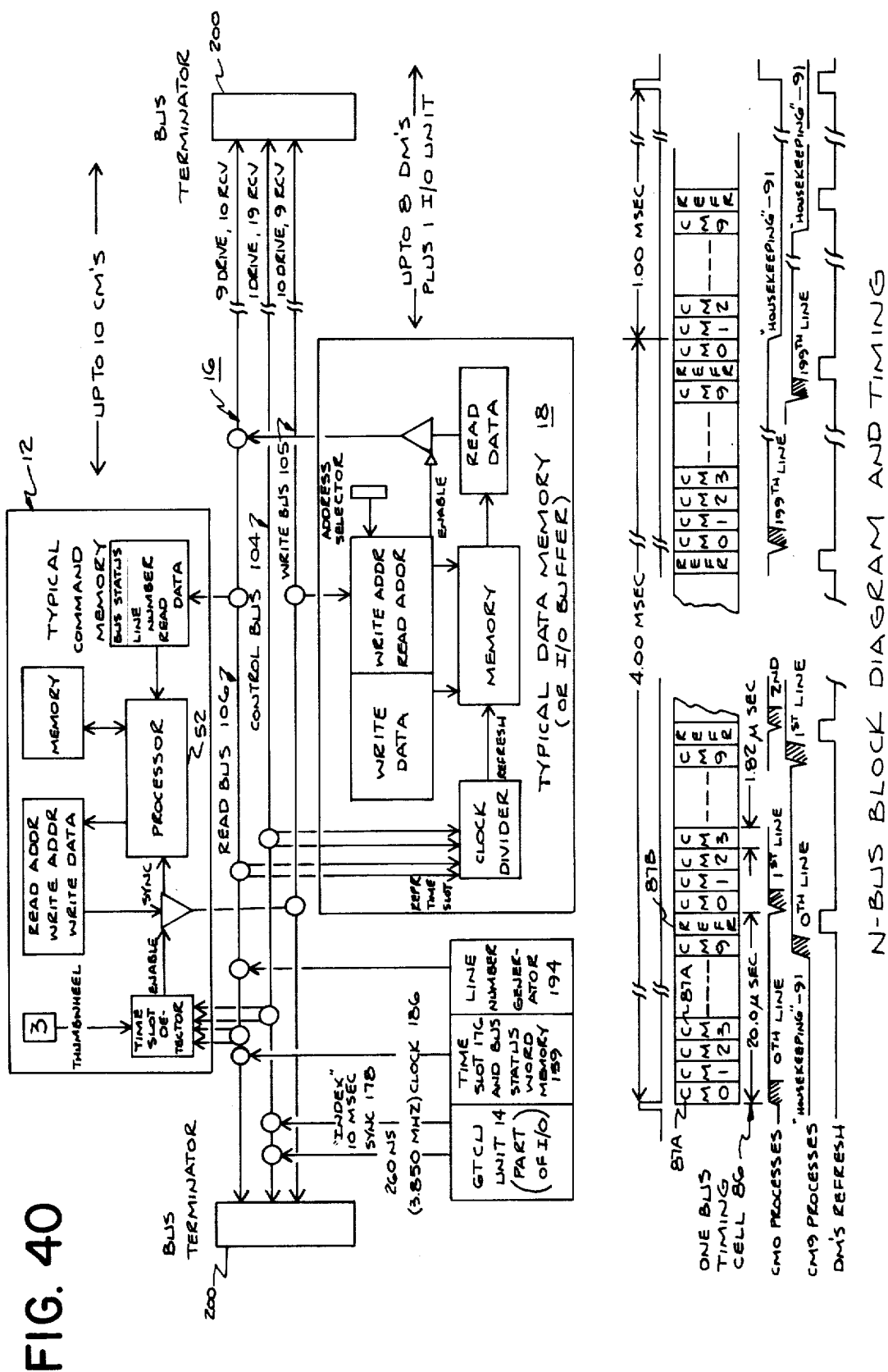
Figures 41A, 41B:
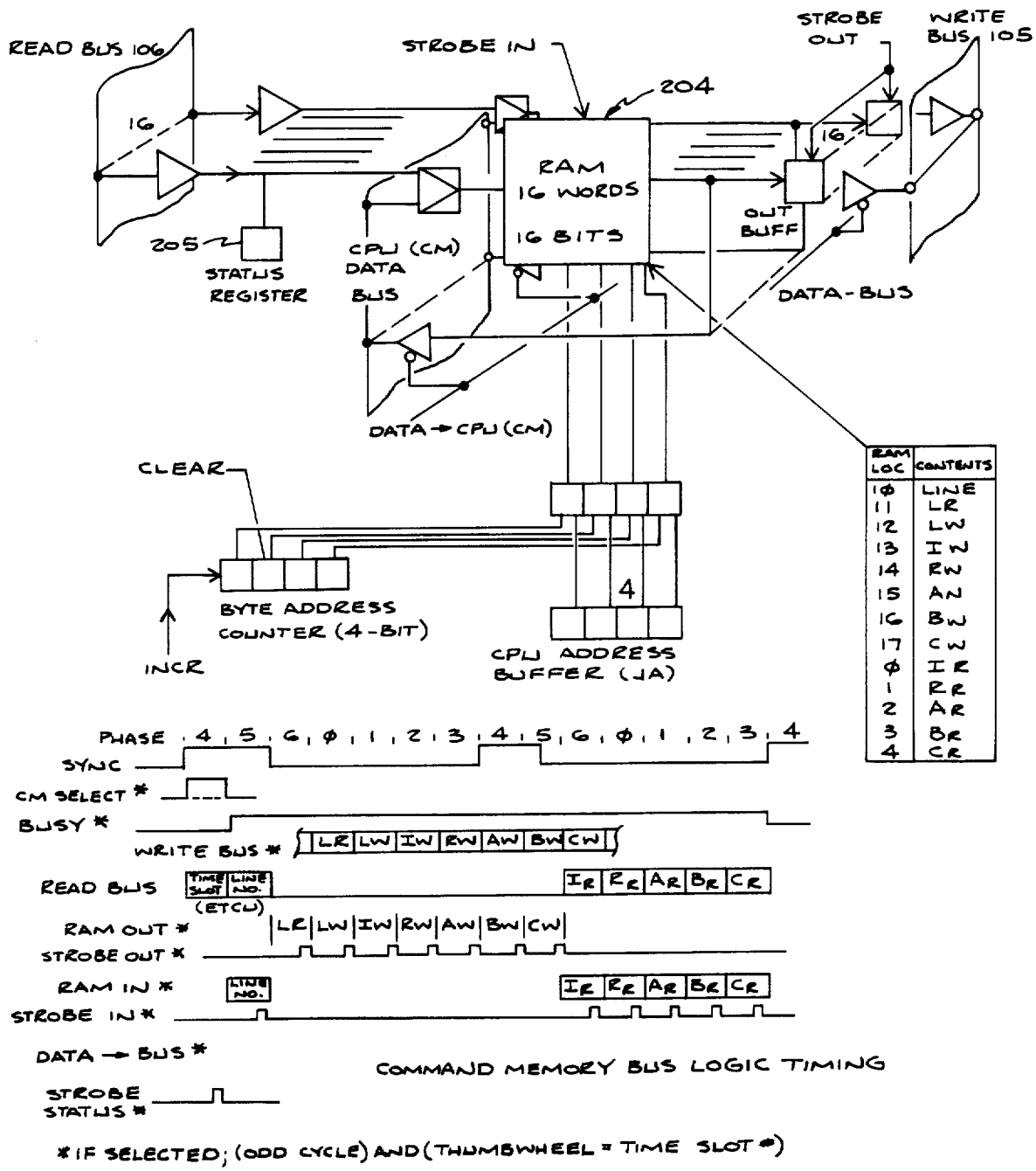
Figure 42A:
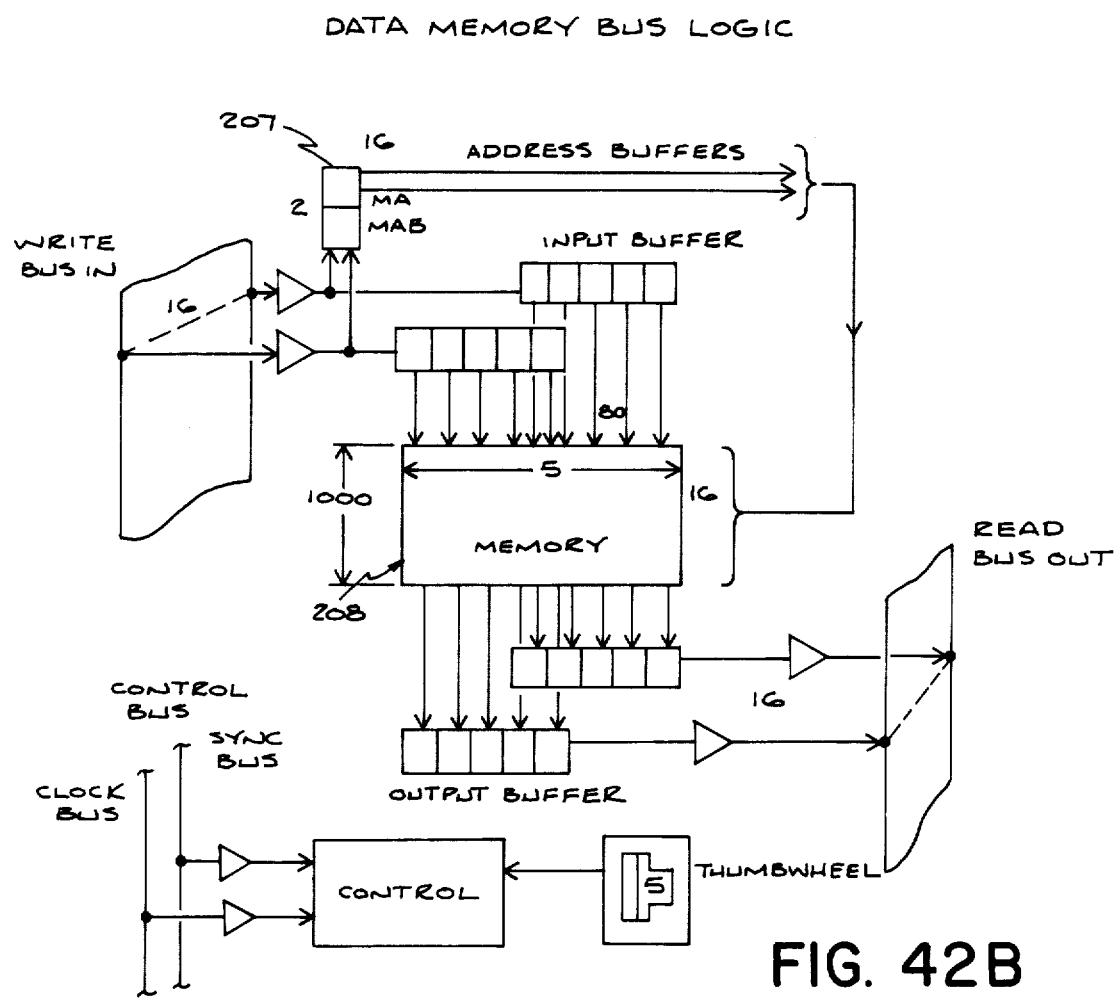
Figure 42B:
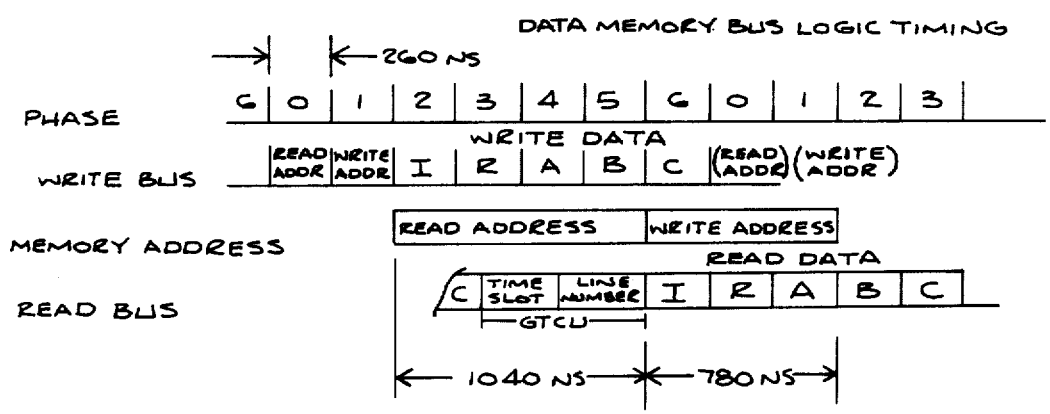
Figures 43A, 43B:
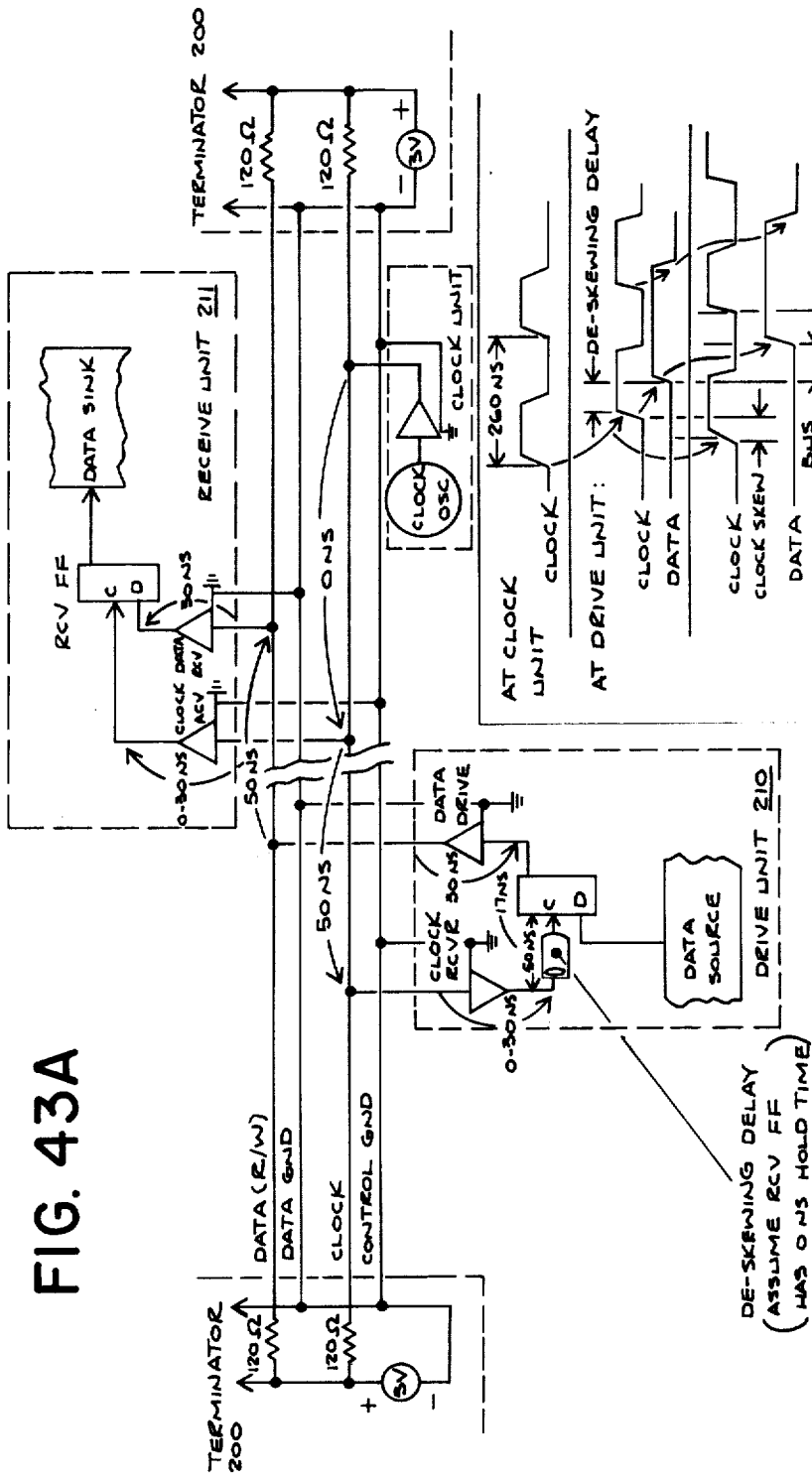
Figure 44:
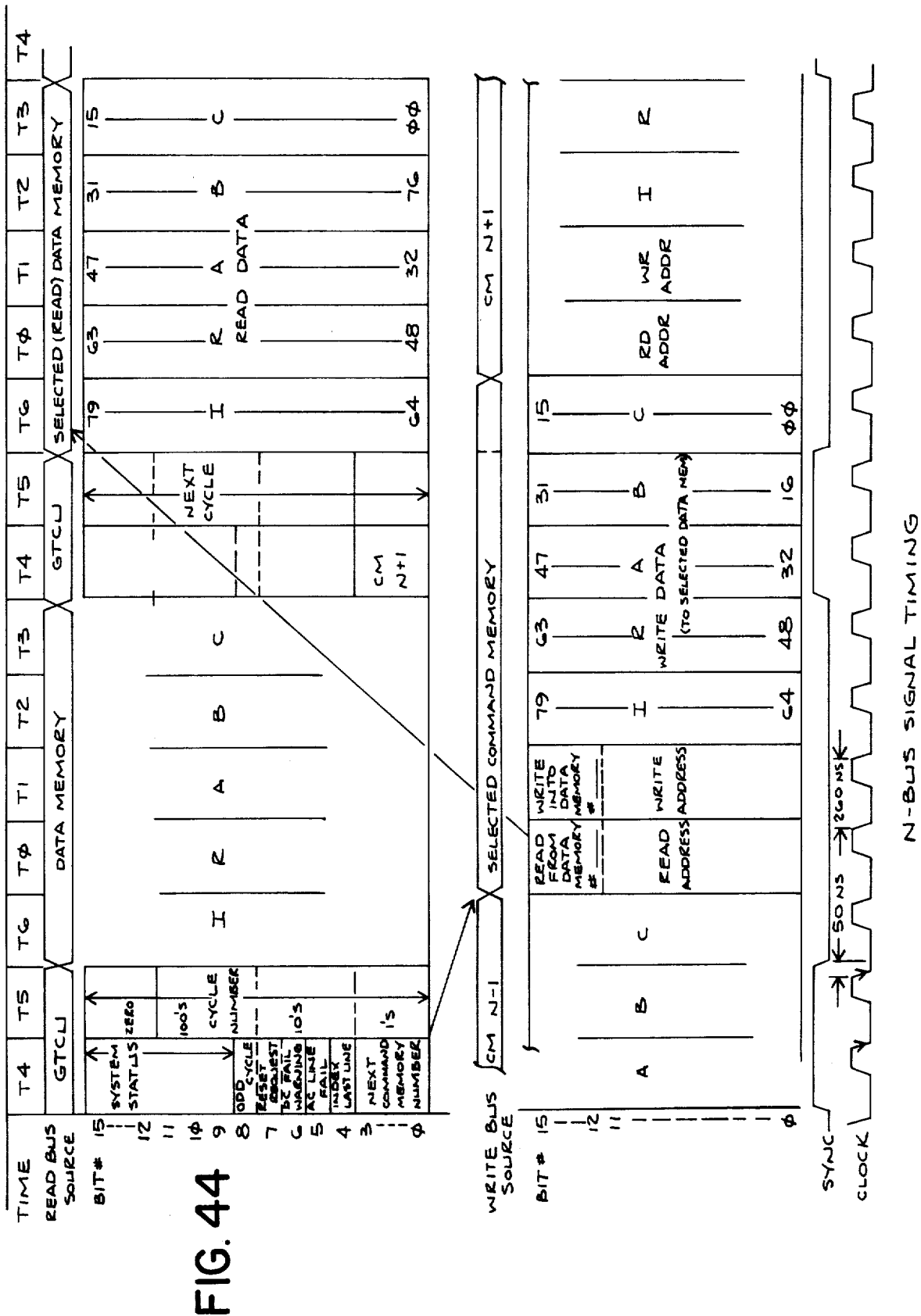
Figure 45:
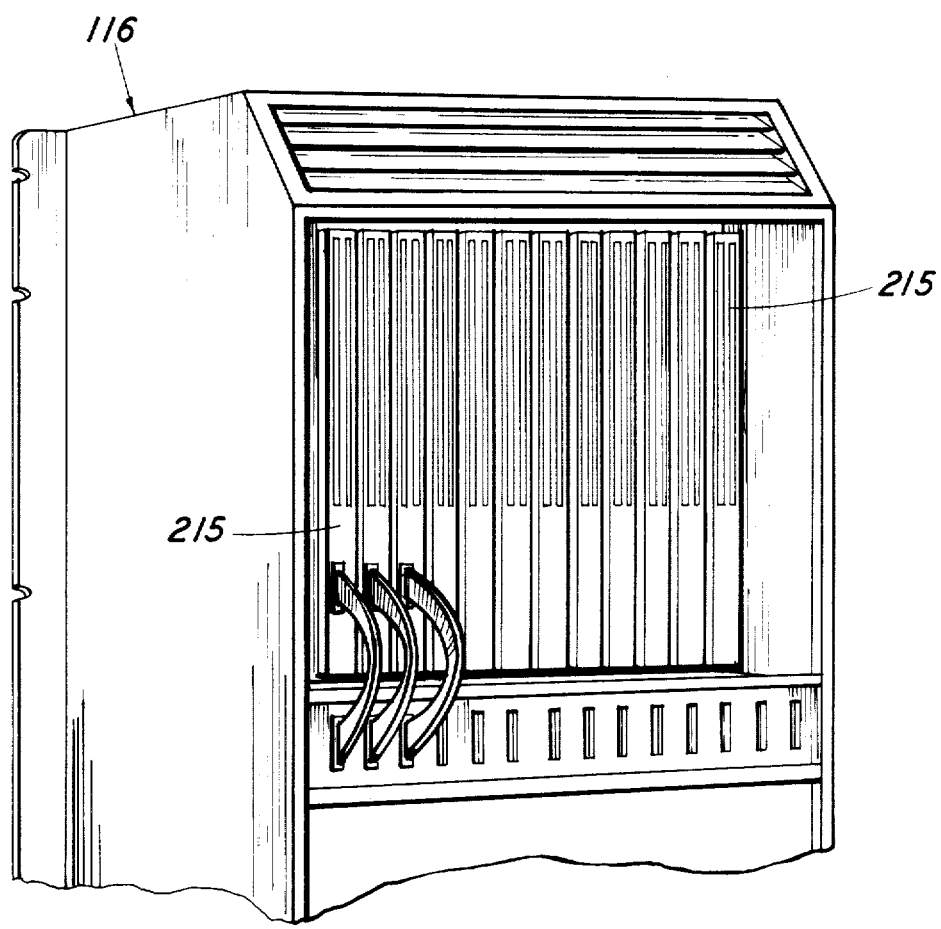
Figure 46:
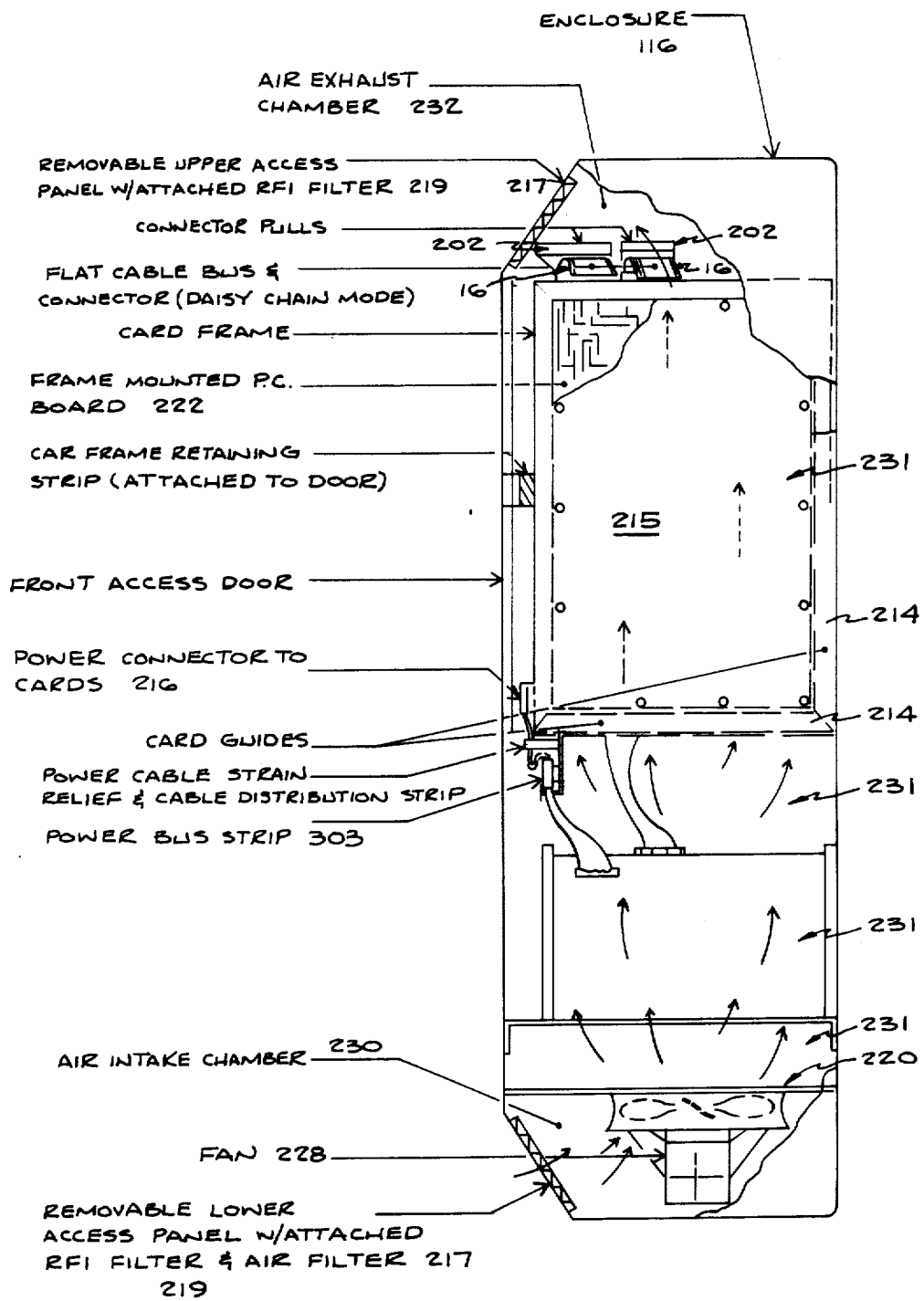
Figures 48A, 48B, 48C:
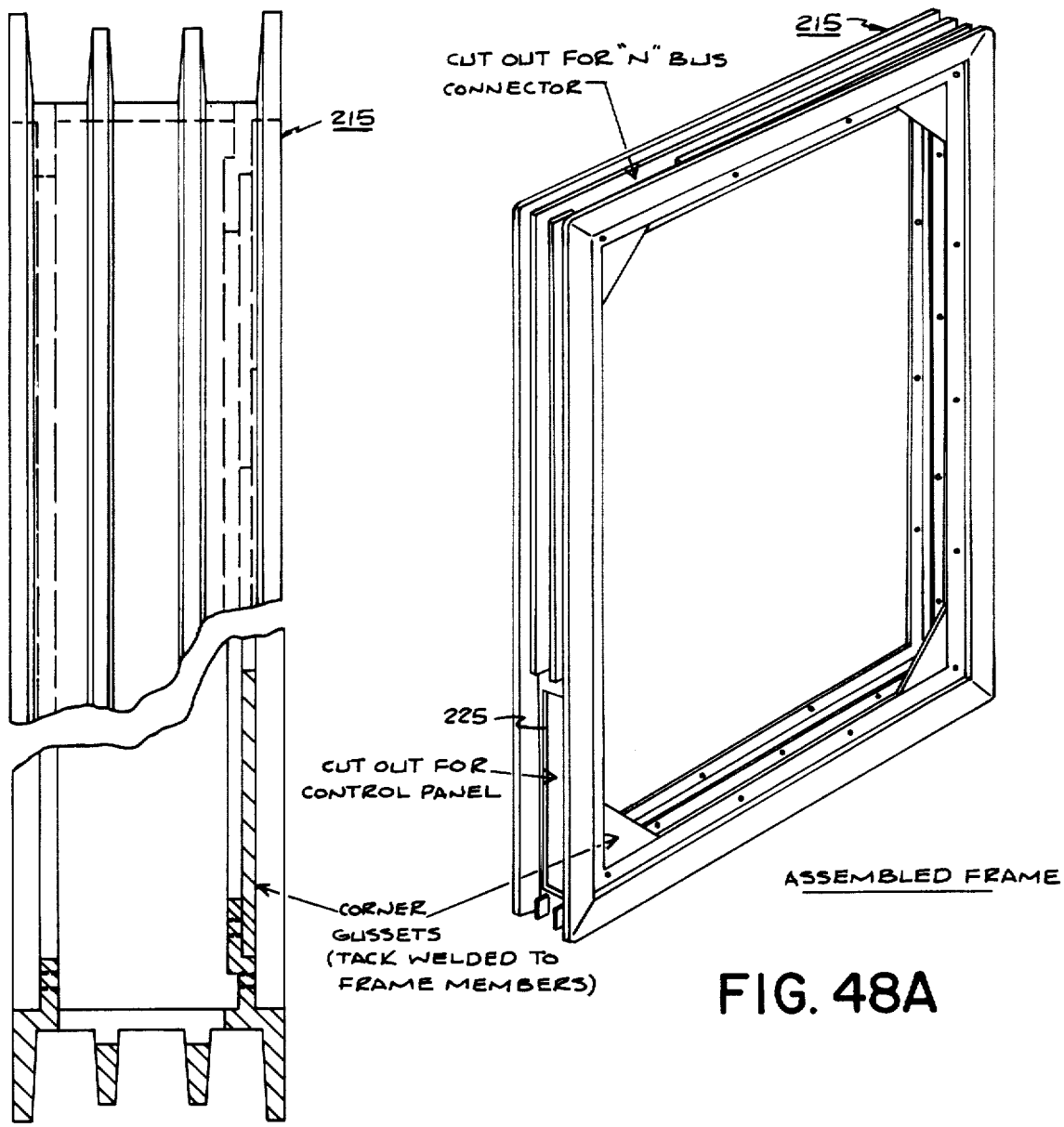
Figure 49:
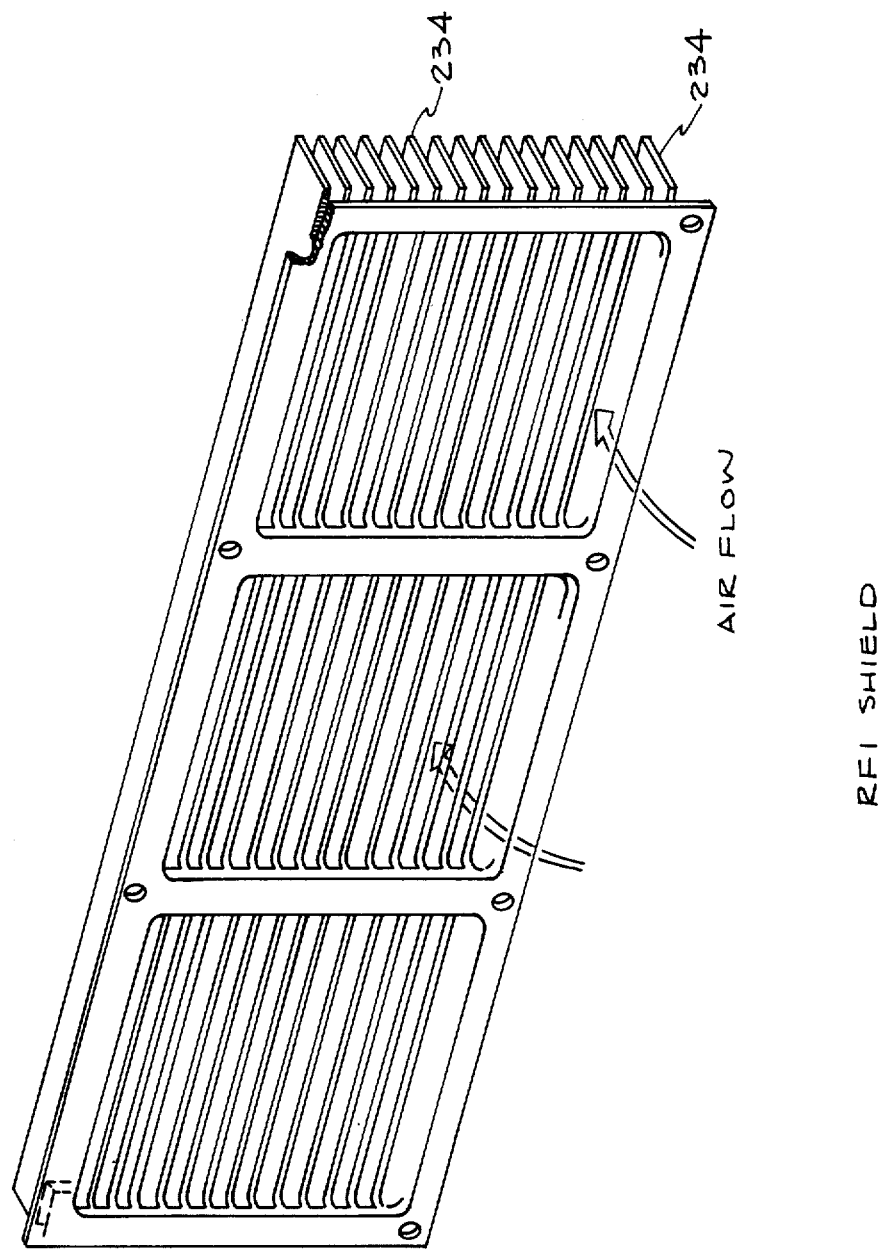
Figure 50:
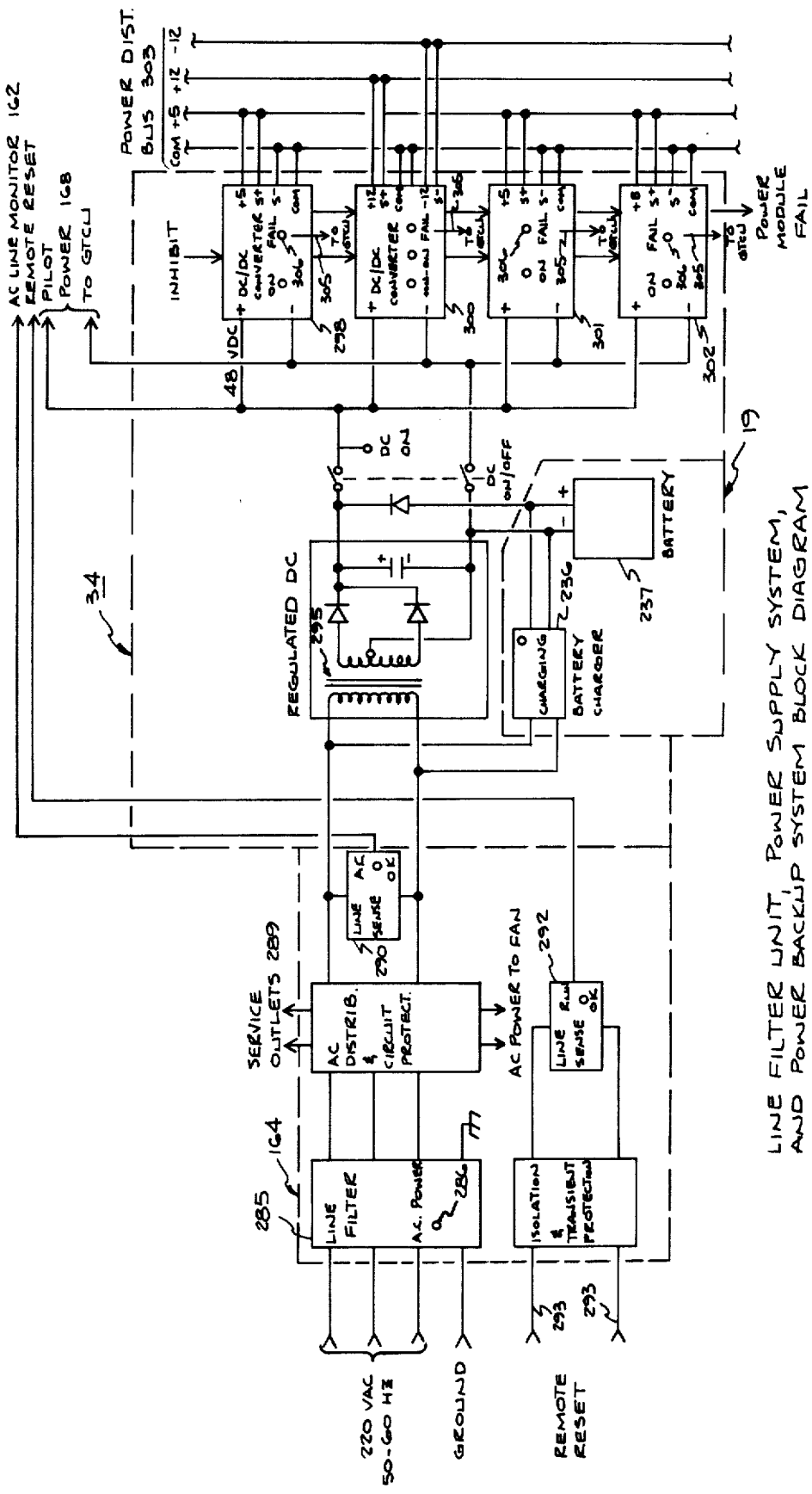
Figure 51:
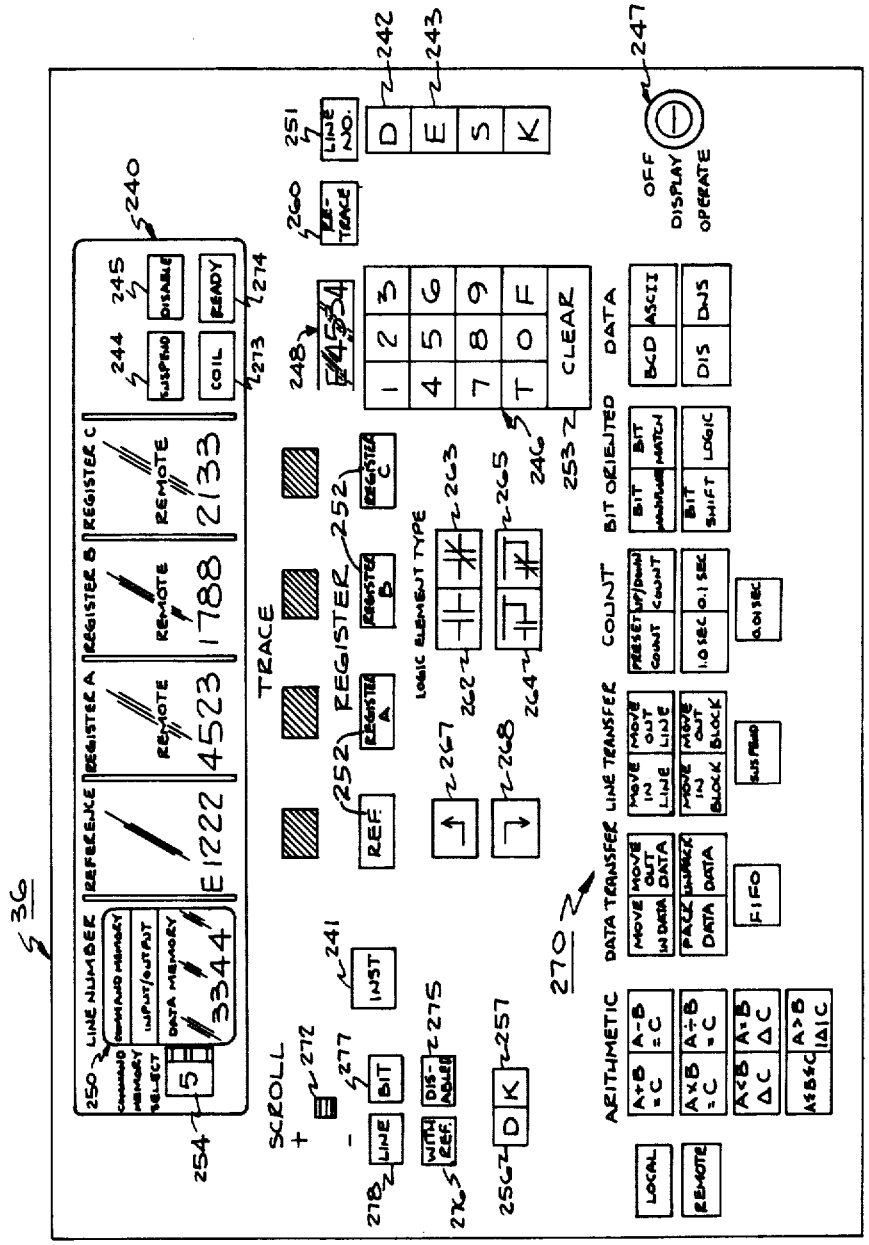
Figure 52:
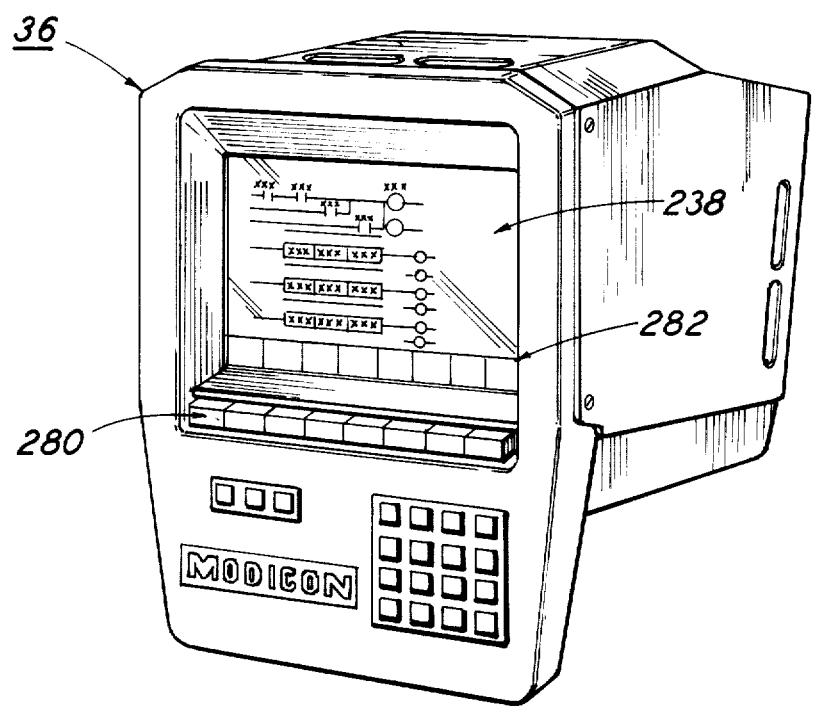

FIG. 16, comprising FIGS. 16A through 16SSF are a series of diagrammatic representations of the complete instruction set of statement lines solvable by the parallel process controller of FIG. 1, as well as conversion from datum lines of one data format to a datum line of another data format or from a statement line to a datum line;

FIG. 17 is a timing chart illustrating the calculation timing for execution of arithmetic statements by the command memory modules of the parallel process controller of FIG. 1;

FIG. 18 is a timing diagram for conducting multisweep execution of multiply and divide statements by the command memory modules of the parallel process controller of FIG. 1;

FIG. 19 is a timing diagram of the execution by the command memory modules of compare, match and test instructions;

FIG. 20 is a timing diagram for execution of count statements by the command memory modules;

FIG. 21 is an overall flow diagram utilized by the command memory modules of the parallel process controller of FIG. 1;

FIG. 22 is an overall block diagram of the processor used in the command memory modules of the parallel process controller of FIG. 1;

FIG. 23 is an overall block diagram of a typical data memory module utilized by the parallel process controller of FIG. 1;

FIG. 24 is a detailed block diagram of a typical data memory module of the parallel process controller of FIG. 1;

FIG. 25 is a detailed timing chart illustrating the execution of functions of a typical data memory module of the parallel process controller of FIG. 1;

FIG. 26 is a block diagram of a section of I/O memory of a particular I/O channel as well as the local modem accompanying this I/O channel of the parallel process controller of FIG. 1;

FIG. 27 is an overall block diagram of the I/O system of the parallel process controller of FIG. 1;

FIG. 28 is a schematic representation of the module assignments for the complete I/O system of the parallel process controller of FIG. 1;

FIG. 29 is a schematic representation of the line addresses utilized by the I/O system of the parallel process controller of FIG. 1;

FIG. 30 is a timing chart illustrating the data rates and minimum bandwidths required by an I/O channel of the I/O system;

FIG. 31 is a timing diagram illustrating the various timing states for the transmittal and receipt of information via the I/O system of the parallel process controller of FIG. 1;

FIG. 32 is a timing chart illustrating the "header" transferrals utilized by the I/O system of the parallel process controller of FIG. 1;

FIG. 33 is an overall block diagram of a typical I/O channel of the I/O system;

FIG. 34 is a schematic representation of the I/O status word coding utilized by the I/O system of the parallel process controller of FIG. 1;

FIG. 35 is a diagrammatic representation of the utilization of the parallel process controller of FIG. 1 with interconnected external programmable controllers so as to form a hierarchical parallel process controller for complex processes;

FIG. 36 is an overall block diagram of the general timing and control unit of the parallel process controller of FIG. 1;

FIG. 37 is a diagrammatic representation of the power and bus interconnection of the parallel process controller of FIG. 1;

FIG. 38 is a detailed block diagram of the general timing and control unit of the parallel process controller of FIG. 1;

FIG. 39 is a schematic representation of the system status word coding utilized by the general timing and control unit of the parallel process controller of FIG. 1;

FIG. 40 is an overall block diagram and timing chart analysis of the N-bus utilized in the parallel process controller of FIG. 1;

FIG. 41A is a block diagram of the command memory module bus logic utilized by the parallel process controller of FIG. 1;

FIG. 41B is a timing chart of the command memory bus logic illustrated in FIG. 41A;

FIG. 42A is an overall block diagram of the data memory bus logic utilized by the parallel process controller of FIG. 1;

FIG. 42B is a timing chart of the data memory bus logic illustrated in FIG. 42A;

FIG. 43A is a schematic representation of the N-bus of the parallel process controller of FIG. 1;

FIG. 43B is a timing analysis for the skew rate of the N-bus illustrated in FIG. 43A;

FIG. 44 is a timing chart representing the transferral of information on the N-bus of FIG. 43A;

FIG. 45 is a partially cutaway perspective view of the parallel process controller of FIG. 1 illustrating the insertion of module frames into the main assembly enclosure of the parallel process controller;

FIG. 46 is a partially cutaway side elevational view of the main assembly enclosure illustrated in FIG. 2 of the parallel process controller of FIG. 1;

FIG. 47A is a perspective view of a typical card frame for enclosing a printed circuit card on which one of the modules of the parallel process controller of FIG. 1 is enclosed;

FIG. 47B is a partially cutaway side elevational view of the frame illustrated in FIG. 47A;

FIG. 48A is a perspective view of the frame illustrated in FIG. 47A without the insertion of the printed circuit card illustrated in FIG. 47A;

FIG. 48B is a partially cutaway side elevational view of the frame illustrated in FIG. 48A;

FIG. 48C is a top plan view of the frame illustrated in FIGS. 48A and 48B;

FIG. 49 is a perspective view of the radio frequency interference shield utilized in the main assembly enclosure illustrated in FIGS. 2 and 46;

FIG. 50 is a block diagram of the input filter unit and power supply system utilized by the parallel process controller of FIG. 1;

FIG. 51 is a top plan view of one version of the programming panel utilized by the parallel process controller of FIG. 1;

FIG. 52 is a perspective view of a cathode ray tube embodiment of the programming panel utilized by the parallel process controller of FIG. 1.

Figure 53:
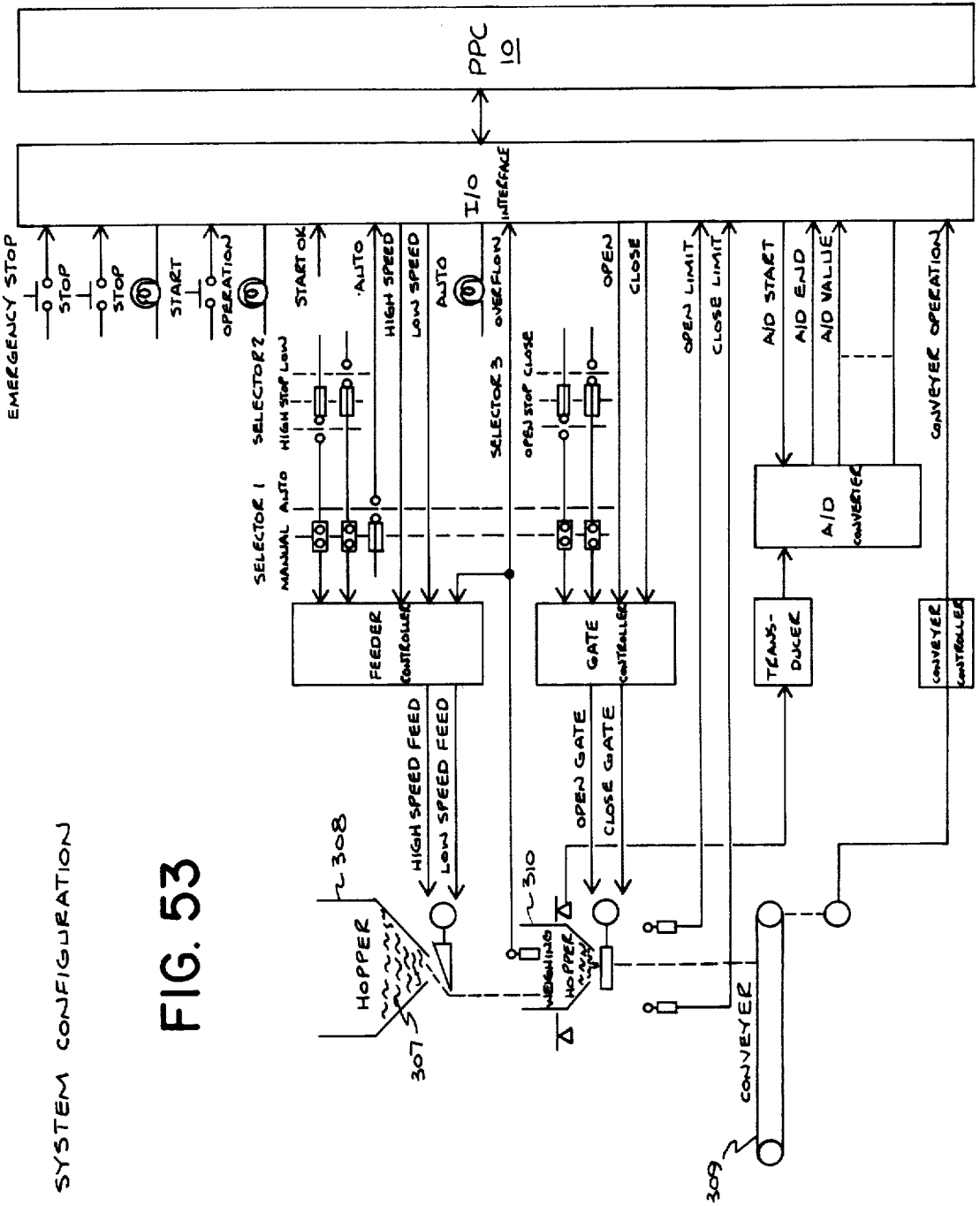
Figure 54A:
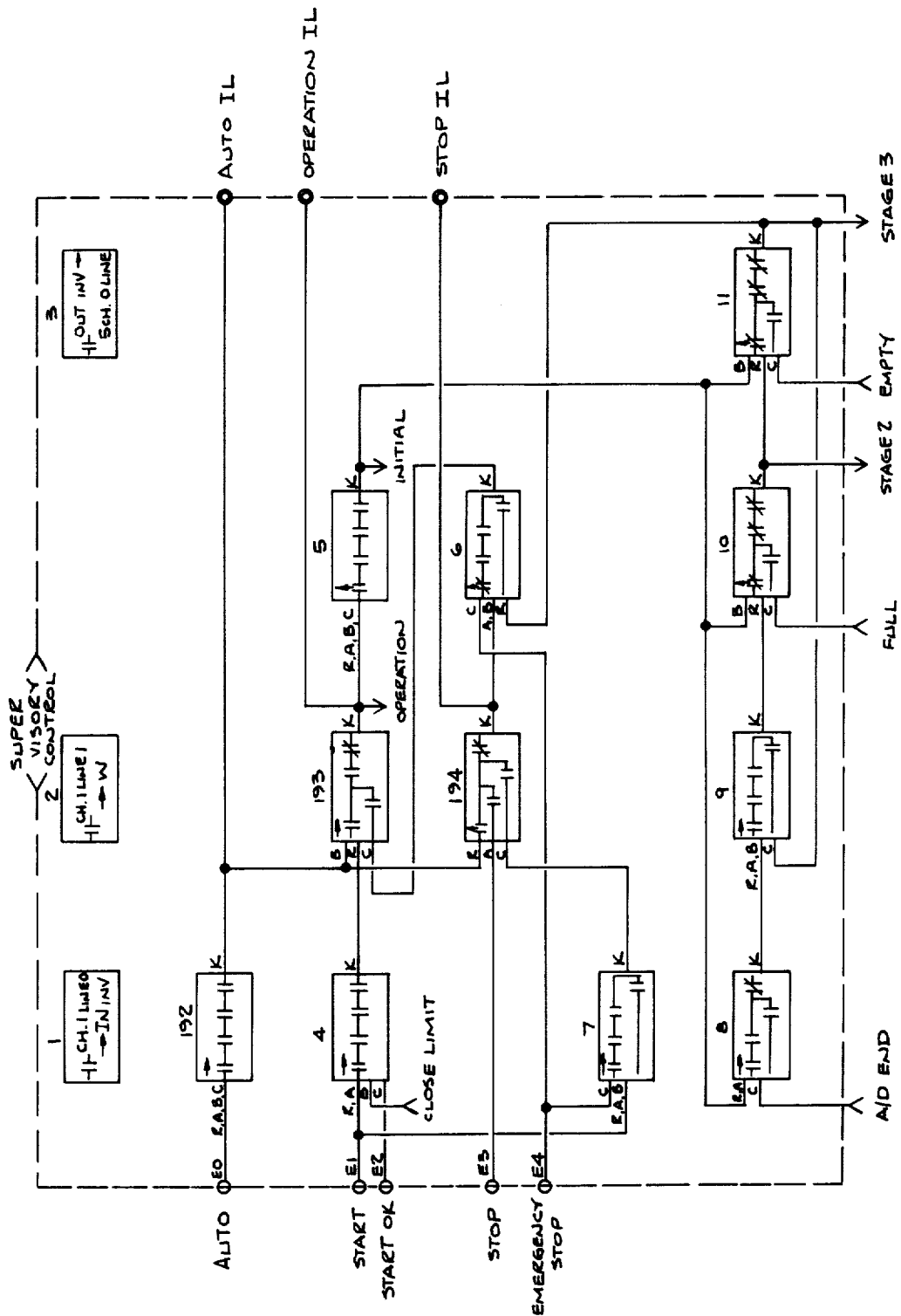
Figure 54B:
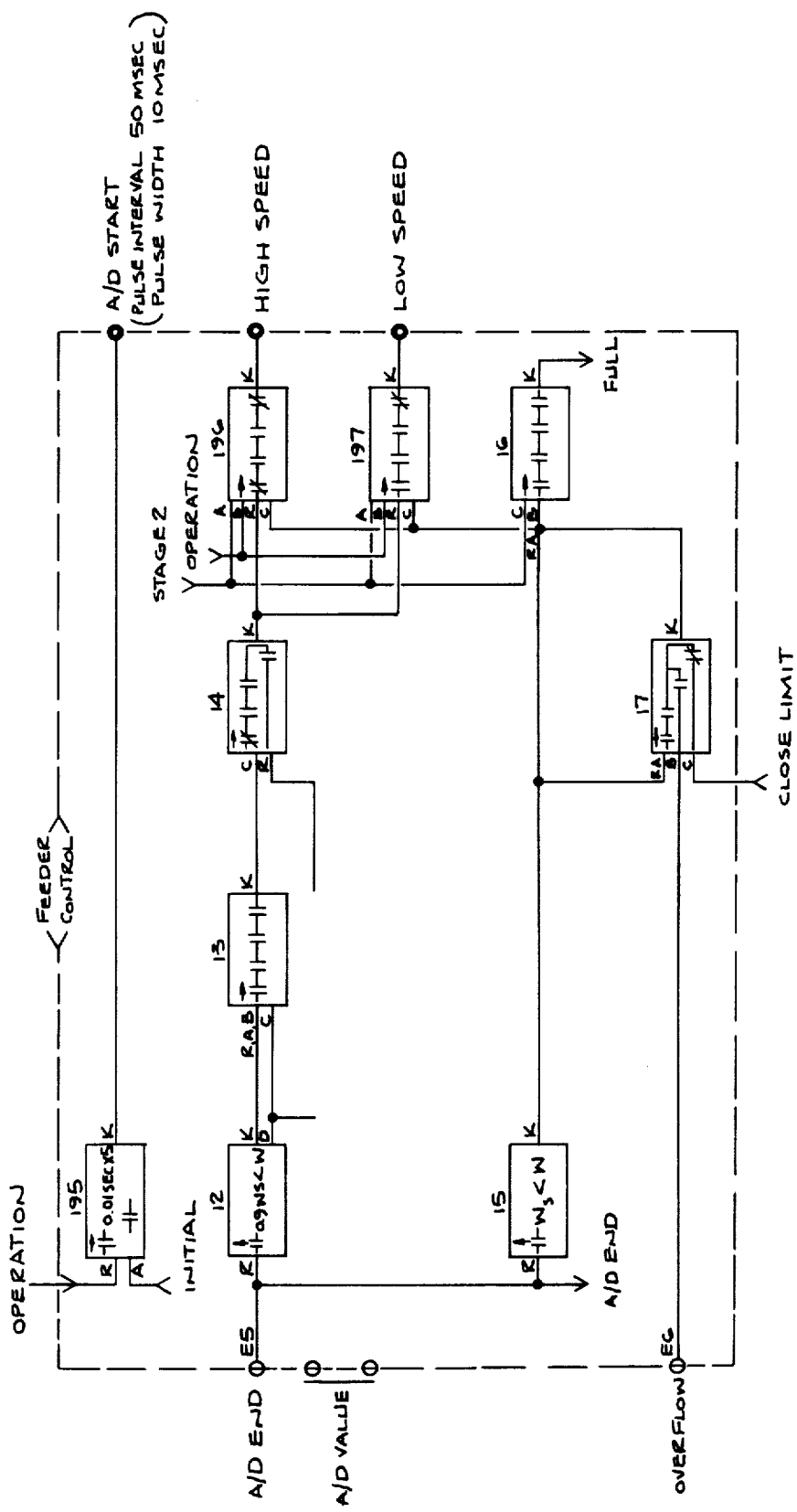
Figure 54C:
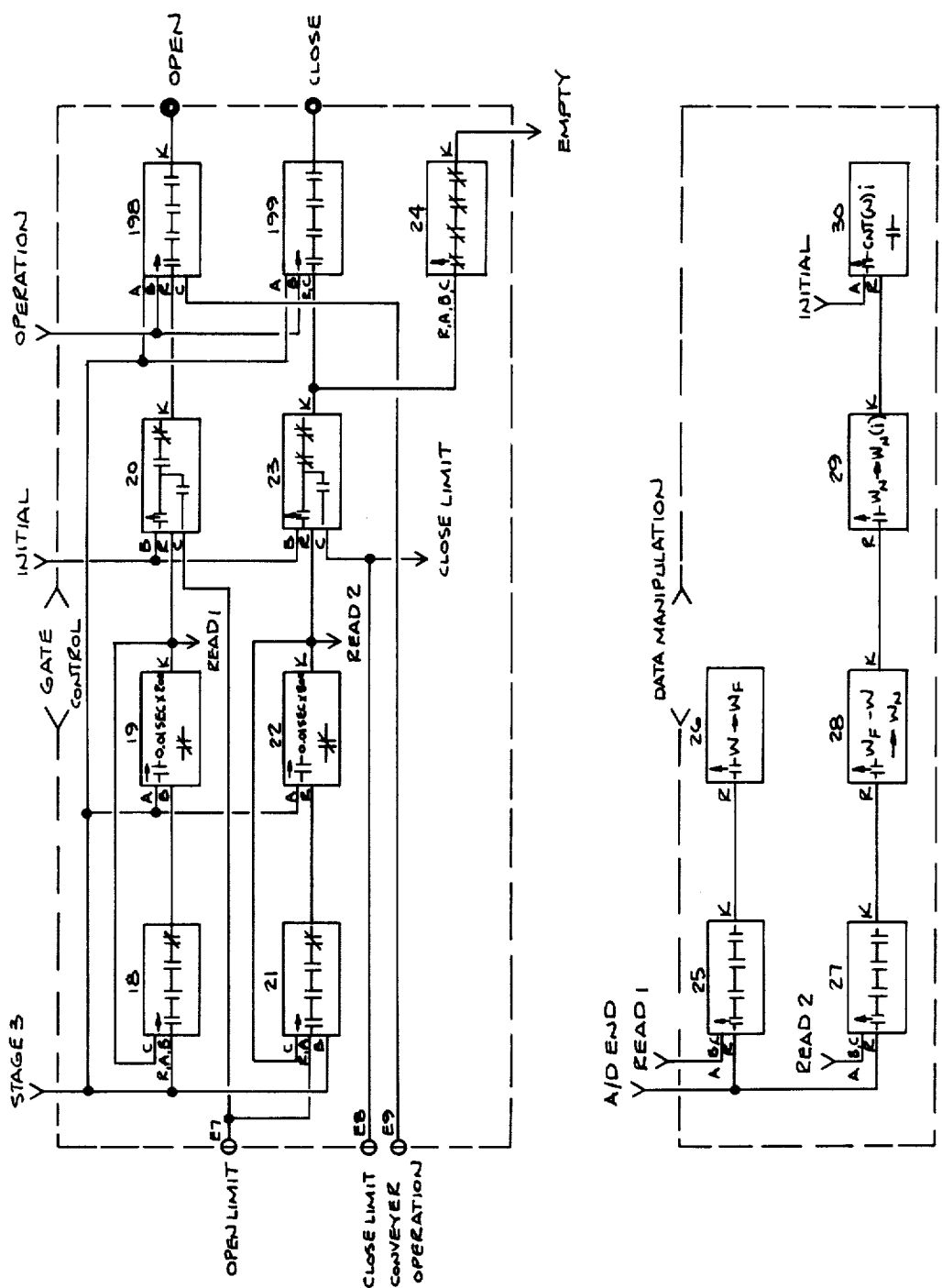
Figure 56D:
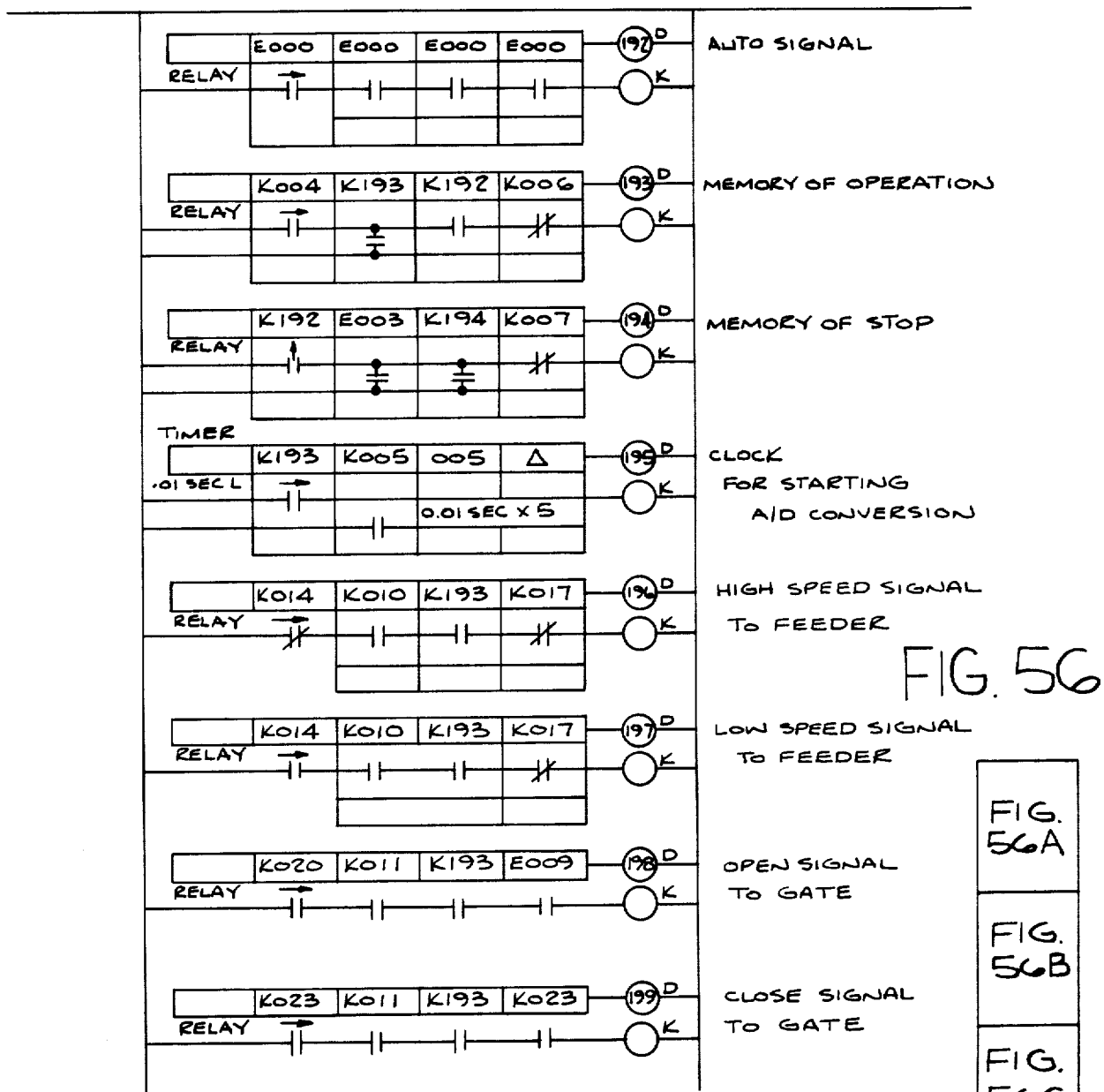
Figure 56A:
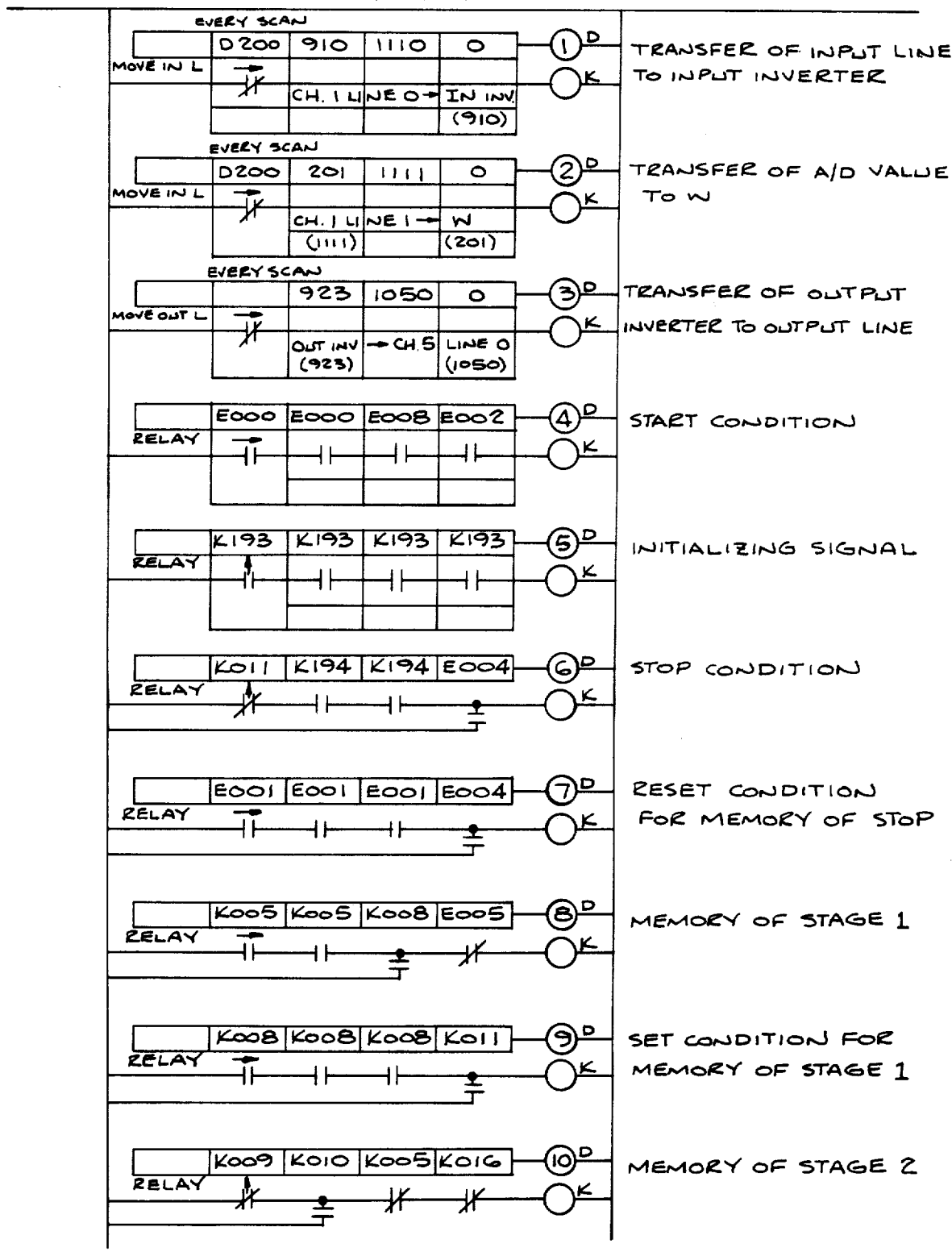
Figure 56B:
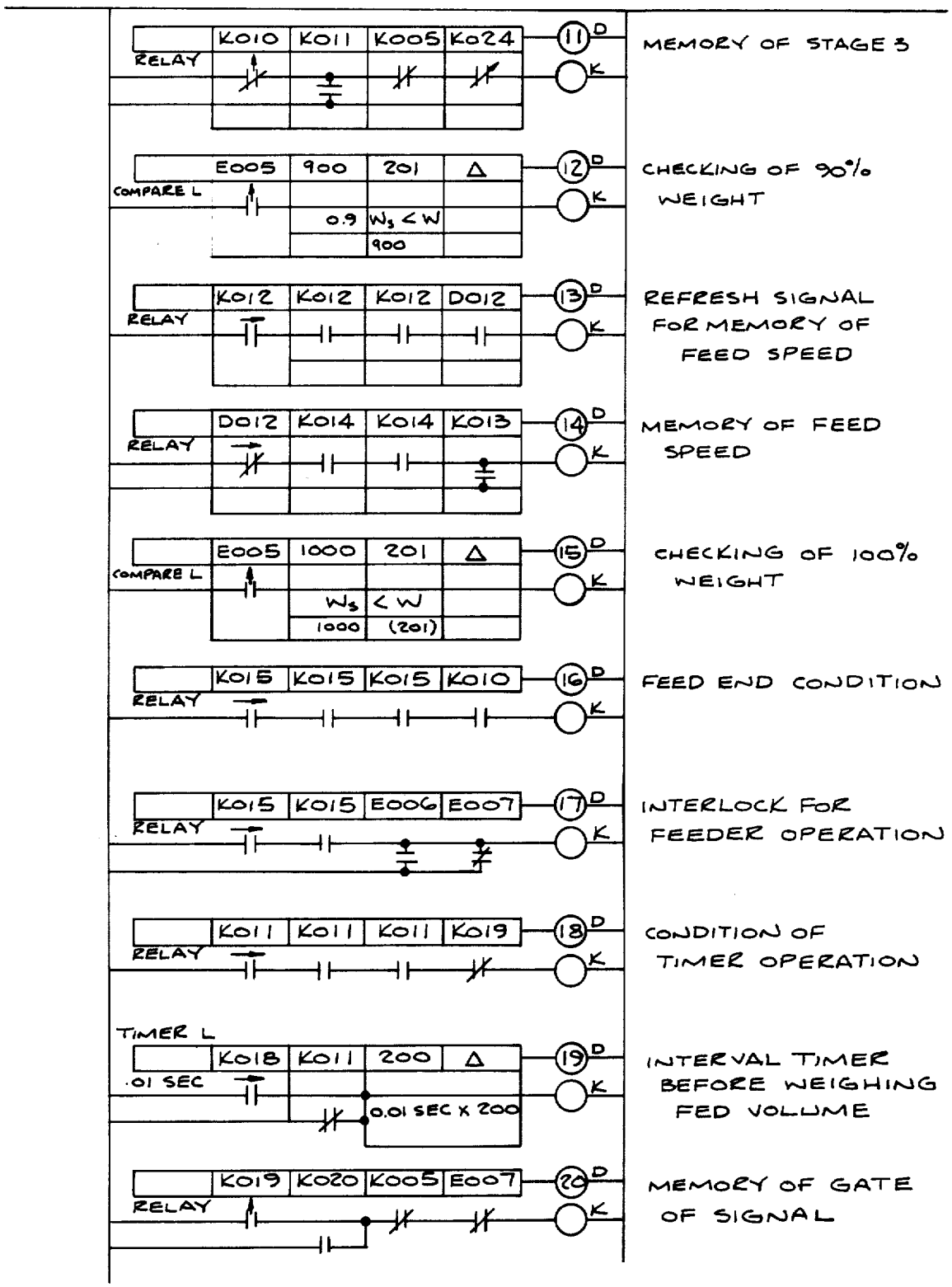
Figure 56C:
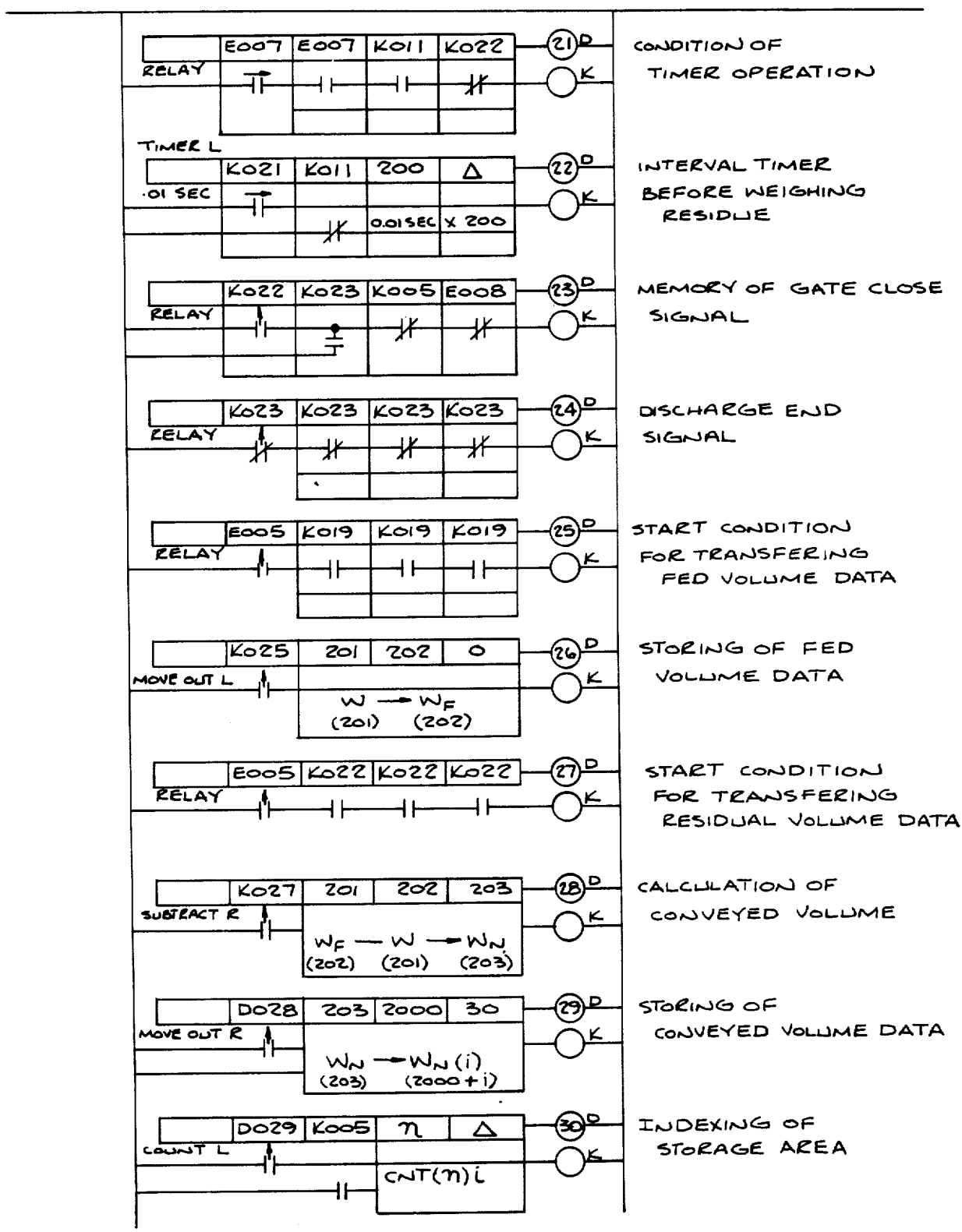

FIG. 53 is a diagrammatic representation of the system configuration describing a typical process to be controlled;

FIGS. 54A-54C are diagrammatic representations of a ladder block diagram for the process illustrated in FIG. 53;

FIG. 55 is a diagram showing and explaining the notations used in FIGS. 54A-54C;

FIGS. 56A-56D is a diagrammatic representation of a ladder program listing based on the ladder block diagrams of FIGS. 54A-54C; and FIG. 56 is a diagram showing how FIGS. 56A-56D are put together.

GLOSSARY NOTE

A glossary of frequently used terms in the description of the present invention is enclosed and labeled Table 14.

DETAILED DESCRIPTION

As best seen in FIGS. 1 and 2, a parallel process controller (also designated PPC or machine) 10 performs as a soft-wired control system for industrial applications. The physical hardware it replaces is inherently continuous and parallel, a network of discrete acquisition, processing, and control elements. In the past, minicomputers have been used to replace such control systems with varying degrees of success. Since a computer is a sequential processing device, executing one instruction at a time, implementation of a control system requires careful consideration of performance under all system conditions. For example, sampling rates may vary with processing load, causing "crosstalk" between seemingly independent parts of a system. Multilevel interrupt systems and supervisory executive routines are often used to solve such problems. In general, however, minicomputer systems tend to be tailored to each process through a massive programming effort by programming specialists and to contain time and memory-consuming overhead to "match" the sequential machine to the parallel process.

The present parallel process controller avoids these problems by strict, hardware-controlled "parallel processing." The PPC has no "instructions" in the minicomputer sense. Instead, it is programmed by "Lines", each of which is a stand-alone processing or storage element. Interrelation of these lines is controlled by referencing, corresponding to wiring or interconnection of the elements. The reader familiar with programmable logic controllers may note that this programming technique has been successfully used in programmable controllers, such as the Models 084, 184 and 284 of the Modicon Corporation, Andover, Mass.

A processing line, called a statement may be a four-term Boolean or relay ladder line as in a programmable logic controller, or it may perform an arithmetic or other calculation when activated by a discrete reference condition (called a "coil"). Each statement has at least one condition reference input and one coil output. Other features, which permit flexible system programming are detailed infra, as are the various types of statements. A storage line, called a Datum, may also be programmed. This is simply a place in which to store data associated with the process. A command memory 12 is the device which stores and executes user lines. Lines contained in a command memory are continuously active with respect to their control relationships. A network of up to 200 active lines may exist within a single command memory module. The control relationships of the command memory lines are emulated, and all processing takes place at the invariant rate of 100 times per second. Internally, the command memory processes lines in numerical order, so that multi-step processes may be performed in a single 10 millisecond scan in most instances. Parallel processing capability may be expanded by connecting several command memories to a PPC system.

A general timing and control unit (GTCU) 14 generates all signals necessary for the sharing of an N-bus 16 by command memories as well as system synchronization and refreshing of semiconductor data memories. It also provides power regulation and control signals to a power supply system 34.

The PPC system comprises one or more command memories as processing elements. All control systems, however, require input/output capability. In addition, provision must be made for data and program storage capability, and for intercommunication among command memories. The N-bus 16 provides an electrical pathway over which command memory statements can have access to common input, output, and data storage units.

Optional data memory modules 18 for storing up to 4000 lines each are available in the parallel process controller. Statements contained in data memories are not active but may be moved into command memories under program control as required. Stored data may also be manipulated by the command memories and storage locations can be used as a means of communication between individual command memories as well as for bulk data storage. All data memories are accessible to all command memories via the N-bus.

Figure 3:
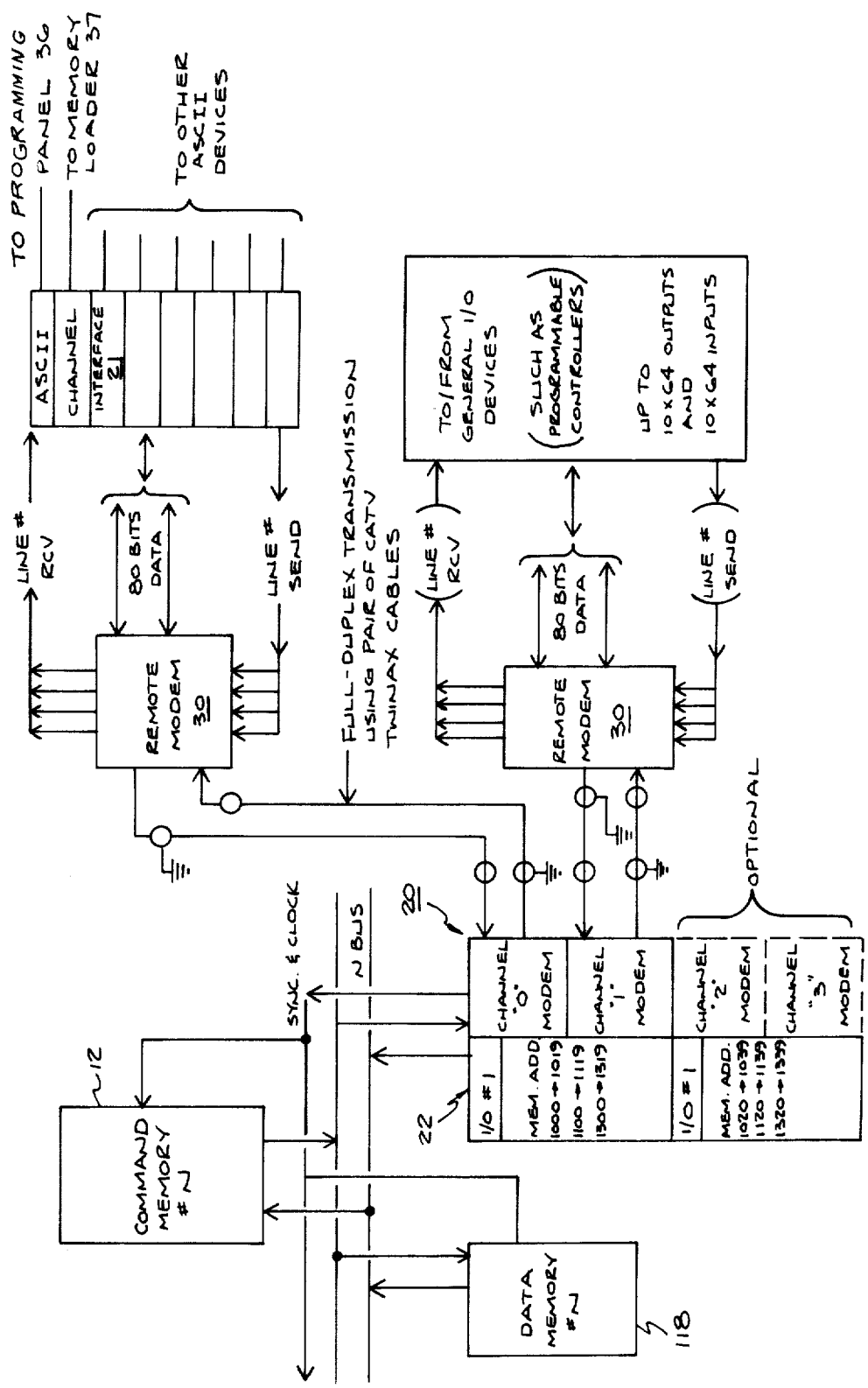
FIG. 3 is an overall block diagram of the input/output system and the interconnection of this system to the command memory modules and data memory modules of the parallel process controller of FIG. 1, and to interconnected external devices.

Command memory access to the outside world is provided via the input/output (I/O) system 20. All command memories can access I/O locations via the N-bus. The I/O unit appears as a set of data lines containing a one-for-one mapping of outside world information. Multiplexing/demultiplexing hardware transfers information between these lines and up to 10 remote locations at the rate of 125 times a second. Both refreshing and error-correction are automatic and continuous and do not require program intervention. As best seen in FIG. 3, and I/O memory 22 has output addresses that are read/write and can thus be used as "data memory" addresses for scratchpad and for inter-command memory buffering purposes.

As best seen in FIG. 1, the command memory modules 12 are interconnected via the N-bus 16. Up to ten command memories are time division-multiplexed on the N-bus so that each, in turn, has control of the bus. Up to two 40-line and one 20-line I/O memories and up to two 4000-line data memories service the bus at all times since one and only one location in all of these memories may be accessed at any instant. Command and data memory numbers are selected by a thumbwheel switch 24 on each module. The input/output system is expandable from a basic I/O memory unit with two channels 26 and 27 optionally expandable to four channels 26, 27, 28 and 29. Up to two additional I/O memory units 23 and 25 each carrying either two or four channels may be added, up to a maximum of ten channels (Channels 4-9). Each I/O channel communicates with a remote modem 30 located up to three thousand feet from the PPC and connected via CATV cable. Up to ten 64-bit lines of input and ten 64-bit lines of output may be further demultiplexed at the remote location. In some equipment, these lines are grouped into ten I/O "ports" 32, each consisting of one input and one output location. Discrete digital, alphanumeric, and programming devices are connected at these points. Direct programming and memory loading devices are restricted to I/O Channel 0, ports 0 and 1. Indirect loading may be implemented via user commands or other lines.

As best seen in FIGS. 1 and 2, an expandable power supply system 34 powers the PPC system and provides, with associated filter circuitry 164, isolation from power line transients. A battery power backup system 19, couples with the power supply system to provide data and system protection in the event of power loss.

The parallel process controller is programmed as a collection of statements (and datums) entered by a programming panel 36 or other loading device. The following procedure is employed:

A. Describe the process. This can be in any descriptive format familiar to the user, but should indicate signal flow from input to output. Electrical elementary diagram format is also useful.

B. Assign outputs. This fixes output statement line numbers where discrete outputs are required.

C. Assign inputs and data storage locations.

D. Create the program using the PPC set of 41 statement types (discussed infra). This should closely follow the original descriptive diagrams.

E. Debug. Individual conditions can be exercised using the programming panel disable feature (described infra) so that portions of the system can be disconnected and debugged individually.

The above procedure is followed for each command memory program. The following items are typically considered:

1. Command memory programs do not inherently interact. One may not reference another directly.
2. Lines are solved in numerical sequence.
3. Command memories operate in synchronism on a line-by-line basis.
4. Only lines 0-199 of each CM (discussed infra) are executed although other lines may contain statements. (The scratchpad area and transformer area (infra) each contain 40 lines.)
5. Data written into data memory by one command memory "move out" statement (discussed infra) may be immediately read by another command memory of higher number on the same time or by any CM on the second subsequent line.
6. The number of lines effectively "swept" by a command memory may be increased by application of block and line move in and move out statements (discussed infra), with attendant reduction of sweep speed.

Figure 4:
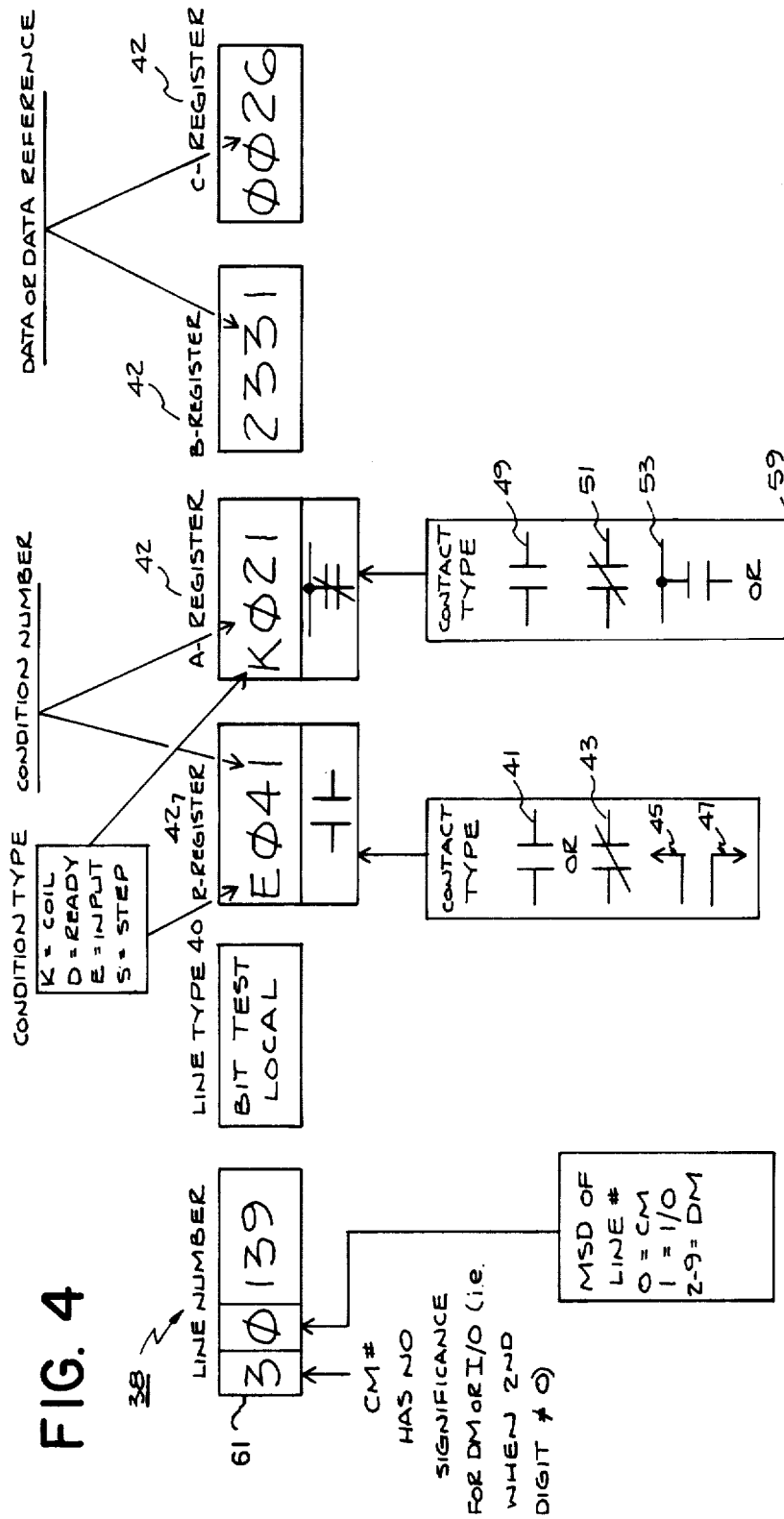
FIG. 4 is a schematic representation of a programmed line utilized in the parallel process controller of FIG. 1, illustrating the five registers comprising a line as well as the information represented by each of these registers.

An example of an instruction line 38 is given in FIG. 4. This illustrates some of the information contained in a typical line. Further details are found infra relating to the command memory. The following features should be noted:

(a) Line number region 61 specifies the location of the line in one of ten CM's, in DM or in I/O.
(b) Line type register (instruction or I register) 40 specifies characteristics of the line.
(c) Registers 42 contain data and/or references associated with the line.

Command Memory

Function

Figure 5:
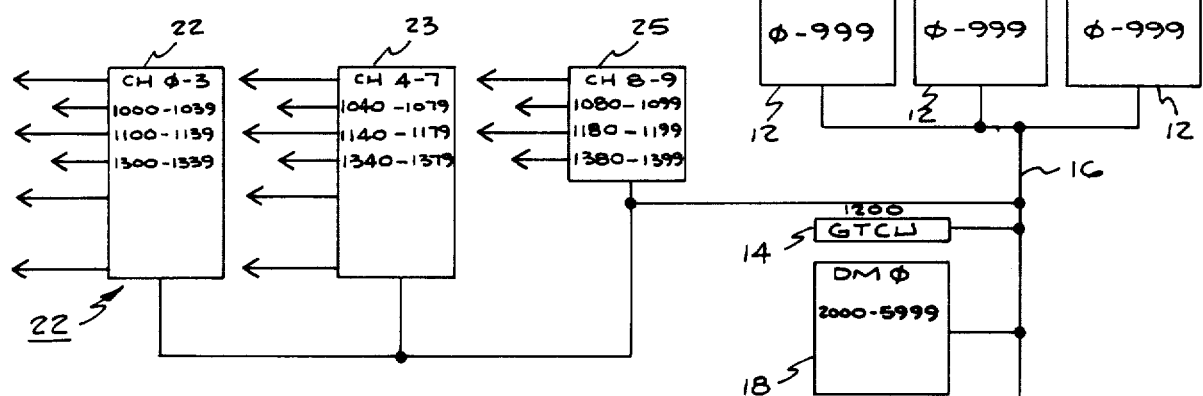
FIG. 5 is an overall block diagram of the interconnections between the command memory modules, data memory modules, input/output channels, and the general timing and control unit of the parallel process controller of FIG. 1.

As best seen in FIGS. 1 and 5, the command memory (CM) is the basic functional unit of the parallel process controller. Its purpose is to memorize user statements and datums descriptive of the process to be controlled and to continuously process these lines to produce the desired control relationships. The command memory is one of up to ten identical parallel central processing units in the PPC system. The command memory can contain a maximum of 200 active user lines, each of which may function as a statement (processing element) or may contain data. In addition, a user scratchpad area is available which generally is used to contain data. Auxiliary features are provided within each command memory to facilitate logical bit manipulation and discrete input/output.

A command memory contains all storage and functional elements required to process user statements. Access to input/output circuitry and data storage (data memory modules 18) is facilitated by connection to the N-bus 16. Timing and synchronization signals from the GTCU 14 via the N-bus maintain line-by-line lock-step synchronism between all command memories with the PPC system. Each time all 200 active lines are processed is defined as one "scan". Externally supplied power is required to support the command memories.

Basic Architecture

Figure 6:
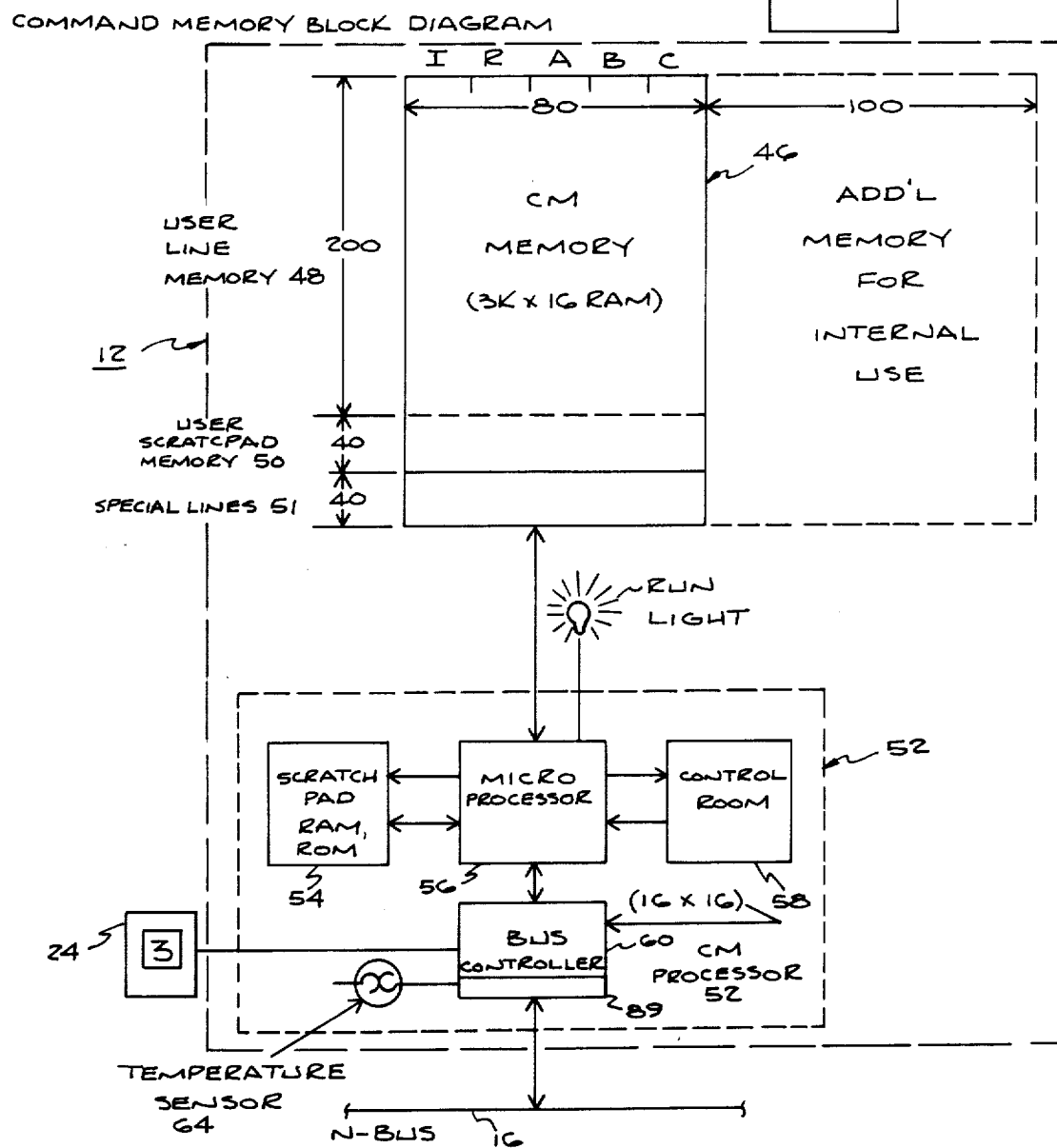
FIG. 6 is an overall block diagram of a command memory module of the parallel process controller of FIG. 1.

FIG. 6 illustrates the basic elements of the command memory.

CM Memory

A large semiconductor memory 46 contains 200 user lines 48, up to 40 scratchpad lines 50, and up to 40 special lines 51 (discussed infra). This memory includes additional storage capacity for partially processed results of lines requiring multiscan processing operation and for special "transformer" lines.

Processor

A second major element of the command memory is the processor 52. This processing element consists of an array of storage registers 54, arithmetic and logical elements 56, and a control read-only-memory (ROM) 58 which directs register transfer paths and sequential state progression. In general, such an array can be considered as an instruction sequence required to interpret and process statements and data in the main memory.

Bus Interface

For access to externally located data and input/output the microprocessor 56 is provided with an interface 60 to the N-bus 16. Because of bus timing constraints, the bus controller 60 is somewhat independent of the microprocessor during a bus data exchange.

For each of the 200 user lines 48 being processed, several references to internal memory 50, a single read access from the N-bus, and a single write access to the N-bus may be made within each 40 microsecond bus multiplexing period.

"Run" Light

An internal self-test function is implemented in the command memory processor 52 to provide maintenance and protective information. Successful completion of a routine designed to exercise a maximum number of circuit elements and data paths causes recycling of a "watchdog timer" circuit within micro-processor 56. Failure to retrigger the device within a 20 millisecond period causes shutdown of the bus interface communication and of the "RUN" indicator 62.

Over-Temperature Sensor

An over-temperature sensor 64 monitors ambient temperature in the command memory module. An over-temperature condition is signalled to the N-bus 16 for maintenance purposes, but does not affect operation of the processor or memory. Over-temperature conditions can be logically sensed by user programs as part of system status information (line address 1200 of the PPC—general timing and control unit 14) should programmed response to this condition be required.

Instructions

The following section sets forth the addressing rules and instruction set of the parallel process controller 10, and presents in detail the internal data formats and the behavior of each line for both application and micropogram design.

Addressing; General

As best seen in the system memory diagram of FIG. 5 illustrating the relationship of address space within the PPC 10, the command memories are time-multiplexed on the N-bus 16 so that each, in turn, has access to the address field consisting of the I/O system 22 and data memories 18. A command memory may reference its internally stored data and conditions freely but may only make limited references to I/O 22 and data memory locations within data memories 18.

Internal Lines

Figure 7:
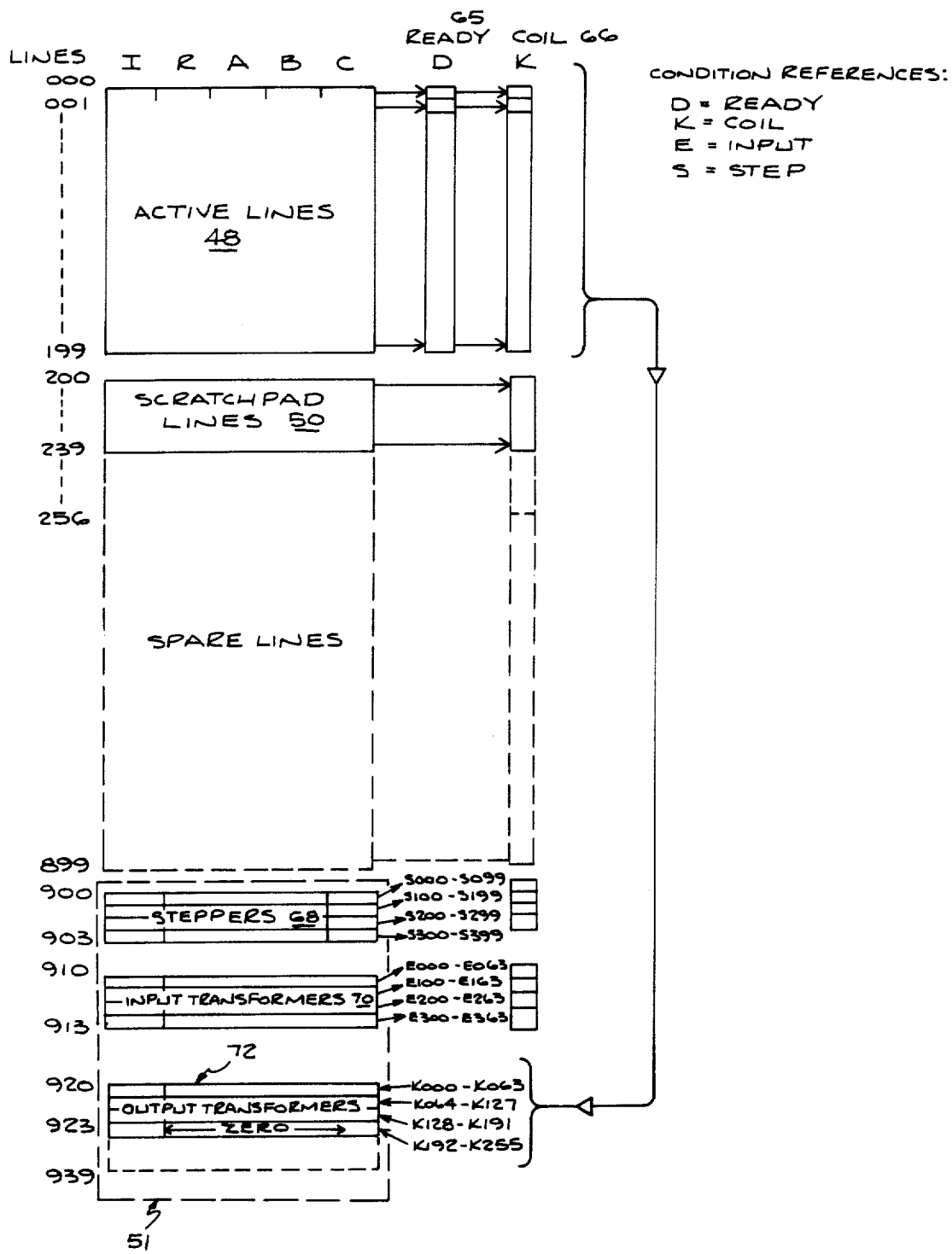
FIG. 7 is a schematic representation of the line memory addresses utilized in a command memory module of the parallel process controller of FIG. 1.

Internal locations addressable by a command memory are illustrated in FIG. 7. Line storage locations are divided into three types: first, 200 active lines 48 for scanning and processing by the command memory processor 52; (see FIG. 6); second, 40 scratchpad lines 50 available for storage; and third, 40 special lines 51 (of which 12 are used) for performing translation between data and conditions. These lines augment bit manipulation capability, discussed infra.

Conditions

Statements within the active line area 48 are activated and controlled by condition references.

Ready (D)

Each line within the active area produces a "Ready" or a D-condition 65 which signifies that the operation specified by an active statement is "ready"; i.e., that the statement has completed the most recently initiated action. This condition is true for one scan each time the action is completed.

Coil or Koil (K)

A set of "coils" or K-condition references 66 are provided. These conditions represent the logical result or status of any line within the command memory.

Stepper (S)

As best seen in FIGS. 7 and 11, four "steppers" 68 are provided in each command memory. Each stepper is a special line location and generates 100 "sequence" conditions. A stepper is generally used to activate functions in a sequential fashion. A stepper is roughly equivalent to a rotary switch; i.e., one and only one condition out of each set of 100 conditions may be true at any one time. Table 1 explains the addressing scheme of the steppers.

Input (E)

Each command memory is provided with four special line locations which function as input transformers 70. Each transformer produces a mapping of any line stored at that location such that each bit of the line is referencable as an E-condition. Each of the input transformer words thus produces a set of 64 E-condition references.

TABLE 1

Input Transformer (see FIGS. 7 and 12)
Bits 0–63 deposited into line 910 become "coils" E00–E63
Bits 0–63 deposited into line 911 become "coils" 064–127
Bits 0–63 deposited into line 912 become "coils" 128–191
Bits 0–63 deposited into line 913 become "coils" #192–E255
Output Transformer (see FIGS. 7 and 13)
K coils K000–K063 generated by line 0–63 are stored in line 920 bits 0–63
K coils K064–K127 generated by lines 64–127 are stored in line 921 bits 0–63
K coils K128–K191 generated by lines 128–191 are stored in line 922 bits 0–63
K coils K192–K199 generated by lines 192–199 are stored in line 923 bits 0–7
Bits 8–63 of line 923 are zero
Stepper (see FIGS. 7 and 11)
Numerical value 1–99 deposited into line 900 becomes one of coils S000–S099
Numerical value 0–99 deposited into line 901 becomes one of coils S100–S199
Numerical value 0–99 deposited into line 902 becomes one of coils S200–S299
Numerical value 0–99 deposited into line 903 becomes one of coils S300–S399

The input transformer may be thought of as a method of converting discrete input information into individually referencable "coils". Table 1 explains the addressing scheme of the E-conditions.

Output Transformers

Figure 13:
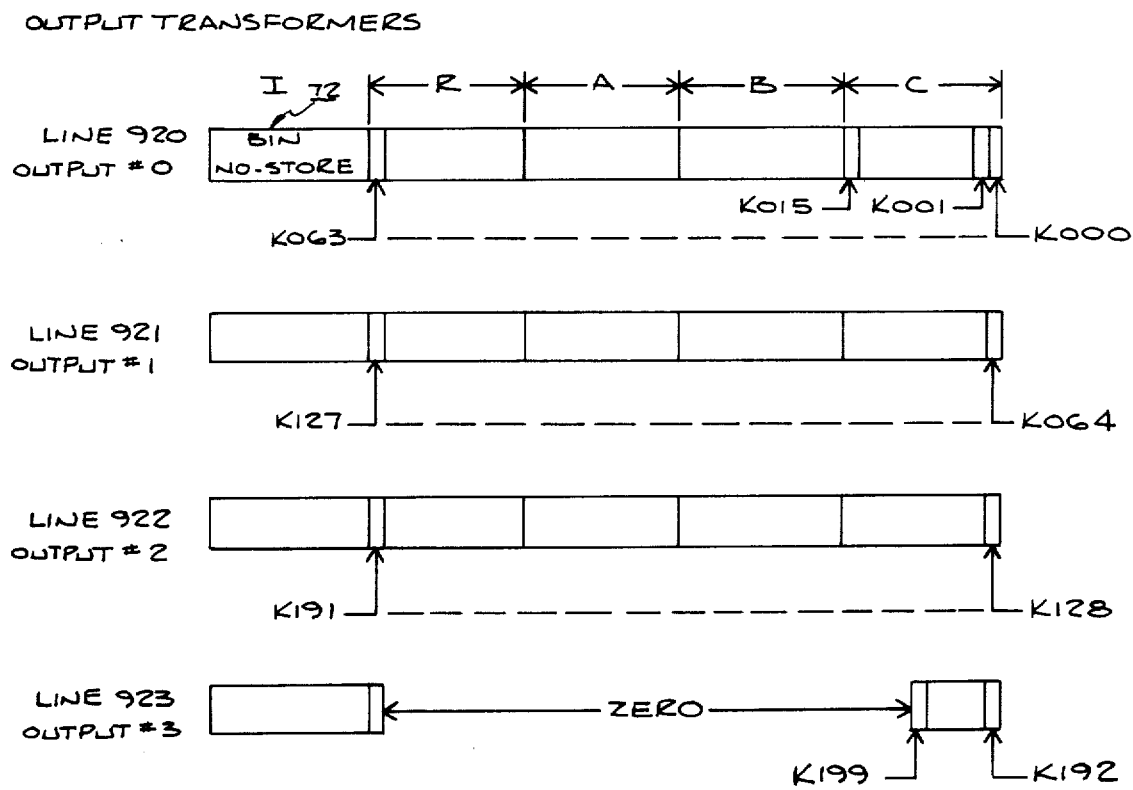
FIG. 13 is a schematic representation of "output transformer" lines utilized in command memory modules of the parallel process controller of FIG. 1.

As best seen in FIGS. 7 and 13, a set of output transformers 72 map the first 200K coils 66 into special line locations in a process which is essentially the inverse of the input transformer 70. Four such transformers are provided, each of which maps 64K-conditions in numerical sequence (up to 199). These transformers provide the fundamental method for communicating discrete information between a command memory and output points. The set of input and output transformers allows discrete bit exchange between command memories within the PPC system using intermediate locations within data memory modules. Table 1 explains the addressing scheme of the K-conditions.

I/O Addressing

Figure 8:
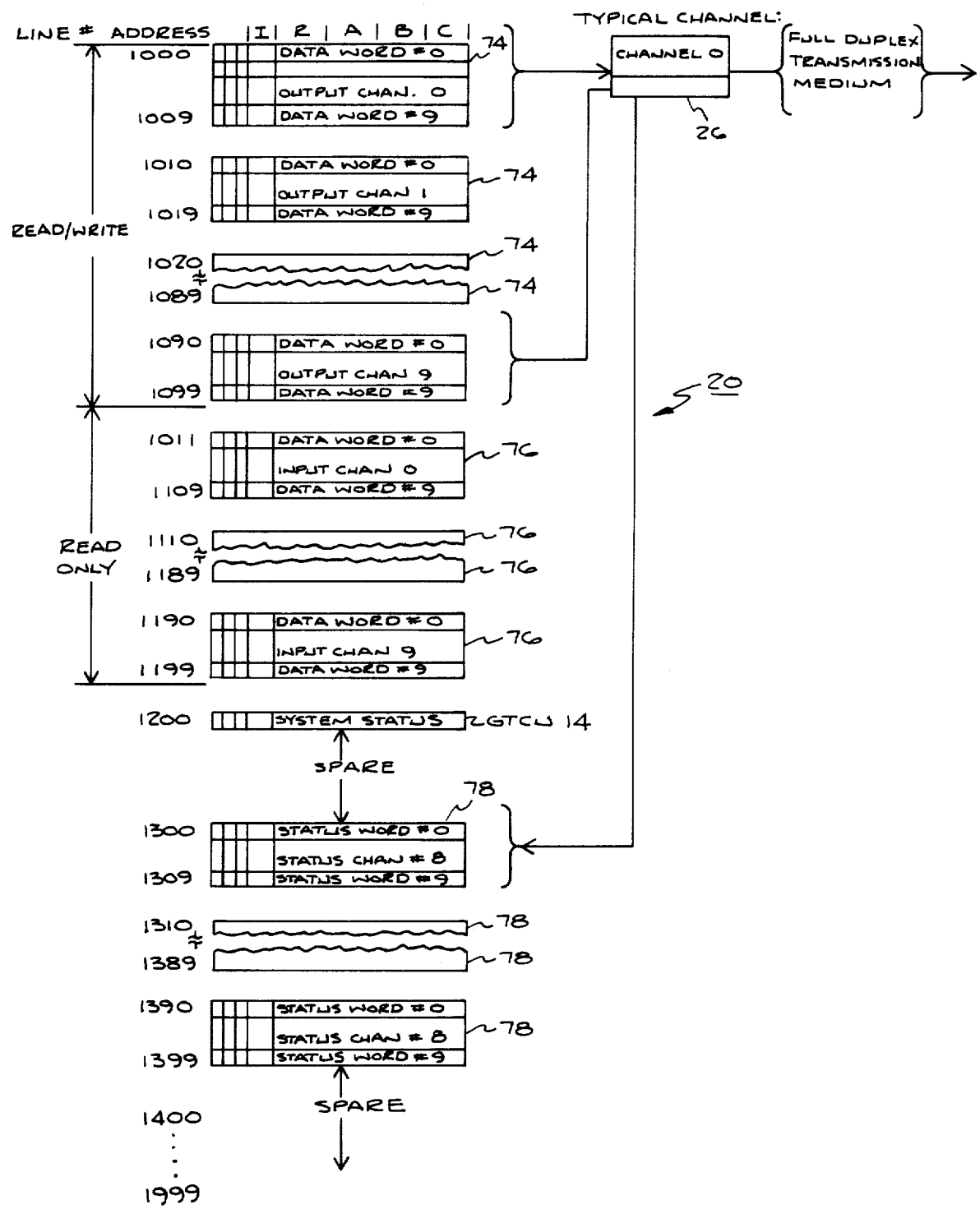
FIG. 8 is a schematic representation of the line addresses utilized in the I/O system of the parallel process controller of FIG. 1.

Input/output addresses of the I/O system 20 are illustrated in FIG. 8. All input/output locations are referenced by all command memories at PPC line addresses 1000 to 1999. There are ten I/O channels (see FIG. 5). Each channel output section 74 is referenced as 10 consecutive line locations in the address range 1000 through 1099 and each channel input section 76 is referenced as 10 line locations in the address range 1100 through 1199.

One hundred words of I/O channel status conditions 78 are available at address locations 1300 to 1399, one word for each line of data, ten for each channel. Bits contained within each word signify the new word status of an individual subchannel (line), and also information concerning the status of channel hardware (carrier, error). The bit test instruction (to be described infra) permits the status bits to be used to implement programmed control of I/O devices when required. Output addresses may be written and read for use as storage locations. Line 1200 contains system power status information and is physically located in the GTCU 14.

Types of Command Memory Lines

Format

Figure 9:
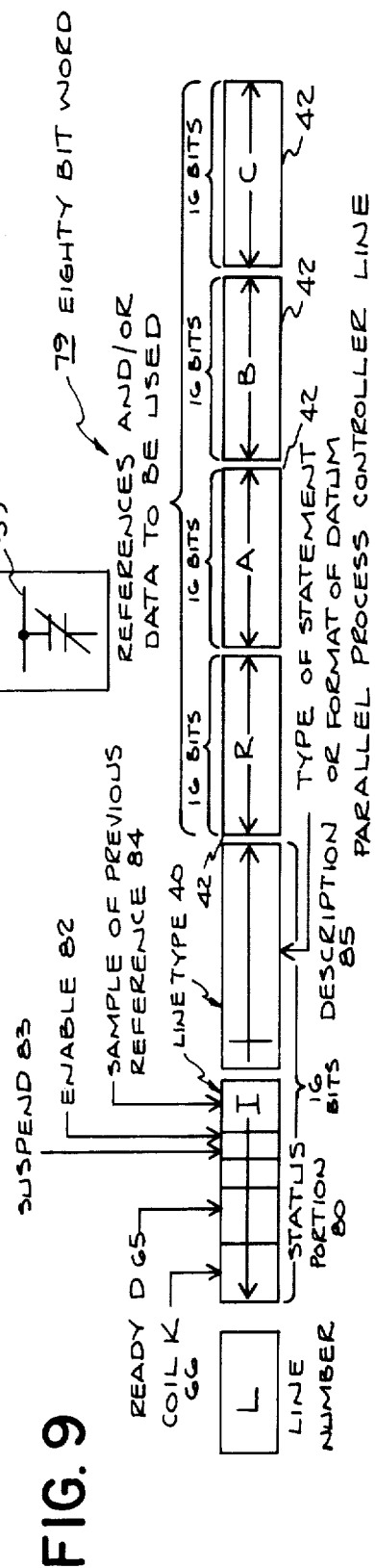
FIG. 9 is a schematic representation of a typical program line utilized in the parallel process controller of FIG. 1, similar to the typical line shown in FIG. 4 but showing in more detail the information entered into the instruction register of the programmed line.

Command memory lines may be classified into three types: statements, datums, and dedicated lines. As best seen in FIG. 9, each line consists of an 80-bit word which is divided into two portions. The first portion is a 16 bit line type or I register 40 containing a description or specification of the line and its status. The remainder of the line consists of four 16-bit registers 42 designated R, A, B, and C, which generally contain the working information associated with the line.

I-register; Status Bits

A status portion 80 of the I-register is dynamic. It contains the coil (K) 66 and ready (D) 65 status bits, which are updated each time the line is processed. It also contains the enable 82 and suspend 83 bits. The enable bit allows a programming panel operator to cause a line to be disabled so that the associated coil and ready conditions can be forced to a known status during debugging operations. The suspend bit allows the programming panel 36 (see FIG. 1) to inhibit all processing of the line. In addition, a previous sample 84 of the reference node calculation (if the line is a statement, see FIG. 4) is stored in the status portion of the I-register so that reference node state transition may be detected (for AC or transitional referencing). For timed count statements (discussed infra), the history of a prior request for counting is also stored.

I-Register; Description Code

A description portion 85 of the I-register specifies whether the line is a statement or a datum. When a line is a datum, R, A, B, and C registers 42 are taken together as data in the format specified by the description code. If the line is a statement, registers R, A, B, and C take on specific meaning as will be detailed in the following sections.

Statement; R-Register

FIG. 10 and Table 2 illustrate characteristics which are common to all statements.

TABLE 2

| REGISTERS: |
|---|
| I-Register defines Instruction. |
| R Register activates process (condition reference). |
| A, B, C Registers define data or conditions associated with process. |
| D (Ready) indicates True when result of process is ready (available). D lasts for one sweep |
| EACH TIME process is completed. |
| K (Coil) indicates logical result of process (as required). |
| REFERENCES: |
| The R Register may make DC (static) or AC (transitional) references to conditions in a command memory. Other logical nodes may make DC references only. Any logical node may make inverted reference (True when referenced condition is false). Conditions referenced may be Coil (K), Done (D), Input (E), or Sequence Step (S). |

The reference (R) register of a statement causes transmission of a true (logical one) condition if the specified reference conditions are met. (Registers performing logical condition solutions are referred to as "nodes"). The R-node may refer to any internal D, K, E (input transformer bit; see FIG. 7), or S (output transformer bit; see FIG. 7) condition in either inverted or noninverted sense. The result of this reference may be taken as a static (DC) or transitional (AC) condition. If transitional, a false-to-true transition causes an output lasting for one sweep.

When a transitional (AC) reference is made, the result (R-node) output will be true whenever the referenced condition is sensed as true on the current sweep and was sensed as false on the previous sweep. An inverted transitional reference is true when the referenced condition is false on the current sweep and was true on the previous sweep.

Statement; Ready Condition (D)

For every statement, a true output from the R-node ultimately causes a D or ready condition 65 to occur. In most lines, the D condition coincides with the truth of the R-node (since processing of the statement occurs within the same sweep time as the detection of the referenced condition). In multi-sweep statements, (such as multiply and divide), the D condition does not occur until the completion of the calculation which may not occur for several sweeps. When a calculation is in progress, the line will not respond to a new R-node truth (DC) or transition (AC).

Statement; A, B, C, Registers, and Coil (K)

The process initiated by a true condition of the R-node commonly uses data or references supplied by the A, B, and C registers. Certain statements deposit information in the C register and most produce a logical result represented by the K coil 66.

Special Lines

Stepper Lines

FIGS. 7 and 11 and Table 3 illustrate in more detail the action of a stepper line 68. A stepper location can contain a full 80 bit line, but any value placed in the data area in excess of the maximum step number (99) causes all referenced conditions for the associated stepper to be false.

Input and Output Transformer Lines

Figure 12:
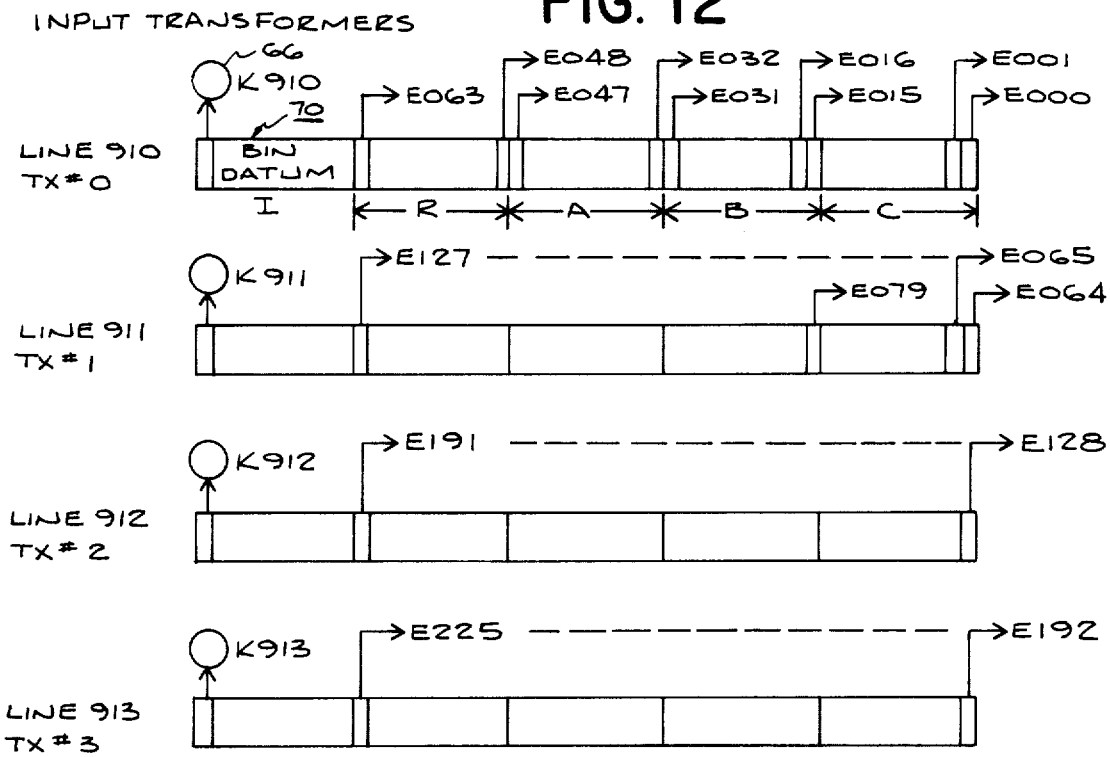
FIG. 12 is a schematic representation of "input transformer" lines utilized in command memory modules of the parallel process controller of FIG. 1.

Input transformers are illustrated in FIGS. 7 and 12 and Table 4 and output transformers are illustrated in FIGS. 7 and 13 and Table 5. These figures and tables are largely self-explanatory. It should be noted that combinations of stepper lines with input and output transformers, plus bit test and move statements (disclosed infra) permit rather flexible imput/output, sequential state, shift register, and sequencer type process-control implementations. An input transformer location is a general purpose "scratchpad" register and therefore can contain a K or coil bit 66.

Statement Classification and Terminology

Figure 14:
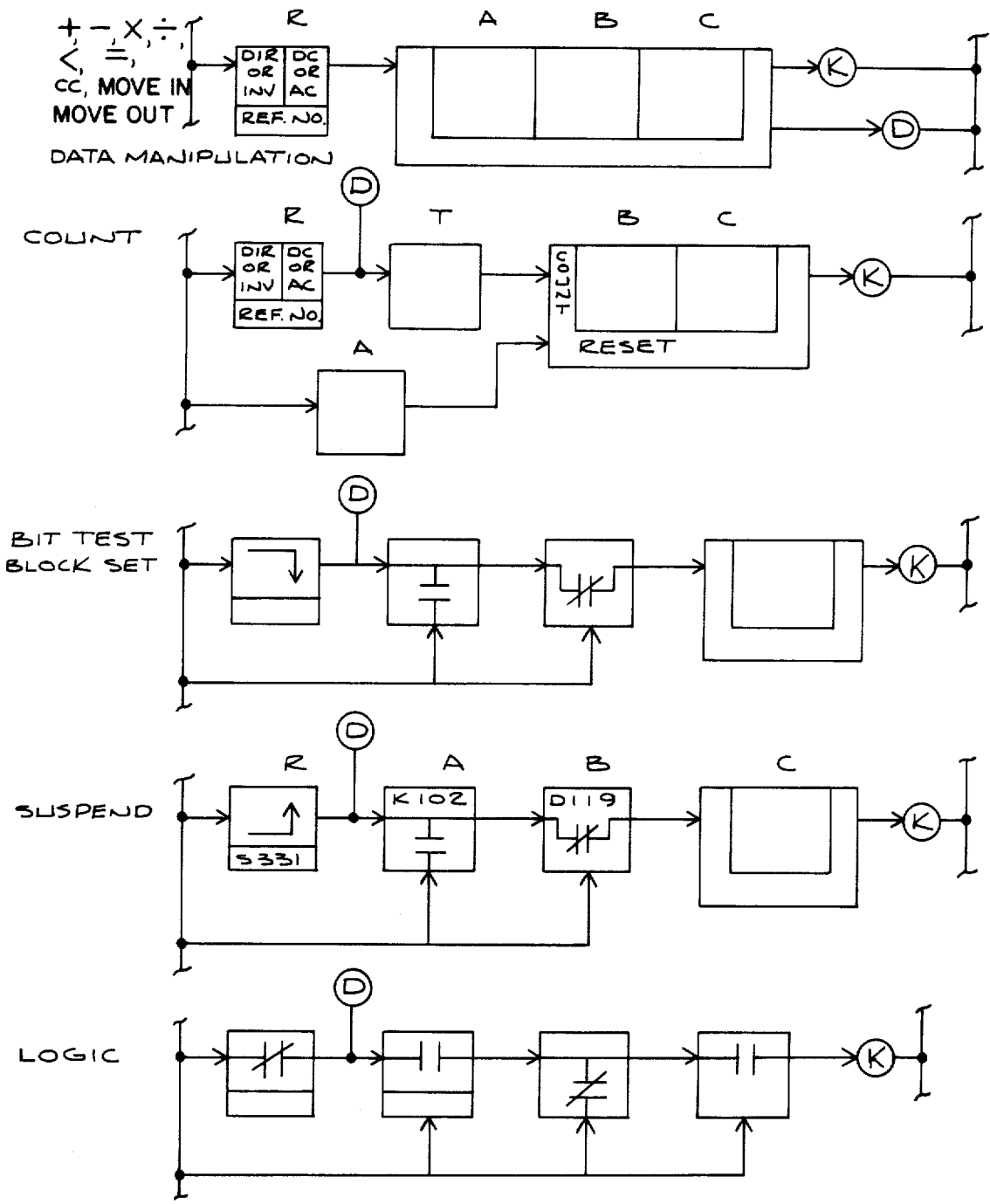
FIG. 14 is a schematic representation of the general line format used for different instructions solvable by the command memory modules of the parallel process controller of FIG. 1.

The various classes of statements are illustrated in relay ladder diagram symbology in FIG. 14. These may be generally classified as data manipulation statements, logical statements, and count statements. Any logical node in an instruction refers only to a condition; however, registers within data manipulation statements often contain or refer to data.

TABLE 3

| | |
|---|---|
| DESCRIPTION: | CM lines 900–903 form four steppers. The decimal (BCD) contents of each "stepper" location is referenceable by active CM lines (0–199) as a set of 100 discrete conditions (coils) as shown above. At most, one condition in each set may be true at any time. If the contents of the stepper (L) $\geq 10^2$, all conditions are false; If (L) = 0, the "Home" condition is true. If (L) = 1, "step 1" is true, etc. Stepper locations are "scratch-pad" to the CM and therefore may store a full 80 bits. Thus, associated coils (K900–K903) are also referenceable |
| RULE: | Step S X Y Z is true when contents of Line 90X = YZ, where YZ = 00, 01, 02, 03, — —99, and X = 0, 1, 2, 3 SXYZ = 0 for contents of line 90X $\geq 10^2$. |

TABLE 4

| | |
|---|---|
| DESCRIPTION: | CM lines 910–913 form four input transformers. Each bit in the data area composed of the R, A, B, and C, Registers is referenceable as a Condition (Coil) by any active line in the CM (lines 0–199). Locations 910–913 appear as "scratch-pad" to the CM and are therefore full 80 bit locations. Thus, Coil conditions K910, K911, K912 and K913 are also referenceable. In general, these locations are treated as binary data. |
| RULE: | Line 91X, bit YZ corresponds to E coil 64 X |

TABLE 4-continued

| | |
|---|---|
| | + YZ where X = 0, 1, 2, 3 and YZ = 1, 2, 3, —63. |

TABLE 5

| | |
|---|---|
| DESCRIPTION: | CM lines 920–923 form an image of CM active and scratch-pad lines, 64 per location. This map is useful for CM-to-output and CM-to-CM communication. Output transformer lines are updated continuously. They are initialized to zero prior to the first sweep on power-up. |
| NOTE: | Bits in the output transformers correspond to K condition (Coils) 0–199 on an instantaneous basis. |
| RULE: | Line 92X, bit YZ contains K coil 64X + YZ where X = 0, 1, 2, 3; YZ = 1, 2, 3, —63. |
| OUTPUT CONDITIONS: | K920–K923 are False |
| RESTRICTIONS: | If a CM statement (other than move in or move out line) deposits into line 920–923, data will not be written, and map content will not be affected. Warning: Move in or move out line may cause data type to change, thus defeating this protection. |

If a register within a statement contains data used in creating the result of the instruction, it is called local data; however, if the register contains a reference to data (i.e., the location in a memory location where data resides), it is called remote. Whenever a data reference is remote, only the B register can specify a data location external to the command memory; that is, the A and C registers can only specify data locations within the particular command memory.

Line Coding

FIG. 15 illustrates the coding format of the various line types. A statement contains decimal data expressed in binary coded decimal data (BCD); one four-digit quantity to each register as shown. A datum is expressed in either BCD or 8-bit coded digits. Whenever a data manipulation is performed between lines having data of varying formats, conversion between formats is automatic. When a statement is referenced as data, the content of the C register is used regardless of the actual significance of this information. Modification of the C register of a "logic" statement is prevented by hardware. In a numeric manipulation, nondecimal values contained in referenced data registers produce meaningless results. Binary (discrete) data is used primarily for condition and input/output manipulation.

Figure 15B:
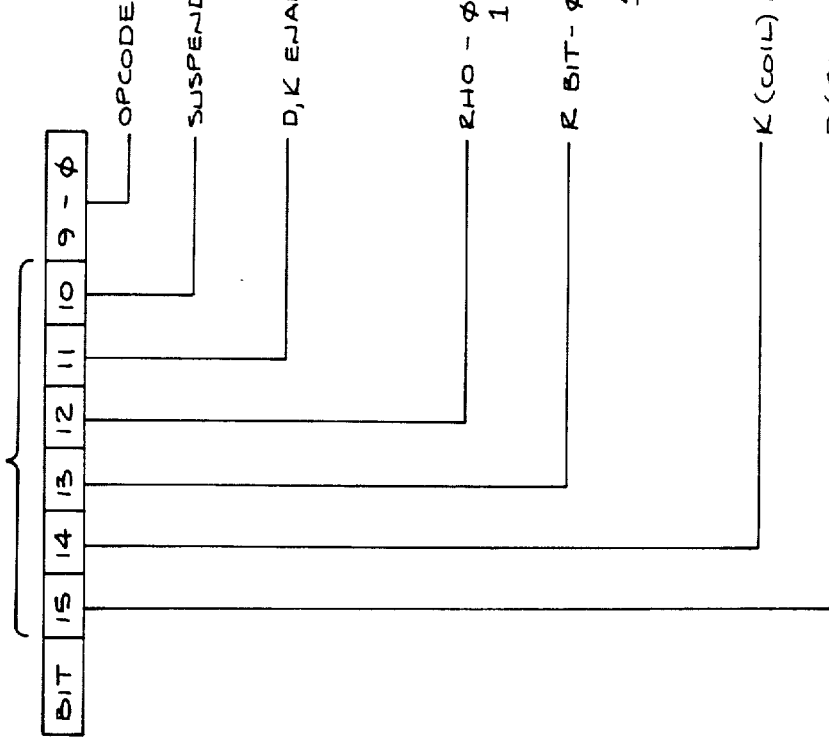
FIG. 15B is a schematic representation of the coding format of an instruction register of an instruction line utilized in command memory modules of the parallel process controller of FIG. 1.
Figure 15C:
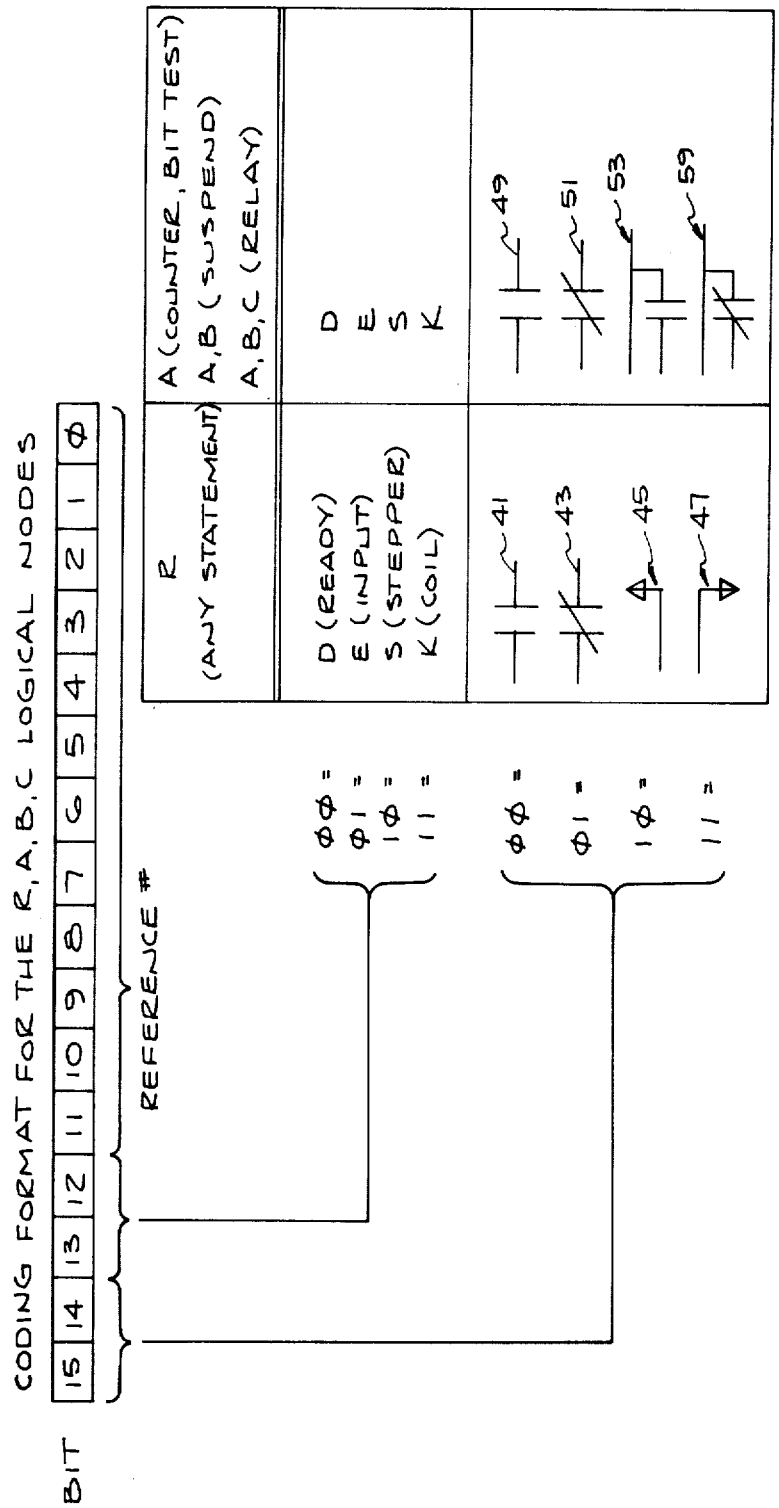
FIG. 15C illustrates the coding format for the reference, A, B, and C nodes of a logical statement utilized by the parallel process controller of FIG. 1.

Details of the I and R register coding formats are shown in FIGS. 15A, 15B, and 15C. As shown in these figures, the operation code (opcode) designating the type of line selected is stored in the first 10 bits of the I register. A summary of these opcodes is given in Table 5A for both hexidecimal and octal numbering systems. Bit 10 of the I register is the "suspend" bit, discussed infra, while bit 11 is the "enable" bit, discussed infra. The remaining four bits of the I register store information relating to the D and K conditions, and the prior state of the D condition.

As best seen in FIG. 15A, the R register stores information relating to the desired contact specifications which activates the R register and the line depending on the state of the selected K, E, D, or S condition of the reference line. These four R register contact specifications are: (1) normal static true 41; (2) static false 43; (3) false-to-true transition (AC leading edge) 45; and true-to-false transition (AC falling edge). The normal static true contact specification activates the R register if the selected reference condition (D, K, E, or S condition of the referenced line) is presently true. Conversely, the static false specification activates the R register if the reference condition is presently false. The AC leading edge specification activates the R register if the selected reference condition was false during the last sweep or scan and is presently true; while the AC falling edge activates the R register if the selected reference condition was true and is presently false.

TABLE 5A
SUMMARY OF OPCODES

| | OPCODES | | | |
|---|---|---|---|---|
| | LOCAL | | REMOTE* | |
| FUNCTION | HEX | OCT | HEX | OCT |
| BIN DATA | 000 | 0000 | N.A. | |
| NO STORE BIN DATA | 010 | 0020 | N.A. | |
| BCD DATA | 020 | 0040 | N.A. | |
| ASCII DATA | 030 | 0060 | N.A. | |
| ADD | 040 | 0100 | 050 | 0120 |
| SUB | 041 | 0101 | 051 | 0121 |
| MUL | 042 | 0102 | 052 | 0122 |
| DIV | 043 | 0103 | 053 | 0123 |
| COMP | 044 | 0104 | 054 | 0124 |
| MATCH | 045 | 0105 | 055 | 0125 |
| TEST | 046 | 0106 | 056 | 0126 |
| GET DATA | 087 | 0207 | 097 | 0227 |
| PUT DATA | 088 | 0210 | 098 | 0230 |
| GET LINE | 089 | 0211 | 099 | 0231 |
| PUT LINE | 08A | 0212 | 09A | 0232 |
| BLOCK GET | 0AE | 0256 | 0BE | 0276 |
| COUNT REF | 0AB | 0253 | 0BB | 0273 |
| TMR SEC | 1AB | 0653 | 1BB | 0673 |
| TMR 0.1 SEC | 2AB | 1253 | 2BB | 1273 |
| TMR .01 SEC | 3AB | 1653 | 3BB | 1673 |
| BIT TEST | 0CC | 0314 | 0DC | 0334 |
| PARALYZE | 0AD | 0255 | 0BD | 0275 |
| RELAY | 0E0 | 0340 | 0F0 | 0360 |
| MULT IN PROG. | 060 | 0140 | 070 | 0160 |
| DIVD IN PROG | 061 | 0160 | 071 | 0161 |
| SPARES: | XFX | | | |
| | XXE | | | |
| | XXF | | | |

*REMOTE = LOCAL + 010₁₆

Example of R register references are shown in FIG. 10. The reference line number is stored in bits 0–11 of the R register.

As best seen in FIG. 15C, for logical statement lines the A, B, and C registers refer to desired reference line conditions, specifying the D, E, S, or K conditions. These conditions are sensed as well as the contact specification—"and" 49, "and not" 51, "or" 53, and "or not" 59—that activate the particular A, B, or C node depending on the state of the referenced D, E, S, or K condition. It should be noted that certain nodes of counter, bit test and suspend lines also use the contact specifications shown in FIG. 15C for some of the A, B, C nodes. The R node of a logical statement is analogous to the R register of any other type of statement (see FIG. 15B).

Details of the Instruction Set

FIGS. 16A through 16SS and corresponding Tables 7A through 7XX form a detailed description of each statement and a description of the datum. Table 6 is a summary of this instruction or statement set. Some additional explanation follows.

Calculate (FIGS. 16A–16H, Table 7A–7H)

Calculate instructions (+, −, ×, −) deal with positive integers only. The result of the subtract statement is magnitude, with the coil (K) representing sign. For add, multiply and divide statements, the coil represents overflow or exceeding of data limits. Multiply and divide statements also place restrictions on the magnitude of the multiplier, multiplicand, and divisor as detailed in the figures.

Data Transfer and Move In, Move Out Line Transfer

FIGS. 16O–16AA, Tables 7O–7AA

These statements are used for moving single datums, tables of data, or instruction sequences between locations within the PPC system. Two classes of move in and move out statements are provided. "Move in data" and "move out data" can move the data areas of lines only, with appropriate format conversion. The "move in" line and "move out" line statements are primarily for program loading, and must be used judiciously. These statements move entire lines without modification. In all move in and move out statements, the C register represents an "index" or "offset", allowing the instruction to point to any one of a number of locations within a table.

TABLE 6
STATEMENT SET AND DATUM SUMMARY

| Statement | Local (FIG. 16-) (Table 7-) | Remote (FIG. 16-) (Table 7-) |
|---|---|---|
| Arithmetic | | |
| Add | A | B |
| Subtract | C | D |
| Multiply | E | F |
| Divide | G | H |
| Compare | I | J |
| Match | K | L |
| Test | M | N |
| Data Transfer | | |
| Move In | O | P |
| Move Out | Q | R |
| Pack | S | T |
| Unpack | U | V |
| FIFO | W | |
| Line Transfer | | |
| Move In | X | Y |
| Move Out | Z | AA |
| Move In Block | BB | CC |
| Move Out Block | DD | EE |
| Suspend | FF | GG |
| Count | | |
| Preset Count | HH | II |
| Up/Down Count | JJ | KK |
| Timer .01 sec | HH | II |
| Timer .1 sec | HH | II |
| Timer 1 sec | HH | II |
| Bit Oriented | | |
| Bit Manipulate | LL | MM |
| Bit Match | NN | OO |
| Bit Shift | PP | QQ |
| Logic | RR | |
| Datum | FIG. 16- | Table 7- |
| DIS to BCD and BCD to DIS | SS | SS |
| DIS, BCD or DNS to ASCII | SS and SSA | SS |
| ASCII to BCD or DIS | SS and SSB | SS |
| Statement to ASCII | SS and SSC | SS |
| Statement to BCD or DIS | SS and SSD | SS |
| ASCII to Statement | SS and SSE | SS |
| BCD, DIS, or DNS to Statement | SS and SSF | SS |
| Logic to any other Line Type | — | SS |

TABLE 7A

STATEMENT: ADD LOCAL

OPERATION: If R is true, A + (B) → C

Note 1. The sum A+(B) is calculated modulo $10^4$ and deposited into the C Register
2. (B) is the data content of Line B located in CM, I/O, or DM

RESTRICTIONS:

A is BCD, $0 \leq A < 10^4$
B is BCD, $0 \leq B < 10^4$
C is BCD, $0 \leq C < 10^4$

INPUT CONDITIONS:

R = DXXX, Where $0 \leq XXX < 10^3$
KXXX,
EXXX,
or SXXX   R is normal or inverted, AC or DC

OUTPUT CONDITIONS:

K: is true if $A+(B) \geq 10^4$ and D is true
D: (Data Ready) is true if R is true

TIMING:

Solved each sweep.

TABLE 7B

STATEMENT: ADD REMOTE

OPERATION: If R is True, (A)+(B) → (C)

Note 1. The Data content of Line A plus the Data content of Line B is deposited in the Data area of Line C.
2. The sum is calculated modulo $10^{16}$.
3. The sum is deposited according to Line C Data area modulus.
4. Lines A and C are in CM. Line B is in CM, DM, or I/O.

RESTRICTIONS:

A is BCD; $0 \leq A < 10^3$ (CM only)
B is BCD; $0 \leq B < 10^4$ (CM, I/O, or DM)
C is BCD; $0 \leq C < 10^3$ (CM only)

INPUT CONDITIONS:

R = D, E, K, or SXXX; normal or inverted, DC or AC where $0 \leq XXX < 10^3$

OUTPUT CONDITIONS:

K: (Data out of limits) is true if sum ≧ data area modulus of line C
D: (Data Ready) is true if R is true

TIMING:

Solved each sweep.

TABLE 7C

STATEMENT: SUBTRACT LOCAL

OPERATION: If R is true $|A-(B)| \rightarrow C$

Note 1. The difference of the data portion of line B and the A Register content is taken modulo $10^4$.
2. The magnitude of the difference is deposited in the C Register.
3. Line B is in CM, DM, or I/O.

RESTRICTIONS:

$0 \leq A, B$ or $C \leq 10^4$

INPUT CONDITIONS:

R = D, E, K, OR SXXX; normal or inverted, DC or AC where $0 \leq XXX \leq 10^3$

OUTPUT CONDITIONS:

K: (Sign of Difference) is true when A<(B) and D is true
D: (Data Ready) is true when R is true

TIMING:

Solved each sweep.

TABLE 7D

STATEMENT: SUBTRACT REMOTE

OPERATION: If R is true, $|(A)-(B)| \rightarrow (C)$.

Note 1. The difference of the data portions of lines B and A is taken.
2. The magnitude of the difference is deposited into the data portion of line C according to line C data area modulus.
3. Lines A and C are located in CM. Line B is in CM, DM, or or I/O

TABLE 7D-continued

STATEMENT: SUBTRACT REMOTE

RESTRICTIONS:

A, B, and C are in BCD; $0 \leq A < 10^3$ (CM)
$0 \leq B < 10^4$ (CM, DM, I/O)
$0 \leq C < 10^3$ (CM)

INPUT CONDITIONS:

R = D, K, E or SXXX; normal or inverted; DC/AC where $0 < XXX \leq 10^3$

OUTPUT CONDITIONS:

K: (Sign of Difference) is true if (A)<(B) and D is true.
D: (Data Ready) is true when R is true

TIMING:

Solved each sweep.

TABLE 7E

STATEMENT: MULTIPLY LOCAL

OPERATION:

If R is true and Line L+1 is a DNS datum and Line is ready (see input conditions), A X (B) → C.

NOTE 1: product of A and the data area of Line B is calculated module $10^4$ and deposited in C.
NOTE 2: Line L+1 is used to store partial results and will change during the calculation

RESTRICTIONS:

A, B, C are in BCD: $0 \leq A, B, C < 10^4$
$0 \leq (B) < 10^8$ (BCD).

INPUT CONDITIONS:

R = D, E, K or SXXX normal or inverted, AC or DC where $0 \leq XXX < 10^3$. Calculation starts when previous calculation is completed and R is true, and proceeds till completion.

OUTPUT CONDITIONS:

K (Out of Limit) is true if $A \times (B) > 10^4$ or if $(B) > 10^8$ and R is true.
D (data ready) is true for one sweep each time calculation is completed.
D and K are false during calculation.

TIMING:

Multi-Sweep. (4 Sweeps)

TABLE 7F

STATEMENT: MULTIPLY REMOTE

OPERATION:

If R is true and line L+1 is a DNS datum and line is ready (see Input Conditions), $(A) \times (B) \rightarrow (C)$.

NOTE 1: The product of the data areas of lines B and A is calculated modulo $10^{16}$ and deposited in Line C (converted as required).
NOTE 2: Line L+1 is used to store partial results and will change during the course of the calculation.

RESTRICTIONS:

A, B, C are in BCD: $0 \leq A, C < 10^3$ (CM only)
$0 \leq (B), (A) < 10^8$ (BCD): $0 \leq B < 10^4$ (CM, I/O or DM)

INPUT CONDITIONS:

R = D, E, K or SXXX normal or inverted, AC or DC where $0 \leq XXX < 10^3$. Calculation starts when previous calculation is completed and R is true, and proceeds till completion.

OUTPUT CONDITIONS:

K: (Out of limit) is true if $(A) \times (B) \geq$ the data area modulus of line C or if (A) or $(B) \geq 10^8$ and R is true.
D: (Data ready) is true for one sweep each time calculation is completed.
D and K are false during calculation.

TIMING:

Multi-sweep. (4 Sweeps)

TABLE 7G

STATEMENT: DIVIDE LOCAL

OPERATION:

TABLE 7G-continued
STATEMENT: DIVIDE LOCAL

If R is true and line is ready (see Input Conditions) and Line L+1 is a DNS datum line, the A÷(B) → C.

NOTE 1: (B)=0, C is set to 9999 and K is turned on.
NOTE 2: Line L+1 is used to store partial results and will change during the calculation.

RESTRICTIONS:
A, B, C are in BCD: $0 \leq A, B, C < 10^4$

INPUT CONDITIONS:
R = D, E, K or SXXX, normal or inverted, AC or DC where $0 \leq XXX < 10^3$. Calculation starts when previous calculation is completed and R is true, and proceeds till completion.

OUTPUT CONDITIONS:
K (out of limit) is true if (B)=0.
D (data ready) is true for one sweep each time calculation is completed.
D and K are false during calculation.

TIMING:
Multi-sweep.

TABLE 7H
STATEMENT: DIVIDE REMOTE

OPERATION:
If R is true and line is ready (see Input Conditions) and Line L+1 is a DNS datum line, then (A)÷(B) → (C).

NOTE 1: If (B)=0, line C is set to its data area modulus −1 and K is turned on.
NOTE 2: Line L+1 is used to store partial results and will change during the calculation.

RESTRICTIONS:
A, B, C are in BCD: $0 \leq A, C < 10^3$ (CM only)
$0 \leq B < 10^4$ (CM, I/O or DM)
$0 \leq (B) < 10^8$

INPUT CONDITIONS:
R = D, E, K or SXXX, normal or inverted AC or DC Where $0 \leq XXX < 10^3$. Calculation starts when previous calculation is completed and R is true, and proceeds till completion.

OUTPUT CONDITIONS:
K: (Out of limit) is true if (B)=0 or the quotient exceeds the data area modulus of Line C.
D: (Data ready) is true for one sweep each time calculation is completed.
D and K are false during calculation.

TIMING:
Multi-sweep.

TABLE 7I
STATEMENT: COMPARE LOCAL

OPERATION:
If R is true and if A>(B), true → K, |A−(B)| → C

Note 1. The numerical difference of the data portion of line B and Register A is taken. The magnitude of the difference is deposited in Register C modulo $10^4$.
2. Line B is in CM, I/O, or DM

RESTRICTIONS:
A, B, C are in BCD; $0 \leq A, B,$ or $C < 10^4$
C result is valid if $|A-(B)| < 10^4$
Result is valid for all decimal values of (B)

INPUT CONDITIONS:
R = D, E, K or SXXX, normal or inverted, AC or DC, where $0 \leq XXX < 10^3$

OUTPUT CONDITIONS:
K: (Compare) is true if A−(B)>0 and D is true
D: (Data Ready) is true if R is true

TIMING:
Solved each sweep.

TABLE 7J
STATEMENT: COMPARE REMOTE

OPERATION:
If R is true, |(A)−(B)| → (C). If (A)>(B), true → K

Note 1. The numerical difference of the data areas of lines B and A is taken.
2. The magnitude of the difference is deposited in the data area of line C according to line C data area modulus.
3. A and C are in CM ($0 \leq A$ or $C < 10^3$); B is in CM, I/O or DM

RESTRICTIONS:
A, B, C are in BCD;
$0 \leq A$ or $C < 10^3$
$0 \leq B < 10^4$
For valid C result, (A) and (B) are decimal

INPUT CONDITIONS:
R = D, E, K, or SXXX; normal or inverted, AC or DC where $0 \leq XXX < 10^3$.
K: (Compare true) is true if (A)−(B)>0 and D is true.
D: (Data Ready) is true if R is true

TIMING:
Solved each sweep.

TABLE 7K
STATEMENT: MATCH LOCAL

OPERATION:
If R is True and if A = (B), True → K, |A−(B)| → C

1. The numerical difference of the contents of the data portion of line B and register A is taken and deposited into register C modulo $10^4$.
2. Line B is in CM, I/O, or DM

RESTRICTIONS:
A, B, C are in BCD; $0 \leq A, B, C < 10^4$.
C-result is valid if $|A-(B)| < 10^4$
K results are valid for all decimal values of (B).

INPUT CONDITIONS:
R = D, E, K, or SXXX where $0 \leq XXX < 10^3$; normal or inverted, AC or DC.

OUTPUT CONDITIONS:
K (match) is true if A−(B)=0 and D is true.
D (data ready) is true when R is true.

TIMING:
Solved each sweep.

TABLE 7L
STATEMENT: MATCH REMOTE

OPERATION:
If R is true and if (A) = (B), true → K: $|(A)_{cm}-(B)| \rightarrow (C)_{cm}$ 1. The decimal difference of the data areas of lines B and A is taken and deposited into line C data area according to the specified modulus.
2. If lines A and B have similar formats, a binary compare (A)XOR(B)=0 gives the "match" result; Otherwise, (A)−(B)=0 is used for "match".
3. Lines A, and C are in CM. Line B is in CM, I/O, or DM.

RESTRICTIONS:
1. A, B, C are in BCD; $0 \leq A$ or $C < 10^3$; $0 \leq B < 10^4$.
2. For valid (C) result, (A) and (B) must be in BCD.
3. K results are valid for all (A) and (B) binary values when lines A and B have same format.

INPUT CONDITIONS:
R = D, E, K, or SXXX, normal or inverted, AC or DC where $0 \leq XXX < 10^3$

OUTPUT CONDITIONS:
K (match) is true if (B) matches (A) and D is true.
D (data ready) is true if R is true.

TIMING:
Solved each sweep.

TABLE 7M

STATEMENT: TEST LOCAL

OPERATION: If R is true and if $A \leq (B)$ and $(B) \leq C$, True $\rightarrow$ K.

1. The decimal difference of the data area of line B and register A is taken.
2. The decimal difference of register C and the data area of line B is taken.
3. The signs of the two calculations are combined to determine K.
4. Line B is in CM, I/O, or DM.

RESTRICTIONS:

A, B, C are in BCD; $0 \leq A, B, C < 10^4$
K is valid for all decimal values of (B).

INPUT CONDITIONS:

R = D, E, D, or SXXX, normal or inverted, AC or DC where $0 \leq XXX < 10^3$.

OUTPUT CONDITIONS:

K (in range) is true if $(B)-A \geq 0$ and $C-(B) \geq 0$ and D true.
D (result ready) is true if R is true.

TIMING:

Solved each sweep.

TABLE 7N

STATEMENT: TEST REMOTE

OPERATION: If R is True and if $(A)_{cm} \leq (B)$ and $(B) \leq (C)_{cm}$, true $\rightarrow$ K.

1. The difference of lines B and A and of lines C and B are each taken.
   Case I - Lines to be subtracted have same format: Binary subtract of data areas is performed.
   Case II - Lines to be subtracted have differing formats: Decimal subtract of data areas is performed.
2. The signs of the two calculations determiine K result.
3. Lines A and C are in CM. Line B is in DM, I/O, or CM.

RESTRICTIONS:

1. A, B, C ARE BCD; $0 \leq A$ or $C < 10^3$; $0 \leq B < 10^4$.
2. If lines A, B, or C have differing formats, (A), (B), (C), are decimal for valid result.
3. Binary code comparisons are valid if (A), (B), and (C) have same format.

INPUT CONDITIONS:

R = D, E, D, or SXXX normal or inverted, AC or DC where $0 \leq XXX < 10^3$.

OUTPUT CONDITIONS:

K (in range) is true if $(B)-(A) \geq 0$ and $(C)-(B) \geq 0$ and D true.
D (result ready) is true if R is true.

TIMING:

Solved each sweep.

TABLE 7O

STATEMENT: MOVE IN DATA LOCAL

OPERATION: If R is true, $(B+C) \rightarrow (A)_{cm}$

1. The sum of B+C is calculated modulo $10^4$
2. The data area of line B+C is deposited into the data area of line A in the specified format and modulus for line A.
3. Line B+C is not modified.
4. Line A is in CM. Line B+C is in CM, I/O, or DM.

RESTRICTIONS:

1. A, B, C are in BCD: $0 \leq A < 10^3$ and $0 \leq B$ or $C < 10^4$.
2. If line A and line B+C are in same format data is not modified (transparent).
3. If formats differ both should contain decimal values for valid result.

INPUT CONDITIONS:

R = D, E, K, or SXXX normal or inverted, AC or DC where $0 \leq XXX < 10^3$ (BCD).

OUTPUT CONDITIONS:

K (data out of limits) is true if the data area modules of line A is exceeded by the data area of line B+C and D is true.
D (data ready) is true if R is true.

TIMING:

Solved each sweep.

TABLE 7P

STATEMENT: MOVE IN DATA REMOTE

OPERATION: If R is true $(B+(C)_{cm}) \rightarrow (A)_{cm}$

1. The sum of B plus the data area of line C is calculated modulo $10^4$.
2. The data area of line, B+(C) is deposited into the data area of line A in the format and modulus specified for line A.
3. Line A and C are in CM. Line B+(C) is in CM, I/O, or DM.
4. Line B+(C) is not modified.

RESTRICTIONS:

1. A, B, C are in BCD. $0 \leq A$ or $C < 10^3$ and $0 < B < 10^4$
2. For valid results (C) is in decimal.
3. If line A and line B+(C) are in same format data is not modified transparent)
4. If formats differ, both should contain decimal values for valid result.

INPUT CONDITIONS:

R = D, E, K, or SXXX normal or inverted, AC or DC; where $0 \leq XXX < 10^3$ (BCD).

OUTPUT CONDITIONS:

K (Data out of limits) is true if the data area modulus of Line A is exceeded by the data area of Line B+(C) and D is true.
D (data ready) is true if R is true.

TIMING:

Solved each sweep.

TABLE 7Q

STATEMENT: MOVE OUT DATA LOCAL

OPERATION: If R is true $(A)_{CM} \rightarrow (B + C)$.

1. The sum of B+C is calculated modulo $10^4$.
2. The data area of Line A is non-destructively read, the data converted as required, and deposited in the data area of line B+C in the specified modulus.
3. Line A is in CM. Line B+C is in CM, I/O, or DM.

RESTRICTIONS:

1. A, B, C are in BCD: $0 \leq A < 10^3$ and $0 \leq B$ or $C < 10^4$.
2. If line A and line B+C are in the same format, data is not modified (transparent)
3. If formats differ both should contain decimal values for valid result.

INPUT CONDITIONS:

R = D, E, K, or SXXX, normal or inverted, AC or DC where $0 \leq XXX < 10^3$ (BCD).

OUTPUT CONDITIONS:

K (Data out of limits) is true if the data area modulus of line B+C is exceeded by the data area of Line A.
D (data ready) is true if R is true.

TIMING:

Solved each sweep.

TABLE 7R

STATEMENT: MOVE OUT DATA REMOTE

OPERATION: If R is true $(A)_{CM} \rightarrow (B + (C)_{CM})$.

1. The sum of register B and data area of line C is taken modulo $10^4$.
2. The data area of line B is read non-destructively. The data is converted as required and deposited in the data area of line B+(C) at the specified modulus.
3. Line A and C are in CM. Line B+(C) is in CM, I/O, or DM.

RESTRICTIONS:

1. A, B, C are in BCD: $0 \leq A$ or $C < 10^3$ and $0 \leq B < 10^4$. (C) is in decimal.
2. If line A and line B +(C) are in the same format data is not modified (transparent).
3. If formats differ both should contain decimal values for valid results.

INPUT CONDITIONS:

R = D, E, K, or SXXX, normal or inverted, AC or DC where $0 \leq XXX < 10^3$ (BCD).

OUTPUT CONDITIONS:

K (data out of limits) is true if the data area modulus of Line B + (C) is exceeded by the data area of Line

TABLE 7R-continued

STATEMENT: MOVE OUT DATA REMOTE

B + (C) and D is true.
D (data ready) is true if R is true.
TIMING:
Solved each sweep.

TABLE 7S

STATEMENT: PACK DATA LOCAL

OPERATION: If R is true $(A)_{cm} \rightarrow (B_{C_L-C_S})$

1. The data area of Line A is non-destructively read, the data converted as required, and deposited into the data area, as specified by $C_L$ and $C_S$, of Line B.
2. The characters in the data area of Line B not included within the field specified by $C_L$ to $C_S$ are left unchanged.
3. Line A is in CM. Line B is in CM, I/O, or DM.

RESTRICTIONS:
1. A, B, C are in BCD: $0 \leq A < 10^3$; $0 \leq B < 10^4$
   $0 \leq (C_S, C_L) \leq 63$
2. If Line A and Line B are in the same format, data is not modified (transparent).
3. If formats differ, the data is converted as required.

INPUT CONDITIONS:
R = D, E, S, or K XXX, normal or inverted, AC or DC where $0 \leq XXX < 10^3$ (BCD)

OUTPUT CONDITIONS:
K (data out of limits) is true if the specified data area of Line B is greater than the data area of Line A or if the character positions specified by C ($C_L$, $C_S$) are not compatible with the format of Line B.
D (data ready) is true if R is true.

TIMING:
One (1) sweep.

TABLE 7T

STATEMENT: PACK DATA REMOTE

OPERATION: If R is true $(A)_{cm} \xrightarrow{pack} (B)$

1. The data area of Line A is non destructively read, the data converted as required, and deposited into the data area, as specified by Line C, of Line B.
2. The characters in the data area of Line B not included within the field specified by Line C are left unchanged.
3. Lines A and C are in CM. Line B is in CM, I/O, or DM.
4. The 2 LSD's of Line C will specify the destination Start Character position, and 3rd and 4th LSD's of Line C will specify the number of characters to be moved.

RESTRICTIONS:
1. A,B,C are in BCD: $\phi \leq A, C < 10^3$ (CM only) $\phi \leq B < 10^4$ (CM, I/O or DM)
2. If Line A and line B are in the same format, data is not modified (transparent).
3. If formats differ, the data is converted as required.

INPUT CONDITIONS:
R = D,E,S or KXXX, normal or inverted, AC or DC where $\phi \leq XXX < 10^3$ (BCD).

OUTPUT CONDITIONS:
K (data out of limits) is true if the specified data area of Line B is greater than the data of Line A or if the character positions specified by Line C are not compatible with the format of Line B.
D (data ready) is true if R is true.
TIMING: One (1) Sweep.

TABLE 7U

STATEMENT: UNPACK DATA LOCAL

OPERATION: If R is true (B) $\xrightarrow{unpack}$ $(A)_{cm}$

TABLE 7U-continued

1. A portion of the data area of Line B, as specified by $C_L$ and $C_S$, is non-destructively read, the data converted as required, and deposited, right justified and zero filled, into the data area of Line A.
2. Line A is in CM. Line B is in CM, I/O or DM.

RESTRICTIONS:
1. A, B, C are in BCD: $\phi \leq A < 10^3$; $\phi \leq B < 10^4$
   $\phi \leq C_S, C_L \leq 63$
2. If Line A and Line B are in the same format, data is not modified (transparent)
3. If formats differ, the data is converted as required.

INPUT CONDITIONS:
R = D, E, S, or K XXX, normal or inverted, AC or DC where $\phi \leq XXX < 10^3$ (BCD)

OUTPUT CONDITIONS:
K (data out of limits) is true if the specified data area of Line B is too small to accomodate the source information in Line A, or if the character positions in C ($C_L$, $C_S$) are not compatible with the format of Line B.
D (data ready) is true if R is true TIMING:
One (1) Sweep

TABLE 7V

STATEMENT: UNPACK DATA REMOTE

OPERATION: If R is true (B) $\xrightarrow{unpack}$ $(A)_{cm}$

1. A portion of the data area of Line B, as specified by Line C is non-destructively read, the data converted as required, and deposited, right justified and zero filled, into the data area of Line A.
2. Line A is in CM. Line B is in CM, I/O or DM.
3. The 2 LSD's of the data area of Line C will specify $C_S$, the source start character position, and the 3rd and 4th LSD's specify $C_L$, the number of characters to be moved.

RESTRICTIONS:
1. A,B,C are in BCD: $\phi \leq A, C < 10^3$ (CM only) $0 \leq B < 10^4$ (CM, I/O or DM)
2. If Line A and Line B are in the same format, data is not modified (transparent).
3. If formats differ, the data is converted as required.

INPUT CONDITIONS:
R = D,E,S, or KXXX, normal or inverted, AC or DC where $\phi \leq XXX < 10^3$ (BCD).

OUTPUT CONDITIONS:
K (data out of limits) is true if the specified data area of Line (B) is too small to accommodate the source information in Line (A), or if the character positions in (C) are not compatible with the format of Line (B)
D (data ready) is true if R is true.

TIMING:
One (1) sweep.

TABLE 7W

STATEMENT: FIFO PAIR

OPERATION: FIRST IN LINE

1. When $R_L$ is true and Line L + 1 is a FIRST OUT Line:
   a. If $B_L + B_{L+1} < C_L < B_L$ (i.e. Line $C_L$ is not within the designated stack) then $B_L \rightarrow C_L$ and no data transfer will take place.
   b. If the Koil (L) is off, then the data area of Line $A_L$, converted as required, will be deposited into Line $C_L$.
   c. If $C_L = B_{L+1}$ and the Koil (L) is off, then $B_L \rightarrow C_L$.
   d. If the Koil (L) is off, and $C_L < B_L + B_{L+1}$ then $C_L + 1 \rightarrow C_L$.
   e. If as a result of b, or c, or d $C_L = C_{L+1}$ the Koil will be off.

OPERATION: FIRST OUT LINE

1. When $R_{L+1}$ is true and Line L is a FIRST IN Line:

TABLE 7W-continued

STATEMENT: FIFO PAIR a. If $B_L + B_{L+1} < C_{L+1} < B_L$ (i.e., Line $C_{L+1}$ is not within the designated stack area) then $B_L \rightarrow C_{L+1}$ and no data transfer will take place.
b. If the Koil (L+1) is on, then no data transfer will take place and $C_{L+1}$ will not be changed.
c. If the Koil (L+1) is off, then the data area of Line $C_{L+1}$ converted as required, will be deposited into Line $A_{L+1}$.
d. If $C_{L+1} = B_L + B_{L+1}$ and the Koil (L+1) is off, then $B_L \rightarrow C_{L+1}$.
f. If as a result of a, or d, or e, $C_{L+1} = C_L$ then the Koil (L+1) is turned on, otherwise the Koil (L+1) is off.

OPERATION: FIRST IN LINE $(A)_{CM} \rightarrow (C)$

If $R_L$ is true and Line L+1 is a FIRST OUT Line and the Stack is not full ($K_L$ is off) then:
1. The data area of Line $A_L$ is non-destructively read, converted as required and deposited into Line $C_L$.
2. $C_L$ (FI Pointer) is then incremented; $C_L + 1 \rightarrow C_L$
   Note: If $C_L + 1 > B_L + B_{L+1} - 1$ (i.e. before execution $C_L$ was pointing to the last address in the stack) then $B_L \rightarrow C$ (i.e. $C_L$ is the reset to the Start address of the stack).
3. If after the previous step (2), the resultant value of $C_L$ is equal to $C_{L+1}$, then the coil of Line L shall be turned on to indicate that the stack is full.
4. The coil of Line L+1 (stack empty) will be cleared.

OPERATION: FIRST OUT LINE

If $R_{L+1}$ and Line L is a FIRST IN Line and the stack is not empty ($K_{L+1}$ is off) then:
1. The data area of Line $C_{L+1}$ is non-destructively read, converted as required, and deposited into the data area of Line $A_{L+1}$.
2. $C_{L+1}$ (FO Pointer) is then incremented; $C_{L+1} + 1 \rightarrow C_{L+1}$
   Note: If $C_{L+1} + 1 > B_L + B_{L+1} - 1$ (i.e. before execution $C_{L+1}$ was pointing to the last address in the stack) then $B_L \rightarrow C_{L+1}$ (i.e. $C_{L+1}$ is reset to the Start address of the stack).
3. If after the previous step (2), the resultant value of $C_{L+1}$ is equal to $C_L$, then the coil of Line L+1 will be turned on to indicate that the stack is empty.
4. The coil of Line L (stack full) will be cleared.

RESTRICTIONS:

$A_L$, $B_L$, $C_L$, $A_{L+1}$, $B_{L+1}$, and $C_{L+1}$ are all in BCD.
$0 \leq A_L, A_{L+1} < 10^3$ (CM only)
$0 \leq B_L < 10^4$ (CM, I/O or DM)
$0 < B_{L+1} < 10^4 - B_L$
$B_L \leq C_L, C_{L+1} < B_L + B_{L+1}$

INPUT CONDITIONS:

$R_L, R_{L+1} = $ D, E, K, or SXXX, normal or inverted, AC or DC where $0 \leq XXX < 10^3$ (BCD).

OUTPUT CONDITIONS:

$K_L$ (buffer FULL) is true if the input (FI) pointer has cycled and is equal to the output (FO) pointer.
$K_{L+1}$ (buffer EMPTY) is true if the output pointer has "caught up to" the input (FI) pointer.
$D_L$, $D_{L+1}$ are true if $R_L$, $R_{L+1}$ are true, respectively.

TIMING:

Both are solved each sweep.

TABLE 7X

STATEMENT: MOVE IN LINE LOCAL

OPERATION: If R is true $(B+C)^* \rightarrow (A)_{CM}^*$

1. The sum of B plus C is calculated modulo $10^4$.
2. The entire line B+C is read non-destructively and written into location A without modification. The D and K conditions of line B are also transferred
3. Line A is in CM. Line B+C is in CM, I/O, or DM.

RESTRICTIONS:

A, B, C are in BCD: $0 \leq A < 10^3$. $0 \leq B < 10^4$.

INPUT CONDITIONS:

R = D, E, K or SXXX normal or inverted, AC or DC, where $0 \leq XXX < 10^3$ (BCD)

OUTPUT CONDITIONS:

D (data ready) is true if R is true.
K is false.

TIMING:

TABLE 7X-continued

STATEMENT: MOVE IN LINE LOCAL

Solved each sweep

*Entire Line (80 bits)

TABLE 7Y

STATEMENT: MOVE IN LINE REMOTE

OPERATION: If R is true $(B+(C)_{CM})^* \rightarrow (A)^*$

1. The sum of B plus the data area of line C is calculated modulo $10^4$
2. The entire line B+(C) is read non-destructively and written into location A without modification. The D, and K conditions of line B + (C) are also transferred.
3. Lines A and C are in CM. Line B+(C) is in CM, I/O, or DM.

RESTRICTIONS:

1. A, B, C are in BCD: $\leq A$ or $C < 10^3$ and $0 \leq B < 10^4$.
2. For valid result (C) is in decimal.

INPUT CONDITIONS:

R = D, E, K, or SXXX normal or inverted, AC or DC where $0 \leq XXX < 10^3$ (BCD).

OUTPUT CONDITIONS:

D (data ready) is true if R is true.
K is false.

TIMING:

Solved each sweep

*Entire Line (80 bits)

TABLE 7Z

STATEMENT: MOVE OUT LINE LOCAL

OPERATION: If R is true $(A)_{CM}^* \rightarrow (B+C)^*$

1. The sum of register B and C is taken modulo $10^4$.
2. The entire line at A is read non-destructively and written into location B + C The D, K conditions of line B + C are also transferred to Line A.
3. Line A is in CM. Location B+C is in CM, I/O or DM.

RESTRICTIONS:

A, B, C are in BCD. $0 \leq A < 10^3$ and $0 \leq B$ or $C < 10^4$.

INPUT CONDITIONS:

R = D, E, K, or SXXX, normal or inverted, AC or DC where $0 \leq XXX < 10^3$ (BCD).

OUTPUT CONDITIONS:

K is false
D (data ready) is true if R is true.

TIMING:

Solved each sweep

*Entire line (80 bits)

TABLE 7AA

STATEMENT: MOVE OUT LINE REMOTE

OPERATION: If R is true $(A)_{CM}^* \rightarrow (B+(C)_{CM})^*$

1. The sum of register B and the data area of line C is taken modulo $10^4$.
2. The entire line at A is read non-destructively and written into location B+(C) The D and K conditions of line B+(C) are also transferred to line A.
3. Lines A and C are in CM. Location B+(C) is in CM, I/O, or DM.

RESTRICTIONS:

A, B, C are in BCD: $0 \leq A$ or $C < 10^3$ and $0 \leq B < 10^4$.
For valid results (C) is decimal.

INPUT CONDITIONS:

R = D, E, K, or SXXX, normal or inverted, AC or DC where $0 \leq XXX < 10^3$ (BCD).

OUTPUT CONDITIONS:

K is false
D (data) ready is true if R is true

T- Solved each sweep.
I-
MING:

*Entire line (80 bits)

TABLE 7BB

STATEMENT: MOVE IN BLOCK LOCAL

OPERATION:
When enable condition is true and $L+C-1<399$
(i.e. move does not extend out of ACTIVE Line area), then
$(B)^* \to L+1, (B+1)^* \to L+2^*, (B+C)^* \to L+C$
Where L is location of Instruction.

1. When the A node output is true, a block of lines C long in number, are retrieved from locations in the CM, DM, or I/O, beginning at line B. The block is deposited beginning at $L+1$ and continues for C lines. Processing of lines $L+1$ through $L+C$ is suspended for any sweep in which the Move In Block instruction is executed. When examined by the programming panel, the affected lines appear paralyzed at this time.
2. The maximum number of lines affected by the Move In Block statement may not extend beyond Line 399. Thus if $L+C>399$ the BLOCK MOVE will not take place and the coil will be turned on.
3. The source address $B, B+1, \ldots B+C-1$ is computed modulo $10^4$

RESTRICTIONS:
B and C are in BCD: $0 \leq B, C < 10^4$
If L is affected by a previous Block Move or Suspend it is inactive.

INPUT CONDITIONS:
$R = D,E,S$ or $KXXX$, normal or inverted, AC or DC;
$A = D,E,S$ or $KXXXX$, normal or inverted, where
$0 \leq XXX < 10^3$.

OUTPUT CONDITIONS:
K (error) is true if $C+L > 399$
D (enable) is true when R and A is true

TIMING:
Solved each sweep

*Entire Line

TABLE 7CC

STATEMENT: MOVE IN BLOCK REMOTE

OPERATION:
When enable is true and $L+(C)-1<399$ (i.e. Move does not extend out of ACTIVE line area), then
$((B))^* \to L+1, ((B))+1^* \to L+2, \ldots, ((B)+(C)-1) \to L+C$
where L is location of instruction.

1. When the A node output is true, the data area of Line C is taken modulo $10^3$ and used to specify the number of lines to be transferred. The data area of Line B, taken modulo $10^4$ specifies the first source location. A block of lines (C) long in number, are retrieved from locations in the CM, DM, or I/O, beginning at line (B). The block is deposited beginning at $L+1$ and continues for (C) lines. Processing of lines $L+1$ through $L+(C)$ is suspended for any sweep in which the Block Move instruction is executed. When examined by the programming panel, the affected lines appear paralyzed at this time.
2. The maximum number of lines affected by the Block Get statement may not extend beyond Line 399. Thus, if $L+C>399$ the block move will not take place and the coil will be turned on.
3. The source address (B), $(B)+1 \ldots (B)+(C)^1$ is computed modulo $10^4$.
4. Line B may be in CM, DM, or I/O. Line C is in CM only.

RESTRICTIONS:
B and C are in BCD; $0 < B > 10^4, 0 > C < 10^3$
$0 < (B) < 10, 0 < (C) < 300-L$

INPUT CONDITIONS
$R = D,E,S$ or $KXXX$, normal or inverted, AC or DC;
$A = D,E,S$ or $KXXXX$, normal or inverted, where
$0 \leq XXX < 10^3$

OUTPUT CONDITIONS:
K (error) is true if $(C)+L-1>399$
D (enable) is true when R and A is true

TIMING:
Solved each sweep.

*Entire Line (80 bits)

TABLE 7DD

STATEMENT: MOVE OUT BLOCK LOCAL

OPERATION:
1. When A is true and $L+C-1<399$, processing of the following

TABLE 7DD-continued

STATEMENT: MOVE OUT BLOCK LOCAL

C Lines will be suspended and these lines will be stored in a block of memory starting at Line B and ending at Line $B+C-1$.
2. If $C + L > 399$ (BCD) or $B + C > 9999$, then the coil will turn on and the statement will not be executed.
3. Entire (80 bit) lines are moved.

RESTRICTIONS:
B and C are in BCD; $0 \leq B < 10^4$ (CM, I/O or DM)
$0 \leq C < 400 - L$ (BCD)
$B+C < 10^4$

INPUT CONDITIONS:
$R = D, E, K,$ or $S\ XXX$, normal or inverted, AC or DC;
$A = D, E, K,$ or $S\ XXX$, normal or inverted,
where $0 \leq XXX < 10^3$

OUTPUT CONDITIONS:
K (error) is true if $C + 1 > 399$ or $B + C > 9999$
D (*enable) is true if R and A is true.

TIMING:
Solved each sweep.

TABLE 7EE

STATEMENT: MOVE OUT BLOCK REMOTE

OPERATION:
1. When A is true and $L \pm (C)-1<399$, processing of the following (C) Lines will be suspended and these lines will be stored in a block of memory starting at Line (B) up to Line (B) + (C).
2. If $(C) + L > 399$ (BCD) or $(B) + (C) > 9999$ then the coil will be turned on and the statement will not be executed.
3. Entire (80 bit) lines are moved.

RESTRICTIONS:
B and C are in BCD; $0 \leq B, C < 10^3$ (CM only)
(B) and (C) are converted as required to BCD;
$0 \leq (B) < 10^4$ (CM, I/O, DM)
$0 < (C) < 400 - L$ (BCD)

INPUT CONDITIONS:
$R = D, E, K,$ or $SXXX$, normal or inverted, AC or DC;
$A = D, E, K$ or $SXXX$, normal or inverted,
where $0 \leq XXX < 10^3$ (BCD)

OUTPUT CONDITIONS:
K (error) is true if $(C) + L > 399$ or $(B) + (C) > 9999$
D (enable) is true if R and A are true.

TIMING:
Solved each sweep.

TABLE 7FF

STATEMENT: SUSPEND LOCAL

OPERATION:
When the Enable condition is True and $C+L-1<399$ the subsequent C lines are not processed.

1. K and D Condition bits and data generated by these lines will not change when line is active.
2. Input conditions of these lines are not sensed
3. The maximum number of lines affected may not exceed the interval from the location of the paralyze statement to the end of the active line area in the command memory (line 399).i.e. - no "wrap-around".e.g. - If line is located at location L and $C < 399 - L$, C lines are affected; but if $C \geq 400 - L$, the coil is turned on and the following 400L lines are not "suspended."
4. C register is taken modulo $10^3$.

RESTRICTIONS:
C is in BCD
For valid result $0 \leq C < 99 - L$ where L is command memory location of line when executed. If L is within an area affected by a previous active Suspend or Block Move statement it will not operate when paralyzed.

INPUT CONDITIONS:
R, A, and B are condition references $D-$, E, K, or SXXX
where XXX is in BCD; $0 \leq XXX < 10^3$. The A and B contact functions can each be specified as follows:
(AND) (AND NOT)
The Enable condition is thus a function of the R, A, and B conditions. R is normal or inverted, AC or DC.

TABLE 7FF-continued

STATEMENT: SUSPEND LOCAL

OUTPUT CONDITIONS:

K (error) is True if C+L > 399
D (enable) is true when R and A and B are true.

TIMING:

Solved each sweep.

TABLE 7GG

STATEMENT: SUSPEND REMOTE

OPERATION:

When the enable condition is true and (C)+L−1<399, the subsequent (C) lines are not processed.

1. Condition bits and data generated by these lines will not change when line is active.
2. Input conditions of these lines are not sensed.
3. The maximum number of lines affected may not exceed the interval from the location of the paralyze statement to the end of the active line area in the command memory (line 399) i.e. - no "wrap-around". e.g. - if line is located at location L and (C) < 399 − L, (C) lines are affected but if (C) ≧ 200−L, the coil is turned on and the following 400−L lines are not "suspended".
4. (C) is the contents of the data area of line C taken modulo $10^3$.

RESTRICTIONS:

C is in BCD. For valid result (C) is a decimal quantity 0 ≦ (C) < 199−L where L is CM location of statement when executed. If L is within an area affected by a previous active paralyze or block get statement will not operate when paralyzed.

INPUT CONDITIONS:

R, A, and B are condition references D-, E-, K or SXXX where XXX is in BCD: 0 ≦ XXX < $10^3$. The A and B contact functions can be specified as follows:
(AND)   (AND NOT)
The enable condition is thus a function of the R, A, and B conditions. R may be normal or inverted, DC or AC.

OUTPUT CONDITIONS:

K (error) is true if (C)+L>399
D (enable) is true when R and A and B are true.

TIMING:

Solved each sweep

TABLE 7HH

| STATEMENT: | COUNT, REF TIMER | (1.0 sec.) (0.1 sec.) (0.01 sec.) | LOCAL |
|---|---|---|---|

OPERATION:

1. When reset condition is true, 0→C.
2. When reset condition is False and count condition is True:
   2a. If C<B, C + 1→C
   2b. If C≧B, 0→C
3. When reset condition is false and count condition is False, C is not modified.

RESTRICTIONS:

B and C are in BCD; 0 ≦ B, C < $10^4$
DC reference should be chosen with T=1.0, 0.1, or 0.01.

INPUT CONDITIONS:

R and A refer to D, E, K, or SXXX; where 0 ≦XXX < $10^3$ (BCD) A or NOT A may be selected as reset condition. R may be normal or inverted, DC or AC. R and T is count condition. If type selected is R, T is always True. If type selected is 1.0, 0.1, or 0.01, T is True for one sweep every 1.0, 0.1, or 0.01 second respectively. (Accuracy is 0.1%±½T± 10msec). (DC reference should be selected).

OUTPUT CONDITIONS:

K (count output) is true when C ≧ B
D (data ready) is true when count is true

TABLE 7II

| STATEMENT: | COUNT, REF. TIMER | REMOTE |
|---|---|---|
| | (1.0 sec) | |

TABLE 7II-continued (0.1 sec)
(0.01 sec)

OPERATION:

1. When Reset is true 0→(C)$_{cm}$.
2. When Reset is false and count is true data areas of lines B and C are compared.
   2a. If (C)$_{CM}$ < (B), (C)$_{CM}$+ 1→(C)$_{cm}$ - Data area of line C is incremented per its modulus.
   2b. If (C)$_{CM}$ > (B), 0→(C)$_{cm}$ - Data area of line C is cleared.
3. When reset is false and count is false (C)$_{cm}$ is not modified.
4. Line B is in CM, I/O or DM. Line C is in CM.

RESTRICTIONS:

B and C are in BCD: 0 ≦ B < $10^4$ and 0 ≦ C < $10^3$.
(B) and (C) decimal values are used. If line C is a statement and (B) ≧$10^4$(BCD) or if line C is ASCII, F1 or F2 datum and (B) > $10^8$ count will
not reach preset, but will return to zero at line C modulus.
K will be false.

INPUT CONDITIONS:

R and A refer to D-, E-, K-, or SXXX where SXXX≦$10^3$ (BCD). A or A may be selected as reset condition. R may be normal or inverted, DC or AC. [R and T] is count condition. If type selected is Reference, T is always true. If type selected is 1.0, 0.1 or 0.01 sec T is true for one sweep (DC R Ref should be used) every 1.0, 0.1 or 0.01 second respectively. [Accuracy is 0.1%±½T±5msec]. An R transition (AC ref) is held until T-event occurs.

OUTPUT CONDITIONS:

K (count output) is true when C >(B).
D (data ready) is true when R is true.

TABLE 7JJ

STATEMENT: UP/DOWN COUNT LOCAL

OPERATION:

1. When reset condition is true, 0 → C.
2. If R is true and A is true and C< 9999, then C + 1 → C and 0 → KOIL; otherwise C = 9999 and KOIL is on.
3. If R is true and A is false and C > 0, then C−1 → C and 0 → KOIL; otherwise C = 0 and the koil is on.
4. When reset condition and R are false, C is not modified.

RESTRICTIONS:

C is in BCD; 0 ≦ C < $10^4$

INPUT CONDITIONS:

R = D, E, S, or K XXX, normal or inverted, AC or DC;
A, B = D, E, S, or KXXX, normal or inverted, where 0≦XXX≦$10^3$.

OUTPUT CONDITIONS:

K (data out of limits) is true if the count either overflows (≧$10^4$) or underflows (<0).
D (data ready) is true if R is true.

TIMING:

One (1) sweep.

TABLE 7KK

STATEMENT: UP/DOWN COUNT REMOTE

OPERATION:

1. When reset condition is true, 0 → (C).
2. If R is true and A is true and (C) < capacity of line C's data area modulus, (C) + 1 → (C) and 0 → koil; otherwise koil is on and (C) is not modified.
3. If R is true and A is true and (C)> 0, then (C) − 1 and 0→ koil; otherwise koil is on and (C) is not modified.
4. When R and B are false, (C) is not modified.

RESTRICTIONS:

C is in BCD; 0 ≦ C < $10^3$.

INPUT CONDITIONS:

R = D, E, S, or KXXX, normal or inverted, AC or DC;
A, B, = D, E, S, or KXXX, normal or inverted, where 0 ≦ XXX ≦ $10^3$.

OUTPUT CONDITIONS:

K (data out of limits) is true if the count either overflows (function of modulus of C) or underflows (<0)
D (data ready) is true if R is true.

TIMING:

TABLE 7KK-continued

STATEMENT: UP/DOWN COUNT REMOTE

One (1) sweep.

TABLE 7LL

STATEMENT: BIT MANIPULATE LOCAL

OPERATION:

1. The state of bit number C in Line B will be transferred into the koil.
2. When R is true bit number C in Line B will follow the A contact.
3. If R is true and A is true, a 1 will be put into bit number C in Line B.
4. If R is true and A is false, a 0 will be put into bit number C in Line B.

RESTRICTIONS:

C is in BCD: $0 \leq C \leq 63$
Line B is in CM, I/O or DM

INPUT CONDITIONS:

R = D, E, S, or KXXX, normal or inverted, AC or DC;
A = D, E, S, or KXXX, normal or inverted, where
$0 \leq XXX < 10^3$

OUTPUT CONDITIONS:

K (result) is true if Line B bit C (before any modification) is a "1", otherwise K is false.
D (ready) is true when R is true.

TIMING:

One (1) sweep.

TABLE 7MM

STATEMENT: BIT MANIPULATE REMOTE

OPERATION:

1. The state of bit number (C) in Line (B) will be transferred into the koil.
2. When R is true and A is true, bit number (C) in Line (B) will be set to a "1".
3. When R is true and A is false, bit number (C) in Line (B) will be cleared to a "0".

RESTRICTIONS:

B, C are in BCD: $0 \leq C < 10^3$, $0 \leq B < 10^4$

INPUT CONDITIONS:

R = D, E, S, or KXXX, normal or inverted, AC or DC.
A = D, E, S, or KXXX, normal or inverted, where
$0 \leq XXX < 10^3$.

OUTPUT CONDITIONS:

K (result) is true if Line (B)bit number (C) (before any modification due to R = 1) is a "1", otherwise K is false.
D (ready) is true when R is true.

TIMING:

One (1) sweep.

TABLE 7NN

STATEMENT: BIT MATCH LOCAL

OPERATION:

1. When R is true and K is false, each bit in Line B and Line A are sequentially compared starting with bit number C.
2. If R is true and K is true, each bit in Line B and Line A are sequentially compared starting with bit number C + 1.
3. If a miscompare is detected, C will be set to the bit number which does not compare and the koil will be turned on and processing of this line is temporarily terminated (till next scan in which R is true - i.e., miscompares result in a multi-sweep statement).
4. After the last bit (63) has been compared, the koil will be turned off and D will be turned on, and C = 0.

RESTRICTIONS:

A, B, and C are in BCD: $0 \leq A < 10^3$ (CM only)
$0 \leq B < 10^4$ (CM, I/O or DM)
$0 \leq C < 63$

INPUT CONDITIONS:

R = D, E, K or SXXX, normal or inverted, AC or DC where
$0 \leq XXX < 10^3$ (BCD).

TABLE 7NN-continued

STATEMENT: BIT MATCH LOCAL

OUTPUT CONDITIONS:

K (bit miscompare) is true if a mismatch is detected, otherwise K is false.
D (match done) is true if R is true and after bit 63 has been compared; (for one scan).

TIMING:

Multi-sweep: 64 sweeps maximum (no two bits compare); 1 sweep minimum (all bits compare).

TABLE 7OO

STATEMENT: BIT MATCH REMOTE

OPERATION:

1. When R is true and K is false, each bit in Line B and Line A are sequentially compared starting with bit number (C).
2. If R is true and K is true, each bit in Line B and Line A are sequentially compared starting with bit number (C) + 1.
3. If a miscompare is detected, (C) will be set to the bit number (BCD) which does not compare and the koil will be turned on and processing of this line is temporarily terminated (till next scan in which R is true - i.e. miscompares result in a multi-sweep statement).
4. After the last bit (63) has been compared, the koil will be turned off and D will be turned on and (C) = 0.

RESTRICTIONS:

A, B, and C are in BCD: $0 \leq A, C < 10^3$ (CM only)
$0 \leq (B) < 10^4$ (CM, I/O or DM)
$0 \leq (C) \leq 63$

INPUT CONDITIONS:

R = D, E, K or SXXX, normal or inverted, AC or DC where
$0 \leq XXX < 10^3$ (BCD).

OUTPUT CONDITIONS:

K (bit miscompare) is true if a mismatch is detected, otherwise K is false.
D (match done) is true if R is true and after bit 63 has been compared, (for one scan).

TIMING:

Multi-sweep: 64 sweeps maximum (no two bits compare); 1 sweep minimum (all bits compare).

TABLE 7PP

STATEMENT: SHIFT LOCAL

OPERATION:

1. When R is true and the A node output is true:
(a) The state of the B-node will be shifted into the MSB of C.
(b) C will be shifted one position to the right.
(c) The LSB of C will be shifted into the koil bit

| | Data In | $C_{100}$ (Hex) | $K_{100}$ |
|---|---|---|---|
| Sweep N-1: | 0 | 1022 | 0 |
| N: | 0 | 0811 | 0 |
| N+1: | 1 | 8408 | 1 |
| N+2: | 0 | 4204 | 0 |

2. When R is true and A is false:
(a) The MSB of C will be transformed into the koil condition.
(b) C will then be shifted one position to the left.
(c) The state of the B-Node will then be shifted into the LSB of C.

RESTRICTIONS:

C shall be binary datum: $0 \leq C \leq FFFF$ (Hexadecimal)

INPUT CONDITIONS:

R = D, E, S, or KXXX, normal or inverted, AC or DC.
A, B = D, E, S, or KXXX, normal or inverted, where
$0 \leq XXX < 10^3$ (BCD).

OUTPUT CONDITIONS:

K (data out) is true if the LSB (MSB) of C is true,
B is true and A is true (False).
D (data ready) is true if R is true.

TIMING:

TABLE 7PP-continued

STATEMENT: SHIFT LOCAL

One (1) sweep.

TABLE 7QQ

STATEMENT: SHIFT REMOTE

OPERATION:

1. When R is true and A is true:
   (a) The LSB of Line C will be shifted into the koil bits.
   (b) Line C will be shifted one bit to the right.
   (c) The state of the B-node will replace the MSB of Line C.
2. When R is true and A is false:
   (a) The MSB of Line C will be shifted into the koil bit.
   (b) Line C will be shifted one bit to the left.
   (c) The state of the B-node will replace the LSB of Line C.

RESTRICTIONS:

Line C is in CM: $0 \leq C < 10^3$ (BCD).

INPUT CONDITIONS:

R = D, E, S, or KXXX, normal or inverted, AC or DC;
A, B = D, E, S or KXXX, normal or inverted, where
$0 \leq XXX < 10^3$ (BCD).

OUTPUT CONDITIONS:

K (data out) is true if the LSB (MSB) of Line C is true and A is true (false).
D (data ready) is true if R is true.

TIMING:

One (1) sweep.

TABLE 7RR

STATEMENT: LOGIC

OPERATION:

When the logic function formed by contacts R, A, B, C (result) is true, K is true.

INPUT CONDITIONS:

R, A, B, or C may refer to D-, E-, K or SXXX where XXX is in BCD; $0 < XXX < 10^3$.

CONTACT SPECIFICATION:

A, B, or C may each be specified as follows:
    (AND),   (AND NOT),   (OR),   (OR NOT)
R may be normal   or inverted   ; Also DC (→) or AC (↑).

OUTPUT CONDITIONS:

K: (Coil) is true if result is true.
D: (Ready) is true when R is True.

DATUM: DIS, BCD, ASCII, DNS

TABLE 7SS

OPERATION:

1. Arithmetic, Data Transfer and Count Statements will convert the referenced datums as required: (see below and individual statements).
2. The DNS (Data No-Store) is used for output transformers (920–929) and for statement extension lines (Multiply, Divide). A DNS Datum can only be changed by a Line Transfer statement.

OUTPUT CONDITIONS:

K is false when Datum is processed.
D is false when Datum is processed.

CONVERSION RULES:

1. No conversion is required when operations involve datums of the same type.
2. DIS to BCD and BCD to DIS require no conversion.
3. DIS, BCD or DNS to ASCII.
   The least significant 32 (8 hex digits) bits of the DIS or BCD datum will be converted to 8 ASCII characters. See FIG. 16SSA
4. ASCII to BCD or DIS.
   The 8 ASCII characters will be converted to 8 BCD and/or DIS digits according to the least significant 4 bits of each ASCII character (see chart below). See FIG. 16SSB
5. STATEMENT to ASCII:
   The C-field of the Statement Line will be treated as

TABLE 7SS-continued four BCD digits and converted to 4 ASCII digits in the ASCII datum Line B as C fields with "NULLS" inserted into the ASCII datum Rad A fields. See FIG. 16SSC 6. STATEMENT to BCD or DIS:
   The C-field of the Statement Line will be treated as four BCD digits and transferred transparently to the C-field of the BCD or DIS datum line with the BCD or DIS Line R, P, and B fields set to zero. See FIG. 16SSD
7. ASCII to Statement
   The B and C fields of the ASCII Line will be converted to BCD (see conversion chart below) and placed, as 4 BCD digits into the C-field of the Statement Line. See FIG. 16SSE
8. BCD, DIS, or DNS to STATEMENT
   The C-field of the BCD, DIS or DNS Line will be transferred transparently to the C-field of the Statement Line:
9. LOGIC To Any Other Line Type
   If a LOGIC Line is used as a source data reference, the resultant value shall be "0". A Logic Line will remain unchanged if used as a destination data reference.

Operations such as integration, statistical calculation, message or recipe input or output, and program loading are all accomplished with the aid of these instructions. Since "line moves" can modify both instruction and condition data, caution is required to avoid operating on transformers or "active" lines since unpredictable behavior can result.

The "pack" statements provide data transfer in a data area of one line to a specifiable data area of a second line. The "unpack" statements provide data transfer from a specifiable data area of one line to a right justified data area of another line, with zero fill to the left of the data so transferred. The "FIFO" line provides for a first-in-first-out transfer of data.

Bit Orientated (FIGS. 16LL–16QQ, Tables 7LL–7QQ)

The bit test instructions are useful for condition referencing, code interpretation, and input/output "handshaking." They can be used to test any bit of any line within the command memory, data memory or I/O system. The "bit manipulate" remote statement allows external indexing of both the line number and bit position, permitting matrix and sequential state processes to be implemented. The "bit match" statements permit matching of a sequence of bits in two different lines.)

Count and Timer (FIGS. 16HH–16KK, Tables 7HH–7KK)

The count statement is capable of counting either discrete events or selectable timing signals. The ready (D) condition pulses whenever a signal is applied to the count input (regardless of the status of the reset input). When counting, the count value returns to zero if equality of preset and count has occurred. Note also that the preset value for a remote counter may be located anywhere in memory.

When timing (1.0, 0.1, 0.01 sec.) is selected, and an AC (transitional) reference is made, the occurrence of the timing event (tick) will not, in general, occur the same sweep as the detected reference transition; thus a count occurs. Only if the transition coincides with the tick, will the D-condition occur when the reference condition is true.

Time basis (ticks) for counter statements are generated by each command memory by counting scan cycles, since these cycles are exactly 10 milliseconds. The timing signals are generated in the GTCU 14, discussed more fully infra.

Suspend (FIGS. 16FF–16GG, Tables 7FF–7GG)

Suspend statements are unique in that they affect other lines in the command memory according to the relative position of the suspend statement with respect to these other lines. The suspend instruction suspends processing of a specified number of succeeding lines. Its influence will not extend beyond the end of the current scan (i.e., no wrap-around). It is generally used during program transfer.

Block Statements (FIGS. 16BB–16EE, Tables 7BB–7EE)

These statements sweep data into or out of a block of lines immediately following the line itself. In this respect, they resemble the suspend function. They are used primarily in high-speed program modification within a single scan. As with other program-moving statements, they must be used cautiously. Lines brought in while such a line is active are not themselve executed.

Logic (FIG. 16RR, Table RR)

The logic statement is functionally equivalent to an electrical relay ladder line as described in U.S. Pat. No. 3,686,639, incorporated herein, and presently used in commercial programmable controllers; e.g., the Model 084 and 184 of the Modicon Corporation, Andover, Mass. The R-node can make a static (DC) or transitional (AC) reference, and directly controls the ready (D) coil. All four term combinations of AND or OR expressions (with no parentheses) are possible.

Datum (FIGS. 16SS, 16SSA–16SSF, Tables 7SS, 8 and 9)

Basically, a datum only stores data; however, when located in the active area of command memory, it contains both a coil (K) and ready (D) condition bit. When a move in line or move out line instruction moves a datum into an active line, the coil bits of this line will be affected when the move occurs. References made to this coil are useful under certain circumstances in controlling data transfers within the PPC system. Tables 8 and 9 illustrate conversion from ASCII data to BCD or DIS and from hexadecimal to ASCII respectively.

TABLE 8

| ASCII to BCD or DIS Conversion Chart: | | | | | | |
|---|---|---|---|---|---|---|
| BCD DIGIT | ASCII CHARACTERS | | | | | |
| 0 ← | SP or | 0or | @ or | P or | | orP |
| 1 ← | ! | 1 | A | Q | a | q |
| 2 ← | " | 2 | B | R | b | r |
| 3 ← | # | 3 | C | S | c | s |
| 4 ← | $ | 4 | D | T | d | t |
| 5 ← | % | 5 | E | U | e | u |
| 6 ← | & | 6 | F | V | f | v |
| 7 ← | ' | 7 | G | W | g | w |
| 8 ← | ( | 8 | H | X | h | x |
| 9 ← | ) | 9 | I | Y | i | y |
| 2 ← | * | : | J | Z | j | z |
| 3 ← | + | ; | K | ( | k | { |
| 4 ← | , | < | L |   | l | l |
| 5 ← | – | = | M | ) | m | } |
| 6 ← | . | > | N | ↑ | n | ~ |
| 7 ← | / | ? | O | ← | o | DEL (RUB OUT) |

TABLE 9

| HEX (BCD, DIS, DNS) to ASCII Conversion Chart: | |
|---|---|
| HEX (BCD) DIGIT | ASCII CHARACTERS |
| 0 → | 0 |
| 1 → | 1 |
| 2 → | 2 |
| 3 → | 3 |
| 4 → | 4 |
| 5 → | 5 |
| 6 → | 6 |
| 7 → | 7 |
| 8 → | 8 |
| 9 → | 9 |
| A → | : |
| B → | ; |
| C → | < |
| D → | = |
| E → | > |
| F → | ? |

Statement Timing

To clarify the operation of single-scan, multiscan, and counting lines, timing diagrams FIGS. 17 through 20 give timing examples for these line types. All timing is quantized into 10 millisecond scan intervals. FIG. 18 shows that the processing logic is not sensitive to changes in the R field condition while the calculation is taking place. FIG. 20, an example of a counter operation, shows that the coil output is produced when the state specified by the B register is reached, and the C register is set to zero on the next counting cycle.

Rules for PPC Command Memory Programming

Condition References

The R register of any statement may be a D, E, K, or S reference. As best seen in FIGS. 10, 15A and 15C, the R register may refer to these references as normal static true 41, static false 43, false-to-true transition 45, or true-to-false transition 47. If, for example a static false state for a D reference is selected, the R register would activate (pass power) if the D condition of the referenced line was false.

For the A, B, or C register of a logic statement, the A or B register of a suspend statement; or the A register of a bit manipulate or move in block statement, the D, E, K, or S reference, true or false, AND or OR must be specified as shown in FIG. 15C (see discussion supra).

For the A register of a counter statement, the D, E, K, or S reference, and static true or static false selection must be specified.

Data Referencing Rules

Remote data references: Any B register remote data reference may be in the line number range 0000 to 9999. Other remote data references (A or C) must be in the line number range 0000 to 0999 (see FIG. 5).

Local data references: Data references made to statement lines by arithmetic, test, count, or data move statements will obtain (or write into) the C register of the referenced line. This data is in the line number range 0000 to 9999. Writing into the C register of a logic statement will be inhibited.

Line transfers: Data written by line transfer statements always replaces the entire line (80 bits) at the referenced line location.

Data formats: Any data referred to will be interpreted according to the format of the referenced line.

Reference numbers are as summarized in Table 10.

TABLE 10

User Address Summary

| | |
|---|---|
| N0000–N0199 | CMN, Active lines; N=0,1,2,—9 |
| N0200–N0239 | CMN, Scratchpad lines |
| N0900–N0903 | CMN, Stepper lines |
| N0910–N0913 | CMN, Input transformer lines |
| N0920–N0923 | CMN, Output transformer lines |
| ND000–ND239, ND900–ND939 | CMN, "Ready" conditions |
| NK000–NK239, NK900–NK939 | CMN, "Coil" conditions |
| NE000–NE063 | CMN, Input coils, Group 0 |
| NE064–NE127 | CMN, Input coils, Group 1 |
| NE128–NE191 | CMN, Input coils, Group 2 |
| NE192–NE255 | CMN, Input coils, Group 3 |
| NS000–NS099 | CMN, Stepper #0 states |
| NS100–NS199 | CMN, Stepper #1 states |
| NS200–NS299 | CMN, Stepper #2 states |
| NS300–NS399 | CMN, Stepper #2 states |
| 1000–1099 | I/O Unit input lines |
| 1100–1199, | I/O Unit output lines |
| 1200– | GTCU System status line |
| 1000–1039 | I/O memory #0 output lines |
| 1040–1079 | I/O memory #1 output lines |
| 1080–1099 | I/O memory #3 output lines |
| 1100–1139 | I/O memory #0 Input lines |
| 1140–1149 | I/O memory #1 input lines |
| 1180–1199 | I/O memory #2 input lines |
| 1200 | GTCU system status line |
| 1300–1339 | I/O memory #0 channel (0–3) and port new word status |
| 1340–1379 | I/O memory #1 channel (4–7) and port new word status |
| 1380–1399 | I/O memory #2 channel (8–9) and port new word status |
| 2000–5999 | Data Memory Low |
| 6000–9999 | Data Memory High |

Command Execution

When any line is moved by a line transfer statement into any command memory location, (line numbers 0000–0239, 0900–0939), its associated condition (D, K) bits are referenceable per Table 10. If moved into an active CM location (line numbers 0–99, non-suspended), execution of the line takes place in normal sweep sequence.

Command memory statement execution takes place when not affected by a previous "suspend" statement. If a multi-sweep statement (multiply, divide) is performing a calculation which has not completed when "suspend" occurs, its operation is suspended until the "suspend" condition no longer exists. All active CM lines (0–199, non-suspended) are processed in numerical sequence.

Programming and Loading the Command Memory

Word zero of I/O channel 0 is a control word produced by the programming panel 36 or a memory loader 37 specifying an action being requested by the panel or loader interface controller. If the selected command memory number coincides with that of the panel request, the service routine is activated. For this reason, it is necessary for the parallel processor 10 to have the ability to sense the identification thumbwheel 24 of the command memory module. Channel 0 information is also used to key a memory loading sequence in the event of power initialization (discussed infra).

Interaction With Program Loading Devices

As best seen in FIGS. 1 and 6, the command memory processor 52 is designed to recognize certain special commands at specified I/O channel 0, via an ASCII interface 21, at ports 0 and 1 (32) for interaction with the programming panel 36 and loading devices 37. As discussed more fully infra, the ASCII interface generates signals compatible with both the remote modem 30 and with external devices such as the programming panel or a teletypewriter 39 that utilize an ASCII signal format for the receipt and transfer of data. The set of instructions recognized includes: (1) stop the sweep; (2) transfer lines to and from the user memory 48; (3) change the enable, suspend, coil, and ready bits; (4) change the line contents; and (5) transfer lines to or from data memory or I/O memory (via the command memory processor). In general, such transfers occur at the maximum rate of one line per sweep (5 milliseconds). The memory loader or programming panel contains most of the "intelligence" required to implement the loading process. The set of special programming instructions described above is required in addition to the implementation of the PPC user statements, supra.

Auto-Load

Automatic loading of user program lines from data memory to command memories must be provided to give a PPC system stand-along start-up capability. Each command memory can have a switch-selectable automatic load option. When this option is selected, the power reset signal causes 200 lines to be loaded from a dedicated data memory into each command memory. Command memory 0 (see FIG. 1) loads from data memory lines 2000 through 2199; command memory 1 loads from data memory lines 2200 through 2399, etc. This technique assumes the use of a nonvolatile data memory. Each command memory can be individually selected for auto-load so that a system start-up involving some internally stored and some externally supplied programs may be implemented.

Command Memory Processing Schedule

Start of Scan

As best seen in FIGS. 6 and 21, a normal scan or processing of the 200 active CM lines (0–199) starts when a sync signal 88 from a GTCU sync bus 173 (discussed infra, see FIG. 38) is detected by the bus interface or controller 60. At this time, the processor is interrupted and forced to start a new sweep; thus maintaining positive system synchronism. Processing of the first line in memory now commences.

Line Processing

Instruction and reference registers are fetched to determine the status of a line. During initial processing, the address of any external data required to be read from the N-bus 16 is placed in an appropriate register in the bus interface. (Any "write" data, generated by a previous computation, required to be externally written via the N-bus is is also placed along with its address in a bus buffer 89 (see FIG. 6) prior to this time.) At a later time, the processor is signaled that the bus transfer has taken place, causing the requested read data to be available for further processing. Processing of the current line is now completed and the generated write data and address are placed in the bus interface buffer.

The processor is now ready to begin processing the next line. Note that even when no data exchange with the bus is required for a given line processing interval, synchronism with the bus is maintained by causing a "bus ready" condition 90 to be checked on every processing cycle.

Housekeeping

As best seen in FIGS. 21 and 40, after the 200th line has been processed, the CM processor 52 enters a "housekeeping" mode 91. During this period several once-per-scan operations are carried out. The status of certain words in I/O channel 0 are checked to determine if programming operations are required. It is at this time that the enable bit or the status bit of a disabled line is changed in response to a programming panel request. At this time the counter timer base references are updated, and a "watchdog timer" 92 is triggered in response to successful completion of a self-check routine.

Initialization

In case of power initialization 94, memory input and output transformers, and coils are all "cleared" to zero (95 and 96) so that predictable behavior results. (Zero line content is interpreted by the processor as a datum and no operation results). A second mode of startup is when a system has been externally reset 98 without loss of memory content. In this mode, mapping and coil areas of the memory are initialized and the sweep is started in housekeeping mode 91. System timing hardware (GTCU 14) must therefore insure the correct time relationship of the "power-up", "reset" and "sync" signals (discussed more fully infra).

Description of Hardware

FIG. 22 illustrates the configuration of the command memory processor 52.

Control ROM

The heart of the processor is a 32-bit wide control ROM 58, which stores both the micro-instructions required for each step of control operation and the constants and other data required by the program. Output bits of the control ROM are assigned to specific functions, such as transfer gating, incrementation, shifting, and control of the arithmetic element.

Scratchpad or Working Memory

A second major structure is a high-speed RAM and ROM array 54. The purpose of this scratchpad memory is to store partial results and to control information and constants used during high speed computation without requiring access to the somewhat slower line memory. Note that the address of the RAM portion 55 can be incremented in order to allow processing of word strings and that immediate addressing is available. Note also that either buffered or direct writing into the RAM is programmable.

Arithmetic Unit

An arithmetic logic unit (ALU) and shift unit 57 has binary, bit and decimal manipulation hardware capability in order to meet processing speed requirements.

Word Length

Since word length varies in multiples of 16 bits, a 16-bit ALU scratchpad and internal but (not shown) is employed. Similarly, the CM line memory 46 uses a 16-bit organization.

Line Memory

The main memory 46 stores the user lines and the scratchpad/stepper/transformer data. It is also required to store partial results of multiscan arithmetic operations ($\times$, $\div$). This full storage capability is required so that store management by the user is not required.

Bus Interface

A bus interface circuit 60 containing a small bus buffer 89 permits the processor to communicate with the N-bus 16 (discussed in detail infra). The bus and main line memories are addressed in common. Decimal line address selects one of the two memories.

Components

For acceptable processing rates, it is important that the processor cycle time approach 100 nanoseconds. A synchronous internal bus organization is also desirable for simplicity of manufacture and debug, for repeatability of performance, and for simplicity of control. The control ROM 58 is buffered so that variation in ROM access time will not affect control delay. All buffers and address register/counters are of the synchronous Schottky TTL type, such as the Texas Instrument 74S163. The control ROM is preferably fabricated from Schottky buffered bipolar ROM's with less than 50 nanosecond access time. The scratchpad RAM is preferably fabricated from a 256×1 Schottky-buffered type RAM. The ALU is preferably composed of a combination of the Texas Instrument 74S181 or equivalent binary ALU's and the Signetics or equivalent 82S82 BCD Adder/Subtractor. In addition, a Schottky multiplexer array is used for bit and byte high-speed shifting and processing operations. Alternatively, a high-speed programmed logic array (PLA) may be employed in order to reduce the ALU component count. The data bus is driven by Schottky multiplexers. The line memory uses 4K dynamic MOS RAM chips.

Data Memory Function

As best seen in FIGS. 1 and 23, the data memory (DM) module 18 is an optional base memory module which stores up to 4,000 lines of 80 bit words.

From 0 to 2 data memory modules can be utilized in the parallel process controller. Each card module has an address selector switch 100, which indicates the address range of data stored in the module. The data address ranges are 2,000–5,999 and 6,000–9,999. A memory protect feature (discussed infra) prevents unauthorized use of a DM by specific CM's. This feature utilizes a manually selected set of ten switches 102, (one shown) each of which authorizes a CM to write into the DM. Timing and control are provided by the N-bus 16. Lines stored in a data memory contain coil (K), ready (D), and other status bits, but these are static until the lines are transferred to a command memory module. Data memory stores both datum and statement lines. Statements will not be executed until they are transferred to a command memory active area.

Basic Architecture or Data Memory

Data is transmitted between command memories and data memories via the N-bus 16. As best seen in FIG. 40 and as discussed more fully later, a single bus timing cell 86 of 20 microseconds includes 10 time slots 87A dedicated to the ten command memories, and an eleventh time slot 87B for data memory refresh. During the first ten time slots, each command memory is allowed for one of these time slots to write a line into a data memory and read a line from data memory as required and authorized by the CM active line being executed. Thus CM0 is "on" the N-bus at time slot 1, CM 1 is "on" during time slot 2, etc.

The eleventh time slot 87B is left for the refreshing operation of the data memory. Certain types of data memory elements (dynamic RAMS) require periodic refreshing in order to maintain the integrity of the data stored within them. The data memory module contains the circuitry to perform this refresh operation.

Bus Interface

As discussed more fully later and as best seen in FIG. 24, the N-bus 16 consists of the control bus 104, a write bus 105 and read bus 106. The control bus delivers appropriate timing signals to all units of the system. The write bus is used for the data flow from the command memory units to the data memory units. The read bus is used for the data flow from the data memory units to the command memory units. The data on the write bus consists of the location to be written into, the location to be read, and the data to be written. Both the write and read bus are 16 bits wide. The 80 bit data is presented in time-multiplexed format as five 16-bit bytes.

Memory Protect

As best seen in FIGS. 23 and 24, the memory protect function prevents unauthorized modification of memory contents by a command memory. Ten two-position switches 102 are provided on the module: each switch corresponds to a certain command memory module and gives it permission to write into the data memory module:
1. Unprotected—All write requests from the CM module are accepted.
2. Protected—No write requests from the CM module are honored. Should an attempt to write occur, a protection violation indicator corresponding to the CM module is lit for 100 milliseconds. A manually resettable error indicator 109 (see FIG. 47A) remains flashing after any such violation. In either case, all read requests are accepted.

Over Temperature

As best seen in FIG. 24, a temperature sensor 107 communicates the over temperature condition 108 to the N-bus but does not affect operation of the memory.

Detailed Circuit

A detailed block diagram of the data memory with Mostek 4096P or equivalent MOS dynamic RAM as the memory element is shown in FIG. 24. A timing chart corresponding to this system is shown in FIG. 25.

As the timing diagram indicates, the read and write addresses are first presented via the write bus and stored in two address buffer registers. BCD 12 line to 10 line binary mapping is performed between the two buffers (to minimize propagation delay on address presentation). Read access now starts. If the selected address range of the module includes the bank corresponding to the read address most significant digit (MSB), chips are selected and transfer to the read bus is enabled when data is loaded into a read buffer. While read access is taking place, 16-bit bytes of the write data is loaded into the read buffer 110. While read access is taking place, 16-bit bytes of the write data continue to arrive on the write bus 105. When read is complete, write address is presented to the DM memory 112. Again the selected address range of the module is checked to determine if it includes the bank corresponding to write address MSB. If so, write authorization is checked. If writing is allowed, it takes place after write data has been allowed to settle. Note that write data settling time occurs during receipt of the next read and write addresses on the write bus. For dynamic RAMS, timing circuitry detects the appropriate refresh interval during each bus timing cell. Memory protect determination is made by allowing writing only during the bus cycle time slots corresponding to the unprotected CM switch settings.

Data Memory Hardware

Semiconductor Memory

The data memory preferably utilizes as its primary element a MOS dynamic RAM, such as the Mostek 40960. The memory chips preferably have a cycle time of about 500 ns. or less to satisfy the PPC requirements.

Volatility

The semiconductor memory presents a system problem of volatility of the stored data. Therefore, battery support is necessary to cover a short power interruption (in minutes). When full system shut down is unavoidable, other types of internal or external memory is used that are of a nonvolatile nature, such as core memories.

PROM Memory

For automatic loading at "hardened" installations, and to reduce cost in small systems where memory loading peripherals may not be feasible, the data memory may employ programmable read only memory (PROM) chip arrays.

I/O Channels

The I/O Channel Concept

As best seen in FIGS. 1 and 26, all input and output communication with the command memories takes place through directly-addressable data memory locations that have been permanently assigned to the input/output function. Thus, all input and output communications are directly available to all command memories. Command memory programs do not require any special instructions to prefrom I/O functions. The purpose of this section is to describe the means by which data is moved between this special region of data memory, hereafter referred to as I/O memory, and the remote terminal areas to and from which the data must actually flow. Within the parallel process controller this mechanism is referred to as an I/O channel. The PPC may have from a minimum of two to a maximum of 10 I/O channels.

Each I/O channel is permanently assigned to service 30 lines of I/O memory: 10 lines of input, 10 lines of output, and 10 lines of status data. FIG. 26 shows in simplified block form the internal or parallel process controller end of a typical I/O channel, channel 1 (27), with its associated I/O memory module 22. The associated memory locations are addressed, written into, and read from directly via the N-bus 16. Note that for memory line locations 1010 through 1019, the N-bus may read or write, and the channel modem may read only. For line locations 1110 through 1119, the N-bus may read only and the modem may write only. Line locations 1310 through 1319 contain status information pertaining to each input/output line pair of the channel. These locations may only be read by the N-bus and only written by the channel control logic. This is the pattern for addressing I/O memory for each of the I/O channels.

Address and control logic for this memory region is time-shared between the N-bus and a channel modem timing and control logic 114. Time sharing is based upon clock signals derived from the bus timing which interlaces access to the I/O memory between the N-bus and the I/O channel. Time shared access to a common memory is the only timing relationship that exists between the I/O channels and the internal PPC activity. In all other aspects, an I/O channel functions completely asynchronously to and independently of the PPC command memories and their programs.

An I/O channel consists of a local modem 31 within the main assembly enclosure 116 (see FIG. 2) of the parallel process controller, communicating over a full-duplex transmission medium 118 with a remote modem 30 (see FIG. 1) located up to several thousand feet away. The local modem acts as the master and the remote as the slave. By time-multiplexing, the two modems sequentially send and receive the data for all 20 lines of I/O to which the channel is assigned, completely refreshing the data images at both ends of the channel at least once every 10 milliseconds. Each I/O channel is thus an independent data processor which continuously moves data, without error, between two locations which may be widely separated. Each channel also maintains an error-free image of all the data at opposite ends of the channel. Under typical noise conditions, data is never more than 10 milliseconds obsolete.

Error-free transmission is a stand-alone capability of the channel. No internal error-checking is required of the command memories. This is accomplished by echoing all data transmissions and performing comparisons. When comparisons do not produce valid results, transmissions are repeated as required until valid results occur.

Thus the effect of a noise condition severe enough to produce transmission errors is to cause the rate of data refreshing across the affected channel to slow down, and in extreme cases even to halt. The noise however will not cause the channel to reproduce erroneous data at the modem interface. The modem hardware includes transceivers (local modem), a pair of full-duplex transmission cables 118, error-checking logic within the timing and control logic 114, a transmit buffer 119, a receive buffer 120, and an address and RAM control 121 common to all lines of data using that channel. Thus, if the modem is detecting errors, it does so independently of the line of data being sent. It makes no difference in the rate of total data sent whether the channel continues to try to send the same data until it succeeds or makes a finite number of tries before going on to the next line in the sequence. Thus I/O channels use the approach of sending the same data until successful. In an extreme case, such as shorted or open cable, the channel hangs indefinitely on the last data line being sent.

System Configuration

FIG. 27 illustrates the hardware units involved in the I/O system. An I/O memory such as I/O memory #0 (22 see also FIG. 1) contains a forty line output memory 122, a forty line input memory 124, and a forty line status memory 126. It thus has the capacity to service four local modems 31, each performing the serial data transmission/reception for one I/O channel. A minimum I/O memory module 22 is supplied with two local modems (channels 0 and 1) and may be optionally expanded to four (channels 2 and 3). The cable interfacing and driving function is performed by a filter unit 128. As best seen in FIGS. 1 and 29, filter unit number 0 (128A) processes I/O channels 0–3 while filter unit number 1 (128B) processes I/O channels 4–9. A filter unit has six sections 130 comprising pulse-width modulator/demodulator and isolated cable driver/receiver pairs plus cable termination and circuit protection equipment.

The I/O memory module addresses are specified by a 3-position selector 132. Module zero 22 services I/O channels 0–3, module one or A 23 services I/O channels 4–7, and module two or B 25 services I/O channels 8–9. FIG. 28 shows a fully implemented I/O system 20. Several other configurations are possible. For systems of any given size, the user has flexibility in making these assignments. For physical reasons, the filter units are located at either edge of the main assembly enclosure 116 (see FIG. 2).

System addresses for each I/O line are given in FIG. 29 with respect to I/O memories and channels.

Format and Bandwidth Considerations

The "black box" representation of the I/O channel appears at a time-shared (or multiplexed) length of bidirectional, 100-conductor ribbon cable that continuously scans all inputs and outputs and refreshes the imaged data at least once every 10 milliseconds. Data is presented to and received from the channel modems as a fully transparent, 80-bit wide, parallel word exactly as it appears in I/O memory. Where I/O data corresponds to a command memory program. It consists of five 16-bit registers of BCD code as described earlier with respect to the command memory module, and requires that all 80 bits be utilized. During normal system operation, the I/O field contains only 64 bits of actual data, corresponding to the R, A, B, & C register fields, although the I(instruction) field frequently contains essential status bits identifying the nature of the data. Hence, the I/O transfer over a channel always contains 80 bits, a number of which may be hard-wired at the I/O device to a constant value. It is never the concern of the I/O channel to know or care about the nature of data being sent or received, but only to faithfully reproduce it at the proper location within the allotted time.

There is a single exception to this rule: The I/O channel always signals the remote terminal devices, and sometimes the parallel processor controller, whenever a line of data is being sent for the first time. Because the I/O channels continuously reproduce images of data at opposite ends of the channel, there is no inherent way for the receiving device, either the PPC or a remote device, to distinguish between consecutive words of identical data. This "new word" information is generated for output data at the I/O memory by automatically setting a status "new word" bit to the "one" state whenever a command memory writes into that I/O memory location. This same bit is automatically cleared to zero whenever the I/O channel takes a word from the memory location for transmission. The "new word" bit is transmitted along with the data and is available as an output pulse at the remote modem.

For input data, a similar procedure must be implemented in the logic and memory of any peripheral device tied to a remote modem wherever it is necessary to signal "new word" status to the PPC, as for example from a keyboard or tape-reader input. "New input word" status is stored in I/O memory locations 1300 through 1399, along with the other channel status information according to the channel and line number of the data source.

The parallel data format for 10 lines each of output and input data are time-multiplexed through the I/O channel under the control of logic associated with the local modem. The local modem acts as the master and the remote modem as the slave. Data flow through a channel represents a continuous and sequential scan of all 10 lines of input and output independent of the activity level of any line, or whether or not particular lines are even in use. I/O channels are designed to accomplish a complete data refresh in 8 milliseconds (under noise-free conditions) independent of the channel loading. Thus, a PPC user need not be concerned with I/O timing relationships as a function of the quantity of devices connected to a remote channel. The design philosophy of the I/O is therefore in keeping with the PPC requirement that system performance be invariant from a minimum to a maximum system implementation.

The requirement for updating the entire I/O memory once every 8 milliseconds with complete error-checking of all transmission imposes specific bandwidth requirements on the I/O channel. As best seen in FIGS. 1 and 26, these channels operate over a full-duplex transmission medium in bit-serial mode. The transmission medium is a pair of CATV-type, shielded, twisted-pair, twin axial cables 118 operating in opposite directions between the local 31 and remote 30 modems. With full-duplex capability, data transmission and echo reception occur nearly simultaneously; thus, the time required to send and error check one line of data, assuming no errors are detected, is the time required to complete all necessary transmission of data.

To the 80-bit PPC line of data must be added a 16 bit header plus framing markers. The header contains data for demultiplexing to the proper output or input line, for control of mode at the remote modem, and for "new word" status. The framing markers synchronize and separate transmission bursts. Thus, a burst length of 128 bits for "output" mode (H0, H1) and 216 bits for "input" mode (H2, H3) yields 344 bits for one input/output line pair transmission not including four round trip transmission delays required for burst synchronization and error checking. Each channel must refresh 10 lines of output and 10 lines of input data at least every 8 milliseconds. The round trip delay is about 12 microseconds at 300 feet.; thus frequency equals $$\frac{10(344 + 4 \times 12 \times 10^{-6} \times \text{frequency})}{8 \times 10^{-3}}.$$

Solving for frequency yields $0.467 \times 10^6$ bits per second or approximately 0.5 Mhz. By using pulse width modulation, coding for the transmission channel requires a clock rate of 0.5 Mhz and a bandwidth of DC to greater than 1 Mhz. Table 11 and FIG. 30 summarize the above encoding and bandwidth considerations.

TABLE 11
CHANNEL DATA RATES & MINIMUM BANDWIDTH

H∅ word = 80 Bits plus 16 Control and 8 Framing Bits = 104 Bits
H1 word = 16 Control and 8 Framing Bits = 24 Bits
H2 word = 80 Bits plus 16 Control and 8 Framing Bits = 104 Bits
H3 word = 80 Bits plus 16 Control and 16 Framing Bits = 108 Bits
Channel sends 10 words and receives 10 words per $8 (10)^{-3}$ second scan cycle.
Each word required one complete round trip to verify good transmission.
Assume "Echo" has 12 μsec delay requiring (12 μsec × bit rate) extra bits per burst.

$$\leq 1/10 \times 8(10)^{-3} \text{ seconds}$$

$$\frac{344 + 48 \, \mu\text{sec} \times \text{bit rate}}{8 \times 10^{-4}} = \text{bit rate}$$

Assuming negligible delay, bit rate is $0.43 \times 10^6$ bits/sec.
Allowing for echo delay and a finite error rate, assume a maximum bit rate of $5(10)^6$ per second.
For PWM Encoding where
"0" = 0.66 microsecond    or < 1.0 microsecond
"1" = 1.32 microsecond    or > 1.0; < 2.0 microsecond
Frame Marker = 4.0 microsecond

Channel Specifications

The following is a list of requirements that the I/O channel preferably attains:

1. The channel operates in image mode. Specifically, it continuously scans ten data output locations in I/O memory and transmits the data contents to the remote modem where it is stored in corresponding memory locations of whatever peripheral device is connected to the remote modem. Time-sequentially it performs the same function in the opposite direction between the remote modem and 10 data input locations in I/O memory. It thus maintains at the remote location an up-to-date image of data output, and in the I/O memory a current record of the status of data originating at the remote terminal. Data transmission over the channel is fully transparent to all 80 bits of the PPC line of data, although a typical peripheral device will utilize only 1 to 64 bits of the available data space.

2. Each I/O channel continuously refreshes all 20 lines of I/O to which it is assigned, completely independent of the activity level or data content of the lines. The channel does not determine whether any or all lines of I/O data are in use by the remote terminal, but continuously images all of them. Thus, the performance of a channel is independent of the frequency at which it is loaded. Refresh time for an average noise environment is less than 10 milliseconds.

3. The channel functions completely independently of the command memories and command memory programs. It performs the functions of multi-plexing parallel data into the modems, serializing and encoding the data, full-duplex transmission and reception, decoding, bit-serial error-checking, serial to parallel conversion, and demultiplexing the data out of the modems.

4. The channel operates error-free in a hostile industrial environment. This means that the error probability is so low as to be acceptable to any industrial process control situation. Error-free operation is accomplished in part by echoing all transmissions and performing a bit-serial comparison of the echo return with the original data. One echo comparison by the local modem is required to confirm a good transmission of output data, and two consecutive identical data patterns are required for a good reception of input data. At the remote modem, an output data pattern with a proper bit pattern in the "header", or control block plus a proper "data valid" header are required before data is accepted for transfer to the modem output. At both the local and remote modem, data is assumed to be correct as received for transmission over the channel. A second identical transmission of input data is required by the local modem before input data is transferred to the input memory.

5. As best seen in FIG. 26, the I/O channels transmit and receive in full-duplex mode over a pair of shielded, twisted-pair, wide-bandwidth, CATV type of transmission cables 118 such as Belden type 8227 twinax, or equivalent. Cable length may be up to three thousand feet. The type of cable used is easily installed by plant electricians and requires no special connectors, tooling, or wiring techniques unfamiliar to electrician-level skills.

6. The channel modems operate in a master/slave relationship, the PPC end being the master and the remote modem the slave. All multiplexing and input/output sequencing of data flow is controlled by logic within the local modem. The corresponding mode of operation for the remote modem is controlled by decoding a 16 bit "header" block sent from the local modem at the beginning of transmission of every data burst.

7. The remote modem design is considered a basic part of the I/O channel hardware and provides a general-purpose interface to allow maximum versatility in connecting peripheral devices. The remote modem may be packaged as an integral part of the peripheral hardware such that direct connection of signals at standard logic levels and impedances will provide noise-free operation. Modem interface connections provide 80-bit input and output data busses, multiplexing and demultiplexing addresses and four bits comprising an "output data valid" pulse, an "input data request", "new word" flag output, and a "new word" flag input line. The modem provides storage for one full line of input and output data; specifically, that line currently being sent from and/or the line last received at the remote modem. The peripheral control logic provides all data and flag storage as required and performs the multiplexing and de-multiplexing functions. Data output from the modem is valid at the time of "output data valid" as is the corresponding output address bits. Data on the input bus must be loaded into the input buffer during the time of the 40 microsecond input data request signal and at least to its trailing edge using the data input line number lines prior to selecting the input data. The data input line number is valid at least 10 microseconds prior to the leading edge of this request pulse. The "new word" output signal from the modem signals the first time that a new line of data is transmitted from I/O memory. It is made available for use by those types of terminal devices that must distinguish between consecutive data output events, such as printers or data storage devices. The signal is asserted for the duration of time that the word is first presented to the modem output. A "new word" input line is made available for use by data input terminals such as keyboards and data memory devices where it is necessary to distinguish between consecutive, and frequently identical, data events. When asserted along with input data, it causes the "new word" status bit for that line and channel, available to command memories in I/O memory address space 1300 through 1399, to be asserted for one full scan of the command memories.

Operating Modes & Timing

Each of the I/O channels has five states of operation corresponding to data output, data output verify, data input, data input verity, and memory exchange. FIG. 31 and Table 12 depict these states in terms of the signals present on the transmission lines as a function of time. The local modem controls the sequence of operations, selects the address of data lines to be transmitted, and alternately switches the channel between send and receive modes of operation.

Each mode of operation is initiated at the local modem by sending a "word sync" (or framing gap) code followed by a "header" block of 16 bits which is then decoded by the remote modem as shown in Table 13 (the most significant bit is transmitted first).

TABLE 12

I/O Channel Timing

TS0: LM sends header type 0 with output new word bit and data header (output mode). RM echoes all data, saves data and output line #, clears data out good.
TS1: LM sends header type 1; RM decodes header (verify Mode), stores input line # and sets data out good, and request new data in LM checks echoes.
TS2: LM sends header type 2 with data RM decodes header, clears request new data in, inserts input new word code into header echo, samples inputs data buffer and sends input data. LM stores new word bit and data.
TS3: LM sends header type 3 with data RM decode header, re-inserts new word code, re-samples input data buffer and sends input data. LM compares data and new word code with that received during TS2.
TS4: LM writes input data into Input Section of I/O memory, status and input new word bits into status section of I/O Memory and advances input line #. LM advances output line # and reads new output data from output section of line memory.

LM = Local Modem
RM = Remote Modem

TABLE 13

| Bits | Interpretation |
| --- | --- |
| 15–14 | Sync Code (1∅) |
| 13–12 | Header Code (∅∅–11) |
| 11–8 | Line Number (∅∅∅∅–1∅∅1) |
| 7–6 | Header Check Code (Ones complement of header code) |
| 5–2 | Line Number Clock Code (Ones complement of line number) |
| 1 | New Word Bit |
| 0 | New Word Check Bit (Complement of new word bit) |

Assuming a data output mode (H∅) is initiated, the local modem assembles and sends a "header type" (H0) as best seen in FIG. 32. This "header type" simply defines that bits 13 and 12 are both zero followed by line address, check codes, and "new word" code, and follows the header with the 80-bit data word output. In response, the remote modem echos the data, and at the same time assembles the first 16 bits received into a shift register, decodes the header, and assembles the incoming data word into an 80-bit shift register. Meanwhile, with the delay due to the remote modem plus transmission line and local modem modulation and demodulation, the original header and data arrive back at the local modem where the entire transmission is error checked (in 16 bit bytes) against the original header and data.

Any detected error in either header or data causes the local modem to repeat the cycle. If no error is detected, the local modem enters the output verify state, changes the header to Type 1 (H1), adds input line number data (to be used later in state 2) and sends the new header. At the remote modem, the entire transmission is echoed back. The incoming header is decoded and, if no error is detected, the "data valid" signal is asserted at the remote modem output along with input and output line addresses and "new word" status as obtained from the header block. The data request line is also asserted, informing user equipment to load input data in preparation for the following input cycle.

The Type 1 header echo arrives back at the local modem and is error checked as before. It no error is detected, the modem assumes a successful transmission and advances to the next state. Detection of any error causes the modem control to return to the beginning phase and repeat the second output cycle (H1).

A data input cycle follows the output verify cycle. It is initiated at the local modem by assembling and transmitting a Header Type 2 (H2); followed by input line address (previously sent during state 1) with the new word bit set to zero (in data input mode, "new word" is originated at the remote modem). The local modem also transmits the 80 bit contents of its input buffer as arbitrary data. The remote modem decodes the header, samples the previously loaded line of data and transfers "new word" status from the input buffer into its transmit buffer while echoing back the first 14 bits of the header. It now transmits the input "new word" status code, and follows the header echo with 80 bits of data from its transmit buffer instead of echoing the incoming data.

At the local modem, the new word bit and following data are saved. The remote modem also negates the input request line so that no new data will be loaded into the input buffer. The local modem enters data input verify state, changes the header to Type 3 (H3) and sends it out followed again by the 80 bit contents of its input buffer. The remote modem detects the Type 3 header (H3), reloads the data input register, echos the header, inserts the sampled "new word" status bit code, and transmits the data buffer as before. The second echo of the header is checked for errors, and all following data is compared with the data saved from the previous transmission. If no errors are detected, the input data is transferred to the modem output buffer along with line address and "new word" status for demultiplexing to I/O memory; and the modem advances to the transfer state. During this state framing signals are transmitted. The I/O memory polls the local modems continuously, and performs the transfer during the N-bus "refresh time" 87B (FIG. 40) when a modem is in the transfer state, thus requesting service. One such transfer can be accomplished per N-bus line cycle (20 microseconds). "Framing" gaps, i.e. absence of clock transitions between data bursts are transmitted by modulators to maintain synchronism of demodulators with transmitted information. Header formats are summarized and detailed in FIG. 32.

Modem Operation

FIG. 33 shows a more detailed block diagram of the operation of the local 31 and remote 30 modems and demonstrates the implementation of operations described above. All channel activity is directed by the timing and control logic 114 (see also FIG. 26) of the local modem. The random-access nature of the I/O memory means that any I/O location is subject to access by the N-bus 16 in any of the ten 1.82 microsecond bus cycles. An I/O memory access may thus prevent access by a local modem.

However, since the channel refresh rate only requires a local modem to access I/O memory approximately once every 200 milliseconds and alternates between data output and data input, ample time is available for the local modem to access I/O memory during the data memory refresh time slot occurring once every 20 microseconds (see FIG. 40). This is accomplished by loading the transmit buffer 119 (see FIG. 26) of the local modem with the next line of data output during a data input channel cycle. Transfer of a new line of data input to I/O memory is accomplished during the first memory refresh cycle on the N-bus after the I/O channel enters a data output mode of operation (State 4). Assuming that the accessing I/O memory and data multiplexing are functioning as required at the local modem, the remaining hardware shown in FIG. 33 functions as follows:

The timing and control logic 114 initiates a data output cycle for line #n by assembling with header generator 135 the appropriate header block into a control output register 136 of the transmit buffer 119. This is a 16-bit shift register with parallel access input and output. Fourteen (14) bits of the header are derived directly from counters within the timing and control logic. The 14th and 15th bits form the "new word" status code which is brought in simultaneously with the data word. A word sync (or frame marker) is generated by a pulse width modulation modulator 138 by sending at least two pulse intervals of longer duration than the nominal clock interval of 2.0 microseconds. This is accomplished by blocking one or more clock pulses to the modulator. During word sync, the control header is loaded into a transmitter output shift register 140. The 80 bits of data are loaded in five 16 bit bytes each time the output register empties. Thus, immediately following word sync, the control header, followed by the data output, are serially shifted through the modulator and transmitted in pulse width modulated (PWM) code to the remote modem 30.

After channel and modem delay time, which is approximately 2 to 12 microseconds depending upon the length of transmission cable, the echo begins arriving back at the local modem 31 where it is demodulated by a pulse width demodulator 142 for both header block and data. The timing and control logic 114 detects word sync and causes a comparator 144 to error-check the return by first comparing the header with the contents in an input buffer 145. Shift pulses are derived from the demodulator-generated clock 146.

When in the data output mode, the echo data is not saved at the local modem 31. at the end of the echo return, if no error is detected, the local modem advances to "output verify" mode. When in this mode, the H1 header is sent by the local modem and echoed by the remote modem and another complete error check of the header is performed. If a valid header is received and decoded by the remote modem via a header decoding and control module 161 (see FIG. 33), the output valid line 151 is asserted and output line number is presented so that external demultiplexing circuitry can sample output data and output new word bits.

The remote modem also presents the input line number and asserts the input request line in preparation for the data input mode. If the local modem detects a valid echo, it advances to the data input mode.

While in the data input mode, the local modem sends the H2 header which is echoed by the remote modem. The remote modem, after checking and verifying the first 14 bits of the header loads into its input shift register 148 from an input buffer 149 and negates the input request line. The remote modem thus echoes the first 14 header bits and follows them with the input new word code. External equipment selects input data using the input line number information, and loads it into the input buffer during the time that the input request line is asserted. (Timing is such that the leading edge of the input request signal can be used directly to strobe the data.)

The local modem now transmits the contents of its input working buffer 150. The data is not echoed by the remote modem but the contents of its input shift register are transmitted. The data is received by the local modem and stored in the input working buffer without checking. (Input new word bits are also stored.) When the echo reception is complete, the local modem advances to the "input verify" mode.

In the "input verify" mode, the local modem sends the H3 header followed by the contents of its input working buffer 150. The remote modem once again echoes and checks the first 14 bits of the header and, if valid, samples the input buffer, inserts the input new word code, and re-transmits the 80 bits of input data. It should be noted that the input buffer must not be loaded when the input request is negated. The local modem checks the received header against the generated 14 bits and stored new word code. Next, the received data is compared by comparator 144 (in 16 bit bytes) with the contents of the input working buffer. If any byte does not compare, the incoming data is stored in the input working buffer in place of the original data and the input verify cycle is repeated. When the "input verify" cycle has been successfully completed, the local modem advances to the data transfer mode.

In data transfer mode, framing markers are transmitted by the local modem while it awaits sevice by the I/O memory. Since a queue of four modems can form and since one local modem can be serviced each 20 microseconds, the worst case service time is 80 microseconds. Each local modem is serviced ten times per I/O system sweep. During the 2 microsecond service time input data plus status are sent to the I/O memory and new output data is obtained from the I/O memory. If the N-bus has caused the corresponding output line to have been written since the previous transfer, the output new word bit is set. This bit is cleared when the transfer takes place. As best seen in FIG. 34, the status information transferred to the status memory includes most of the bits of the input header inserted into this data and the carrier loss and channel error bits. The channel error bit is asserted whenever an error is detected by the local modem. A "one-shot" multivibrator asserts the bit for a minimum of ten milliseconds so that it can be reliably sampled by any command memory.

The carrier loss bit is asserted whenever the PWM receiver clock 146 is absent.

The remote modem inverts and echoes all input data between detection of any leader error and the local modem does not interpret a noise burst error affecting both transmit and receive channels as a valid transmission. Header bit codes are time separated as well as code-separated to further reduce the possibility of burst error malfunction.

Remote Modem Application

As best seen in FIGS. 1, 26, 33 and 35, the remote modem 30 is a fundamental component of the parallel process controller 10 and is, in its basic form, a system building block for design engineers rather than industrial of plant engineers. It performs the function of converting transistor-transistor logic (TTL-level) data to and from the I/O channel transmission medium and performs logical housekeeping at the remote terminal location. Each peripheral device interfaced to a PPC system must have a logic interface designed specifically for it. As do general purpose computers, the PPC provides a general purpose I/O bus to which a wide variety of peripheral devices may be interfaced. One such peripheral device is the interfacing of a programmable controller 152, such as the type disclosed in U.S. Pat. No. 3,686,639 and the Models 084, 184 and 284 of the Modicon Corporation, Andover, Mass. In this configuration the parallel process controller 10 can provide supervisory control to one or more programmable controllers which in turn directly control a desired process. The parallel process controller-programmable controller combination forms a hierarchical system for the parallel control of extremely complex processes.

Alternatively, the programmable controllers can function as input/output data processors which multiplex data into a usable format for the programmable controller input/output interface modules 154 and local and remote modems 155 and 156. In this configuration, the I/O channel's data of the parallel process controller is converted into programmable controller bus format, thus giving access to all input/output equipment of the programmable controller and ultimately providing system capability for satellite processing, monitoring, and remote programming.

In addition, as best seen in FIGS. 1 and 35, a general-purpose ASCII interface 21 for direct connection to teletypewriters, telephone couplers, and similar data communication devices is provided. This device provides access for the programming panel 36 and memory loader units 27 when connected to channel zero 26. The ASCII interface unit provides eight ports 32 of ASCII data interchange, one common control port 33, and one general purpose 64 bit TTL input/output discrete port 35.

As best seen in FIG. 33, the remote modem contains signal-conditioning and isolation hardware 158 for the termination of a pair of full-duplex transmission cables 118 for one I/O channel. Between the two ends of the remote modem there is an RF-noise shield 160. Contained within the remote modem are LC noise filters, photo isolators, and a DC-to-DC converter (not shown) to completely isolate the transmission cable from the modem logic.

General Timing and Control Unit (GTCU)

General

The general timing and control unit (GTCU) 14 is the heart of the parallel process controller N-bus 16 system. As best seen in FIGS. 1 and 36, it performs three basic functions. First, it senses system DC voltages and controls current supplied by the power modules, as well as power supply and system startup and shutdown sequences. Secondly, it generates N-bus control signals which synchronize all N-bus data flow, maintain lock-step synchronism of the command memories, and inform all N-bus units of system power status. Thirdly, it responds to CM read commands as part of data memory address space (line 1200) so that explicit power system status can be sensed by command memory statements. The GTCU comprises three main modules, an N-bus timing and control module 161, a power regulation and control module 165, and a system status line 1200 memory 169. In addition, a status display 192 indicates the current condition of the power system status.

Theory of Operation

Power Regulation and Control Section

FIG. 37 shows the relationship of the GTCU 14 to other system hardware. An AC line monitor signal 162 and user remote reset request signal 163 originate from a line inlet filter unit 164, which also distributes AC power to fans and power modules. Each DC power module 166 has detection circuitry capable of driving the power module monitor "party line" bus 167 and provides (via a diode) pilot power via line 168 capable of operating system startup circuitry.

The GTCU 14 produces an oscillating power sync/enable bus signal via line 168 to all power modules to synchronize and control power delivery. In addition, power demand buses for each voltage are driven by the GTCU to regulate the DC voltages.

N-Bus Control Section

As best seen in FIG. 38, various signals are generated by the N-bus timing and control module 161 for N-bus 16 control. These are as follows:

(1) A master reset bus 170 is a fail-safe, high level (+12 V) discrete signal which asynchronously initializes and protects all devices on initial power-up or final power-down cycling.

(2) A power "OK" bus 171 is a logical startup and shutdown signal to all units to permit initialization and finalization of all units in a synchronous manner. This signal changes state only at the start of a line cycle and only when DC voltages are adequate for reliable operation.

(3) A clock bus 172 is the master timing strobe. All modules which sample and drive the data buses do so in reference to the trailing edge of this pulse.

(4) A sync bus 173 identifies the two time phases (out of every seven clock periods) during which N-bus units may sample time slot and line number information from the read bus 106 of N-bus 16. This signal synchronizes data exchange on the bus.

(5) An N-bus status word 175 occurs during the first of the two sync bus time phases. At this time, the GTCU 14 places a time slot identification code, plus other bus status information on the read bus 106. Bits 0–3 comprise the time slot code 176, identifying which of the ten command memories are authorized to exchange data with the bus during the succeeding bus cycle period. Code 1010 signifies refresh time to all data memories. Bit 4 is an "Index" 178, occurring only one line cycle out of each full system sweep (10 milliseconds). Bits 5–7 180 are bus status, allowing command memories to directly sense line fail, power fail and reset request information. These changes are only at "index" time. Bit 8 is an "odd cycle" bit 182, a time slot code extension bit allowing expansion to 20 command memories, or alternatively, 5 millisecond sweeps. This bit allows up to ten command memories to use the bus on every second bus cycle only.

(6) A line number word 184 is placed on the read bus during the second of the two sync bus 173 time phases. This is a four decimal digit number identifying the current line cycle being executed by the command memories. This number changes during the refresh time slot on each odd bus cycle and is at its final value when "index" 178 is asserted (see above). It is set to zero on the line cycle immediately following index.

The counting chain which generates the above signals is shown in FIG. 38. An oscillator 186 generates a clock frequency of 3.85 MHZ and seven time phases (T0–T6) during which a specific command memory drives the bus (described infra). The sync bus 173 is driven during time phase T4 and T5. During T4, the time slot code is placed on the read bus, and during T5, the line number code. A time state counter 188 generates the time state code 176 (0 to 10), a divide by two module 189 generates the odd cycle bit 182 (0 to 1), and a line counter 190 generates the line number 194 (0 to 249). The line counter also produces the "index" 178 once every 10 milliseconds. At the "index" period, time slot 10, odd cycle, and power status information is sampled into the status buffer.

System Status Memory Section

The system status memory section 169 is implemented similar to a data memory. The read address information is read from the write bus 105 at time phase T0 and, if address 1200 is selected, the I 38, R 40, A, B, and C 42 fields of the status word are gated onto the read bus 106 at time phases T6, T0, T1, T2, and T3 respectively (described more fully infra, in the N-bus description) respectively. FIG. 39 illustrates specific coding utilized.

Sequencing Functions

As best seen in FIGS. 36 and 38, the power regulation and control module 165 of GTCU 14 generates a power up sequence and a power down sequence via a shutdown timing chain 193 in response to line failure or to an auxiliary shutoff switch 195. Normally, when AC power fails, the power modules automatically revert to battery operation. The GTCU generates a power fail warning on status display 192 after a 10 second delay. Thus programmed action may be initiated on AC line failure and/or power fail warning. At one second following power fail warning, a power fail signal 197 is asserted, causing all units to synchronously shut down. One millisecond later, supplies are actually disabled, removing all load from the power modules. To avoid battery drain, the on/off switch initiates the shutdown cycle from the one second power fail warning point.

When error signals exceed certain limits, the power fail signal 197 and master reset bus 170 are asserted, forcing all circuitry to remain in reset/protect status.

A reset request signal 198 is a user-generated control signal operated by an auxiliary switch 199. Its purpose is to instruct the command memories to clear all simulated "relays" or coils 66. It does not cause loss of memory images, data processing or programming functions and is intended only as a user "master reset" function for certain applications.

Status Display Panel

The GTCU panel 192 indicates the following conditions:
1. Bus over temperature,
2. GTCU over temperature condition,
3. power fail signal status,
4. power fail warning signal status,
5. line fail signal status, and
6. power module fail signal status.

N-Bus

General

The N-bus is the sole data path between command memory processing modules and data memory and I/O devices within the parallel process controller. As illustrated in FIGS. 1 and 5, the N-bus 16 interconnects the ten command memories 12, two data memories 18, the three I/O memories 22, 23, and 25, and the GTCU 14. The command memories are time-multiplexed so that at any one time only one command memory has access to the N-bus 16. The I/O memories and data memories are always prepared to service the particular command memory which has control of the N-bus at any instant in time. Ten time intervals are sequentially assigned to each command memory, regardless of the command memory's use or presence, while an eleventh time interval is provided during every multiplexing cycle to allow those data memories having dynamic refresh requirements (such as dynamic MOS memories) to perform refresh operations.

Command Memory

As best seen in FIG. 6, the command memory 12 is interfaced to the N-bus 16 by means of a bus controller 60 incorporating a bus buffer 89. The bus controller senses the command memory number from the associated thumbwheel switch 24.

Utilizing this number and timing signals supplied on the N-bus by the GTCU 14, the bus controller 60 determines the correct time for the specific command memory to drive the N-bus 16.

Data Memory

As best seen in FIG. 23, the data memory connects to the N-bus 16. The data memory is a slave to the selected command memory. As explained earlier, the N-bus 16 consists of two data pathways, the write bus 105 and the read bus 106. The command memory sends both read and write addresses and write data on the write bus. The read address is compared with the data memory thumbwheel switch setting 100. If the specific data memory has been selected for reading, read information is placed on the read bus 106 during specified tim subintervals. At a later time, the write address is compared with the thumbwheel 100. If the data memory is selected for writing, data accumulated in the write buffer is written into the memory.

GTCU

As described earlier, and as best seen in FIGS. 36 and 38, the general timing and control unit 14 generates a clock bus signal 172, a sync bus signal 173, and initializing signals 170 and 171 on the control bus 104. It distributes time slot, power status, and line number data to command and data memories via the read bus 106. It also serves as a one line data memory for system status sensing.

Description

As best seen in FIGS. 1, 2, 37 and 40, the N-bus 16 is made up of three 16-bit impedance-controlled partylines, simplex data pathways 104, 105 and 106 terminated at both ends with bus terminators 200. The maximum length of these pathways is ten feet. Synchronizing of units and power-up cycle control is accomplished using signals generated by the special clock circuitry within the N-bus timing and control section 161 of the general timing and control unit 14 (see FIGS. 36 and 38). The N-bus consists of two impedance-controlled flat cables, each having twenty-five signal conductors and twenty-five signal return lines. It has connectors 202 positioned at each module station, up to a maximum of sixteen stations, for a maximum of ten command memory modules, two data memory modules, three I/O memory modules, and one GTCU module, and carries two end-termination assemblies 200. The N-bus length is preferably the same regardless of the size of the parallel process controller.

Theory of Operation

FIG. 40 illustrates the signals and timing associated with the N-bus 16. As best seen in FIGS. 38 and 40, the timing unit time slot 176 and line number codes 194 generate an "index" 178 occurring every 10 milliseconds, a sync pulse 173 every 1.82 microseconds, and a clock pulse 172 occurring every 260 nanoseconds.

Timing

As best seen in FIG. 38, a basic timing cell for one command memory access contains seven clock cycles 172. As explained earlier, a complete bus cycle multiplex interval timing cell 86 consists of eleven such 1.82 microsecond bus cells, one being assigned to each command memory and the eleventh for data memory refresh. Each command memory is synchronized to the bus cycle by comparing the time slot code from the GTCU 14 with its thumbwheel value during sync time. Thus a command memory operates within one of the available multiplex time cells. Within a given 40 microsecond interval, therefore, every command memory is allowed one bus read and one bus write access, and is required to process one user line. Since all the command memories operate with respect to the "index" 178 and sync 173 pulses, lines are processed in lock-step. Thus, if data generated by the solution of Line 1 in any command memory is deposited into a cell in a data memory, a reference to that cell by any Line 3 (or subsequent) statement in any other command memory retrieves this most recently calculated value of the data. Data can thus be parallel-processed by several command memories within a single scan cycle.

A system sweep consists of 500 bus cycles. The line number code 194 increments every second bus cycle.

An odd/even bit 182 is toggled every bus cycle and is presented to command memories along with time slot information. The command memories of the present PPC operate only during the ten odd bus cycles, leaving the 10 even cycles of every line time free for expansion. Note that such expansion may either be in the form of more command memories (up to 20) or faster sweep times (5 milliseconds).

The ten millisecond interval between "index" 178 signals is divided into an active period and a housekeeping period 91. During the active period the user lines are solved in each command memory. During the housekeeping interval, each command memory processor 52 (see FIG. 6) is free to perform certain once-per-scan functions, including communication with the programming panel 36 and loading devices 37. (see FIG. 1). Thus, of 250 command memory bus cycles available, 200 are used for lock-step synchronized access to data required for solution of user statements and the remaining 50 are available for the general use of the command memory. Data memories are also synchronized to the bus in order to determine the correct refresh cycle time. Each provides local counting circuitry using clock and sync signals.

Command Memory Interface

Details of the command memory bus interface are best seen in FIGS. 41A and 41B. A 16×16 bit RAM buffer 204 is used to store all of the required exchange information in 16-bit registers (13 words are required—see RAM location insert in FIG. 41A). This RAM is two-port and can be accessed by the command memory processor 52 when not involved in bus exchange activity. The timing of the loading and unloading of the RAM is best seen in FIG. 41B. A status register 205 allows the CM to determine the status of the bus interface; i.e. power status, index, etc.

Data Memory Interface

The data memory bus interface logic and timing is best seen in FIGS. 42A and 42B respectively. Since both the read and write addresses arrive on the write bus initially, the write address is held in a buffer 207 until required. Not shown in the figure is a decimal-to-binary mapping circuit which is utilized to address the RAM chips 208.

Circuit Considerations

Circuit and timing detail of the N-bus circuitry is best seen in FIGS. 43A, 43B, and 44. Each data pathway is carried on a controlled-impedance bus terminated at both ends as shown. In order to operate properly, high fan-out, high-speed drivers and high-impedance, high-speed receive circuitry is required.

Drive/Receive Circuits

Driver circuits 210, such as the American Micro Devices 26S12, capable of sinking terminator current are utilized. High impedance receivers 211, such as American Micro Devices 26S12 or the National DM8837 (Hex "uni-bus" receiver), which have built-in hysteresis and fast response are used for bus receiving.

Cable

Each control signal preferably carries a separate ground; however, data busses employ group grounds as required to achieve the desired settling time.

Timing

Since each interconnect module contains individual clock receivers and may be located at any physical location on the N-bus 16, clock and data skew must be accounted for. Maximum receiver transit times of 30 nanoseconds, bus settling time of 50 nanoseconds, and a resultant maximum clock skew of 50 nanoseconds occur. Thus, any unit placing data on an associated data bus is required to allow a 50 nanosecond minimum deskewing delay to allow other units on the bus an opportunity to reliably sample the associated data before it is changed by the module. With these assumptions, a worst case timing analysis (see FIG. 43B) of 227 nanoseconds can elapse between the arrival of the clock pulse at the driving unit and the appearance of the associated data at the receiving unit. Since the receiving unit is clocked at the end of the 260 nanosecond period, 33 nanoseconds remain for setup time plus clock jitter at the receiving register.

Power Supply System

As best seen in FIGS. 2, 37, and 50, the power supply system 34 comprises a series of power modules 284 for the generation of +5 VDC, +12 VDC and −12 VDC power for the remainder of the parallel process controller.

As seen in FIGS. 37 and 50, the AC power distribution emanates from the line inlet filter unit 164. This unit includes an inlet filter 285 for filtering incoming VAC power so as to minimize transient effects. An AC power indicator 286 shows a "POWER ON" condition. The AC distribution and circuit protect module 288 distribute AC power to service or utility outlets 289, to fan 228, and to the power supply system 34. A line sense indicator 290 shows proper AC power to the power supply system while line sense indicator 292 shows when a remote reset signal 293 is ON; that is, a remote 110 VAC or 220 VAC remote control signal is present.

The power supply system 34 comprises a voltage regulator transformer 295, and associated circuitry for generating a 48 VDC source of power on raw DC bus 296. A battery power backup system 19 incorporating a battery charger 236 and a battery pack 237 supply the 48 VDC to bus 296 during power failures. The battery pack consisting of four 20 ampere-hour rechargeable batteries is capable of providing sufficient DC power to drive the PPC for thirty seconds. The battery charging circuit 236 is of standard design providing constant current, constant voltage and "float charging" controls capable of sensing battery pack discharge for activating a standard charge-control circuitry.

The power supply system 34 also comprises a ±12 VDC DC to DC converter module 298 and a +5 VDC DC to DC converter module 300 for converting the 48 VDC power to the respective three direct current voltages. Two other +5 VDC converter modules 301 and 302 may be added to the power supply system if needed when a fully implement PPC is desired (up to 10 CMs, 2 DMs). The +5 volt converters may be operated in parallel in a bussed arrangement with load sharing between each converter. The outputs of these converters drive a DC distribution bus 303.

As best seen in FIGS. 2 and 37, the power supply system 34 is packaged in modules 166, some modules separately housing the rectifying circuitry and two converters while additional modules housing +5 VDC converters may be added.

Status Signal Requirements

As best seen in FIGS. 37 and 50, the power supply system 39 and line inlet filter unit 164 provide two types of status signals: wired connections to the GTCU 14 and visual status indication on various subsections of the power supply. The wired connections to the PPC allow programmed response to changes in power supply status. These signals reflect the general status of the power supply system and inlet power.

The first signal is an AC line monitor 162 which indicates when the AC line voltage is not suitable for continuous operation of the power supply. The user is then able to program appropriate delay and alarm functions.

A second signal 305 indicates a partial loss of capacity in the power supply system. When a portion of a power module shuts down, thereby reducing the reserve capacity of the power supply (without putting the outputs out of spec), a caution signal is generated. This creates a request for service or alarms the user that the reserve capacity built into the power supply has been used. A power fail signal indicates that the regulated outputs are about to go out of specification. When power is restored and all DC output voltages are stable, the power fail signal is cleared.

The visual status signals are to aid field and factory personnel during system troubleshooting. One group of indicators 306 on the power supply modules simply displays the status being transmitted to the GTCU. Each power module displays a go-no-go status. This allows a service person to quickly locate a faulty module, check its fuses, and if necessary replace it.

Packaging

Main Assembly Enclosure

As best seen in FIGS. 1, 45 and 46, the frame and outside package for the parallel process controller is designed to protect the CM, DM, I/O, GTCU and filter modules while operating in an industrial environment. The frame 116 is preferably constructed of aluminum sheet metal. When closed, there are no exposed switches, controls, displays or connectors. The frame and PPC within is thus a hard-hat system, capable of withstanding the abuse that industrial, in-plant equipment must suffer.

The internal arrangement of modules within the parallel process controller and frame 116 meet the following criteria:

(1) All modules are removable (and reinstallable) through a front access panel 213.
(2) All connections to modules are accessible from the front of the frame 116.
(3) There is no backplane wiring.
(4) Printed circuit card edge contacts (discussed infra) mate with cable connectors 202, not with mounted connectors.
(5) Connectors for the N-Bus 16 are identical, regardless of the module being interconnected.
(6) Connectors for power are identical, regardless of the module being interconnected.
(7) Unused module slots are undedicated. Any type of module may be added in any slot.
(8) Module slots 214 are used as mechanical guides for loosely guiding modules into position. Module slots are designed to automatically shut off the air flow when the module is removed.

The main assembly enclosure on housing 116 is best seen in FIGS. 2, 45 and 46. FIG. 45 illustrates the upper portion of the housing with the front access door removed. A plurality of frames 215 enclosing individual CM's, DM's, GTCU, I/O's and filter modules are in place within the housing 116. FIG. 46 illustrates a mounted frame 215 with cable interconnections, heat dissipation and air flow equipment, busses, and shielding equipment.

Card frame modules 215 are removed by opening the front access door 213, pulling out the flat cable bus connectors 202, at the top of the module frame, pulling out the power connector 216 at the bottom front of the module frame, and drawing the frame forward out of the edge guides 214. Replacing a frame requires inserting the frame in the guides, pushing it back until it contacts the stops at the rear, and re-connecting the bus connector 202 and the power supply connector 215. When the front access door is closed, it provides a retaining strip that prevents the modules from vibrating or moving.

A command memory or data memory may be placed in any slot. All interconnecting cabling is identical in every slot. I/O expander card frame must be located in a slot not more than 10 slots from the end of the N-bus.

As best seen in FIGS. 1, 45, and 46, the main assembly enclosures or housing 116 contains the following hardware:

(1) card module frames 215,
(2) a signal bus 16,
(3) a power bus 167,
(4) a filter blower assembly 217,
(5) I/O connections,
(6) radio frequency interference (RFI) filters 219, and
(7) air circulating system 220.

Printed Circuit Card Packaging

As best seen in FIGS. 46, 47A and 47B, printed circuit cards 222 are employed to fabricate the various CM, DM, I/O, GTCU and filter modules. These cards are large (approximately 14"×22") and are single layer two-sided boards with plated-through holes. Each command memory is housed on a single card, as is each data memory. The basic I/O card contains 2 I/O channels (channels 0 and 1). Two additional I/O expander cards each contain the hardware for 4 additional I/O channels (channels 2-5 and 6-9). Two I/O filter cards will filter 6 channels each for a total of 10 channels and 2 spaces (filter units number 0 and 1—see FIG. 1).

Each card mounts approximately 150 integrated circuit (IC) chips. Each IC is allowed approximately two square inches of board space.

Each card is housed in an aluminum frame as best seen in FIGS. 47A, 47B, 48A, 48B and 48C. The frame edges are of extruded aluminum, and provision has been made for the card edge electrical contacts to project through the frame. A control and status display 223 incorporating the GTCU status display 192 (see FIG. 36) for the GTCU module and the DM error indicator 109 for DM modules, is mounted on a plate 224 and accessed through an aperture 225 in the front of the frame. The side panels 227, when installed, provide strength and rigidity to the card frame, as well as providing RFI-EMI shielding.

Cabling

Power Bus

As best seen in FIGS. 2 and 46, a solid copper laminated power bus 303 is used to distribute power to each of the modules. The voltage drops are minimal with such a bus. Individual pigtails and mate and lock-type connectors 216, such as those manufactured by the Amphenol Company, interconnect each module to the power bus. Each module may be individually disconnected for removal. Power for the power bus enters the main assembly enclosure at the bottom left hand side. Filtered AC power for fan 228 is brought up from the power supplies and terminated in a connector box in the base of the main assembly enclosure 116.

N-Bus

The N-bus 16 is a flexible flat cable with 50 signal lines. This bus permits structural flexibility of undedicated slots in the main assembly enclosure. A flat cable connector 202 similar to the 3M Company "stake-on" connectors is used to interconnect the bus to each module.

Main Assembly Enclosure Cooling

As best seen in FIGS. 46 and 47B, the card modules within the main assembly enclosure 116 must dissipate up to 2000 watts of power in a fully implemented parallel processor controller 10. While systems which contain fewer than the full number of modules produce proportionally less heat, the cooling conideration is based on the fully implemented system since each PPC can be expanded to the maximum configuration at any time. Two thousand watts of heat cannot be dissipated by conduction and convection alone in an enclosure as small as the main assembly enclosure. To insure that no damaging heat occurs, the PPC employs a fan 228 and a system of air chambers. FIG. 46 illustrates the location of the fan, an air intake chamber 230, an air distribution plenum 231, and an air exhaust chamber 232.

Air filters 216 are used at the air entry and exit points to screen dirt and airborne contaminants. Because filters become clogged and dirty and must be changed regularly, a temperature sensor with an over-temperature indicator on each P.C. board is monitored continuously. If a predetermined temperature is exceeded, an alarm (not shown) is activated to remind the operator to clean or change the filters.

Each printed circuit card 222 is conformally coated with a dense resin coating to prevent contaminants and corrosive fumes that may pass through the filters from damaging these cards and components placed thereon.

The air inlet and outlet are RFI shielded by RFI filters 219 to prevent the entry of unwanted RFI and electromagnetic interference (EMI).

The Cooling Fan

As best seen in FIGS. 2, 46, and 47B, the fan 228 draws air in at the bottom of the main assembly enclosure and forces it to flow through the card frames 215. The direction of air flow produces a positive pressure within the enclosure, so that any air entering the enclosure must do so through the air inlet filter 217.

RFI Shielding

As best seen in FIGS. 47A and 47B, the aluminum frames 215 which house the printed circuit cards 222 provide RFI shielding for these cards. The bus power lines are shielded by the outside main housing 216 and by baffling the I/O isolation filter cards. The air inlets and exits have RFI filters 219 associated with them.

As best seen in FIG. 49, the RFI shield 219 for input and output air comprises a plurality of rugged, finned extrusions 234 for providing this shielding function.

The I/O Card Frames

The I/O card module frames differ from the command memory and data memory card module frames in that they cannot be plugged randomly into any slot in the main assembly enclosure. While the physical appearance of the I/O card module frames matches that of the command and data memories, the need to provide RFI filtering from the outside shielded cables that bring signals from the remote modems dictates that the I/O filter, driver and receiver frame be located at one side of the main assembly enclosure. The left-most slots are therefore dedicated to this requirement.

The basic I/O card module frame that contains two channels of I/O as well as certain housekeeping and timing function, may be positioned in any slot.

Overview of Expansion

As best seen in FIGS. 1, 2, 95, and 92, increasing the size of the parallel process controller 10 is accomplished by simply adding pieces to a structure designed for expansion. This section considers (1) the functional implications in terms of the number of CM's, DM's and I/O modules added, and (2) the mechanical design features which allow expansion.

Increasing Controller Capability

The parallel process controller task is expressed in the line, and the simplest version of the process controller is capable of carrying out 200 lines of instruction repetitively. The PPC at its minimum consists of a single command memory 12, an I/O system with two I/O channels 26 and 27 (one I/O memory 22), and the attendant power supply. The addition of a programming panel 30 and an associated ASCII interface 21 to this basic system permits the preparation, monitoring, and operation of 200 lines of instruction. All 200 lines are executed every 10 milliseconds. There is limited memory space 50 within the command memory (see FIG. 6) available for the storage of 40 lines of information. These can be used as scratchpad or as stored reference data as the user desires; however, if larger data storage is required, additional memory must be added.

Expansion of the basic parallel process controller can occur in three different ways:

(1) Command memories (up to a total of ten) can be added in parallel. Each additional CM adds 200 lines of instruction capability to the basic machine. The scan rate (the rate at which all 200 lines of each CM are serviced) remains the same, once every 10 milliseconds except that 200×N lines will be scanned in 10 milliseconds (where N equals the number of CM's, up to 10). CM's do not communicate directly with each other.

(2) Data memories 18 (up to a total of two) can be added. Each DM adds 4000 lines of memory space to the parallel process controller. All DM lines are addressable by any CM.

(3) I/O channels (up to a total of ten) can be added, in increments of two with I/O memories, each supporting up to four I/O channels. Each channel adds 10 lines of input and 10 lines of output capability.

Mechanical Consideration of Expansion

The mechanical package of the parallel process controller consists of command memory modules, data memory modules, I/O modules, and an appropriate chassis 116 in which to mount them. The power supply is packaged similarly and consists of a number of power modules mounted in an open frame which provides mechanical support.

Each parallel processor module is packaged in a self-contained, free-standing, aluminum housing 215. These housings have provisions for connection to the N bus 16 and power bus 303 which are common to all modules. The modules are assembled side by side, making the bus interconnections straight forward. The module assembly is enclosed in an electrically shielded chassis 116 which provides forced-air cooling of the modules. The mechanical package is designed for simple, economical expansion of the PPC. The housing has a minimum number of connectors since the N bus interconnection is accomplished by a flexible daisy-chain which is mechanically separate from the housing. The simplicity of the housing makes it relatively inexpensive. It is both possible and economically feasible for a user to purchase a housing capable of accepting up to twenty modules, even though his immediate requirement is for only a single CM and the minimum I/O of two channels. Subsequently, when his needs increase, he can expand his processor by adding only those modules he needs. CM's, DM's, or additional I/O channels can be accommodated by adding the modules. Nothing (hardware or software) of his original system must be scrapped since each additional piece builds on his initial minimum system.

All bus connectors on all modules are identical, and all power supply connectors on all modules are identical.

Using the Parallel Process Controller I/O System and Programming Panel

Using the Parallel Process Controller I/O System

As discussed earlier and as best seen in FIGS. 1, 3, and 38, the parallel process controller input/output remote modem 30 multiplexes 10 input and 10 output lines. Each line accommodates 64 bits of data or conditions plus 16 bits of status and control. Each remote modem exists as a separate channel of information when coupled to a matching local modem 31 within the input/output system 20. There are a minimum of two and a maximum of ten such channels. The remote modems are hardened, hard-hat modules designed especially for industrial environment. Peripheral devices, including programming, display and monitoring panels 36 and memory loaders 37 communicate with the PPC 10 through interconnection to the first two ports 32 of channel zero only. Other peripherals, including CRT's, printers, analog to digital converters and programmable controller 156 can be interfaced through any other line of any channel. When interfaced with programmable controllers, the parallel process controller 10 can provide hierarchical parallel process control with interconnect capability to industrial devices now being controlled by programmable controllers.

Each I/O channel is designed to operate error free in typical industrial environments over distances of several thousand feet. Each channel is updated every eight milliseconds during normal electrical noise conditions.

Using the Programming Panel

As best seen in FIGS. 1 and 51, the programming panel 36 provides the controls and displays necessary to program, to monitor, to modify, and to test the performance of the parallel process controller. FIG. 51 illustrates the operating area of a programming panel.

Internally, the programming panel is an intelligent terminal with a central processing unit (CPU), memory, and ROM memory program. The principle of operation and implementation of the programming panel is set forth in U.S. Pat. No. 3,686,639, entitled "Digital Computer-Industrial Controller System and Apparatus", U.S. Pat. No. 3,930,233, entitled "Data Transfer and Manipulation Apparatus for Industrial Computer Controllers", and U.S. Pat. No. 3,944,984, entitled "Computer Controller System With a Reprogrammable Read-Only Memory", all assigned to Gould Inc., and all incorporated by reference. The '639 patent discloses operation and implementation of relay logic, the '233 patent discloses program and monitoring nonrelay logic, and the '984 patent discloses implementation and operation of the scroll and trace features discussed more fully infra. As best seen in FIG. 1, it is hardware interfaced to a remote ASCII interface 21 and operates through channel ∅, ASCII port zero. Communication between the programming panel and command memories 12 is controlled by special firmware within the command memories with which the programming panel has been programmed to interact.

Additionally, all of the interaction between panel switches and readouts is controlled by programs stored in ROM memory in the programming panel CPU. This programming panel functions like any other peripheral device; i.e., at remote locations up to several thousand feet away from the main assembly enclosure 116 (see FIG. 2). Each programming panel has a self-contained RS232-C asynchronous interface for communicating over an I/O channel capable of accepting ASCII data. Two external control devices may be connected to the system at one time. One for programming (port zero), and one for memory loading (port one). These devices must be wired to the ASCII interface 21 connected to I/O channel 0.

The programming panel 36 in one embodiment is a portable unit and in another embodiment is incorporated in a panel suitable for standard 19 inch rack mounting. As best seen in FIG. 52, the programming panel in a third embodiment can incorporate a CRT display 238. FIG. 51 illustrates a programming panel without a CRT display, utilizing a display panel 240 to visualize information.

The programming panel permits the user to:
(1) Enter the control programs. These can be logic lines, timer lines, counter lines, data transfer lines, test lines, calculate lines, and data transformation lines;
(2) Check out the entire control system. Each electrical element of the system to be controlled can be manipulated and monitored to determine its operating status; and
(3) Troubleshoot the machine or process. After the machine or the process has been initiated, the programming panel can be used to monitor the complete operation, and each of the steps can be traced by the panel's visual indicators.

Control programs are entered from the programming panel by entering instructions on selected lines of a chosen command memory's 200 user programmable lines 48 (see FIGS. 6 and 7). These lines can be created from conventional elementary ladder diagrams, or directly from the process flow block diagram. If programmed from ladder diagrams, each line of instruction contains an output which is activated by four control elements, the equivalent of relay contacts in the line. Each of these elements may be normally open or normally closed contacts connected in series or parallel configuration.

As explained earlier and as best seen in FIGS. 4, 9-16SS, and 51, there are five 16-bit registers in each eighty bit line. They are labeled instruction or I 38, reference or R 40, A, B, and C 42. The instruction register contents are shown by lighting the corresponding lighted instruction pushbutton 241 in the instruction display and D, K, suspend, disable pushbuttons 242-245 respectively of the programming group. The opcode is selected on keyboard 246 and displayed in composing register 248. The contents of the R, A, B and C registers are displayed directly in BCD or hexadecimal numbers in the logic line display 240. If the instruction register is programmed for relay logic, the programming panel is the functional equivalent of the programming panel described in U.S. Pat. No. 3,686,639. Lighted color bars (not shown) show power flow for logic lines. The contact references are displayed for each register as shown in FIGS. 51 and 52. If the instruction display indicates an instruction other than relay logic, then registers A, B, and C are used to store data (or the address of data) to be operated upon. The value of this data, or the address where data is to be obtained, is displayed on CRT display 238 or display panel 240. Display panel 240 also indicates if the number displayed is an address by denoting such as "Remote". The R or reference register display indicates the reference line number and the reference condition (D, E, S or K) selected.

Program changes are made by displaying the line to be changed and operating on it in the same manner as it was originally programmed. The programming panel may also be used to simply display the entire 200-line program stored in each command memory, line by line

Programming Panel Controls and Displays

As best seen in FIG. 51, a keylock switch 247 allows the user to display lines within the PPC and to operate or program any of these lines.

Entry Keypad

As best seen in FIG. 51, the entry keypad 246 allows the operator to key in the line number or input to be programmed and displayed on the programming panel. This line number is displayed in the "Line Number" region 250 of display panel 240. The entry keypad contains its own composing register 248 where the keyed-in number is stored until the LINE NUMBER switch 251 or one of the SELECTED REGISTER switches 252 is depressed.

The entry keypad remains a local key-and display area, with its own Clear Key 253, until one of the switches 251 or 252 is pressed. At that time, the number displayed is transferred to the Line Number register or the selected register. If the LINE NUMBER switch 251 is depressed, the three or four digit number in the composing register is transferred to the Line Number display 250, and that line is displayed. If a SELECTED REGISTER switch 252 is depressed, the number stored in the composing register is transferred to that register..

Line Number Display

The line number display of display panel 240 presents the complete information content of any line within any line of the parallel process controller. Properly instructed, it will fetch any line in any command memory, data memory, or I/O memory and display the entire contents of that line, including all condition references.

There are seven sections to the line number display.

THUMBWHEEL SWITCH—The thumbwheel switch 254 allows the operator to manually select the command memory to be displayed or programmed. It is a single lever with numbers from 0 to 9, corresponding to the command memories 0 to 9.

LINE NUMBER INDICATOR—The line number indicator 250 displays the memory location of the line being displayed (command memory, data memory or I/O) and the number of the line. If the line is from the command memory selected by the thumbwheel switch, the line number will have three digits. If the line is from data memory or the I/O, it will have four digits.

REFERENCE REGISTER—The reference register, or R register, is the first of four 4-digit, 16 bit registers that contain the line's information. It is generally a direct or transitional contact reference for the activation of the line upon the occurrence of a selected even related to a selected condition of a selected reference line.

A Register

The A register is the second 4-digit, 16 bit display. It is used exclusively as a direct reference (within the command memory). It cannot refer to lines in data memory or the I/O register. The information contained in the A register may be a contact reference, data (local), or it may be an address (remote) within the selected CM.

B Register

The B register is the third 4-digit, 16 bit display. It is used exclusively as a remote reference. It can refer to lines in command memory, data memory or the I/O system. The information in the register, when not a contact reference, is always an address.

C Register

The C register is the fourth, and last, 4-digit, 16 bit display. It can only refer to addresses within the command memory. The information within its register may be a contact reference, data (local), or an address (remote).

DISABLE CONTROL AND DISPLAY

The disable control switch 245 allows the operator to disable the coil and ready bits of the displayed line. A line may be enabled or disabled by depressing this lighted pushbutton. This feature is valuable during initial program debugging and troubleshooting. When a line is disabled, K and D conditions may be toggled by depressing the K and D display lighted pushbuttons 256 and 257.

SUSPEND CONTROL & DISPLAY

The suspend lighted pushbutton 244 ordinarily indicates when processing of a line has been suspended due to a suspend statement. A selected line may also be forced to suspend or to start processing by depressing the control. This feature is useful during reprogramming and debugging operations when references are to be changed.

TRACE CONTROLS

Trace control is accomplished by lighted pushbutton trace switches 259, one for each of the R, A, B, C registers, which allow the operator to transfer the line number referenced in each register to the line number display. The contents of the moved line will then be displayed. Thus as seen in FIG. 51, if the register A trace pushbutton is depressed, line number 4523 would be displayed in line number display 250 along with the display of the R, A, B, and C registers in the remainder of display panel 240. The previously displayed line number will be transferred to the composing register 248 and can be recalled by pressing the retrace switch 260. Up to four line numbers may be stacked in the composing register. They may be recalled sequentially, in reverse order by switch 260.

ELEMENT TYPE PUSHBUTTONS

The element type pushbuttons 262, 263, 264 and 265 provide the operator with the four contact types that can be placed in the R, A, B, and C registers of a logic line. The contact types are best seen in FIGS. 10A and 15C and correspond to the element type pushbuttons 262-265:

(1) normally open series contact 49,
(2) normally closed series contact 51,
(3) normally open parallel contact (A, B, C only) 53; and
(4) normally closed parallel contact (A, B, C only) 59.

The reference register may be set with pushbuttons 262, 263 and off-to-on transition 267 and on-to-off transition 268. As best seen in FIGS. 10 and 15A, these pushbuttons correspond to contact specifications 41, 43, 45 and 47 respectively.

Contact closures are entered into a line of logic by depressing the lighted pushbutton for the type to be entered, which causes only that specific pushbutton to remain lighted and flashing indicating ready by not entered; entering the appropriate reference number into the composing register; and then pressing the desired REGISTER SELECT pushbutton 252. The contact type and reference numbers are then both displayed in the selected register and all of the logic element type pushbuttons are off.

INSTRUCTIONS

A group of lighted pushbuttons 270 is utilized both to display the instruction for the line number currently being displayed, and to program a new instruction. The current instruction is indicated by a steady-state lighted condition of the appropriate pushbutton. If another pushbutton is pressed, its light will then alternately flash ON and OFF to indicate that it has been selected for entry. The operator then must select the element type and enter the reference number in the composing register. Pressing a reference register select pushbutton 252 causes all of this information to be entered into the line. The flashing instruction pushbutton 241 then becomes continuously ON and the previously lit pushbutton is turned OFF.

SCROLL SEARCH CONTROL AND DISPLAY

The scroll control switch 272 allows the programming panel operator to electronically rotate the complete 10,000 lines of memory accessible to a selected command memory through the line display 240. The scrolling switch is a bidirectional center-off switch. Holding the switch in either of the "+" or "−" positions causes the lines to "roll" through the display; much as mechanical roll chart rolls information by a reader.

The specific lines to be presented on the line display may be chosen by pushbutton switches 244 and 273, 274, 275, 276, 277 and 278 which accompany the scroll control. By selecting either the coil 273 or ready 274 pushbuttons with a line pushbutton 278, the scroll control displays only those lines which have the coil or ready in the true state. The disable pushbutton 275 causes only those lines which are disabled to be displayed. Pressing the "With Reference" pushbutton 276 and then operating the scroll control causes the display to refer sequentially to the reference register address of the line displayed, then to display the reference register address of that line and so forth. A memory stack keeps track of the path followed, so that the operator may return to the line of origin.

BIT DISPLAY

A bit pushbutton 277 allows any selected line to be displayed and modified as a 64 bit binary pattern. A cursor, controlled by the scroll switch 272 may be positioned over any individual bit to be modified. The entry display indicates which bit is selected. Depressing the T or F button of the keyboard 246 causes setting (T) or clearing (F) of the selected bit, and advances the cursor to the next position; thus allowing entry of arbitrary binary codes and display of discrete I/O information.

DATA DISPLAY

Datums are normally displayed as 16 hexadecimal digits if BCD or binary, or as eight alphanumeric characters if ASCII. The entire 7-bit ASCII set is displayed, using prefixes "  " to indicate "control" and "_" to indicate "Lower Case" zones.

As best seen in FIG. 52, the CRT embodiment of programming panel 36 incorporates eight command keys 280 to be utilized as general purpose command switches. Each key is labeled by a particular region 282 of the CRT display 238. Depending on the key selected, the keys 280 will represent additional programming data, as illustrated by region 282 of the CRT display. The CRT display for this region is driven by software within the programming panel. Thus, each key of command keys 280 represents a multiplicity of functions depending on the previously selected command keys. This programming panel key arrangement greatly reduces the number of keys necessary for implementing a desired program due to the multi-function representation of the command keys. Furthermore, additional commands can be added to an existing programming panel by simply adding to the software.

Programming Example

As best seen in FIGS. 53 through 56D, the programming of the parallel process controller to control a desired process is straight forward. As best seen in FIG.

53, here a desired process to be controlled is to automatically feed material 307 form a hopper 308 to a conveyor 309 through the use of a weighing hopper 310, to calculate the weight of material fed to the conveyor, and to store the calculated weight data. FIG. 53 and Table 15 also illustrate the first step in programming the PPC (supra, software description); that is, to describe the process.

Once the process is described, a ladder block diagram as best seen in FIGs. 54A–54C is prepared which illustrates in symbolic ladder diagram language of the steps involved in controlling the desired process. FIG. 55 illustrates the notations utilized in the ladder block diagram of FIGS. 54A–54C.

From the ladder block diagram, the industrial control engineer prepares the parallel process controller program for implementing the control process. This program is seen in FIGS. 56A–56D. Once this program is prepared, the connections between the I/O system 20 and the hopper 308, weighing hopper 310, and conveyor 309 are made and the PPC is programmed via the programming panel 36 (see FIGS. 1, 51 and 52). Debugging of the program is performed with the use of the programming panel, and once completed, the process may be fully controlled by the PPC.

TABLE 14

GLOSSARY

AC REFERENCE - An R-register condition reference made to the transition of a condition (coil).
ARITHMETIC STATEMENT - A statement which requires numerical calculation. (+, −, ×, ÷, <, =, etc.)
CHANNEL - The 2-way communication link between the I/O system of the parallel process controller and the outside world. One channel is capable of transmitting to and from the parallel process controller ten error-free lines of data every five milliseconds.
CHARACTER - A symbolic quantity expressed as a hexidecimal or 8-bit quantity with a data register.
COIL - A condition (K) indicating the status of a line. When line status is true, the coil is enabled. A coil is associated with each line in memory.
COMMAND MEMORY (CM) - A basic parallel process controller module containing a processor and 200 lines of memory
CONDITION - A discrete quantity (true or false) operated on by a CM.
CONDITION PREFERENCE - A quantity specifying a condition to be used by a statement within a command memory. In any statement, the R register is a condition reference and may refer to coil (K), ready (D), input (E), or stepper (S) conditions. In certain types of statements, the A, B, or C registers may also contain references to K or D, E or S conditions.
CONTACT SPECIFICATION - A logical operation command (in conjunction with a condition reference) in the A, B, or C fields of certain statements. Specifically, a series, shunt, normally open, or normally closed reference (and, or, nand, nor) defining a logical node.
COUNT STATEMENT - A statement which permits numerical accumulation of discrete events.
CRT - A cathode ray tube or more commonly a display terminal which contains a televsion type visual display.
DATA - Any quantity operated on by the parallel process controller. In a datum, the 64 bits formed by the R, A, B, and C registers In certain statements, data may be stored in the A, B, or C register.
DATA MANIPULATION STATEMENT - Arithmetic or move statement.
DATA MEMORY (DM) - An optional data base memory module storing 1000 lines of 80 bit words. From 0 to 2 such modules comprise a parallel process controller. Each occupies a single module position.
DATA REFERENCE - A quantity used to indicate the location of data.
DATUM - A line containing data. The I register specifies data format and coil. The combination of the R, A, B and C registers form a 64 bit quantity consisting of 16 bit digits, eight 8-bit characters or sixty-four 1-bit conditions.
DC REFERENCE - A static (non-transitional) condition reference.
DIGIT - A numeric quantity which has a decimally weighted value 0–9. Digits are expressed in BCD or ASCII.

TABLE 14-continued

GLOSSARY

DISABLE - A programming feature by which conditions associated with a line may be deactivated and controlled by a programming device. When a line is disabled, its accociated Coil (K) and Ready (D) conditions can be remotely controlled.
FULL DUPLEX - The communications technique employed between the local and remote modems in the I/O channel. Both modems can operate as transmitter and receiver simultaneously. Data flows in both directions at the same time.
HARDWARE - Permanent electrical circuitry which makes up an electronic system. Usually refers to the circuitry of a computer.
HARDWIRED - Similar to hardware but usually referring to programs which are a permanent part of the circuitry of a processor.
INPUT TRANSFORMERS - A group of 4 lines, in each command memory module which map the status of individual bits of words placed in these locations into input (E) conditions.
I/O CHANNEL - Three modules which handle such housekeeping tasks as timing and synchronizing and which pass data to and from all peripheral devices, through 10 channels. Each channel multiplexes 10 inputs and 10 output lines and each accomodates 64 bits of data or conditions plus 16 bits of status and control.
LINE - A location in memory. A line may be either a statement or a datum. A line contains 80 bits or 5 registers of 16 bits each.
MODEM - A device for transmitting or receiving information serially over a line.
MOVE STATEMENT - A statement capable of copying information between memory locations. (e.g. move in data, move out data, move in line, move out line statements)
N-BUS - A time-shared 50-wire bus that interconnects the CM's, DM's, and the I/O system.
NODE - A register (R, A, B or C) representing a contact specification and condition reference in a relay statement. Each node corresponds to a circuit node in an equivalent relay-ladder diagram.
OUTPUT TRANSFORMERS - A group of 4 lines in each command memory, each of which indicates the status of a set of 64 coil (K) bits corresponding to lines in the command memory.
PARALLEL PROCESSING - A method of peforming tasks in which several tasks are pursued at once. For a given type of machine, this is usually faster than serial processing where one task is completed before another is begun.
PERIPHERAL - A piece of electronic or electromechanical equipment external to the parallel process controller, such as a teletypewriter, printer, digital, voltmeter etc.
PROGRAMMING PANEL - A portable terminal used to gain access to the stored information in the parallel process controller in order to observe the operation, change the program, or input a new program.
READY - A condition (D) indicating the completion of exectution of a statement. Available within the command memory only.
REGISTER - A portion of a line containing 16 bits. A statement contains five registers I, R, A, B, and C. The I register specifies operation type and status. The R, A, B, and C registers each contain four digit references and/or data. A datum combines the R, A, B, and C registers into a 64 bit quantity, expressed as sixteen 4-bit or eight 8-bit characters or digits, or as sixty-four 1-bit conditions.
RELAY STATEMENT - A statement combining condition references in a four term logical function.
REMOTE DATA REFERENCE - A quantity indicating the location of a data reference.
RFI - Radio fequency interference, conducted or radiated electromagnetic energy capable of causing erratic operation. This can be caused by arcing of switch constacts, motors, static electricity and many similar noise sources.
SCRATCHPAD MEMORY - A small area of memory used for storing intermediate results.
SELF-CHECK - A technique for verifying integrity of data (lines) transmitted between local and remote modems in the I/O channel.
SERIAL PROCESSING - See parallel processing.
SOFTWARE - The programs required to direct the activities of a computer. Most computers must utilize a software package unique to each machine.
STATEMENT - A parallel process controller instruction which defines an operation to be carried out under control of conditon references.

TABLE 15

PROGRAMMING EXAMPLE

Operation (i) Select AUTO position on SELECTER 1, and AUTO, STOP lamps turn on.
(ii) Push START push-button-switch when starting conditons are satisfied, and OPERATION lamp turns on, STOP lamp turns off and the feeder begins to operate.
(iii) When the weight of material in the weighing-hopper is less than 90% of the set point, feed in high speed.
(iv) If it is not less than 90%, feed in low speed.
(v) When the weight reaches the set point, stop feeding from the hopper.
(vi) 2 seconds later, weigh the material in the weighing-hopper, store the datum, and, if the conveyor is in operation, open the gate of weighing hopper.
(vii) 5 seconds later, weigh the residue in the weighing-hopper, calculate the weight delivered to the conveyor, store the data and close the gate of weighing hopper.
(viii) Repeat steps iii through vii.
(ix) Push STOP push-button-switch, and STOP lamp turns on, but usually the system does not cease operation immediately.
(x) When STOP lamp is on and vii is finished, the system stops operation and OPERATION lamp turns off.
(xi) Push EMERGENCY STOP push-button-switch whenever any trouble occurs, and the system stops operation immediately. OPERATION, STOP lamps turning off.

It is assumed that the acquired data are stored consecutively for later use.

Thus what has been described is a parallel process controller, capable of controlling complex processes, which is expandable and programmable by the industrial control engineer having no computer programming experience. The controller incorporates an expandable number of command memory modules each solving user instruction lines in a parallel, time invariant, fashion; thereby maintaining uniform response time regardless of the complexity of the process under control.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A parallel process controller for communicating with and control of external devices, comprising:
   (A) at least one but not more than N central processing units, N being an integer greater than one, each central processing unit designated by one of a series of N sequential numbers;
   (B) an input/output system for communicating data to and from the parallel process controller and interconnected external devices;
   (C) a data bus interconnected between the input/output system and each central processing unit for the transferral of data to and from the input/output system and each central processing unit; and
   (D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing only said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;

whereby from one to N central processing units may comprise a portion of the parallel process controller without degrading the amount of time any of the central processing units may communicate with the input/output system.

2. A parallel process controller as defined in claim 1, wherein the general timing and control unit incorporates means for preventing the direct communication between said central processing units.

3. A parallel process controller for communicating with and control of external devices, comprising:
   (A) at least one but not more than N central processing units, N being an integer greater than one, each central processing unit designated by one of a series of N sequential numbers;
   (B) an input/output system for communicating data to and from the parallel process controller and interconnected external devices;
   (C) a data bus interconnected between the input/output system and each central processing unit for the transferral of data to and from the input/output system and each central processing unit; and
   (D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;

and further wherein each central processing unit contains M user lines, M being an integer greater than one, each user line defining either an instruction to be executed, said instruction capable of containing data to be acted upon or addresses where data can be retrieved, or said user line primarily defining data (datum line) to be acted upon, each central processing unit having means for repetitively sequentially executing at least a portion of the instruction represented by each of said M lines, only one of said M lines being executed during each of said first predetermined lengths of time generated by the general timing and control unit, said sequential executing means incorporating means for transferring data to and from the user line being executed and the input/output system when the general timing and control signal associated with the particular central processing unit allows for such transferral of data to and from the central processing unit and input/output system for said second predetermined length of time; whereby the number of lines of said M user lines for each central processing unit requiring execution does not degrade the amount of time for any particular user line to be executed by the central processing unit; whereby from one to N central processing units may comprise a portion of the parallel process controller without degrading the amount of time any of the central processing units may communicate with the input/output system.

4. A parallel process controller as defined in claim 3, wherein the user lines primarily defining data (datum lines) may contain data in one of a predetermined number of different data formats; and wherein the central processing unit user line executing means includes means for executing said user lines utilizing data in more than one format of said predetermined number of data formats.

5. A parallel process controller as defined in claim 4, wherein at least some of the data acted upon during the execution of said instruction user lines may be remotely located with respect to said instruction user lines, wherein at least a portion of the data stored in said instruction user lines represent the address of said remotely located data.

6. A parallel process controller as defined in claim 5, wherein at least some of said remotely located data may be located external to said particular central processing unit.

7. A parallel process controller as defined in claim 4, wherein said instruction lines represent at least one of the following:
(A) arithmetic statements including addition, subtraction, multiplication and division;
(B) data transfer statements; and
(C) logic statements.

8. A parallel process controller as defined in claim 4, wherein said instruction lines and datum lines have an invariant size.

9. A parallel process controller as defined in claim 8, wherein said instruction lines and datum lines have a predetermined number of registers.

10. A parallel process controller as defined in claim 9, wherein, for instruction lines, one of said registers represents the type of instruction the remainder of the registers represents.

11. A parallel process controller as defined in claim 10, wherein a second of said registers represents the circumstance under which active execution of said line is initiated by the central processing unit.

12. A parallel process controller as defined in claim 1, further comprising:
(E) at least one data memory module interconnected with said data bus for the storage of data.

13. A parallel process controller as defined in claim 12, wherein each central processing unit and each data memory module is housed in a separate frame.

14. A parallel process controller as defined in claim 13, further comprising:
(F) a main assembly enclosure incorporating a plurality of channels wherein any central processing unit and data memory module may be placed in any channel.

15. A parallel process controller as defined in claim 14, wherein the main assembly enclosure further comprises a positive pressurizable housing, an air plenum within said housing, and a fan within the housing for maintaining positive pressure within the housing.

16. A parallel process controller as defined in claim 12, wherein the general timing and control unit incorporates means for causing said control signals to further cause a particular central processing unit to communicate by the data bus with any of the data memory modules for the transferral and receipt of data.

17. A parallel process controller as defined in claim 16, wherein the general timing and control unit and data bus incorporate means for preventing the direct communication between said central processing units, whereby communication between said central processing units is achieveable by utilization of the data memory modules.

18. A parallel process controller as defined in claim 12, further comprising:
(F) a programming panel interconnectable with the input/output system incorporating first means for monitoring selected data within any of the central processing units, the data memory modules, the general timing and control unit, and the input/output system, and incorporating second means for altering at least some of the data within the central processing units and the data memory modules.

19. A parallel process controller for communicating with and control of external devices, comprising:
(A) at least one but not more than N central processing units, N being an integer greater than one, each central processing unit designated by one of a series of N sequential numbers;
(B) an input/output system for communicating data to and from the parallel process controller and interconnected external devices;
(C) a data bus interconnected between the input/output system and each central processing unit for the transferral of data to and from the input/output system and each central processing unit;
(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;

(E) at least one data memory module interconnected with said data bus for the storage of data; and (F) a programming panel interconnectable with the input/output system incorporating first means for monitoring selected data within any of the central processing units, the data memory modules, the general timing and control unit, and the input/output system, and incorporating second means for altering at least some of the data within the central processing units and the data memory modules;

and wherein each central processing unit sequentially scans M user lines; M being an integer greater than one, wherein said monitoring means further comprises scrolling means for sequentially monitoring consecutively higher or lower M user lines of any central processing unit; whereby from one to N central processing units may comprise a portion of the parallel process controller without degrading the amount of time any of the central processing units may communicate with the input/output system.

20. A parallel process controller as defined in claim 19, wherein the scroll switching means further incorporates means for sequentially monitoring higher or lower M user lines that have a selected one of a plurality of characteristics.

21. A parallel process controller for communicating with and control of external devices, comprising:

(A) at least one but not more than N central processing units, N being an integer greater than one, each central processing unit designated by one of a series of N sequential numbers;

(B) an input/output system for communicating data to and from the parallel process controller and interconnected external devices;

(C) a data bus interconnected between the input/output system and each central processing unit for the transferral of data to and from the input/output system and each central processing unit;

(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;

(E) at least one data memory module interconnected with said data bus for the storage of data; and (F) a programming panel interconnectable with the input/output system incorporating first means for monitoring selected data within any of the central processing units, the data memory modules, the general timing and control unit, and the input/output system, and incorporating second means for altering at least some of the data within the central processing units and the data memory modules;

and wherein each central processing unit contains M user lines, M being an integer greater than one, wherein said monitoring means further comprises trace means for monitoring user lines to which a presently monitored user line refers; whereby from one to N central processing units may comprise a portion of the parallel process controller without degrading the amount of time any of the central processing units may communicate with the input/output system.

22. A parallel process controller for communicating with and control of external devices, comprising:

(A) at least one but not more than N central processing units, N being an integer greater than one, each central processing unit designated by one of a series of N sequential numbers;

(B) an input/output system for communicating data to and from the parallel process controller and interconnected external devices;

(C) a data bus interconnected between the input/output system and each central processing unit for the transferral of data to and from the input/output system and each central processing unit;

(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;

(E) at least one data memory module interconnected with said data bus for the storage of data; and (F) a programming panel interconnectable with the input/output system incorporating first means for monitoring selected data within any of the central processing units, the data memory modules, the general timing and control unit, and the input/output system, and incorporating second means for altering at least some of the data within the central processing units and the data memory modules;

and wherein said central processing units, data memory modules, and input/output system store data in uniquely addressable lines wherein the monitoring means of the programming panel further comprises scrolling means for sequentially viewing consecutively higher or lower lines in any central processing unit, data memory module or input/output system; and whereby from one to N central processing units may comprise a portion of the parallel process controller without degrading the amount of time any of the central processing units may communicate with the input/output system.

23. A parallel process controller as defined in claim 18, wherein said programming panel further comprises a display panel interconnected with the monitoring and altering means for indicating to the user the monitored or altered data.

24. A parallel process controller as defined in claim 18, wherein said programming panel further comprises a cathode ray tube interconnected with the monitoring and altering means for indicating to the user the monitored or altered data.

25. A parallel process controller as defined in claim 1, wherein said input/output system incorporates at least one local modem and at least one remote modem that transfer data between each other asynchronously with respect to the remainder of the parallel process controller.

26. A parallel process controller for communicating with and control of external devices, comprising:
 (A) at least one but not more than N central processing units, N being an integer greater than one, each central processing unit designated by one f a series of N sequential numbers;
 (B) an input/output system for communicating data to and from the parallel process controller and interconnected external devices wherein said input/output system comprises:
  (1) at least one input/output memory interconnected to said data bus, for the storage of data as P input lines, and Q output lines, P and Q being positive integers; and
  (2) at least one input/output channel interconnected to said input/output memory for processing, isolating and receiving from interconnected external devices at least some of said P lines of data and the transferring to interconnected external devices at least some of the Q lines of data, said input/output channel incorporating:
   (a) a local modem having input means for processing, isolating and receiving at least some of said P lines of data and output means for the processing, isolating and transferring at least some of the Q lines of data;
   (b) a remote modem having output means for the processing, isolating and transferring data to the input means of the local modem from interconnected external devices; and input means for the receiving, processing and isolating data from the output means of the local modem and transferring said processed and isolated data to interconnected external devices; and
   (c) a data communication means interconnecting the input means of the local modem with the output means of the remote modem and interconnecting the output means of the local modem with the input means of the remote modem;
 (C) a data bus interconnected between the input/output system and each central processing unit for the transferral of data to and from the input/output system and each central processing unit; and
 (D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller;
whereby from one to N central processing units may comprise a portion of the parallel process controller without degrading the amount of time any of the central processing units may communicate with the input/output system.

27. A parallel process controller as defined in claim 26, wherein the local modem incorporates means for error checking all data received by its input means and transferred by its output means with the data transmitted by the remote modem output means and input means respectively.

28. A parallel process controller as defined in claim 27, wherein all transferrals of data to and from the local and remote modems occur asynchronously with respect to the remainder of the parallel process controller.

29. A parallel process controller as defined in claim 1, wherein said data bus is in the form of a daisy chain and further comprises a series of connectors interconnectable with the central processing units, the input/output system, and the general timing and control unit.

30. A parallel process controller for communicating with and control of external programmable controllers that in turn communicate with and control external devices comprising:
 (A) at least one, but not more than N central processing units, N being an integer greater than one, each central processing unit having:
  (a) a memory for the storage of M user lines, M being an integer greater than one, each user line defining either an instruction to be executed, said instruction capable of containing data to be acted upon or addresses where data can be retrieved, or said user line primarily defining data (datum line) to be acted upon, and
  (b) means for repetitively sequentially executing at least a portion of the instruction represented by each of said M instruction lines;
 (B) an input/output system for communicating to and from the parallel process controller and the interconnected external programmable controllers;
 (C) a data bus interconnected between the input/output system and each central processing unit for the transferral of data to and from the input/output system and each central processing unit; and
 (D) a general timing and control unit interconnected with the data bus, each central processing unit, and the input/output system for repetitively generating at least N different sequential control signals during a first predetermined length of time regardless of the number of central processing units presently part of the parallel process controller, each of N control signals causing only a particular central processing unit to be able to communicate by the data bus with the input/output system for a short, second predetermined length of time;

whereby a hierarchial parallel process control is obtained.

31. A parallel process controller for communicating with and control of external programmable controllers that in turn communicate with and control external devices comprising:
   (A) at least one, but not more than N central processing units, N being an integer greater than one, each central processing unit having:
      (a) a memory for the storage of M user lines, M being an integer greater than one, each user line defining either an instruction to be executed, said instruction capable of containing data to be acted upon or addresses where data can be retrieved, or said user line primarily defining data (datum line) to be acted upon, and
      (b) means for repetitively sequentially executing at least a portion of the instruction represented by each of said M instruction lines;
   (B) an input/output system for communicating to and from the parallel process controller and the interconnected external programmable controllers;
   (C) a data bus interconnected between the input/output system and each central processing unit for the transferral of data to and from the input/output system and each central processing unit; and
   (D) a general timing and control unit interconnected with the data bus, each central processing unit, and the input/output system for repetitively generating at least N different sequential control signals during a first predetermined length of time regardless of the number of central processing units presently part of the parallel process controller, each of N control signals causing a particular central processing unit to be able to communicate by the data bus with the input/output system for a short, second predetermined length of time;

wherein the means for sequentially executing the M user lines of each central processing unit incorporates first means for executing only one user liner during a time period equal to the first predetermined length of time generated by the general timing and control unit and second means for allowing said central processing unit to communicate by the data bus with the input/output system during said second predetermined length of time only with respect to said one user line; whereby the response time of the parallel process controller is not altered by the number of central processing units, nor the number of user lines requiring execution and; whereby a hierarchial parallel process control is obtained.

32. A parallel process controller as defined in claim 30, further comprising:
   (E) at least one data memory module interconnected with said data bus for the storage of data.

33. A parallel process controller as defined in claim 32, wherein the general timing and control unit incorporates means for causing each of N said control signals to further cause said corresponding particular central processing unit to be able to communicate by the data bus with any of the data memory modules for the transferral and receipt of data.

34. A parallel process controller as defined in claim 33, wherein the general timing and control unit incorporates means for preventing the direct communication between said central processing units, whereby communication between said central processing units is achievable by the data memory modules or input/output system.

35. A parallel process controller for communicating with and control of external devices, comprising:
   (A) at least one, but not more than N central processing units, N being an integer greater than one, each central processing unit having,
      (a) a memory for the storage of M uniquely addressable user lines of data, M being an integer greater than one, wherein said M user lines may represent instruction lines defining a desired instruction to be executed under certain circumstances and wherein said M user lines may also alternatively represent datum lines representing data in one of a predetermined number of different types of data formats; and
      (b) means for sequentially scanning all M lines and performing at least a portion of the instruction of each user line representing an instruction;
   (B) at least one data memory module for the storage of data in uniquely addressable lines of data, said lines being instruction lines and datum lines;
   (C) an input/output system for communicating to and from the parallel process controller and interconnected external devices;
   (D) a data bus interconnected between the input/output system and each central processing unit and data memory module for the transferral of data to and from the input/output system with any central processing unit and any data memory module and to and from any central processing unit with respect to any data memory module; and
   (E) a general timing and control unit communicating with the data bus, each central processing unit, each data memory module, and the input/output system, having first means for repetitively generating at least N different sequential control signals during a first predetermined length of time, each of N of the control signals causing only a particular central processing unit, if it is presently made part of the parallel process controller, to scan one of its M user lines and, if the line is an instruction line, to perform for a length of time no greater than said first predetermined length of time at least a portion of said instruction, and wherein said general timing and control unit allows said particular central processing unit to communicate data, by the data bus, to and from said user line and the input/output system or any one of the data memory modules for a short seconds predetermined length of time no greater than the time between consecutive control signals of said general timing and control unit, whereby one of said M user lines of each central processing unit is scanned by the respective central processing unit during said first predetermined length of time and whereby data may be communicated to and from said user line and the input/output system or any data memory module during said second predetermined length of time.

36. A parallel process controller as defined in claim 4, wherein said data formats include ASCII and binary coded decimal.

37. A parallel process controller as defined in claim 33, wherein the input/output system incorporates a memory having a first section for storing data to be transferred to said interconnected programmable controllers and a second section for receipt of data from said programmable controllers.

38. A parallel process controller as defined in claim 11, wherein said first register of each said instruction line further stores the status of the instruction line.

39. A parallel process controller as defined in claim 38, wherein the status information stored in said first register includes information regarding the active execution of the instruction line.

40. A parallel process controller as defined in claim 38, wherein the status information stored in said first register includes information regarding the output state of said instruction line.

41. A parallel process controller as defined in claim 40, wherein the output status information of said instruction line represents the energization or de-energization of a simulated relay coil.

42. A parallel process controller as defined in claim 38, wherein the circumstances represented by the second register of a first user instruction line for active execution of the instruction line include the state of a selected instruction line during the next to the last scan of the selected line by the central processing unit and the status of the selected line during the latest scan of the selected line by the central processing unit.

43. A parallel process controller as defined in claim 42, wherein the circumstances represented by the second register of the first instruction line concerning when active execution of the line is initiated by the central processing unit includes one of the following:
  (a) the truth of an input to any selected M user line during the latest scan of the selected line by the central processing unit as it sweeps through the M user lines,
  (b) the non-truth of said input to said selected user line during the latest scan by the central processing unit of the selected line,
  (c) the non-truth of the input to said selected line during the scan prior to the latest scan by the central processing unit and the truth of said input during the latest scan by the central processing unit of said selected line, or
  (d) the truth of the input to said selected line during the scan prior to the latest scan by the central processing unit and the non-truth of said input during the latest scan of the selected line by the central processing unit.

44. A parallel process controller as defined in claim 43, wherein said second register of the first instruction line alternatively provides for the observation of the output status of the selected instruction line or the completion of the execution of the statement represented by the selected instruction line instead of the input condition to said selected line for ascertaining when the first instruction line is to be executed by the central processing unit.

45. A parallel process controller as defined in claim 44, wherein said central processing unit further includes stepper lines, each line having one, and only one, of a plurality of its outputs true, and sequentially advancing the true output, and wherein the second register of the first instruction line alternatively provides for the observation of a selected stepper line output.

46. A parallel process controller as defined in claim 45, wherein at least some of the data acted upon during the solving of said instruction user lines may be remotely located with respect to said instruction user lines, wherein at least a portion of the data stored in said instruction user lines represent the address of said remotely located data.

47. A parallel process controller as defined in claim 46, wherein at least some of said remotely located data may be located external to said particular central processing unit.

48. A parallel process controller as defined in claim 47, wherein said instruction lines represent at least one of the following:
  (A) arithmetic statements including addition, subtraction, multiplication and division;
  (B) data transfer statements; and
  (C) logic statements.

49. A parallel process controller as defined in claim 11, wherein each central processing unit further comprises lines of data representing the input status for each user line, the output status for each user line and wherein the second register of each user instruction line may represent a reference to an input or output of any user line and wherein said second register may represent one of four circumstances regarding the referenced input or output for initiating the active solution of said line, said circumstances including:
  (A) the truth of the referenced input or output,
  (B) the un-truth of the referenced input or output,
  (C) the un-truth of the input or output during the next to the last time that the user instruction line was scanned by the central processing unit and the truth of said input or output during the most recent scan of the instruction line by the central processing unit, or
  (D) the truth of the input or output during the next to the last time that the user instruction line was scanned by the central processing unit and the un-truth of said input or output during the most recent scan of the instruction line by the central processing unit.

50. A parallel process controller as defined in claim 49, wherein each central processing unit further comprises at least one additional line representing a stepper output and wherein said second register of each user instruction line may reference the stepper line to ascertain the circumstances for the active solution of the user instruction line.

51. A parallel process controller as defined in claim 50, wherein the first register of each user instruction line contains data representing the READY status of the user instruction line, said READY signal representing the solution state of the user instruction line, and wherein the second register of the user instruction line may represent the reference to the READY condition of any other user instruction line in order to determine the circumstances for active execution of the present user instruction line.

52. A parallel process controller as defined in claim 11, wherein the remaining registers define data or conditions associated with the instruction defined by said first register.

53. A parallel process controller as defined in claim 12, wherein said data memory module includes a predetermined number of addressable data storage lines for the storage of information including user instruction lines and user datum lines.

54. A parallel process controller as defined in claim 53, wherein the general timing and control unit incorporates means for preventing direct communication between central processing units, whereby central processing units may only communicate with each other by one central processing unit depositing data in one of the data memory modules and a second central processing unit retrieving this data from the data memory module.

55. A parallel process controller as defined in claim 54, wherein the user lines of each central processing unit and the data storage lines of each data memory module are of the same invariant size.

56. A parallel process controller as defined in claim 55, wherein the user lines and the data storage lines have a predetermined number of registers.

57. A parallel process controller as defined in claim 56, wherein the data bus transfers data between the central processing units, the data memories, and the input/output system in discrete bytes equal in size to the registers comprising the user lines in the central processing unit and the data memory lines within the data memory modules.

58. A parallel process controller as defined in claim 1, wherein the data bus comprises a write bus, a read bus, and a control bus for the transferral of data to and from each central processing unit and the input/output system.

59. A parallel process controller as defined in claim 29, wherein said data bus comprises three impedance-controlled party-lines with simplex data pathways terminated at both ends with bus terminators.

60. A parallel process controller for communicating with and control of external devices, comprising:
(A) at least one but not more than N central processing units, N being an integer greater than one, each central processing unit designated by one of a series of N sequential numbers;
(B) an input/output system for communicating data to and from the parallel process controller and interconnected external devices;
(C) a data bus interconnected between the input/output system and each central processing unit for the transferral of data to and from the input/output system and each central processing unit; and
(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing said particular central processing unit to communicate by the data bus with the input/output system for a short, second predetermined length of time, each of the N sequential control signals, if any, designated by a sequential number other than a number corresponding to a central processing unit of the present parallel process controller, allowing one additional central processing unit to communicate by the data bus with the input/output system for said second predetermined length of time if said additional central processing unit is added to the parallel process controller; wherein the first means of the general timing and control unit generates at least one additional sequential control signal besides the N different sequential control signals, said additional signal communicating by the data bus to the input/output system for permitting data transfer to and from the parallel process controller and interconnected external devices at times other than when a central processing unit can communicate via the data bus with the input/output system;
wherein said data bus is in the form of a daisy chain and further comprises a series of connectors interconnectable with the central processing units, the input/output system, and the general timing and control unit; and wherein said data bus comprises three impedance-controlled party-lines with simplex data pathways terminated at both ends with bus terminators; whereby from one to N central processing units may comprise a portion of the parallel process controller without degrading the amount of time any of the central processing units may communicate with the input/output system.

61. A parallel process controller as defined in claim 60, wherein the first predetermined length of time of the general timing and control unit is 20 microseconds and the second predetermined length of time for each central processing unit to communicate by the data bus with input/output system is 1.82 microseconds, whereby up to 10 central processing units may comprise a portion of the parallel process controller.

62. A parallel process controller as defined in claim 59, wherein the data bus incorporates two impedance-controlled flat cables each having 25 signal conductors and 25 signal return lines.

63. A parallel process controller as defined in claim 30, wherein the sequential executing means of each central processing unit includes means for executing said user lines utilizing data in more than one format.

64. A parallel process controller as defined in claim 30, further comprising:
(F) a programming panel interconnectable with the input/output system for allowing the user to change the user instruction lines in any of the central processing units and to observe the data within any selected instruction line of any central processing unit.

65. A parallel process controller as defined in claim 3, further comprising:
(E) a programming panel interconnected with the input/output system for monitoring and programming at least the M user lines of any central processing unit.

66. A parallel process controller as defined in claim 9, further comprising:
(E) a programming panel interconnectable with the input/output system for monitoring and programming any user line of any central processing unit, said programming panel incorporating a display for illustrating the information stored in each register of any selected user line.

67. A parallel process controller as defined in claim 27, wherein the error checking means of the local modem bit-serial error checks data received from the output means of the remote modem with previously received data from the remote modem output means corresponding to the same set of data to verify the first set of data as being error free if no errors occur in the bit-serial checking of the data; and the error checking means for transferring data to the remote modem sends out a set of data to the remote modem, the remote modem echoing the data back to the local modem where it is bit-serial checked with the data as originally sent to the remote modem and if no error ocurs for any bit the local modem sends out a signal to the remote modem indicating that the data it has received is correct and thereby permissible to transfer to the external device.

68. A parallel process controller as defined in claim 67, wherein the error checking means of the local modem generates a first header signal along with data to be transferred to the remote modem that signifies to the remote modem that the data sent to it is the initial transfer of said data to the remote modem, a second header signal generated by the local modem and transferred to the remote modem that signifies to the remote modem that the data sent to the remote modem with the first header signal has been successfully echoed back to the local modem by the remote modem and successfully bit-serial error checked and therefore, the remote modem may pass the isolated and processed representation of this data to the interconnected external devices; a third header type generated by the local modem error checking means sent to the remote modem and signifying to the remote modem that a new set of data is requested by the local modem from an external device coupled to the remote modem and causing the remote modem to transfer the new set of data to the local modem where it is stored for bit-serial error checking, a fourth header signal transferred to the remote modem from the local modem signifying that the local modem has received the new set of data and causing the remote modem to re-transfer the same set of data to the local modem for bit-serial error checking with the first transferral of this same set of data to the local modem, wherein if the bit-serial error checking is correct the local modem isolates and processes the data and transfers it to the input/output memory, there accessible by the data bus with the remainder of the parallel process controller, and wherein a repeat of any header with any accompanying data occurs if an error is sensed in any data sent between the local and remote modems.

69. A parallel process controller as defined in claim 68, wherein the general timing and control unit generates an additional distinct sequential control signal during said first predetermined length of time, said control signal allowing the transfer of data to and from the input/output memory with the input/output channel during said second predetermined length of time, whereby a refresh period is generated at about the time that the distinct sequential control signal is generated by the general timing and control unit to provide for the updating of information in the input/output memory as well as the transferral of information from the input/output memory to external devices while allowing each central processing unit to communicate with any portion of the input/output memory during the second predetermined length of time associated with that central processing unit as governed by its corresponding control signal generated by the general timing and control unit.

70. A parallel process controller as defined in claim 35, wherein the datum user lines may contain data in one of a predetermined number of different data formats, and wherein the sequential scanning and performing means of each central processing unit includes means for performing the instruction of user instruction lines utilizing data in any of said data formats used in the datum lines.

71. A parallel process controller for communicating with and control of external devices, comprising:

(A) at least one, but not more than N central processing units, N being an integer greater than one, each central processing unit having,
  (a) a memory for the storage of M uniquely addressable user lines of data, M being an integer greater than one, wherein said M user lines may represent instruction lines defining a desired instruction to be executed under certain circumstances and wherein said M user lines may also alternatively represent datum lines representing data in one of a predetermined number of different types of data formats; and
  (b) means for sequentially scanning all M lines and performing at least a portion of the instruction of each user line representing an instruction;
(B) at least one data memory module for the storage of data in uniquely addressable lines of data, said lines being instruction lines and datum lines;
(C) an input/output system for communicating to and from the parallel process controller and interconnected external devices;
(D) a data bus interconnected between the input/output system and each central processing unit and data memory module for the transferral of data to and from the input/output system with any central processing unit and any data memory module and to and from any central processing unit with respect to any data memory module; and
(E) a general timing and control unit communicating with the data bus, each central processing unit, each data memory module, and the input/output system, having first means for repetitively generating at least N different sequential control signals during a first predetermined length of time, each of N of the control signals causing a particular central processing unit, if it is presently made part of the parallel process controller, to scan one of its M user lines and, if the line is an instruction line, to perform for a length of time no greater than said first predetermined length of time at least a portion of said instruction, and wherein said general timing and control unit allows said particular central processing unit to communicate data, by the data bus, to and from said user line and the input/outpt system or any one of the data memory modules for a short, second, predetermined length of time no greater than the time between consecutive control signals of said general timing and control unit;

wherein the datum user lines may contain data in one of a predetermined number of different data formats, and wherein the sequential scanning and performing means of each central processing unit includes means for performing the instruction of user instruction lines utilizing data in any of said data formats used in the datum lines; and further wherein said input/output system comprises:
  (a) at least one input/output memory interconnected to said data bus, for the storage of data as P input lines, and Q output lines, P and Q being positive integers; and
  (b) at least one input/output channel interconnected to said input/output memory for processing, isolating, and receiving from interconnected external devices at least some of said P lines of data and the transferring to interconnected external devices at least some of the Q lines of data, said input/output channel incorporating;

(1) a local modem having input means for processing, isolating and receiving at least some of said P lines of data and for transferring said data to the input/output memory, means for receiving said Q output lines from the input/output memory and for processing, isolating and transferring at least some of said Q lines of data;

(2) a data communication means interconnected with the local modem for providing a pathway for transferring said Q output lines beyond said local modem and for providing a pathway for receiving said P input lines; and (3) a remote modem interconnected at the other end of the data communication means having input means for receiving, processing and isolating said transferred Q lines of data to interconnected external devices and output means for isolating, processing and transferring data from interconnected external devices along said data communication means to the local modem input means;

whereby one of said M user lines of each central processing unit is scanned by the respective central processing unit during said first predetermined length of time and whereby data may be communicated to and from said user line and the input/output system or any data memory module during said second predetermined length of time.

72. A parallel process controller as defined in claim 71, wherein the input/output channel incorporates error checking means at the remote modem for echoing back the Q output lines transferred to the remote modem and for retransferring the P input lines previously sent to the local modem, and second means for bit-serial error checking each of the Q output lines echoed from the remote modem with the image of those Q output lines stored at the local modem and bit-serial checking the transferrals of the P input lines from the remote modem to the local modem, wherein said error checking means causes the re-transferral of a line of data by either the local modem or remote modem depending upon whether the line is an output or input line respectively until a bit-serial error free comparison is obtained, said error checking means prohibiting the transferral of received input lines by the input/output channel to the input/output memory until an error-free comparison of said data is obtained and for preventing the transferral of output lines by the remote modem to interconnected external devices until an error-free comparison of said transferred data is obtained; whereby the input/output memory as well as interconnected external devices only receive data from the input/output channel when said data has been verified correct.

73. A parallel process controller as defined in claim 71, wherein the data communications means comprises a coaxial cable.

74. A parallel process controller as defined in claim 71, wherein the first means of the general timing and control unit generates at least one additional sequential control signal besides the N different sequential control signals, said additional signal communicated to the input/output system so as to cause the transferral of said P input lines and Q output lines between the input/output memory and input/output channel during a period of time initiated by the additional repetitive control signal; whereby the input/output memory is able to service the remaining portion of the parallel process controller without interruption by the input/output system and yet maintain up-to-date input and output lines in conjunction with the input/output system.

75. A parallel process controller as defined in claim 74, wherein the general timing and control unit incorporates means for preventing direct communication between the central processing units.

76. A parallel process controller as defined in claim 75, wherein the central processing units communicate with each other by depositing and receiving data deposited in the data memory modules or the input/output memory of the input/output system.

77. A parallel process controller as defined in claim 76, wherein at least some of the data acted upon during the execution of said instruction user lines may be remotely located with respect to said instruction user lines in any one of the following areas: (1) within other areas of the particular central processing unit; (2) within any data memory module; or (3) within the input/output memory of the input/output system.

78. A parallel process controller as defined in claim 77, wherein said instruction lines represent at least one of the following:

(A) arithmetic statements including addition, subtraction, multiplication, and division;

(B) data transfer statements; and (C) logic statements.

79. A parallel process controller as defined in claim 78, wherein said user lines have an invariant size.

80. A parallel process controller as defined in claim 79, wherein said user lines have a predetermined number of registers.

81. A parallel process controller as defined in claim 80, wherein with respect to user instruction lines one of said registers represents the type of instruction that the remainder of the registers of that line represent.

82. A parallel process controller as defined in claim 81, wherein a second of said registers represents the circumstances under which active performance of said instruction line is initiated by the central processing unit.

83. A parallel process controller as defined in claim 82, wherein the remaining registers of the user instruction lines define the data, data addresses, or conditions associated with the instruction line.

84. A parallel process controller as defined in claim 83, wherein the user instruction lines and data lines comprise five registers.

85. A parallel process controller as defined in claim 83 further comprising:

(f) a programming panel interconnected with the input/output system for monitoring and programming the M user lines of any selected central processing unit and the uniquely addressable lines of data in any of the data memory modules, as well as any of the P input lines and Q output lines of the input/output memory.

86. A parallel process controller as defined in claim 85, wherein said programming panel incorporates a display for illustrating the information stored in each register of any selected line of data.

87. A parallel process controller as defined in claim 86, wherein said programming panel monitoring means further comprises scrolling means for sequentially monitoring consecutively higher or lower M user lines of any selected central processing unit, any addressable data memory lines of any data memory, or any P and Q line of the input/output memory.

88. A parallel process controller as defined in claim 87, wherein the scroll switching means further incorporates means for sequentially monitoring higher or lower M user lines that have a selected one of a plurality of characteristics.

89. A parallel process controller for communicating with and control of external devices, comprising:
(A) at least one, but not more than N central processing units, N being an integer greater than one, each central processing unit having,
  (a) a memory for the storage of M uniquely addressable user lines of data, M being an integer greater than one, wherein said M user lines may represent instruction lines defining a desired instruction to be executed under certain circumstances and wherein said M user lines may also alternatively represent datum lines representing data in one of a predetermined number of different types of data formats; and
  (b) means for sequentially scanning all M lines and performing at least a portion of the instruction of each user line representing an instruction;
(B) at least one data memory module for the storage of data in uniquely addressable lines of data, said lines being instruction lines and datum lines;
(C) an input/output system for communicating to and from the parallel process controller and interconnected external devices;
(D) a data bus interconnected between the input/output system and each central processing unit and data memory module for the transferral of data to and from the input/output system with any central processing unit and any data memory module and to and from any central processing unit with respect to any data memory module; and
(E) a general timing and control unit communicating with the data bus, each central processing unit, each data memory module, and the input/output system, having first means for repetitively generating at least N different sequential control signals during a first predetermined length of time, each of N of the control signals causing a particular central processing unit, if it is presently made part of the parallel process controller, to scan one of its M user lines and, if the line is an instruction line, to perform for a length of time no greater than said first predetermined length of time at least a portion of said instruction, and wherein said general timing and control unit allows said particular central processing unit to communicate data, by the data bus, to and from said user line and the input/output system or any one of the data memory modules for a short, second, predetermined length of time no greater than the time between consecutive control signals of said general timing and control unit;
wherein the datum user lines may contain data in one of a predetermined number of different data formats, and wherein the sequential scanning and performing means of each central processing unit includes means for performing the instruction of user instruction lines utilizing data in any of said data formats used in the datum lines, wherein said input/output system comprises:
  (a) at least one input/output memory interconnected to said data bus, for the storage of data as P input lines, and Q output lines, P and Q being positive integers; and
  (b) at least one input/output channel interconnected to said input/output memory for processing, isolating, and receiving from interconnected external devices at least some of said P lines of data and the transferring to interconnected external devices at least some of the Q lines of data, said input/output channel incorporating;
    (1) a local modem having input means for processing, isolating and receiving at least some of said P lines of data and for transferring said data to the input/output memory, means for receiving said Q output lines from the input/output memory and for processing, isolating and transferring at least some of said Q lines of data;
    (2) a data communication means interconnected with the local modem for providing a pathway for transferring said Q output lines beyond said local modem and for providing a pathway for receiving said p input lines; and
    (3) a remote modem interconnected at the other end of the data communication means having input means for receiving, processing and isolating said transferred Q lines of data to interconnected external devices and output means for isolating, processing and transferring data from interconnected external devices along said data communication means to the local modem input means;
wherein the first means of the general timing and control unit generates at least one additional sequential control signal besides the N different sequential control signals, said additional signal communicated to the input/output system so as to cause the transferral of said P input lines and Q output lines between the input/output memory and input/output channel during a period of time initiated by the additional repetitive control signal; whereby the input/output memory is able to service the remaining portion of the parallel process controller without interruption by the input/output system and yet maintain up-to-date input and output lines in conjunction with the input/output system; wherein the general timing and control unit incorporates means for preventing direct communication between the central processing units, wherein the central processing units communicate with each other by depositing and receiving data deposited in the data memory modules or the input/output memory of the input/output system, wherein at least some of the data acted upon during the execution of said instruction user lines may be remotely located with respect to said instruction user lines in any one of the following areas: (1) within other areas of the particular central processing unit; (2) within any data memory module; or (3) within the input/output memory of the input/output system, wherein said instruction lines represent at least one of the following:
  (A) arithmetic statements including addition, subtraction, multiplication, and division;
  (B) data transfer statements; and
  (c) logic statements;
wherein said user lines have an invariant size, wherein said user lines have a predetermined number of registers, wherein with respect to user instruction lines one of said registers represents the type of instruction that the remainder of the registers of that line represent, wherein a second of said registers represents the circumstances under which active performance of said instruction line is initiated by the central processing unit, wherein the remaining registers of the user instruction lines define the data, data addresses, or conditions associated with the instruction line, and wherein the parallel process controller further comprises:

(F) a programming panel interconnected with the input/output system for monitoring and programming the M user lines of any selected central processing unit and the uniquely addressable lines of data in any of the data memory modules, as well as any of the P input lines and Q output lines of the input/output memory, wherein said programming panel incorporates a display for illustrating the information stored in each register of any selected line of data, wherein said monitoring means further comprises trace means for monitoring user lines to which a presently monitored user line refers, whereby one of said M user lines of each central processing unit is scanned by the respective central processing unit during said first predetermined length of time and whereby data may be communicated to and from said user line and the input/output system or any data memory module during said second predetermined length of time.

90. A parallel process controller as defined in claim 89, wherein each central processing unit in each data memory module is housed in a separate frame.

91. A parallel process controller as defined in claim 90, further comprising:

(G) a main assembly enclosure incorporating a plurality of channels wherein any central processing unit or data memory module may be placed in any channel.

92. A parallel process controller as defined in claim 91, wherein the main assembly enclosure further comprises a positive pressurizable housing, an air plenum within said housing, and a fan within the housing for maintaining the positive pressure within the housing.

93. A parallel process controller as defined in claim 91, wherein at least a portion of the input/output system including the input/output memory and the local modem of the input/output channel are housed in a separate frame installable within one of a plurality of channels within the main assembly enclosure and wherein the data bus is in the form of a daisy chain comprising a series of connectors interconnectable with the central processing unit frames, the data memory module frames, and the input/output system frame.

94. A parallel process controller as defined in claim 3, wherein at least some of the user instruction lines of a central processing unit require for execution a time period in excess of one first predetermined length of time, and wherein the sequential executing means of the corresponding central processing unit incorporates means for storing partial results of execution of said instruction lines to allow complete execution of the instruction lines as the corresponding central processing unit repetitively sequentially executes said M user lines.

95. A parallel process controller as defined in claim 7, wherein at least some of the user instruction lines of a central processing unit require for execution a time period in excess of one first predetermined length of time, and wherein the sequential executing means of the corresponding central processing unit incorporates means for storing partial results of execution of said instruction lines to allow complete execution of the instruction lines as the corresponding central processing unit repetitively sequentially executes said M user lines.

96. A parallel process controller for communicating with and control of external programmable controllers that in turn communicate with and control external devices comprising:

(A) at least one, but not more than N central processing units, N being an integer greater than one, each central processing unit having:

(a) a memory for the storage of M user lines, M being an integer greater than one, each user line defining either an instruction to be executed, said instruction capable of containing data to be acted upon or addresses where data can be retrieved, or said user line primarily defining data (datum line) to be acted upon, and (b) means for repetitively sequentially executing at least a portion of the instruction represented by each of said M instruction lines;

(B) an input/output system for communicating to and from the parallel process controller and the interconnected external programmable controllers;

(C) a data bus interconnected between the input/output system and each central processing unit for the transferral of data to and from the input/output system and each central processing unit; and (D) a general timing and control unit interconnected with the data bus, each central processing unit, and the input/output system for repetitively generating at least N different sequential control signals during a first predetermined length of time regardless of the number of central processing units presently part of the parallel process controller, each of N control signals causing a particular central processing unit to be able to communicate by the data bus with the input/output system for a short, second predetermined length of time; and (E) at least one data memory module interconnected with said data bus for the storage of data;

wherein at least some of the user instruction lines of a central processing unit require for execution a time period in excess of one first predetermined length of time, and wherein the sequential executing means of the corresponding central processing unit incorporates means for storing partial results of execution of said instruction lines to allow complete execution of the instruction lines as the corresponding central processing unit repetitively sequentially executes said M user lines; and whereby a hierarchial parallel process control is obtained.

97. A parallel process controller as defined in claim 35, wherein at least some of the user instruction lines of a central processing unit require for execution a time period in excess of one first predetermined length of time, and wherein the sequential executing means of the corresponding central processing unit incorporates means for storing partial results of execution of said instruction lines to allow complete execution of the instruction lines as the corresponding central processing unit repetitively sequentially executes said M user lines.

98. A parallel process controller for communicating with and control of external devices, comprising:

(A) at least one, but not more than N central processing units, N being an integer greater than one, each central processing unit having, (a) a memory for the storage of M uniquely addressable user lines of data, M being an integer greater than one, wherein said M user lines may represent instruction lines defining a desired instruction to be executed under certain circumstances, and wherein said M user lines may also represent datum lines representing data in one of a predetermined number of different types of data formats; and (b) means for sequentially scanning all M user lines and performing at least a portion of the instruction of each user line representing an instruction, said sequential scanning and performing means including means for storing partial results of any user instruction line if said instruction line is not completely performed during one scan of the central processing unit;

(B) at least one data memory module for the storage of data in uniquely addressable lines of data, said lines including instruction lines and datum lines;

(C) an input/output system for communicating to and from the parallel process controller and interconnected external devices, said input/output system having, (a) at least one input/output memory for the storage of data in the form of uniquely addressable lines of data representing inputs from interconnected external devices and a second set of uniquely addressable lines of data representing output data for transferral to interconnected external devices, and (b) at least one input/output channel interconnected to said input/output memory for processing, isolating and receiving from interconnected external devices data for transferral to the addressable input lines of the input/output memory and for processing, isolating and transferring data in the uniquely addressable output lines of the input/output memory to interconnected external devices;

(D) a data bus interconnected between the input/output memory of the input/output system and each central processing unit and each data memory module for the transferral of data to and from the input/output memory with any central processing unit and any data memory module and also for the transferral of data to and from any central processing unit with any data memory module;

(E) a programming panel interconnectable with the input/output channel of the input/output system having user input means for selecting any addressable line in any central processing unit, data memory module, or input/output memory and a display for showing the data within the selected addressable line and programming means having a programming switch and interactable with the user input means for allowing alteration of the data within any addressable line of any central processing unit, data memory module or input/output memory; and (F) a general timing and control unit interconnected with the data bus and communicating with each central processing unit, each data memory module, and the input/output system having first means for repetitively generating at least N+1 different sequential control signals during a first predetermined length of time, each of N of the N+1 control signals causing a particular central processing unit, if it is presently made part of the parallel process controller, to scan one of its M user lines and, if the line is an instruction line, to perform for a length of time no greater than said first predetermined length of time at least a portion of said instruction, and wherein said general timing and control unit allows said particular central processing unit to transfer data, by the data bus, to and from said user line and the input/output memory of the input/output system or any of the data memory modules for a short, second predetermined length of time no greater than the time between consecutive control signals of the general timing and control unit, and wherein the (N+1)th control signal communicates via the data bus with the input/output system for the transferral of input line data and output line data to and from the input/output memory and the input/output channel so as to prevent data communication between the input/output memory and the input/output channel at times when any central processing unit may transfer data to and from the input/output memory, whereby one of said M user lines of each central processing unit is scanned by the respective central processing unit during said first predetermined length of time and whereby data may be transferred to and from said user line and the input/output system or any data memory module during said second predetermined length of time and wherein the response time of the parallel process controller is invariant with respect to the number of central processing units, up to N, presently made part of the parallel process controller as well as the number of M user lines of any central processing unit requiring active execution.

99. A parallel process controller as defined in claim 98, wherein the programming panel is interconnectable with a dedicated input/output channel and communicates with dedicated addressable input and output data lines of the input/output memory.

100. A parallel process controller as defined in claim 99, wherein the programming panel incorporates means for specifying that a particular central processing unit be monitored or programmed, and wherein the general timing and control unit incorporates means for generating a first group of N control signals at the beginning of each scan of the M user lines for N central processing units for permitting each central processing unit to ascertain if the programming panel desires monitoring or programming thereof.

101. A parallel process controller for communicating with and control of external devices, comprising:

(A) at least one, but not more than N central processing units, N being an integer greater than one, each central processing unit having, (a) a memory for the storage of M uniquely addressable user lines of data, M being an integer greater than one, wherein said M user lines may represent instruction lines defining a desired instruction to be executed under certain circumstances, and wherein said M user lines may also represent datum lines representing data in one of a predetermined number of different types of data formats; and (b) means for sequentially scanning all M user lines and performing at least a portion of the instruction of each user line representing an instruction, said sequential scanning and performing means including means for storing partial results of any user instruction line if said instruction line is not completely performed during one scan of the central processing unit;

(B) at least one data memory module for the storage of data in uniquely addressable lines of data, said lines including instruction lines and datum lines;

(C) an input/output system for communicating to and from the parallel process controller and interconnected external devices, said input/output system having,
 (a) at least one input/output memory for the storage of data in the form of uniquely addressable lines of data representing inputs from interconnected external devices and a second set of uniquely addressable lines of data representing output data for transferral to interconnected external devices, and
 (b) at one input/output channel interconnected to said input/output memory for processing, isolating and receiving from interconnected external devices data for transferral to the addressable input lines of the input/output memory and for processing, isolating and transferring data in the uniquely addressable output lines of the input/output memory to interconnected external devices;
(D) a data bus interconnected between the input/output memory of the input/output system and each central processing unit and each data memory module for the transferral of data to and from the input/output memory with any central processing unit and any data memory module and also for the transferral of data to and from any central processing unit with any data memory module;
(E) a programming panel interconnectable with the input/output channel of the input/output system having user input means for selecting any addressable line in any central processing unit, data memory module, or input/output memory and a display for showing the data within the selected addressable line and programming means having a programming switch and interactable with the user input means for allowing alteration of the data within any addressable line of any central processing unit, data memory module or input/output memory; and
(F) a general timing and control unit interconnected with the data bus and communicating with each central processing unit, each data memory module, and the input/output system having first means for repetitively generating at least N+1 different sequential control signals during a first predetermined length of time, each of N of the N+1 control signals causing a particular central processing unit, if it is presently made part of the parallel process controller, to scan one of its M user lines and, if the line is an instruction line, to perform for a length of time no greater than said first predetermined length of time at least a portion of said instruction, and wherein said general timing and control unit allows said particular central processing unit to transfer data, by the data bus, to and from said user line and the input/output memory of the input/output system or any of the data memory modules for a second, short, predetermined length of time no greater than the time between consecutive control signals of the general timing and control unit, and wherein the (N+1)th control signal communicates via the data bus with the input/output system for the transferral of input line data and output line data to and from the input/output memory and the input/output channel so as to prevent data communication between the input/output memory and the input/output channel at times when any central processing unit may transfer data to and from the input/output memory,
wherein the user line has a first region for the storage of data representing whether the line is a datum line or instruction line and if it is a datum line what type of data in one of said predetermined number of different types of data format is represented in the remaining portion of the datum line, and if the line is an instruction line, said first region indicating the type of instruction that the line represents; whereby one of said M user lines of each central processing unit is scanned by the respective central processing unit during said first predetermined length of time and whereby data may be transferred to and from said user line and the input/output system or any data memory module during said second predetermined length of time and wherein the response time of the parallel process controller is invariant with respect to the number of central processing units, up to N, presently made part of the parallel process controller as well as the number of M user lines of any central processing unit requiring active execution.

102. A parallel process controller as defined in claim 101, wherein a second region of any user instruction line contains status information about the particular user instruction line.

103. A parallel process controller as defined in claim 102, wherein this status information includes,
 (1) output status of the line,
 (2) input status of the line, and
 (3) ready status of the line.

104. A parallel process controller as defined in claim 103, wherein a third region of any user instruction line represents the circumstance under which active execution of the instruction line is initiated by the central processing unit when it scans this particular user instruction line.

105. A parallel process controller as defined in claim 104, wherein the circumstances represented by the third register for active execution of the line include a reference to a condition of any other user line of the same central processing unit.

106. A parallel process controller as defined in claim 105, wherein the condition of the referenced line may include reference to its input state, output state, or ready state.

107. A parallel process controller as defined in claim 106, wherein the circumstances for execution represented by the third region of the user instruction line includes:
 (1) the truth of the reference condition of the referenced user line,
 (2) the un-truth of the reference condition of the referenced user line,
 (3) the present truth of the reference condition of the referenced user line and the un-truth of the same reference condition during the previous scan of the central processing unit, and
 (4) the present un-truth of the reference condition of the referenced user line and the truth of the reference of the same reference condition during the previous scan of the central processing unit,
wherein the second region of the user instruction line further includes status information regarding said reference condition of the referenced user line during the previous scan of the central processing unit.

108. A parallel process controller as defined in claim 107, wherein each central processing unit further comprises at least one additional line representing a stepper output and wherein said third region of each user instruction line may make reference to any particular stepper output of any selected stepper line within the same central processing unit.

109. A parallel process controller as defined in claim 108, wherein the remaining regions of each user instruction line represent data to be used in the execution of the instruction line, addresses for data to be used in the execution of the instruction line, or addresses for the deposit of the executed result of the user instruction line.

110. A parallel process controller as defined in claim 109, wherein at least some of said data addresses may be addresses for data in any addressable line of any data memory module.

111. A parallel process controller as defined in claim 110, wherein each central processing unit may not directly address any other central processing unit.

112. A parallel process controller as defined in claim 111, wherein said programming panel includes means for generating an ENABLE signal and a DISABLE signal for causing the output of any selected user line to be true or false respectively and wherein the first region of every user line incorporates a sub-region for the storage of data corresponding to an ENABLE or DISABLE signal.

113. A parallel process controller as defined in claim 112, wherein every user line has an invariant size.

114. A parallel process controller as defined in claim 113, wherein said first and second regions comprise a first register of the user line, said third regions comprises a second register of a user instruction line, and the remaining regions of a user instruction line are set forth in a third, fourth, and fifth register of the user instruction line.

115. A parallel process controller as defined in claim 114, wherein said instruction lines represent at least one of the following instructions:
(1) arithmetic statements including addition, subtraction, multiplication, and division;
(2) data transfer statements; and
(3) logic statements.

116. A parallel process controller as defined in claim 115, wherein the data format for the user line includes ASCII and BCD.

117. A parallel process controller as defined in claim 107, wherein the programming panel is interconnectable with a dedicated input/output channel and communicates with dedicated addressable input and output data lines of the input/output memory.

118. A parallel process controller as defined in claim 117, wherein the programming panel incorporates means for specifying that a particular central processing unit be monitored or programmed, and wherein the general timing and control unit incorporates means for generating a first group of N control signals at the beginning of each scan of the M user lines for N central processing units for permitting each central processing unit to ascertain if the programming panel desires monitoring or programming thereof.

119. A parallel data processor comprising:
(A) at least one but not more than N central processing units, N being an integer greater than one, each central processing unit designated by one of a series of N sequential numbers;
(B) an input/output system for communicating data to and from the parallel data processor and interconnected external devices;
(C) a data bus interconnected between the input/output system and each central processing unit for the transferral of data to and from the input/output system and each central processing unit; and
(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing only the particular central processing unit to communicate by the data bus with the input/output system for a short, second predetermined length of time, each of the N sequential control signals, if any, designated by a sequential number other than a number corresponding to a central processing unit of the present parallel data processor allowing one additional central processing unit to communicate by the data bus with the input/output system for the second predetermined length of time if the additional central processing unit is added to the parallel data processor;

whereby from one to N central processing units may comprise a portion of the parallel data processor without degrading the amount of time any of the central processing units may communicate with the input/output system.

120. A parallel data processor as defined in claim 119, wherein the general timing and control unit incorporates means for preventing the direct communication between the central processing units.

121. A parallel data processor, comprising:
(A) at least one but not more than N central processing units, N being an integer greater than one, each central processing unit designated by one of a series of N sequential numbers;
(B) an input/output system for communicating data to and from the parallel data processor and interconnected external devices;
(C) a data bus interconnected between the input/output system and each central processing unit for the transferral of data to and from the input/output system and each central processing unit; and
(D) a general timing and control unit interconnected with the data bus, each central processing unit, and the input/output system for repetitively generating at least N distinct sequential control signals during a first predetermined length of time regardless of the number of central processing units, each of N control signals designated by one of the numbers of said series of N sequential numbers, each control signal with the same designated number as a central processing unit allowing the particular central processing unit to communicate by the data bus with the input/output system for a short, second predetermined length of time, each of the N sequential control signals, if any, designated by a sequential number other than a number corresponding to a central processing unit of the present parallel data processor allowing one additional central processing unit to communicate by the data bus with the input/output system for the second predetermined length of time if the additional central processor unit is added to the parallel data processor;

wherein each central processing unit contains M user lines, M being an integer greater than one, each user line defining either an instruction to be executed, the instruction capable of containing data to be acted upon or addresses where data can be retrieved, or the user line primarily defining data (datum line) to be acted upon, each central processing unit having means for repetitively sequentially executing at least a portion of the instruction represented by each of the M lines, only one of the M lines being executed during each of the first predetermined lengths of time generated by the general timing and control unit, the sequential executing means incorporating means for transferring data to and from the user line being executed and the input/output system when the general timing and control signal associated with the particular central processing unit allows for such transferral of data to and from the central processing unit and input/output system for the second predetermined length of time; whereby the number of lines of the M user lines for each central processing unit requiring execution does not degrade the amount of time for any particular user line to be executed by the central processing unit; whereby from one to N central processing units may comprise a portion of the parallel data processor without degrading the amount of time any of the central processing units may communicate with the input/output system.

122. A parallel data processor as defined in claim 121, wherein the user lines primarily defining data (datum lines) may contain data in one of a predetermined number of different data formats; and wherein the central processing unit user line executing means includes means for executing the user lines utilizing data in more than one format of the predetermined number of data formats.

123. A parallel data processor as defined in claim 122, wherein at least some of the data acted upon during the execution of the instruction user lines may be remotely located with respect to the instruction user lines, wherein at least a portion of the data stored in the instruction user lines represent the address of the remotely located data.

124. A parallel data processor as defined in claim 123, wherein at least some of the remotely located data may be located external to the particular central processing unit.

125. A parallel data processor as defined in claim 122, wherein the instruction lines represent at least one of the following:
(A) arithmetic statements including addition, subtraction, multiplication and division;
(B) data transfer statements; and
(C) logic statements.

126. A parallel data processor as defined in claim 122, wherein the instruction lines and datum lines have an invariant size.

127. A parallel data processor as defined in claim 126, wherein the instruction lines and dataum lines have a predetermined number of registers.

128. A parallel data processor as defined in claim 127, wherein, for instruction lines, one of the registers represents the type of instruction the remainder of the registers represents.

129. A parallel data processor as defined in claim 128, wherein a second of the registers represents the circumstance under which active execution of the line is initiated by the central processing unit.

130. A parallel data processor as defined in claim 119, further comprising:
(E) at least one data memory module interconnected with the data bus for the storage of data.

131. A parallel data processor as defined in claim 130, wherein each central processing unit and each data memory module is housed in a separate frame.

132. A parallel data processor as defined in claim 131, further comprising:
(F) a main assembly enclosure incorporating a plurality of channels wherein any central processing unit and data memory module may be placed in any channel.

133. A parallel data processor as defined in claim 132, wherein the main assembly enclosure further comprises a positive pressurizable housing, an air plenum within the housing, and a fan within the housing for maintaining positive pressure within the housing.

134. A parallel data processor as defined in claim 130, wherein the general timing and control unit incorporates means for causing the control signals to further cause a particular central processing unit to communicate by the data bus with any of the data memory modules for the transferral and receipt of data.

135. A parallel data processor as defined in claim 134, wherein the general timing and control unit and data bus incorporate means for preventing the direct communication between the central processing units, whereby communication between the central processing units is achievable by utilization of the data memory modules.

136. A parallel data processor as defined in claim 130, further comprising:
(F) a programming panel interconnectable with the input/output system incorporating first means for monitoring selected data within any of the central processing units, the data memory modules, the general timing and control unit, and the input/output system, and incorporating second means for altering at least some of the data within the central processing units and the data memory modules.

* * * * *